(12) United States Patent
Nishio et al.

(10) Patent No.: US 7,751,065 B2
(45) Date of Patent: Jul. 6, 2010

(54) OPTICAL DISPLACEMENT METER, OPTICAL DISPLACEMENT MEASURING METHOD, OPTICAL DISPLACEMENT MEASURING PROGRAM, COMPUTER-READABLE RECORDING MEDIUM, AND DEVICE THAT RECORDS THE PROGRAM

(75) Inventors: Yoshiaki Nishio, Osaka (JP); Hiroyuki Satoyoshi, Osaka (JP)

(73) Assignee: Keyence Corporation, Osaka (JP)

( * ) Notice: Subject to any disclaimer, the term of this patent is extended or adjusted under 35 U.S.C. 154(b) by 263 days.

(21) Appl. No.: 11/973,253

(22) Filed: Oct. 5, 2007

(65) Prior Publication Data

US 2008/0094643 A1    Apr. 24, 2008

(30) Foreign Application Priority Data

Oct. 5, 2006  (JP) .............................. 2006-274526
Apr. 18, 2007  (JP) .............................. 2007-109292

(51) Int. Cl.
*G01B 11/30*  (2006.01)

(52) U.S. Cl. ........................................ 356/606; 356/623
(58) Field of Classification Search ........................ None
See application file for complete search history.

(56) References Cited

U.S. PATENT DOCUMENTS 7,242,485 B2   7/2007   Akishiba

FOREIGN PATENT DOCUMENTS

JP       10-267648      10/1998
JP     2006-010361       1/2006

OTHER PUBLICATIONS

U.S. Appl. No. 11/973,036, filed Oct. 5, 2007, Nishio.

*Primary Examiner*—Gregory J Toatley, Jr.
*Assistant Examiner*—Juan D Valentin
(74) *Attorney, Agent, or Firm*—Kilyk & Bowersox, P.L.L.C.

(57) ABSTRACT

The present invention provides an optical displacement meter in which light receiving elements are disposed two-dimensionally, capable of stably obtaining a reception light amount in accordance with a work. The optical displacement meter includes: a two-dimensional light receiving device for receiving reflection light of strip-line-shaped light from an object to be measured and outputting the received reflection light as a reception light signal in each of positions in a first direction; reception light level control means for controlling any of parameters of at least operation amounts including a light emission amount of a projector and amplification factor of an amplifier so that a distribution of peaks in the first direction of amplification signals obtained by the amplifier lies in a predetermined range; and mode switching means for switching between a measuring mode of measuring displacement of an object to be measured and a setting mode of setting an operation amount of the reception light level control means. In the setting mode, strip-line-shaped light is emitted from the projector to the object to be measured, a distribution state of peaks of the amplification signals in the positions in the first direction is measured, and the reception light level control means can adjust the operation amount in accordance with the distribution state in the first direction.

10 Claims, 115 Drawing Sheets

Fig. 7

| No | Profile acquisition time | NG | Data |
|---|---|---|---|
| 1 | 2005/6/12 12:37:12 | | |
| 2 | 2005/6/12 12:37:12 | | |
| 3 | 2005/6/12 12:37:13 | | |
| 4 | 2005/6/12 12:37:13 | 1 | 12.547 |
| 5 | 2005/6/12 12:37:13 | | |
| 6 | 2005/6/12 12:37:13 | | |
| 7 | 2005/6/12 12:37:13 | | |
| 8 | 2005/6/12 12:37:13 | | |
| 9 | 2005/6/12 12:37:13 | | |
| 10 | 2005/6/12 12:37:13 | | |
| 11 | 2005/6/12 12:37:13 | | |
| 12 | 2005/6/12 12:37:14 | | |
| 13 | 2005/6/12 12:37:14 | 2 | 3.244 |
| 14 | 2005/6/12 12:37:14 | | |
| 15 | 2005/6/12 12:37:14 | | |
| 16 | 2005/6/12 12:37:14 | | |
| 17 | 2005/6/12 12:37:14 | | |
| 18 | 2005/6/12 12:37:14 | 1 | 12.331 |
| 19 | 2005/6/12 12:37:14 | | |
| 20 | 2005/6/12 12:37:14 | | |
| 21 | 2005/6/12 12:37:14 | | |
| 22 | 2005/6/12 12:37:15 | | |
| 23 | 2005/6/12 12:37:15 | | |

Fig. 17
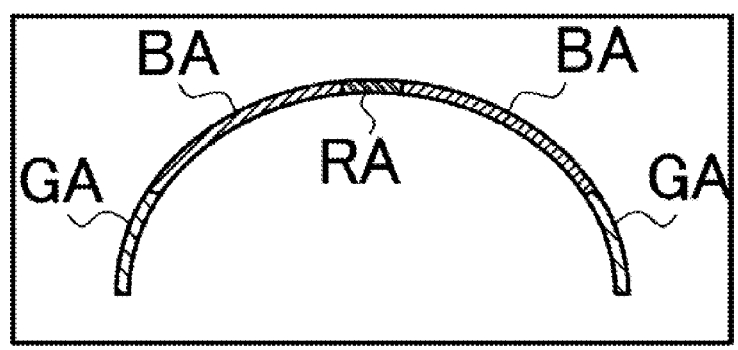
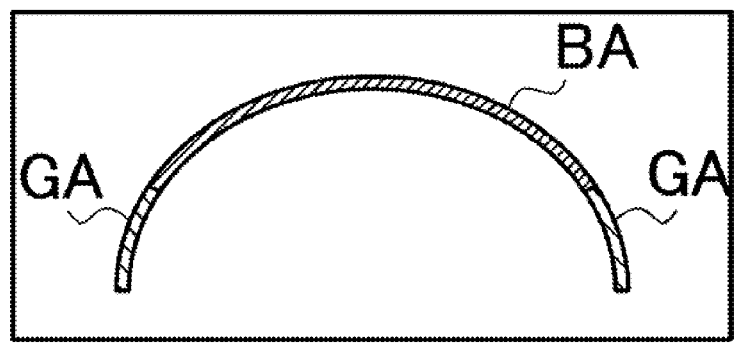
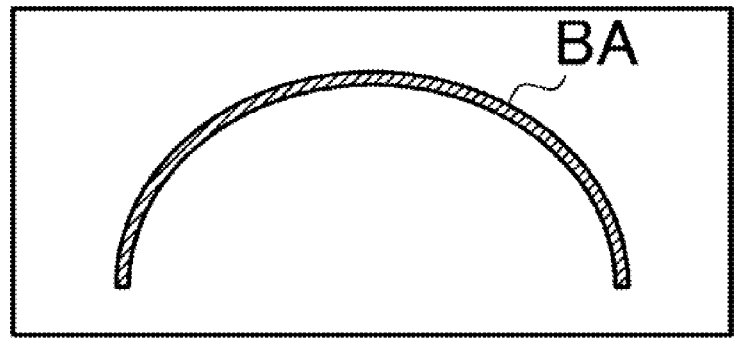

KW                KW d

Prior Art

Prior Art

OPTICAL DISPLACEMENT METER, OPTICAL DISPLACEMENT MEASURING METHOD, OPTICAL DISPLACEMENT MEASURING PROGRAM, COMPUTER-READABLE RECORDING MEDIUM, AND DEVICE THAT RECORDS THE PROGRAM

BACKGROUND OF THE INVENTION

1. Field of the Invention

The present invention relates to an optical displacement meter, an optical displacement measuring method, an optical displacement measurement program, a computer-readable recording medium, and a device that records the program, for irradiating an object to be measured with light, receiving the light from the object to be measured with a light receiving device to obtaining an electric signal according to the receiving light, measuring a distance from a light projector to the object to be measured, a displacement of the object to be measured, and the like corresponding to the electrical signal.

2. Description of the Related Art

To measure the dimension, a movement amount, and the like of an object to be measured (work), an optical displacement meter to which triangulation measuring technique is applied is used. FIG. 93 is a block diagram showing the configuration of main components of a conventional optical displacement meter. In FIG. 93, a drive circuit 101 drives a laser diode (LD) 102 on the basis of a light output control signal Va. A laser beam emitted from the laser diode 102 is passed to a work WK via a projection lens 103. A diffusion reflection component and a specular reflection component in reflection light from the work WK are received by a light position detection device such as a PSD via the light reception lens 104. When the work WK is displaced in the direction shown by the arrow X, the position of a light spot moves on the light reception surface of a light position detection device 105. Two output signals according to the position of a light spot on the light reception surface are output from the light position detection device 105 and are subjected to current-voltage conversion in current-voltage converting circuits (I-V converting circuits) 106a and 106b. One of the output signals of the optical position detection device 105 has a current value proportional to the distance from an end of the light reception surface to the light spot, and the other output signal has a current value proportional to the distance from the other end of the light reception surface to the light spot. Therefore, on the basis of the current values of the two output signals, the displacement of the work WK can be detected.

In such an optical displacement meter, the intensity of reflection light varies according to the material of the work WK and the surface state of the work WK. Consequently, the light output of the laser diode 102 has to be adjusted so that the light reception amount of the light position detection device 105 becomes a certain level. FIG. 94 is a block diagram showing an example of a conventional control circuit for controlling the light reception amount in the light position detection device 105. The control circuit of FIG. 94 includes the current-voltage converting circuits 106a and 106b, an adder 112, a subtracter 113, an error integration circuit 114, a reference voltage generating circuit 115, and a light output adjustment circuit 111. The current-voltage converting circuits 106a and 106b convert the current signal of the light position detection device 105 to a voltage signal. The adder 112 adds voltage signals on the far side and the near side, and outputs the light reception amount of the light position detection device 105 as a light reception amount voltage VL. The reference voltage generating circuit 115 generates a predetermined reference voltage Vr. The subtracter 113 outputs the difference between the light reception amount voltage VL obtained by the adder 112 and the reference voltage Vr generated by the reference voltage generating circuit 115. The error integration circuit 114 integrates error signals VE output from the subtracter 113, and provides the integrated error signals as a control voltage VC to the light output adjustment circuit 111. The voltage of the light output adjustment circuit 111 is controlled so that the light reception amount voltage VL output from the adder 112 becomes equal to the reference voltage Vr generated by the reference voltage generating circuit 115. Therefore, by controlling the voltage of the light output control signal Va provided from the light output adjustment circuit 111 to the drive circuit 101 in FIG. 93, the light reception amount in the light position detection device 105 can be controlled to a predetermined level.

In such an optical displacement meter, the reception light amount largely fluctuates and corresponds to the reflectance of light of a work according to the color, roughness, angle, and the like of the surface of a work. When the reception light signal is too small, or too large due to saturation or the like, the measurement accuracy deteriorates. Consequently, a technique of performing a feedback control that adjusts the light emission amount of a light emission device and the amplification factor (gain) of an amplifier so that the peak value of a light reception amount (image signal level) becomes a target value is developed (refer to, for example, Japanese Unexamined Patent Application Publication No. 2006-010361). An optical displacement meter of the technique has, as shown in FIG. 95, a light emitting device 102B for irradiating the work WK with light, an image sensor 105B for receiving light from the work WK and generating an image signal, a signal processing circuit including an amplifier 146B for amplifying the image signal from the image sensor 105B, and a controller 144B that executes feedback control of at least one of operation amounts including a light emission amount of the light emitting device 102B and the amplification factor of the amplifier 146B on the basis of the image signal from the signal processing circuit. The variable range of at least one of the operation amounts in the feedback control can be changed. The controller 144B sets a proper variable range of the operation amount on the basis of data of the operation amount in a predetermined period in a variable range setting mode. As a result, as shown in FIG. 96, while keeping the advantage of performing the feedback control of the light emission amount of the light emitting device 102B and the amplification factor of the amplifier 146B, the technique realizes higher speed of measurement.

On the other hand, an apparatus for measuring the shape (profile) of a work using the principle of light sectioning is developed. The light sectioning is obtained by two-dimensionally expanding the principle of triangulation as shown in FIGS. 97A and 97B. Specifically, as shown in FIG. 97A, a laser beam LB emitted from a sensor head SH to the work WK is set in a band shape, and the triangulation is increased in the width direction (X direction). As a result, the triangulation measuring technique is enlarged in the width direction as shown in FIG. 97B. Consequently, line-shaped (linear) light receiving devices are used in the triangulation measuring technique. On the other hand, light receiving devices JS arranged two-dimensionally are used in the light sectioning method.

By using an optical displacement meter for measuring a profile by using the principle of light sectioning, a stereoscopic shape of a work is measured. In the case of measuring a stereoscopic shape, there is a case such that intensity of reception light largely fluctuates according to the surface state and angle of a work. Conventionally, as the light receiving device, a CCD or CMOS sensor whose sensitivity characteristic (light receiving characteristic) is linear is used. Consequently, when the light amount changes considerably in a work, multiple exposure process is performed. In the process, while changing the amount of projected light and shutter time on the reception light side, imaging is performed on the work a plurality of times. From a plurality of reception light images obtained, ranges in which the light amount is proper are extracted. By combining the extracted images, a single image is obtained.

In the multiple exposure, however, the imaging process is performed a plurality of times. There is a problem such that the time required for obtaining one profile is long. For example, a reception light image requiring 15 to 16 ms per exposure is captured five to ten times successively, so that it takes about 0.5 to 1 second. Consequently, the technique is not suitable for an application requiring immediacy such as an inline process. When a work is position-deviated during image capturing a plurality of times, an error occurs at the time of composition of the multiple exposures. In such a case, an error can be compensated via software. In this case, the process amount further increases.

SUMMARY OF THE INVENTION

The present invention has been achieved to solve such a drawback of the conventional technique. A first object of the invention is to provide an optical displacement meter, an optical displacement measuring method, an optical displacement measuring program, a computer-readable recording medium, and a device that records the program, capable of performing stable image capturing operation at high speed.

The adjustment width of the light emission amount of a laser diode used for a light emitting device is extremely wide. When the state of a work changes, the reflection light amount largely fluctuates. Consequently, the control is not stabilized only by the automatic control of the feedback control, and diffusion may occur.

The present invention has been achieved to solve such a drawback of the conventional technique. A second object of the invention is to provide an optical displacement meter, an optical displacement measuring method, an optical displacement measuring program, a computer-readable recording medium, and a device that records the program capable of preventing diffusion and performing stable control by designation of an optimum range of an operation amount of feedback control of the user.

To achieve the object, according to a first aspect of the invention, a first optical displacement meter for measuring a displacement of an object to be measured includes: a projector for irradiating an object to be measured with strip-line-shaped light having expansion in a first direction or performing a scan in the first direction and emitting light; a two-dimensional light receiving device having a plurality of pixel construction parts for receiving a reflection light image of the strip-line-shaped light from the object to be measured, the plurality of pixel construction parts are arranged in a plane in a second direction corresponding to the first direction and in a third direction in which the reflection light image is changed corresponding to displacement of the object, and for outputting a reception light signal corresponding to the amount of the reflection light image; an amplifier for amplifying the reception light signal from the two-dimensional light receiving device; a profile computing unit for calculating a position of the light reflection light image along the third direction at each position in the second direction on the two-dimensional light receiving device based on the amplified reception light signal, and for computing displacements of the object at each position in the second direction as the profile shape of the object to be measured on the basis of the position of the light reflection light image along the third direction on the two-dimensional light receiving device; and reception light level control unit for computing each of peaks of the amplified reception light signals along the third direction at each position in the second direction on the two-dimensional light receiving device, and for adjusting any of parameters of at least operation amounts including a light emission amount and light emission time of the projector, exposure time of the two-dimensional light receiving device, and amplification factor of the amplifier so that a distribution of each of the peak amounts of the amplified reception light signals, lies in a predetermined range. With the configuration, by adjusting the operation amount with the reception light level control unit in accordance with the object to be measured, a proper reception light image of the object to be measured can be obtained by the two-dimensional light receiving device.

According to a second aspect, an optical displacement measuring method capable of measuring a displacement of an object to be measured on the basis of a light sectioning method, includes: a step of scanning an object to be measured with light emitted from a projector or strip-line-shaped light having expansion in a first direction; a step of receiving reflection light from the object to be measured by a two-dimensional light receiving device having a plurality of pixel construction parts for receiving reflection light image of the strip-line-shaped light from the object to be measured, the plurality of pixel construction parts are arranged in a plane in a second direction corresponding to the first direction and in a third direction in which the reflection light image is changed corresponding to displacement of the object and outputting the reflection light as a reception light signal in a position in the first direction; a step of amplifying the reception light signal from the two-dimensional light receiving device by an amplifier; a step of converting an amplified signal to a digital signal by digital converting means; and a step of calculating a position of the light reflection light image along the third direction at each position in the second direction on the two-dimensional light receiving device based on the digital signal, and computing displacements of the object at each position in the second direction as the profile shape of the object to be measured on the basis of the position of the light reflection light image along the third direction on the two-dimensional light receiving device, and computing each of peaks of the digital signals along the third direction at each position in the second direction on the two-dimensional light receiving device, and performing feedback control on any of the parameters relating to at least operation amounts including a light emission amount and light emission time of the projector, exposure time of the two-dimensional light receiving device, and amplification factor of the amplifier so that a distribution of each of the peak amounts of the digital signals, lies in a predetermined range, wherein the step of outputting a reception light signal from the two-dimensional light receiving device is performed by using the two-dimensional light receiving device having the light receiving characteristic such that an output signal in an area of a large reception light amount is suppressed without being saturated. With the configuration, the absolute value is suppressed so that an output signal does not saturate in an area where an amount of light received is large. As a result, the difference between the signal and a signal in an area where a reception light signal is relatively low is reduced. Even if the reception light signals among lines in the first direction vary, the variations are reduced, and the range of the reception light signals forming a single reception light image can be widened. In other words, a single image capturing process is sufficient. Also in the case of performing the multiple exposure of combining a plurality of reception light images, the number of imaging processes can be decreased.

According to an third aspect, an optical displacement measuring program capable of measuring a displacement of an object to be measured on the basis of a light sectioning method makes a computer realize: a function of scanning an object to be measured with light emitted from a projector or strip-line-shaped light having expansion in a first direction;

a function of receiving reflection light from the object to be measured by a two-dimensional light receiving device having a plurality of pixel construction parts for receiving reflection light image of the strip-line-shaped light from the object to be measured, the plurality of pixel construction parts are arranged in a plane in a second direction corresponding to the first direction and in a third direction in which the reflection light image is changed corresponding to displacement of the object and outputting a reception light signal corresponding to amount of the reflection light image;

a function of amplifying the reception light signal from the two-dimensional light receiving device by an amplifier, and converting the amplified signal to a digital signal;

a function of calculating a position of the light reflection light image along the third direction at each position in the second direction on the two-dimensional light receiving device based on the digital signal, and computing displacements of the object at each position in the second direction as the profile shape of the object to be measured on the basis of the position of the light reflection light image along the third direction on the two-dimensional light receiving device;

a function of computing each of the peaks of the digital signals along the third direction at each position in the second direction on the two-dimensional light receiving device, and performing feedback control on any of parameters of at least operation amounts including a light emission amount and light emission time of the projector, exposure time of the two-dimensional light receiving device, and amplification factor of the amplifier so that a distribution of each of the peak amounts of the digital signals, lies in a predetermined range; and a function capable of adjusting the light receiving characteristic of the two-dimensional light receiving device, and adjusting the light receiving characteristic.

According to a twenty-third aspect, a computer-readable recording medium that stores a program or a device records the above-described program. The recording medium includes magnetic disk, optical disk, magneto-optic disk, semiconductor memory, and media capable of storing a program such as CD-ROM, CD-R, CD-RW, flexible disc, magnetic tape, MO, DVD-ROM, DVD-RAM, DVD-R, DVD+R, DVD-RW, DVD+RW, Blu-ray®, and HD DVD. The program includes not only a program stored in the recording medium and distributed but also a program distributed by being downloaded via a network line such as the Internet. The device that records the program includes a general or dedicated device on which the program is recorded so as to be executed in the form of software, firmware, or the like. The processes and functions included in the program may be executed by program software which can be executed by a computer or may be executed by hardware such as a predetermined gate array (FPGA, ASIC) or a mixture of the program software and a partial hardware module realizing a part of the elements of the hardware.

BRIEF DESCRIPTION OF THE DRAWINGS

FIG. 7 is a table of a list of profile data stored;

FIG. 17 is a schematic diagram showing a state where the profile shapes are displayed as candidate patterns;

DETAILED DESCRIPTION OF THE PREFERRED EMBODIMENTS

Figure 1:
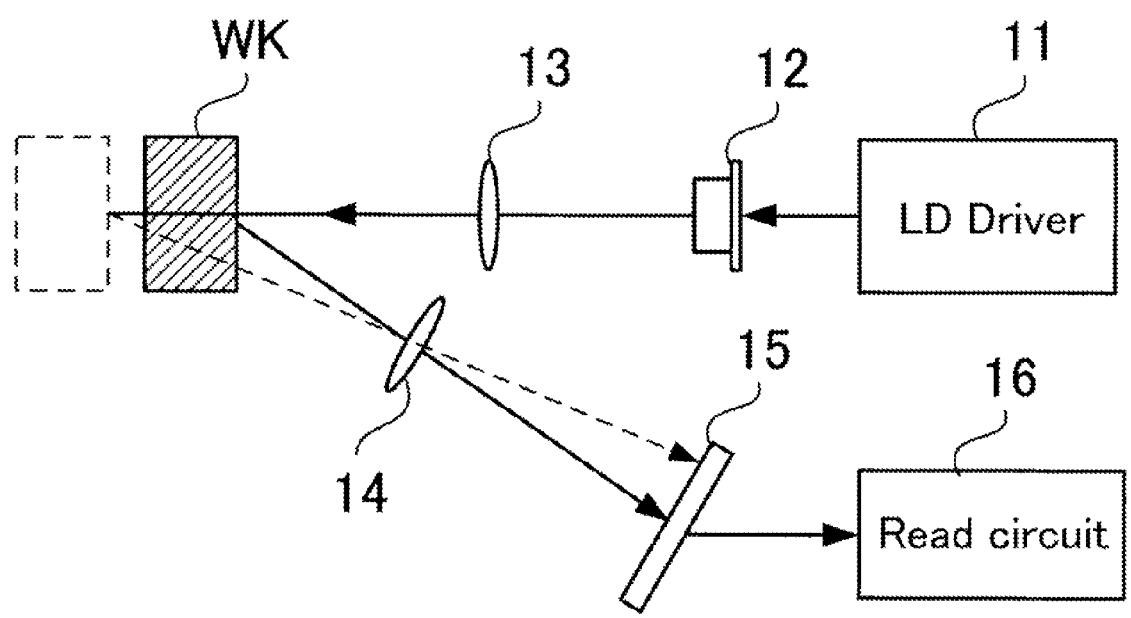
FIG. 1 is a diagram showing the measurement principle of an optical displacement meter as a first embodiment of the invention.

Embodiments of the present invention will be described hereinbelow with reference to the drawings. The following embodiments relate to an optical displacement meter, an optical displacement measuring method, an optical displacement measuring program, a computer-readable recording medium, and a device that records the program, for embodying the technical ideas of the present invention. However, the present invention is not limited to the following optical displacement meter, optical displacement measuring method, optical displacement measuring program, computer-readable recording medium, and the device that records the program. The members described in the claims of the present invention are not limited to those in the embodiments. Particularly, the scope of the present invention is not limited to dimensions, materials, shapes, relative arrangement, and the like of the components described in the embodiments unless otherwise specifically described, and they are just examples. Some of the sizes, positional relations, and the like in the drawings are exaggerated to make the description clear. In the following description, the same names and the same reference numerals express the same or similar materials and repetitive description will not be given. Further, with respect to the elements of the present invention, a plurality of elements may be constructed by a single member, and a single member may be used as a plurality of elements. On the contrary, the function of a single member can be realized by a plurality of members.

First Embodiment

Figure 2:
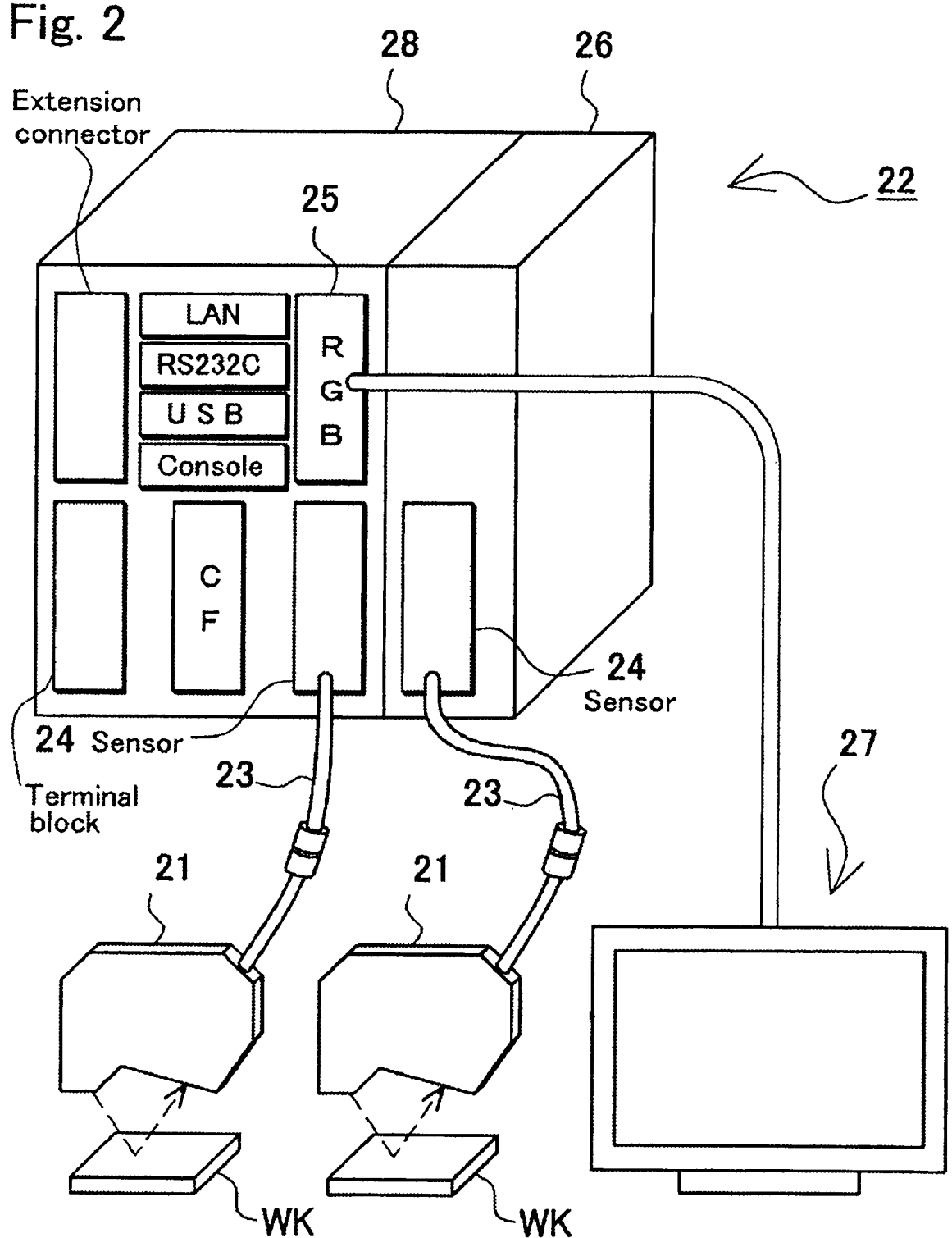
FIG. 2 is a plan view and side view showing the appearance of an optical displacement meter.
Figure 3:
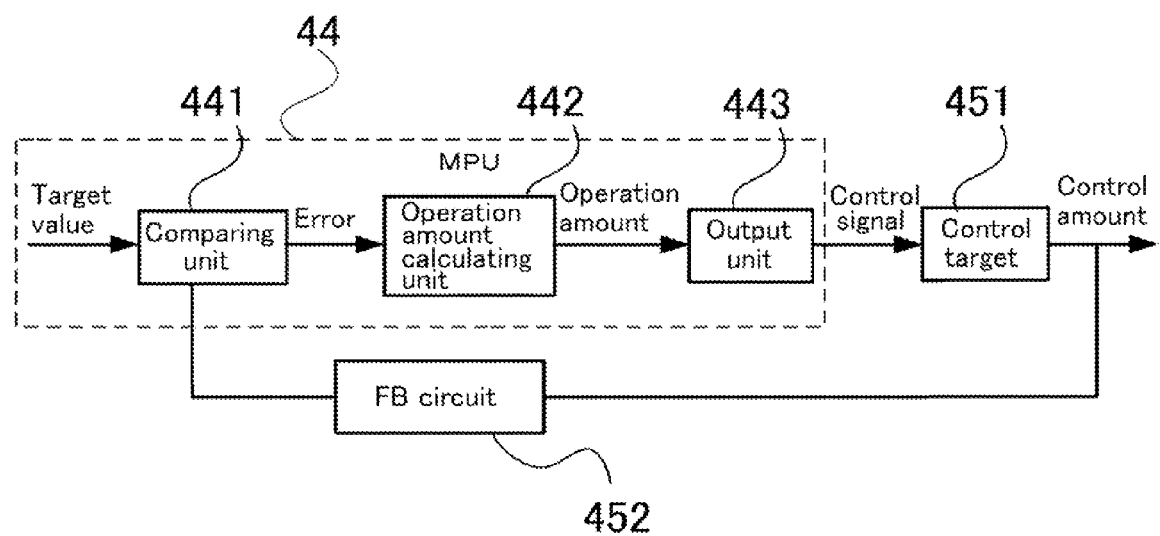
FIG. 3 is a block diagram showing the configuration of feedback control performed by a microprocessor.

FIGS. 1 to 3 show an optical displacement meter 100 as a first embodiment of the present invention. FIG. 1 is a block diagram showing the configuration of the optical displacement meter 100 as a first embodiment of the invention. FIG. 2 is a perspective view showing the system configuration of the optical displacement meter 100. FIG. 3 is a block diagram showing the configuration of feedback control performed by a microprocessor 44. An example of the feedback control will be mainly described.

FIG. 1 shows the measurement principle of the optical displacement meter 100. The optical displacement meter 100 is also called a laser displacement meter and used for measuring a displacement of an object in a non-contact manner by using the principle of triangulation. A laser beam emitted from a laser diode 12 under control of an LD driver 11 passes through a projection lens 13 and falls on a work WK. A part of the laser beam reflected from the work WK passes through a light reception lens 14 and is received by a two-dimensional light receiving device 15. The two-dimensional light receiving device 15 is a CCD or CMOS image sensor in which a plurality of pixel construction parts are arranged in a plane. At each of the pixel construction parts, a charge corresponding to a light reception amount is accumulated and is taken out.

When the work WK is displaced as shown by broken lines in FIG. 1, the optical path of the laser beam reflected from the work WK and arrives at the two-dimensional light receiving device 15 changes as shown by a broken line. As a result, the position of a light spot in the light receiving surface of the two-dimensional light receiving device 15 moves, and shape of the light reception signal waveform, that is, the position of a light reception image focused on the two-dimensional light receiving device 15 changes. The accumulated charge according to the light reception amount in each of the pixel construction parts of the two-dimensional light receiving device 15 is read by a read circuit 16, and the light reception waveform as a one-dimensional light reception amount distribution is obtained by signal processing. The displacement of the work WK is obtained from the peak position of the light reception waveform or the centroid of the light reception waveform.

FIG. 2 shows a system configuration of the optical displacement meter 100. The optical displacement meter 100 is constructed by a sensor head 21, a controller 22, and a display unit 27. The sensor head 21 has therein the LD driver 11, the laser diode 12, the projection lens 13, the light reception lens 14, the two-dimensional light receiving device 15, and the read circuit 16 shown in FIG. 1. The controller 22 has a head connector 24 for connecting the sensor head 21 and also a display connector 25 for connecting the display 27. The controller 22 has a microprocessor (control unit), controls an output (light emission amount) of the laser diode 12 via the LD driver 11 of the sensor head 21, and executes a process for obtaining the displacement of the work WK from the signal read from the two-dimensional light receiving device 15. It is also possible to make the sensor head 21 control the laser diode 12. In this case, the sensor head is provided with the control unit. The front surface of the controller 22 may be provided with a press button switch, a console and connectors for connecting those members as an input interface for performing various settings and operations. The controller 22 may also have a slot for inserting a semiconductor memory, a terminal block, an extension connector, and serial ports of USB, RS232C, and the like. The controller 22 can be connected to an extension unit 26 to connect a plurality of sensor heads 21 via the extension unit 26. In the example of FIG. 2, one extension unit 26 is connected to a main amplifier unit 28 as a component of the controller 22, so that total two sensor heads 21 can be connected. By further increasing the number of extension units 26, the larger number of sensor heads can be connected. Obviously, a head connector for connecting a plurality of sensor heads 21 may be provided for the amplifier unit itself as a component of the controller 22, and two or more head connectors may be provided for the extension unit. The sensor head 21 and the controller 22 are connected to each other via an electric cable 23 so that electric signals are transmitted/received to/from each other, and power supply voltage is supplied from the controller 22 to the sensor head 21. The display unit 27 is used for displaying numerical values of measurement results and various setting values. The display unit 27 has a display such as an LCD or CRT.

As shown in FIG. 1, a laser beam emitted from the laser diode 12 passes through the projection lens 13 to the work WK. A part of the laser beam reflected from the work WK passes through the light reception lens 14 and is incident on the two-dimensional light receiving device 15. A charge accumulated in each of the pixel construction parts of the two-dimensional light receiving device 15 is read by the read circuit 16. The read circuit 16 applies a pixel selection signal as a read pulse signal to the two-dimensional light receiving device 15 and sequentially scans the pixel construction parts, thereby obtaining time-sequential voltage signals corresponding to a one-dimensional light reception amount distribution.

For example, in a case where the two-dimensional light reception device 15 is made of 256 pixels and the transfer rate per pixel is 1 microsecond, it requires 256 microseconds to read charges accumulated in all of the pixel construction parts. The read charges are outputted as time-sequential voltage signals from the read circuit 16. Time obtained by adding time required for control computation to the time required to read the accumulated charges in all of the pixels is a sampling period. An output signal of the read circuit 16 is passed to the controller 22.

The intensity (light emission amount) of a laser beam emitted from the laser diode 12 is controlled by the microprocessor 44 shown in FIG. 3 via the LD driver 11. When the intensity of the laser beam is changed, the amount (light reception amount) of light reflected by the work WK and incident on the two-dimensional light receiving device 15 also changes. Consequently, by adjusting the intensity of the laser beam emitted from the laser diode 12 in accordance with light reflectance (brightness) of the work WK, while avoiding saturation of the charges accumulated in the pixel construction parts of the two-dimensional light receiving device 15, the two-dimensional light receiving device 15 with the dynamic range can be sufficiently utilized. Concretely, by changing the pulse width or duty ratio of a pulse for driving the laser diode 12, the intensity of the laser beam is adjusted. Obviously, the intensity of the laser beam may be adjusted by changing the pulse voltage (peak value).

The control on the light emission amount (intensity of a laser beam) by the microprocessor 44 is performed as a kind of feedback controls. To be specific, a feedback control of the light emission amount (intensity of a laser beam) is performed so that the value (for example, peak value) corresponding to the light reception amount becomes a predetermined target value. In place of the feedback control of the light emission amount, a feedback control of the gain (amplification factor) of the amplifier may be performed. Alternatively, both of the feedback control of the light emission amount and the feedback control of the amplification factor of the amplifier may be performed. For example, when an error of the feedback amount from a target value is within a predetermined range, the feedback control of the amplification factor of the amplifier is performed. When an error of the feedback amount exceeds the predetermined range, the feedback control of the light emission amount is performed. Therefore, it is sufficient to execute the feedback control of at least one of the operation amounts including the light emission amount of the laser diode 12 and the amplification factor of the amplifier.

FIG. 3 is a block diagram showing the configuration of feedback control performed by the microprocessor 44. A comparing unit 441, an operation amount calculating unit 442, and an output unit 443 are constructed by the microprocessor 44, that is, a program executed by the microprocessor 44. The LD driver 11 and the laser diode 12 in FIG. 1 correspond to a control target 451. The two-dimensional light receiving device 15, the read circuit 16, and the like correspond to a feedback circuit (FB circuit) 452.

The comparing unit 441 compares a predetermined target value with a feedback amount and outputs the error of the predetermined target value with the feedback amount. On the basis of the error, the operation amount calculating unit 442 calculates an operation amount and supplies it to the output unit 443. The operation amount corresponds to the light emission amount and/or the amplification factor. The operation amount is supplied as a control signal from the output unit 443 of the microprocessor 44 to the control target 451. Specifically, the control signal is supplied to the LD driver 11 and/or the amplifier, and the light emission amount of the laser diode 12 and/or the amplification factor of the amplifier is controlled. The peak value of the light reception amount obtained by the feedback circuit 452 (the two-dimensional light receiving device 15, the read circuit 16, and the like) is fed back again to the comparing unit 441 of the microprocessor 44, thereby forming a feedback loop.

The optical displacement meter has the measurement processing unit for generating profile shape data and performing various computations on the basis of the generated profile shape data, and the measurement area designating means for designating a desired measurement area. Therefore, it is unnecessary to generate a dedicated displacement computing program or the like according to the application on the user side, and measurement of the profile shape data of the work and displacement measurement can be performed easily.

Second Embodiment

Figure 4:
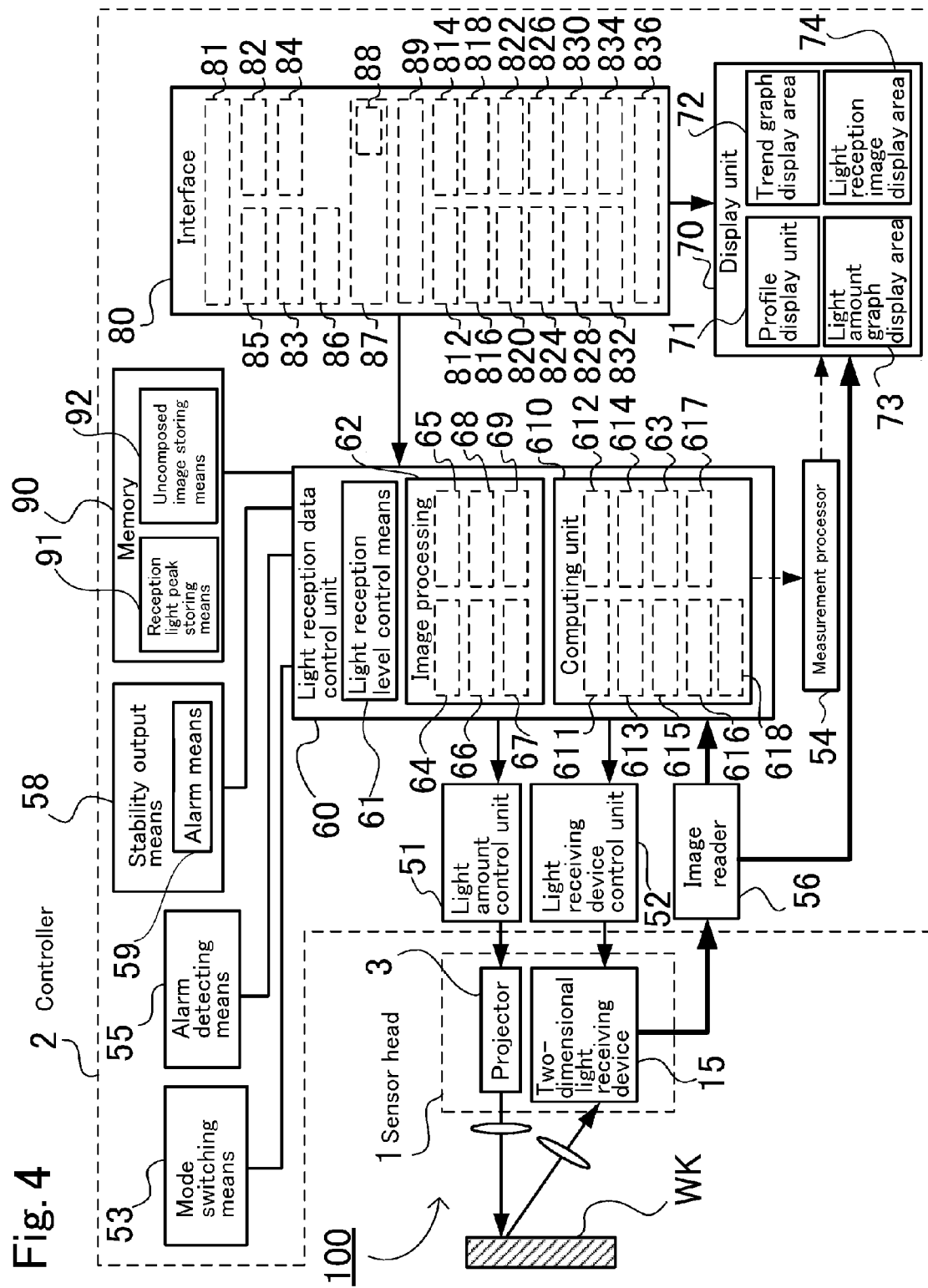
FIG. 4 is a block diagram showing an optical displacement meter as a second embodiment of the invention.

FIG. 4 is a block diagram of an optical displacement meter 200 as a second embodiment of the present invention. The optical displacement meter 200 shown in the diagram is also constructed by connecting a sensor head 1 and a controller 2. The sensor head 1 has a projector 3 for emitting strip line light to the work WK and the two-dimensional light receiving device 15 for receiving reflection light of the strip line light, capturing a light reception image, and outputting the image as a light reception signal in positions in a first direction. The controller 2 includes: a light amount control unit 51 such as a driver for controlling the light amount of a light projecting element included in the projector 3; a light receiving device control unit 52 for controlling the light reception characteristic of the two-dimensional light receiving device 15; an image reader 56 for reading a light reception image captured by the light receiving device; a light reception data control unit 60 for feedback-controlling the light amount control unit 51 and the light receiving device control unit 52 on the basis of the light reception signal obtained by the image reader 56; a measurement processor 54 for performing desired computation on the profile obtained by the light reception data control unit 60; a display unit 70 for displaying the light reception image and the profile shape captured by the light reception data control unit 60; an interface 80 for operating the light reception data control unit 60 and the display unit 70; a memory 90 for holding necessary data; stability output means 58 for outputting stability of a reception-light peak waveform; mode switching means 53 for switching between a measurement mode and a setting mode; and alarm detecting means 55 for generating an alarm signal. The image reader 56 includes an amplifier for amplifying a light reception signal from the two-dimensional light receiving device 15 and digital converting means for converting an amplification signal obtained by the amplifier to a digital signal.

Projector 3

The projector 3 has a light projecting device and a light projecting lens. As the light projecting device, a semiconductor laser (LD: Laser Diode) or a light emitting diode (LED) can be used. As the light projecting lens, a collimate lens, a cylindrical lens, or a rod lens can be used. Light emitted from the semiconductor laser as the light projecting device of the projector 3 is converted to a strip line shape by the light projecting lens, and the strip-line-shaped light is passed to an object to be measured. The strip-line-shaped light is also called a laser sheet beam, a slit beam, a line beam, or the like.

The light emission amount of the projector 3 can be controlled by adjusting the parameters such as the amplitude, ON duty, and the like of the drive current of the light projecting device. The operation amount therefore includes parameters such as the amplitude or light emission level of drive current of the light projecting device, duty radio or light emission time, the exposure time of the two-dimensional light receiving device 15, and the amplification factor of the amplifier (the gain of the signal level).

Two-Dimensional Light Receiving Device 15

The strip-line-shaped light of the light projecting device is reflected by the surface (or the back side or an intermediate member) of the work and received by the two-dimensional light receiving device 15 via the light receiving lens, thereby obtaining a light reception image. As the two-dimensional light receiving device 15, a two-dimensional image sensor in which a plurality of CCDs or CMOS sensors as linear image sensors are arranged two-dimensionally can be used. For example, by arranging CCDs as one-dimensional linear image sensors in parallel only by the number of lines of pixels, the two-dimensional light receiving device 15 is constructed. The CCD is an imaging device suitable for detecting the peak of a light reception waveform. In particular, when a position sensitive detector (PSD) is used as a light receiving device, the luminance centroid position in the whole light receiving surface is detected, so that the influence of secondary reflection, third reflection, diffuse reflection, and the like is large. On the other hand, the CCD can accurately detect the reception-light peak position on the basis of pixel information. Accurate measurement can be realized without being influenced by such diffuse reflection.

Light Reception Data Control Unit 60

The light reception data control unit 60 realizes the functions of light reception level control means 61 for calculating the peak level of each line from a light reception image or the like and controlling the light reception amount, an image processor 62 for performing various imaging processes such as computation of a profile shape from the light reception image data, and a computing unit 610 for performing various computations such as determination of the state of the work. The image processor 62 realizes the functions of profile computing means 64 for computing a profile, trend graph generating means 65 for generating a trend graph, profile coloring means 66, profile highlight means 67, light reception image coloring means 68, multiple composing means 69, and the like.

Computing Unit 610

Figure 5:
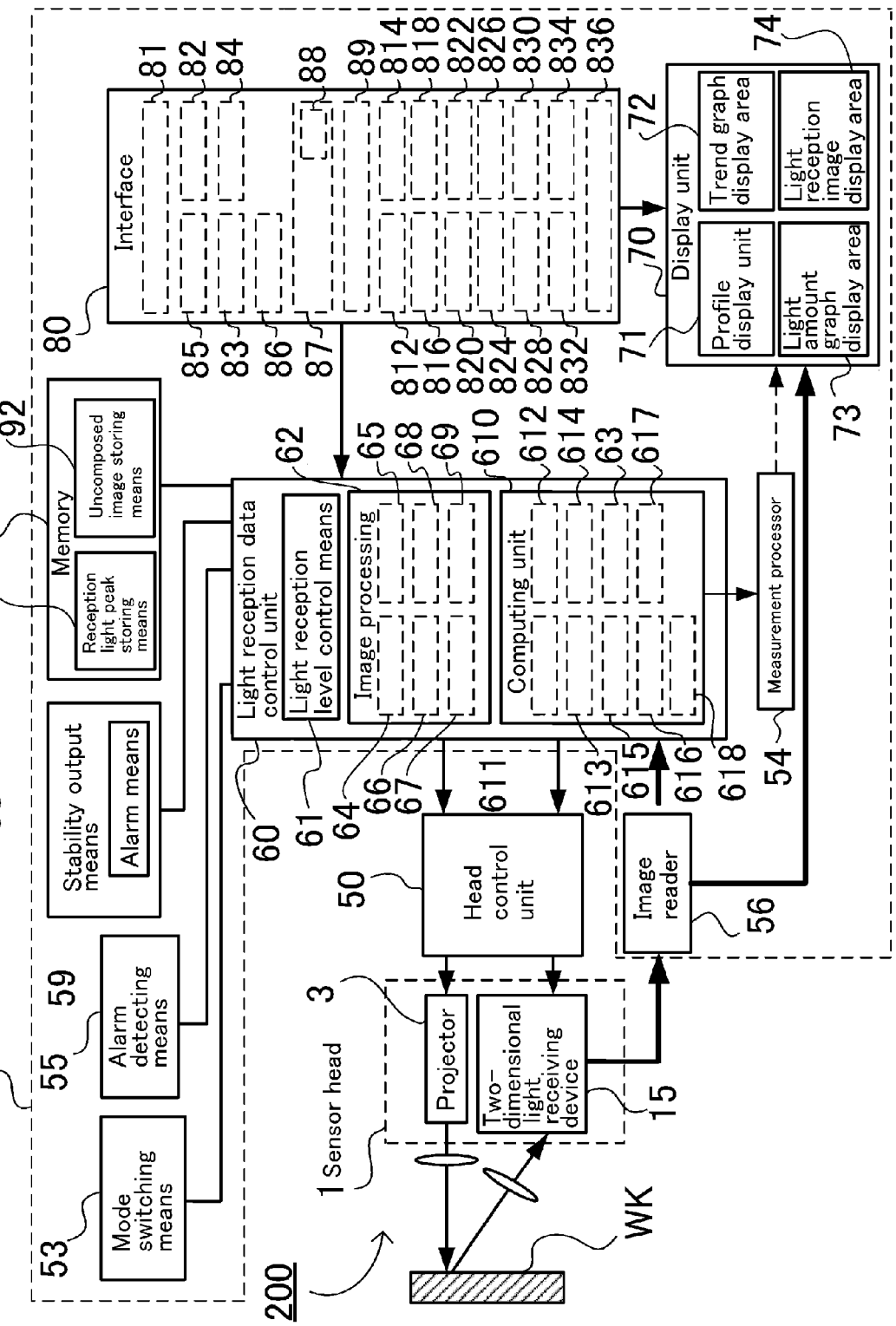
FIG. 5 is a block diagram showing an optical displacement meter having a controller in its sensor head.
Figure 10:
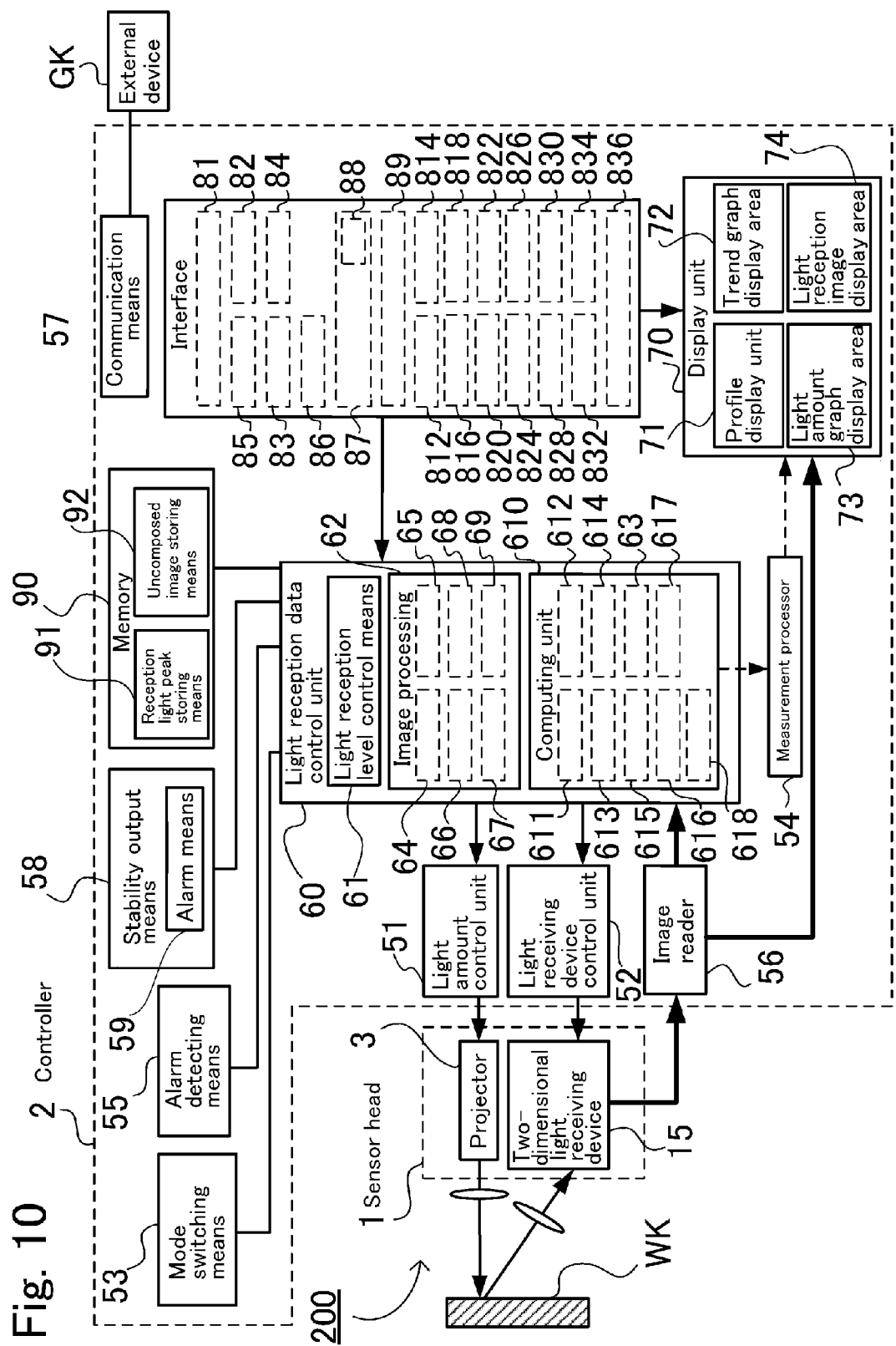
FIG. 10 is a block diagram showing an optical displacement meter having communication means.

The computing unit 610 realizes the functions of tilt angle computing means 611 for computing tilt angle formed between a horizontal reference position and an actual horizontal line; elevation difference computing means 612 for computing the elevation difference between elevation difference reference positions; tilt correcting means 613 for correcting tilt of the sensor head with respect to a profile shape having a step portion of the work; profile matching means 614 for performing a profile search for matching profile shapes on the basis of step portions in a plurality of profile shapes; difference extracting means 615 for extracting difference information from the common profile shape combined by the profile matching means 614; work determining means 63 for determining the state of the work; image search means 616 for performing an image search on a light reception image; mask shifting means 617 for shifting a light reception mask area to a proper position in accordance with a result of the image search; edge face calculating means 618 for calculating the position of an edge face on the basis of a change in the light reception amount between pixels of neighboring two-dimensional light receiving devices from light reception images of a work having an edge face almost parallel with irradiation light; and the like. The details of the components will be described later. The light reception data control unit 60 can be constructed by a microprocessor such as ASIC. In the examples of FIGS. 4, 10 and the like, the light reception data control unit 60 for performing light amount feedback control is provided for the controller 2. Alternatively, the sensor head 1 may be allowed to control the laser diode 12. For example, as shown in FIG. 5, a head control unit 50 may be provided on the sensor head 1 side, and the head control unit 50 may perform the control of the light emission amount of the laser diode 12 or light amount feedback control.

Light Reception Level Control Means 61

The light reception level control means 61 sets the light emission amount of the projector 3, the gain of the two-dimensional light receiving device 15, the amplification factor of the amplifier, and the like to proper values so that the distribution of the peak level of the light reception signal waveform in each line of a digital signal obtained by the digital converting means lies in a proper range. The light reception level control means 61 obtains a light reception amount in the whole range or only in a limited area to be measured. For example, when only information of a dark portion is necessary, the light reception level control means 61 can perform control while ignoring saturation in a light portion. Thus, a higher-precision light reception image adapted to a measurement purpose can be obtained.

In addition, at least any of the parameters of operation amounts including the light emission amount of the projector 3 and the amplification factor of the amplifier is feedback-controlled so that the range of the distribution of the peak level of a light reception signal waveform among lines lies within a predetermined range. In the embodiment, the feedback control for making the light reception amount constant is performed. The operation amount can be computed and adjusted by the light reception level control means 61 or can be operated by the user with operation amount adjusting means 81 of the interface 80.

Profile Computing Means 64

The profile computing means 64 measures a displacement of a work on the basis of optical cutting and computes the profile shape of the work. The computed profile shape of the work is displayed as a waveform on the display unit 70.

Measurement Processor 54

The measurement processor 54 performs an installation correcting process, position correcting process, measurement correcting process, and the like on the profile shape computed by the profile computing means 64. The measurement process includes various computations such as an elevation difference measurement of a designated line segment, tilt angle detection, and computation of designated area.

Interface 80

The interface 80 serves as input means for performing necessary input and operation such as setting in the controller 2. As a member for performing setting and operation by the user, an input/output device can be also used. The user interface screen of an optical displacement measuring program for operating the optical displacement meter may be used. The input/output device as a component of the interface is connected to a computer by wire or wirelessly, or is fixed to a computer or the like. Examples of general input units are various types of pointing devices such as a mouse, a keyboard, a slide pad, a track point, a tablet, a joystick, a console, a jog dial, a digitizer, a light pen, a ten key, a touch pad, and accupoint. The input/output devices can be used not only for operation of a program but also operation of hardware such as the optical displacement meter. Further, by using a touch screen or touch panel for the display itself of the display unit 70 displaying the interface screen, the display unit 70 can be used also as the interface 80. An input or operation may be performed when the user directly touches the screen with his/her finger. Existing input means of sound input and the like can be also used.

In the example of FIG. 4, the interface 80 realizes the functions of the operation amount adjusting means 81, measurement area designating means 82, time designating means 83, a sampling designating unit 84, control area designating means 85, mask area designating means 86, multiple composition condition setting means 87, multiple composition range limiting means 88, uncomposed-image selecting means 89, horizontal part designating means 812 for designating a horizontal reference position from the profile shape, elevation difference designating means 814 for designating, as an elevation difference reference position, a face constructing a step in the profile shape of the work having a step portion as a known elevation difference, tilt angle adjusting means 816 for manually adjusting tilt angle computed by the tilt angle computing means 611, elevation difference adjusting means 818 for manually adjusting an elevation difference computed by the elevation difference computing means 612, common profile designating means 820 for designating a step profile shape showing a difference in the profile shape of the work having the step portion, inverting means 822 capable of inverting the profile shape displayed in the display unit in the vertical or horizontal direction, profile moving means 824 capable of shifting and/or rotating the profile shape displayed in the display unit, tilt adjusting means 826 for manually adjusting the tilt computed by the tilt correcting means 613, layout mode selecting means 828 for selecting the layout of two or more sensor heads in the measuring mode for measuring displacement of a work from transverse configuration, vertical configuration, and sandwiching configuration, registration profile designating means 830 for designating a registered profile as a reference for performing a profile search from the profile shape, invalid area designating means 832 for designating an invalid area whose importance in the profile search is decreased, in the registered profile, invalidating means 834 for automatically extracting a portion having a large change in the registered profile and setting it as an invalid area, and measurement light selecting means 836, when a plurality of light reception signal waveforms exist on a desired measurement line on the display unit, for selecting, as measured light, one of the light reception signal waveforms as a measurement target. The operation amount adjusting means 81 is means for adjusting an operation amount of the feedback control. The measuring area designating means 82 designates a measurement area in which measurement is performed by the measurement processor 54 from a profile display area 71 in the display unit 70. The time designating means 83 designates time from the trend graph display area 72 in the display unit 70. The sampling designating unit 84 designates timing of recording profile shape data in the memory 90 and/or the number of groups of profile shape data to be recorded in the memory 90. The control area designating means 85 designates a control area on which the feedback control is performed. The mask area designating means 86 designates a mask area on which the feedback control is not performed. A profile mask area which is set on the profile shape and a reception mask area which is set on the light reception image can be designated by the common mask area designating means 86. Alternatively, individual mask designating means is provided, that is, profile mask area designating means for designating a profile mask area and light reception mask area designating means for designating a light reception mask area can be also provided.

Profile Mask Area Designating Function

Figure 6:
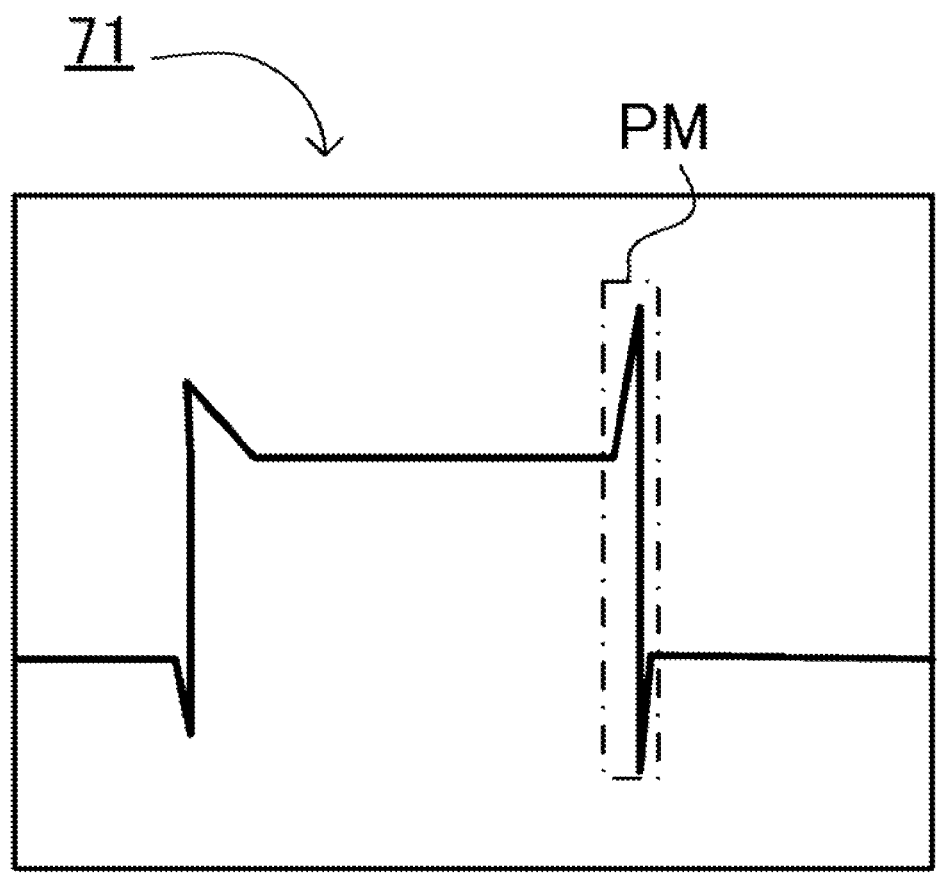
FIG. 6 is a schematic diagram showing a state of designating a frame-shaped profile mask area in a profile shape.

On the other hand, a profile mask area on which the feedback control is not performed can be also designated on the profile shape. The mask area designating means 86 designates a profile mask area PM on which feedback control is not performed in the profile display area 71. In an example of FIG. 6, an unstable area on the profile shape is designated as a profile mask area PM by frame constructed of a long and short dash line. At the time of the feedback control, the measurement value of the profile mask area PM is ignored, so that an accurate feedback control result obtained by eliminating the unstable area can be obtained. Thus, stable and reliable control and measurement can be realized.

The multiple composition condition setting means 87 has the multiple composition range limiting means 88 as a member for setting a multiple composition condition for performing multiple composition and limiting a multiple composition range. Further, the uncomposed-image selecting means 89 is a member for designating image capturing parameters of an uncomposed image.

Memory 90

The memory 90 functions as reception-light peak storing means 91 and uncomposed-image storing means 92. The reception-light peak storing means 91 holds the number of calculated reception-light peaks at the time of performing peak number storing light reception amount control in the work determining means 63.

A profile storage function of sequentially storing a light reception image stored in the memory 90 and the computed profile shape together with measurement time information can be also realized. By the function, the history of profile changes can be held. Data to be stored may be a profile as a waveform-shaped line, collection of numerical value data (points), or a profile image displaying a profile shape. The memory 90 for holding various settings can realize the function. Further, a trend graph and an output period of an alarm signal of the alarm detecting means 55 can be also recorded in the memory 90.

Profile Data Storage Function

A profile data storage function for storing profile data in the profile data storage area in the memory is also provided so that data can be called and checked later. When the shape of a work varies with time, the function can be suitably used for measuring the change amount. For example, as shown in the perspective view of FIG. 103 and the cross section of FIG. 104, in the case where an application of inspecting whether a coating applicator TS coats a proper amount of an adhesive SZ in a correct shape in a predetermined position on a work WK 15 or not, when the background of the inspected area, that is, the shape of the work WK 15 as an application object is constant, it is preferred to register the background in advance as a registration image. Then, in the measurement mode, comparing only the profile shape after application with the registration image is just required to achieve the inspection. However, in the case where the shapes of works are not constant, measuring a profile shape before application and a profile shape after application individually are required to achieve the inspection. In this case, that is, it is required to obtain the profile shapes of the same work at different timings.

In such an application, the profile data storage function for storing the profile shape can be suitably used. That is, the profile shapes of the work before and after application of an adhesive are obtained at predetermined timings and stored in the data storage area in the memory. After that, acquisition time is designated and the profile shapes are called to the display unit. In such a manner, the profile shapes before and after the application can be easily compared with each other. In the display, a plurality of profile shapes obtained at different times can be displayed side by side, or alternatively. Further, as necessary, the difference of the profile shapes may be displayed as a differential profile.

Figure 40:
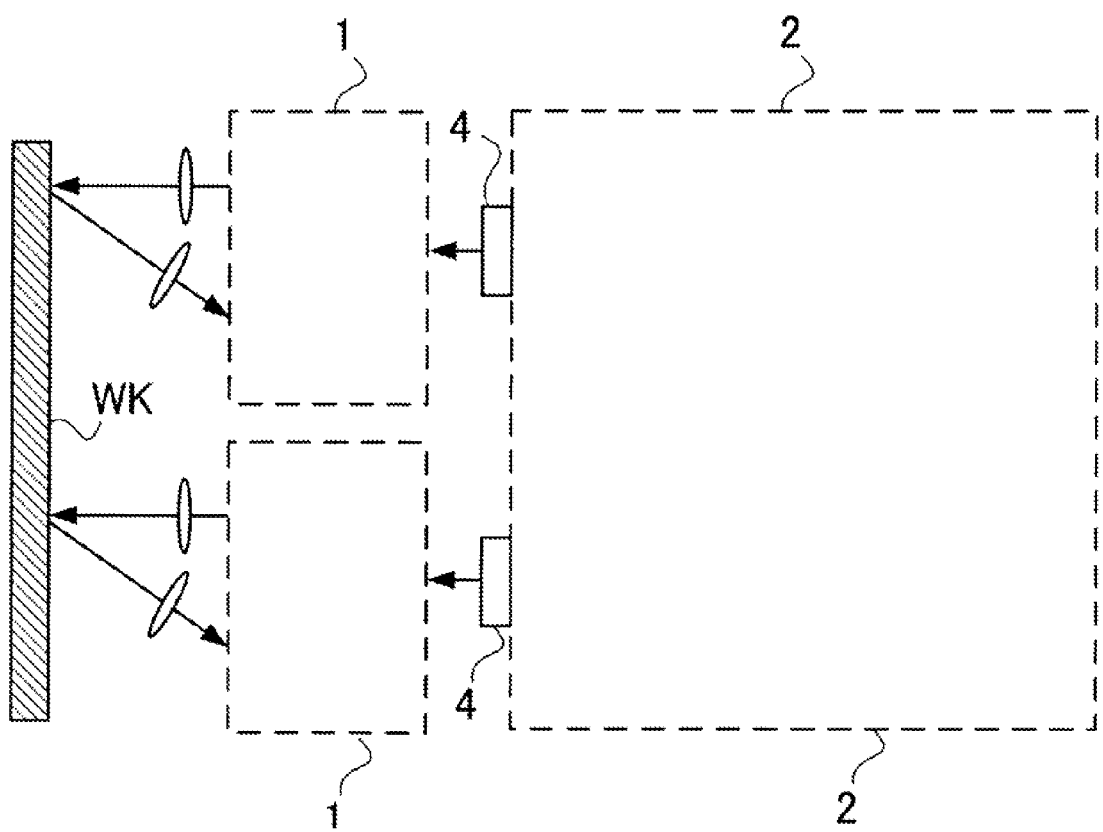
FIG. 40 is a block diagram showing an optical displacement meter as a third embodiment of the invention.
Figure 103:
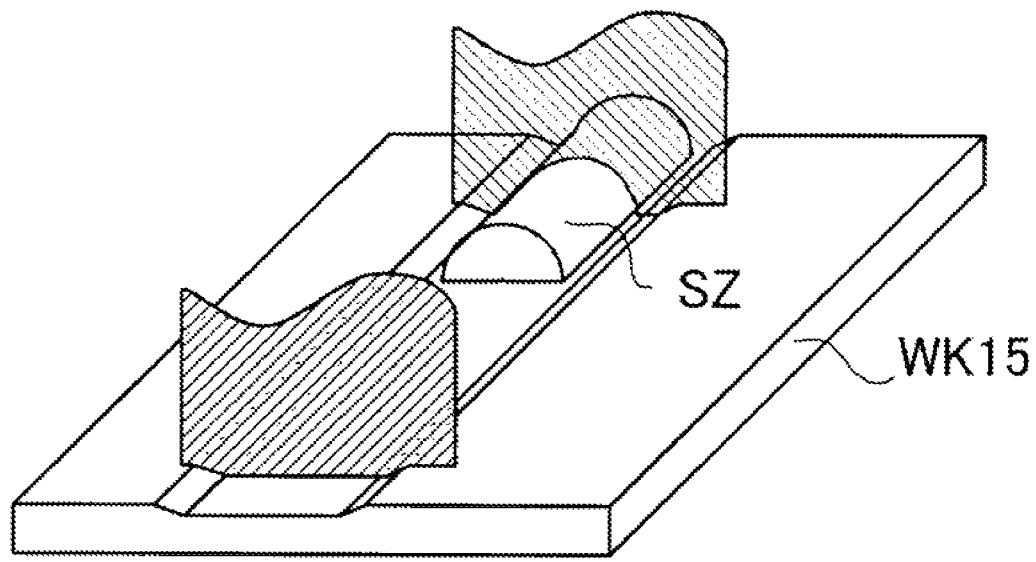
FIG. 103 is a perspective view showing a state of measuring a profile of an adhesive applied on a work having a recess.
Figure 104:
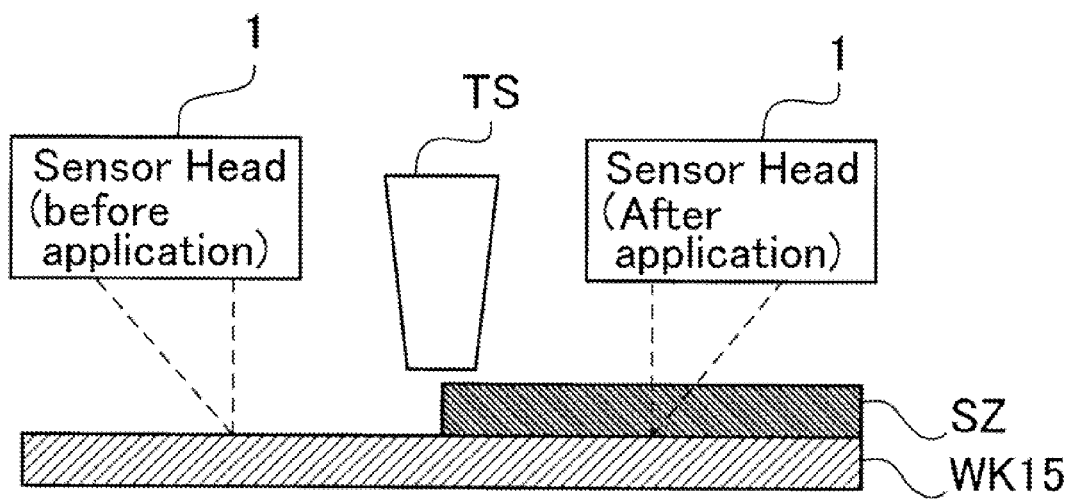
FIG. 104 is a side view showing a state where an adhesive is applied on the work of FIG. 103.
Figure 105A:
FIGS. 105A to 105D are image diagrams showing profile shapes before and after coating of an adhesive measured with the work of FIG. 103.
Figure 105B:
Figure 105C:
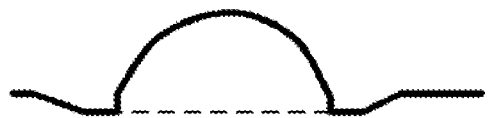
Figure 105D:
Figure 106:
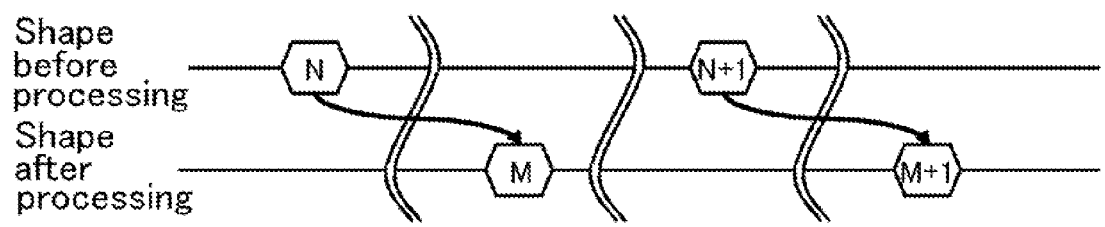
FIG. 106 is a timing chart showing a state of imaging the same work by a single sensor head at different timings.

By using the profile data storage function, images of the same work can be captured by the single sensor head at different timings. Later, the captured images can be read from the data storage area and displayed on the display. FIG. 106 shows a timing chart for measuring shapes before and after processing of a work by a single sensor head. In the diagram, the positions indicated by N, M, and the like show the work measurement positions by the sensor head 1. In FIG. 106, the shape of the work before processing is measured by the sensor head 1 in the position of N, and the shape of the processed work is measured by the sensor head 1 in the position of M. Similarly, the shape of the work before processing is measured by the sensor head 1 in the position of N+1, and the shape of the work after processing is measured by the sensor head in the position of M+1. In this case, the measurement is performed by moving the single sensor head 1 or work relatively in order of N, M, N+1, and M+1. In such a manner, the sensor head is commonly used before and after processing. The time difference process, that is, acquisition, comparison, or the like of profile shapes at different timings can be performed efficiently using the small number of hardware resources. In this case, a mechanism of moving the sensor head 1 to the positions where images of the work WK15 before being coated with the adhesive SZ and the work WK15 coated with the adhesive SZ can be captured as shown in FIG. 104, or a mechanism of returning the conveyed work WK15 to a position below the sensor head 1 is necessary. Preferably, two or more sensor heads are used to capture works before and after coating. With the configuration, the sensor head and the work moving mechanism can be simplified. In the embodiment, as shown in FIG. 40 which will be described later, two sensor heads are used and the profile shape before coating with the adhesive SZ and the profile shape after coating of the work WK15 shown in FIGS. 103 and 104 are captured by the different sensor heads 1. FIG. 40 is a block diagram of the controller 2 to which two sensor heads can be connected. The profile shape before coating with the adhesive shown in FIG. 105A and the profile shape after coating shown in FIG. 105B are measured by the sensor heads 1. By using matching means which will be described later, the profile shapes are combined on the basis of the shape of the work to obtain a composite profile as shown in FIG. 105C. As shown in FIG. 105D, by extracting the differential profile, an accurate profile of the coated adhesive can be obtained.

In the example of FIG. 103, a portion in a position different from the coating position of the adhesive SZ on the work WK15 is measured as the profile shape before coating. In a case where the coating position is in a groove in the work and the same profile can be obtained in any positions as shown in FIG. 103, a portion in a position different from the coating position may be used as the profile shape before coating. In this method, a profile shape before coating and that after coating can be obtained at substantially the same timing. Obviously, the profile shape of the same portion can be captured before and after coating. Consequently, also in a case where the molding precision of a work is low, the adhesive can be measured more accurately.

The example of measuring a coating amount of an adhesive has been described but the embodiment is not limited to the example. The invention can be widely utilized in applications of comparing shapes changing before and after a process for checking processed shapes.

Figure 107:
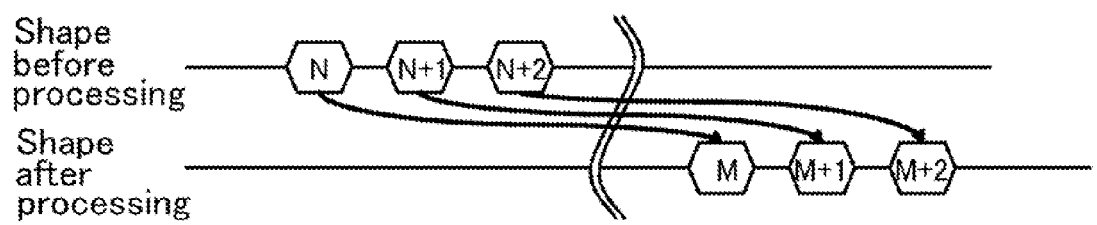
FIG. 107 is a timing chart showing an example of a batch process based on a plurality of profile shapes before processing and a plurality of profile shapes after processing.

Further, the invention can be used not only in modes of sequentially performing display and process but also for an application of performing a process in a lump when predetermined data is collected. For example, as shown in FIG. 107, the profile shape, which is not yet coated with an adhesive, is measured in a plurality of positions and the shapes are stored. After application of the adhesive, the shapes in the plurality of positions are measured and a batch process using the plurality of profile shapes such as the sum of adhesive coated areas can be performed. In the example of FIG. 107, works before processing are measured and processed works are measured in order of N, N+1, N+2, . . . , M, M+1, and M+2. In this case, a configuration of using two sensor heads 1 to measure a work before processing and a work after processing and a configuration of measuring a work before processing and a work after processing by a single sensor head 1 can be employed.

Measurement Pitch

Figure 108:
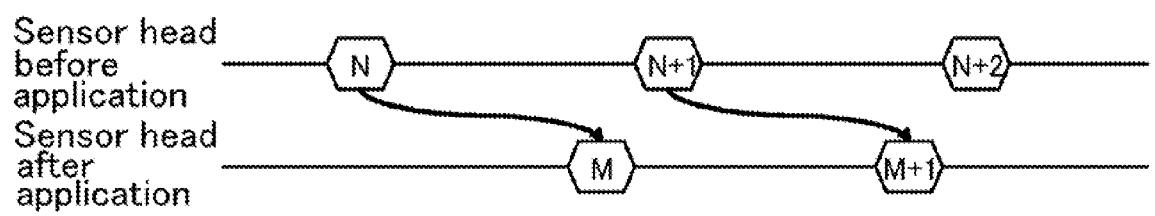
FIG. 108 is a timing chart showing an example where the pitch of timings before and after processing is relatively low.
Figure 109:
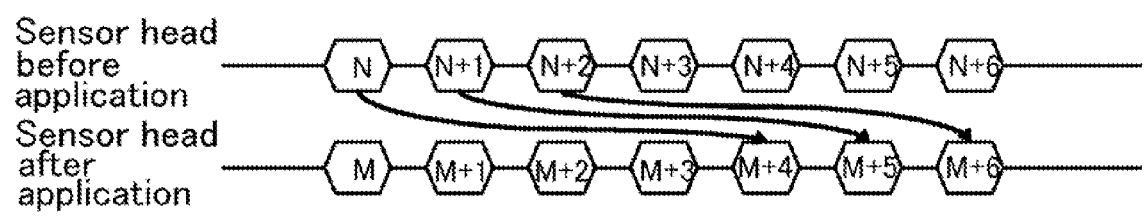
FIG. 109 is a timing chart showing an example where the pitch of the timings before and after processing is relatively high.

The timing or measurement pitch of storing the profile shape in the data storage area in the memory can be arbitrarily set in accordance with the speed of a work conveying line, precision of the profile required, and the like. As shown in FIG. 108, when the measurement pitch is relatively low, immediately preceding profile shapes can be sequentially displayed. In the example of FIG. 108, the same work can be measured before and after processing. The work is measured in order of N, M, N+1, M+1, and N+2, and the measured shapes are sequentially read. The shapes before and after the processing can be compared with each other. On the other hand, in the case of increasing the measurement pitch, a plurality of pieces of profile data before coating with an adhesive exist. The plurality of pieces of profile data are temporarily stored and have to be read at the time of display. In the example of FIG. 109, there are four cycles between the measurement position before coating with an adhesive and the measurement position after coating. That is, the measurement position after coating corresponding to a measurement position N of the work before coating is M+4. The measurement position after coating corresponding to the measurement position N+1 before coating is M+5. Similarly, the position corresponding to N+2 is M+6. Consequently, the measurement pitch is set according to the storing timing and the displaying timing. For example, a profile shape to be displayed in the display unit corresponding to a measurement pitch or a sampling cycle can be designated.

The timing of storing the profile shape can be designated by various methods. For example, a timing signal autonomously generated in the controller may be used or the profile shape may be stored by using a trigger signal supplied from the outside. In a mode where a plurality of sensor heads are connected, the timing signal or trigger signal may be used commonly for the sensor heads or different signals can be used for the sensor heads. Various modes can be set such as a mode in which the sensor heads operate according to a single trigger signal, a mode in which two sensor heads operate synchronously according to a trigger signal, and a mode where the sensor heads operate according to a trigger signal, and profile acquisition is performed a plurality of times per trigger signal.

Obviously, the invention is not limited to the mode of simply displaying the stored profile shapes to the display unit but can include other processes. The invention can employ various processes such as a process of computing a differential profile as shown in FIG. 105D and displaying it in the display unit and a process of computing the area and height of a differential profile and displaying only the result of computation without displaying the profile shapes.

Storage Data Kind Setting

Data to be stored can be arbitrarily set. For example, all of the profiles can be stored or only a profile in which abnormality occurs (abnormal profile) may be stored. At the time of storing all of the profiles, the case where abnormality frequently occurs is not a big issue. However, when the frequency of occurrence of abnormality is low, it is not easy to find out abnormal profile data from a number of pieces of profile data stored.

In the embodiment, at the time of storing profile data in the profile data storage area, the fact is attached to the abnormal profile data, and the resultant data is stored. FIG. 7 shows a list of the stored profile data. In the example, profile numbers and profile acquisition time are added to each of a plurality of pieces of profile data displayed in the list and, in addition, a flag indicative of occurrence of an error is added to data where an error occurs in measurement.

The profile data stored can be displayed as a list in the display unit. For example, the profile data can be displayed in a tabular format as shown in FIG. 7. When a profile number is selected from the list, the selected profile waveform is displayed in the profile display area 71. Other than the selected profile, a plurality of profiles for comparison can be also displayed. A plurality of profiles are displayed in parallel so that they can be compared with each other, and can be used for confirming an abnormality occurrence position, occurrence process, and the like. Further, the highlight process such as coloring is performed on the profile and can be displayed on the display unit. For example, all of the groups of the profile data are displayed and only a selected profile is overlaid in a different color, so that the tendency, variation, and the like of the profile can be grasped intuitively.

Whether profile data is abnormal profile data or not is determined according to preset determination conditions. For example, when a saturation point is included in profile data, it can be determined that a point of a light reception amount lower than a predetermined lower threshold value is included.

Display Unit 70

Figure 8:
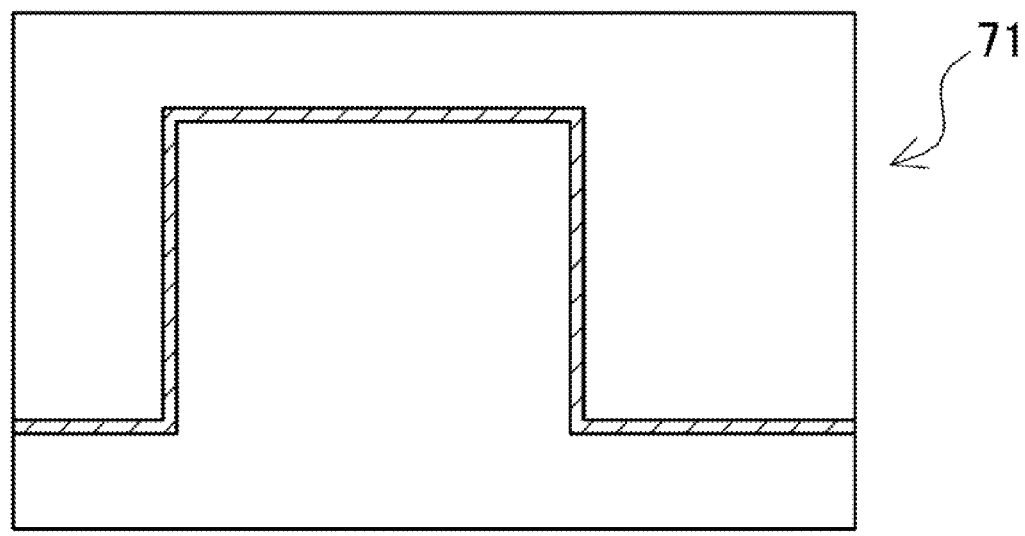
FIG. 8 is a schematic diagram showing an example of displaying the profile shape of a work in a display unit.

The display unit 70 displays a computation result, image data captured, and the like. In the example shown in FIG. 4, the display unit 70 includes the profile display area 71 for displaying a profile shape, a trend graph display area 72 for displaying a trend graph, a light amount graph display area 73 for displaying a light amount graph, and a light reception image display area 74 for displaying a light reception image. The areas may be displayed in the screen of the display unit in which the area is properly divided, or displayed while switching a plurality of screens. For example, the profile shape of the work computed by the profile computing means 64 is displayed as shown in FIG. 8. Therefore, the profile shape of the work can be visually recognized. Various computations can be performed by the measurement processor 54 on the profile shape. For example, the elevation difference of a step portion is computed, the length of a designated line segment, area, and the like can be computed. A portion to be computed is designated by the measurement area designating means 82 constructed by a pointing device such as a mouse or keyboard as a component of the interface 80.

Figure 9:
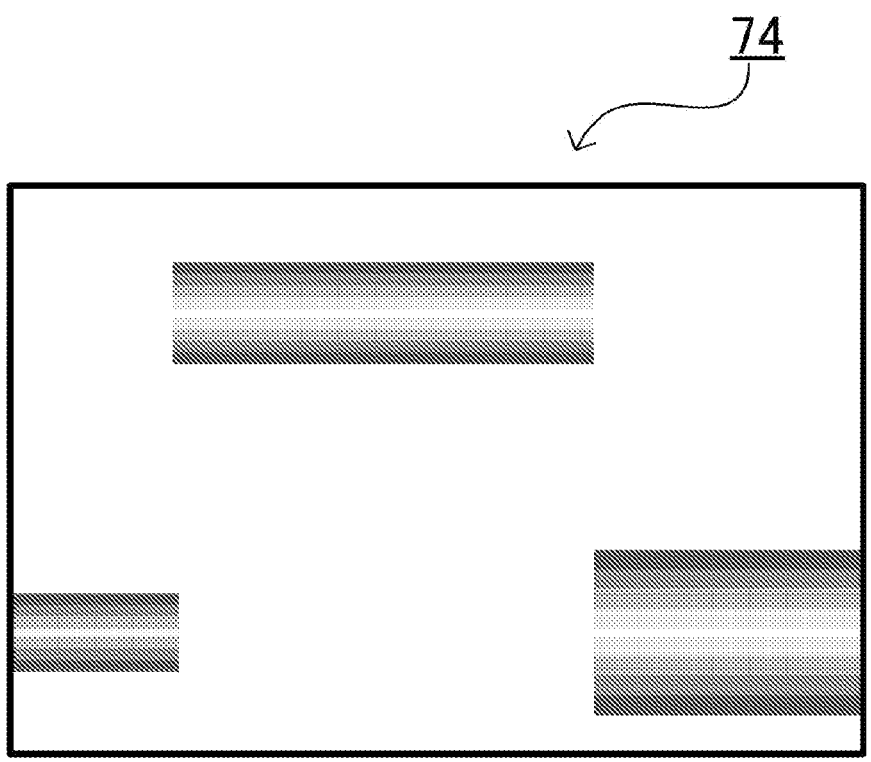
FIG. 9 is a schematic diagram showing an example of displaying a reception light image of the work on the display unit.

As shown in FIG. 9, a light reception image captured by the two-dimensional light receiving device 15 can be displayed in the light reception image display area 74. The light reception image is preferably used at the time of recognizing a reception-light luminance distribution of a raw image obtained by the light receiving device in such a case that the profile shape of a work cannot be properly measured. The profile shape and a light reception image can be displayed while switching the display screen or can be displayed simultaneously. In particular, a profile shape and a light reception image can be displayed side by side in two screens or displayed overlaid in a single screen. The display unit 70 can employ a CRT monitor, a liquid crystal display, or the like. The display unit 70 can be assembled in the controller 2 or constructed separately from the controller 2.

In the block diagram of FIG. 4, the thick-line arrow indicates the flow of image data, the broken-line arrow indicates the flow of profile data, and the thin-line arrow indicates the flow of a control signal. In an optical displacement meter 200, first, the light projecting device in the light projector 3 emits strip-line-shaped light to a work, and an image is formed by reflection light of the emitted light. The analog signal is captured by the image reader 56 and amplified by an amplifier. The amplified signal is converted to a digital signal by converting means. In such a manner, a light reception image is obtained by the image reader 56, and a profile shape is generated by the image processor 62 in the light reception data control unit 60. The image data is displayed on the display unit 70. On the other hand, the light reception level control means 61 performs feedback control to adjust the operation amount so that the peak value of the light reception amount is properly obtained.

The above-described function allocation between the sensor head and the controller is just an example. A part of the functions of the controller may be provided for the sensor head. The sensor head and the controller can be integrated. A plurality of sensor heads can be connected to a single controller, and the controller can control the plurality of sensor heads. The connection between the controller and the sensor head is not limited to the I/O connection but may be realized by data communication.

Communication Means 57

The optical displacement meter can further include communication means 57 for performing communication with an external device GK. FIG. 10 is a block diagram of an optical displacement meter 300 having the communication means 57 as a second embodiment. In the optical displacement meter 300, the mode switching means 53 switches between a measurement mode and an operation amount adjustment mode of adjusting the operation amount by communication with the external device GK via the communication means 57, performed by the operation amount adjusting means 81. In the operation amount adjustment mode, the operation amount computed by the light reception level control means 61 is transmitted to the external device GK via the operation amount adjusting means 81 and the communication means 57. The operation amount data is stored in the external device GK. In the optical displacement meter, the operation amount of the feedback control is adjusted by the operation amount adjusting means 81 and can be also adjusted from the external device GK connected to the optical displacement meter via the communication means 57. For example, a computer is connected as the external device GK and the operation amount adjusting function can be realized by a program operated on the computer. In this case, the operation of adjusting the operation amount can be made more clearly by the user interface provided by the display device or input device of the computer.

The communication with the external device GK of the communication means 57 is not limited to wired communication but may be wireless communication. A program that operates on the computer as the external device GK can provide a user interface for arbitrarily setting or changing the adjustment amount of the user, not determining the adjustment amount of a proper operation amount on the basis of operation amount data.

Optimization of Light Reception Image Capturing Parameters

Figure 11:
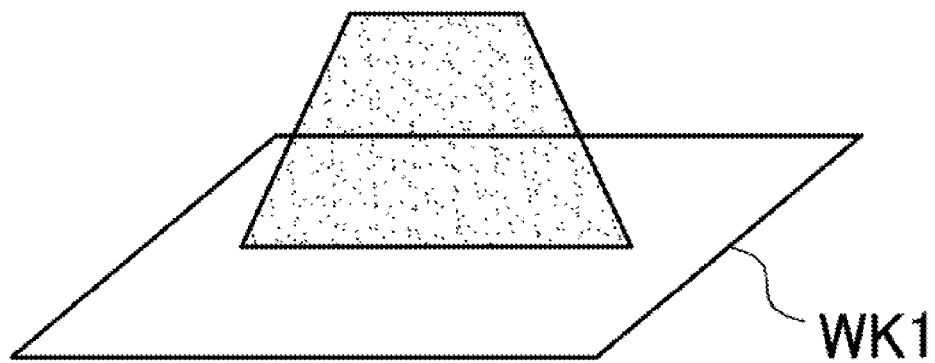
FIG. 11 is a schematic diagram showing a work whose surface is flat and whose surface state is uniform.
Figure 12:
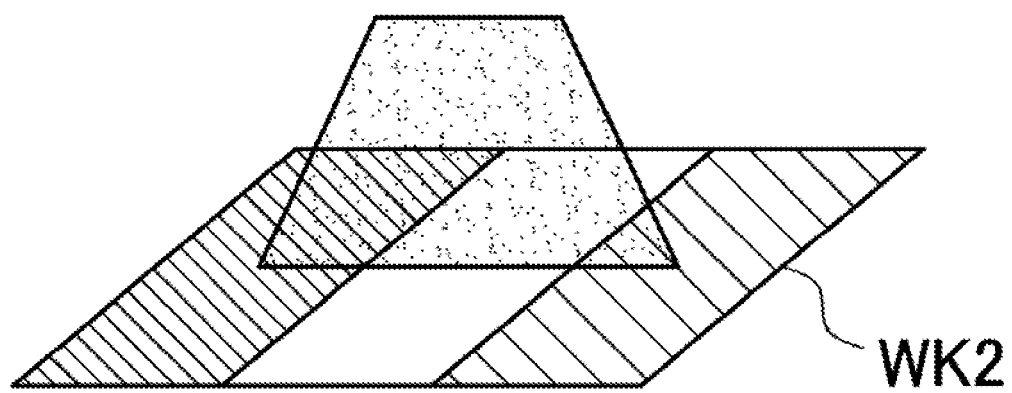
FIG. 12 is a schematic diagram showing a work whose surface is flat and whose surface state varies according to parts.
Figure 13:
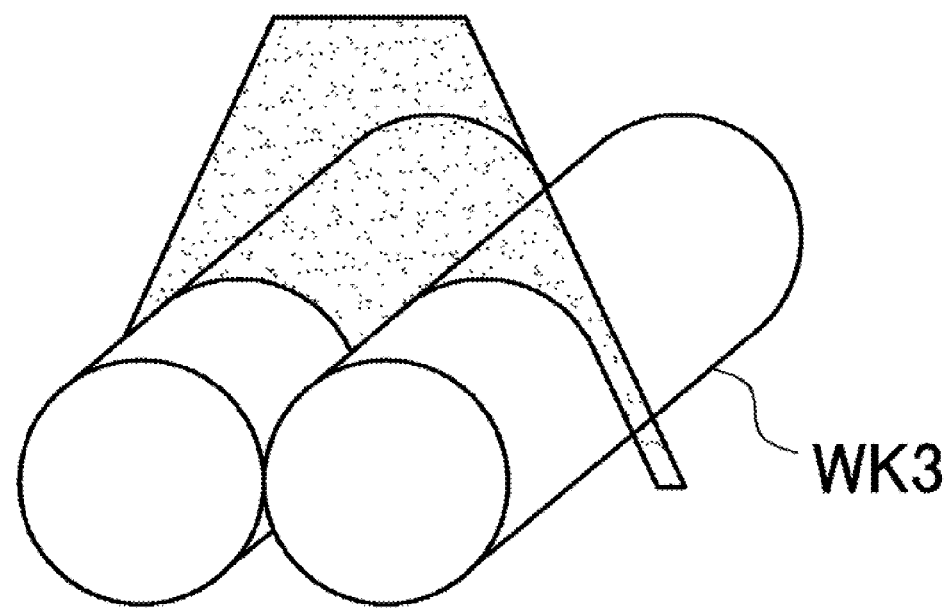
FIG. 13 is a schematic diagram showing a stereoscopic work whose reflection state varies according to parts.

Works as objects to be actually measured by the optical displacement meter include a work WK1 whose surface is flat and having an uniform surface state as shown in FIG. 11, a work WK2 whose surface is flat but whose surface state, particularly, reflectance varies according to its parts as shown in FIG. 12, and a work WK3 having a three-dimensional shape and whose reflection state varies according to its parts as shown in FIG. 13. In the work WK1 as shown in FIG. 11, the distribution of the reflection light amount is almost constant, so that variations in the peak level are small, and the reflection amount of a whole light reception image can be grasped. On the other hand, in the work WK2 as shown in FIG. 12, the reflection light amount varies according to the parts. Consequently, the operation amount has to be adjusted, or multiple exposure is necessary such that a plurality of light reception images are captured while changing the imaging parameters and are synthesized. The work WK3 as shown in FIG. 13 also requires processes similar to the above. In this case, according to desired profile information in a work, a point to be imaged varies. For example, in a case where the user desires to measure parts as many as possible, adjustment of exposure time or multiple exposure is necessary so that the whole light reception amount distribution can be grasped. On the other hand, in a case where the measurement precision of the corners where the reflection light amount is extremely small can be ignored in the work WK3, it is sufficient that the light reception amount control works in the apex portion of the work. In a case where the precision of the corners is requested more than the precision of the apex portion in an application of measurement of width or the like, it is sufficient that the light reception amount control works in the corners. By performing the light reception amount control according to the applications or purposes, when the application does not require measurement of a portion where the reflection light amount is extremely small, it is sufficient to capture an image of only the surface portion of a work. When the application does not require measurement of a portion where the reflection light amount is extremely large, it is sufficient to capture an image of only the corner while unsetting the surface of the work as the object to be imaged, processed, and controlled.

By properly performing the imaging according to the application and purpose, profile information can be obtained efficiently and accurately. In the embodiment, the optical displacement meter has the functions suitable for imaging by application. The functions will be described concretely.

Examples of the operation amount to be adjusted so that the light reception image and the profile shape can be properly obtain are light emission level and light emission time of the light emitting device, exposure time of the two-dimensional light receiving device, the gain of the signal level of the amplification factor of the amplifier, and the like. The operation amounts can be directly set by the user with the operation amount adjusting means or can be automatically set on the optical displacement meter side. In particular, by performing feedback-control with the light reception level control means, the operation amount can be set to a proper value. However, since the operation amount settable range is wide and the reflection light amount and the like largely change according to works, the automatic control by the light reception level control means cannot follow. In some cases, the feedback control does not work and diffusion occurs, or it takes time until the control becomes stable. Consequently, as a method for obtaining more stable operation, a two-dimensional light receiving device having a light reception characteristic of a curve which does not saturate by adjusting the sensitivity characteristic is used. To be concrete, a two-dimensional light receiving device having the logarithm characteristic is used. Therefore, the absolute value is suppressed in an area where the light reception signal is high, and the relative difference between the signal and a signal in a low area is decreased. Even if there is the elevation difference in the light reception signals among lines in the two-dimensional light receiving device, the difference can be decreased. The range of the light reception signals of a single light reception image can be set wide. That is, single imaging operation is sufficient. Also in the case of performing the multiple exposure imaging operation of synthesizing a plurality of light reception images, the number of times of imaging can be reduced.

Mode Switching Means 53

The mode switching means 53 switches between a measurement mode of measuring a displacement of an object to be measured and a setting mode of setting an operation amount. In the setting mode, strip-line-shaped light is preliminarily emitted from the projector 3 to the object to be measured. The distribution of peaks of amplification signals in positions in a first direction is measured. The light reception level control means 61 can adjust the operation amount in accordance with the distribution state in the first direction. Since the light reception level control means 61 can adjust the operation amount to a proper operation amount on the basis of the distribution of peaks in the positions in the first direction, the difference among the lines in the first direction of the peak levels obtained by the two-dimensional light receiving device 15 is reduced, the peak level is captured effectively, and the displacement amount can be measured. As described above, by executing the measurement mode in a state where the operation amount is preliminarily adjusted to a proper operation amount in the setting mode by, for example, putting the work onto a line and performing optimum adjustment prior to actual operation, proper control can be realized without performing the feedback control. In particular, by pre-setting a range to be changed in an actual work, diffusion which occurs in a case where the feedback control is performed is prevented, and stable operation is expected.

Another configuration is also possible such that a displacement of an object to be measured is measured while executing the feedback control by the light reception level control means 61 also in the measurement mode depending on the application or purpose. It is also possible to set the operation amount to a proper operation amount in the measurement mode without performing the setting mode. After setting a rough operation amount in the setting mode, the optical displacement meter can operate while adjusting the set operation amount to the optimum operation amount in the measurement mode.

Automatic Adjusting Function

Figure 14:
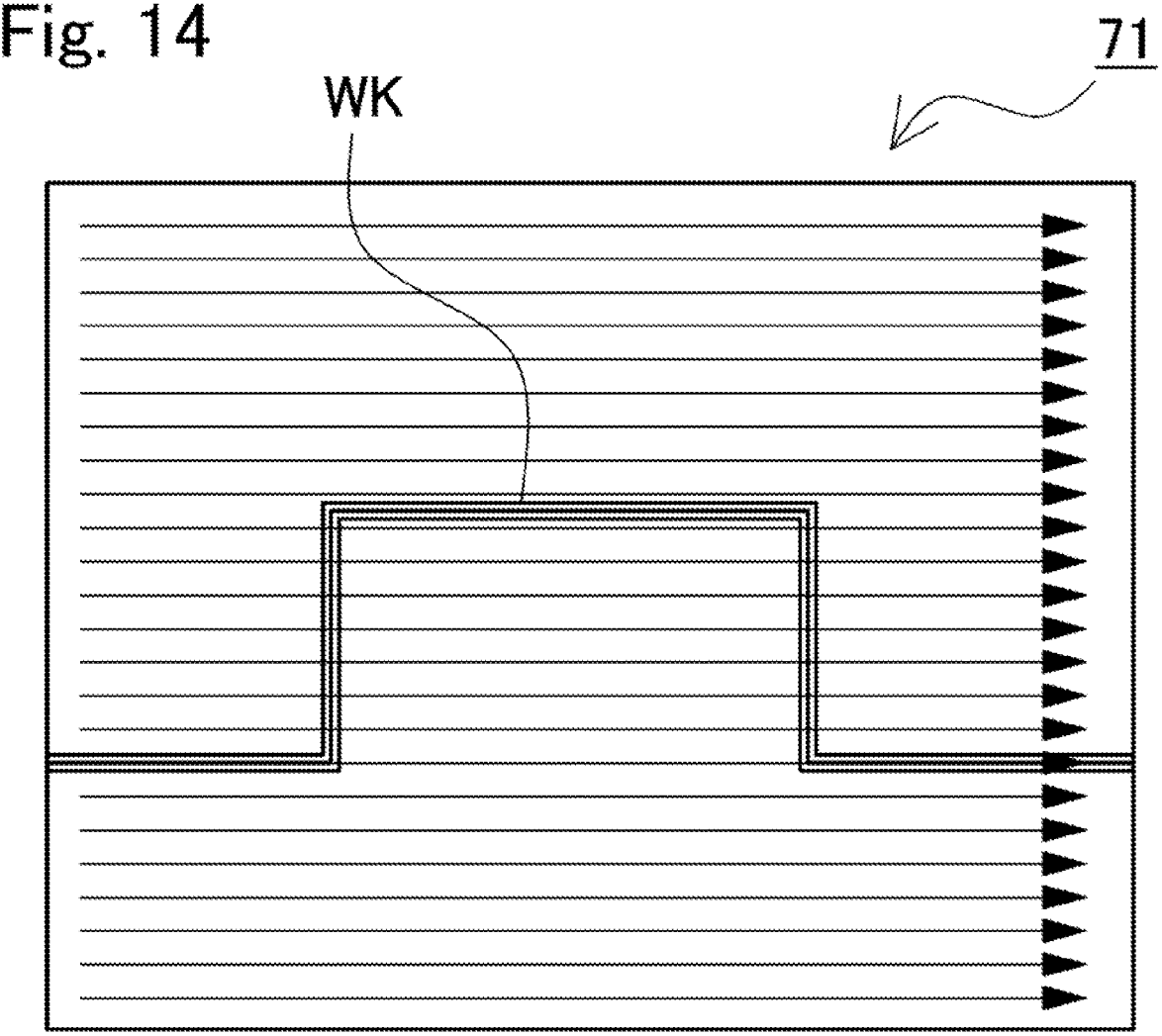
FIG. 14 is a schematic diagram showing a state where a reception light amount is detected in each of the lines of a two-dimensional light receiving device.
Figure 15:
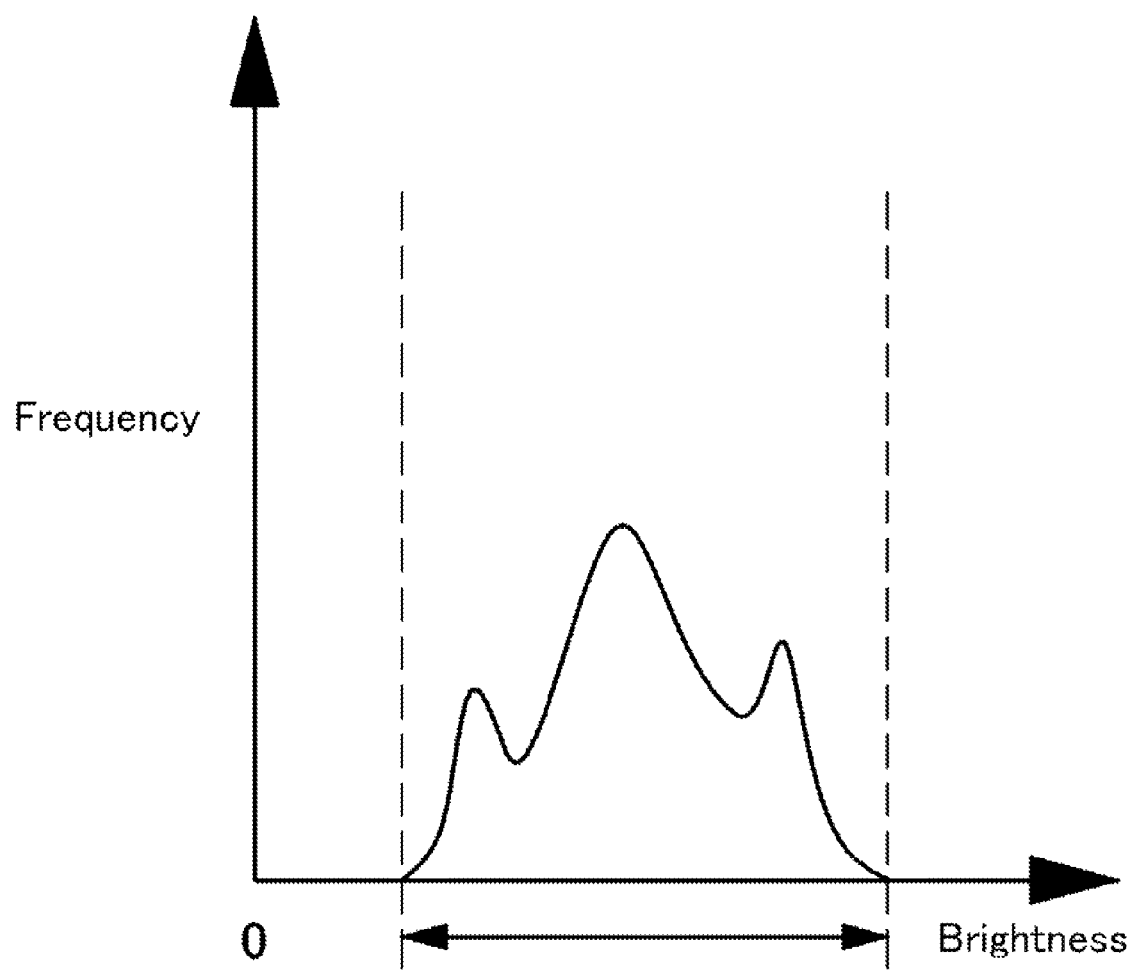
FIG. 15 is a graph showing histogram of a luminance distribution of a reception light image.

Further, in the case of using a device whose light reception characteristic can be adjusted as the two-dimensional light receiving device as will be described later, in the setting mode, the function of automatically adjusting the light reception sensitivity of the two-dimensional light receiving device by the light reception level control means on the basis of luminance distribution information of the light reception image may be provided. Concretely, a work is actually disposed or put onto a line. A light reception image of the work is captured by the two-dimensional light receiving device, and luminance distribution data is obtained. On the basis of the luminance distribution information, the light reception level control means automatically adjusts the light reception characteristic of the two-dimensional light receiving device. That is, the light reception characteristic is adjusted so that all of the luminance information can be properly obtained from the luminance distribution data obtained by imaging the actual work. To be concrete, as shown in the example of the profile display area 71 in FIG. 14, the reflection light amounts in the positions of the work WK are detected line by line by the two-dimensional light receiving device. The arrows shown in FIG. 14 correspond to lines in the two-dimensional light receiving device. As a result, the peak value of the light reception amount of each line is extracted. The frequency of the peak values (luminance) in the whole light reception image is counted, and the histogram of the luminance distribution of the light reception image as shown in FIG. 15 is obtained. On the basis of the histogram, the distribution range is grasped. The light reception characteristic (FIG. 16 and the like) of the two-dimensional light receiving device is adjusted or selected so as to cover the range. In a case where the optimum option or adjustment cannot be performed, a similar setting is made and the user is warned that the optimum setting cannot be made. As necessary, the light reception characteristic is changed, and two or more light reception images can be captured. Consequently, at the time of setting prior to the measurement mode, the pre-setting can be made so that the light reception characteristic becomes proper. Thus, more stable operation can be performed in the measurement mode.

Further, such automatic adjustment is not limited to the method of adjusting the light reception characteristic of the two-dimensional light receiving device in the direction to capturing a single light reception image in all of the range of the luminance distribution. A method of adjusting the light reception characteristic so as to capture only a part of the luminance distribution can be also employed. In particular, when all of the luminance information is not necessary at the time of measurement, by performing adjustment so that the luminance of the necessary part can be covered, an accurate light reception image can be obtained more efficiently.

The object to be adjusted is not limited to selection of the light reception characteristic of the two-dimensional light receiving device, but the above-described operation amount can be used. Examples are light emission level and light emission time of the light emitting device, exposure time of the two-dimensional light receiving device, and the gain of the signal level of the amplification factor of the amplifier.

Further, the operation amount automatically adjusted by the light reception level control means or the like or the operation amount adjusted by the feedback control can be adjusted by the user with the operation amount adjusting means. The user can perform fine adjustment and re-setting as necessary. In a case where the behavior is different from a calculation value or a theoretical value or the automatic adjustment cannot be performed, a manual setting can be made or the setting is made from the beginning.

Presentation of Candidate Patterns

At the time of automatic adjustment, the invention is not limited to computation of only one result (operation amount). A plurality of candidate patterns according to the applications may be generated and presented to the user on the display unit so that the user can select one of them. Concretely, a plurality of candidate patterns are computed by the light reception level control means or the like and displayed as a list on the display unit. FIG. 17 shows a display example of the candidate patterns KP. The candidate patterns KP are displayed as profile shapes obtained in the case of computing profile shapes with different operation amounts. The display unit has a plurality of profile display areas 71 for displaying profile shapes. Consequently, the user can easily obtain a necessary result by selecting a candidate pattern KP regarded as a desired result from the screen of the display unit. In the example of FIG. 17, three candidate patterns KP are displayed. The invention is not limited to the example but four or more candidate patterns KP or two or less candidate patterns KP can be displayed. When small candidate patterns are displayed like thumbnail images, the number of candidate patterns which can be displayed on one screen can be increased. The invention is not limited to the case of displaying a list of candidate patterns on the screen. By displaying candidate patterns while switching a plurality of screens, the candidate patterns can be displayed largely, and visibility also improves (smaller points can be well recognized).

Highlight Process

Figure 18:
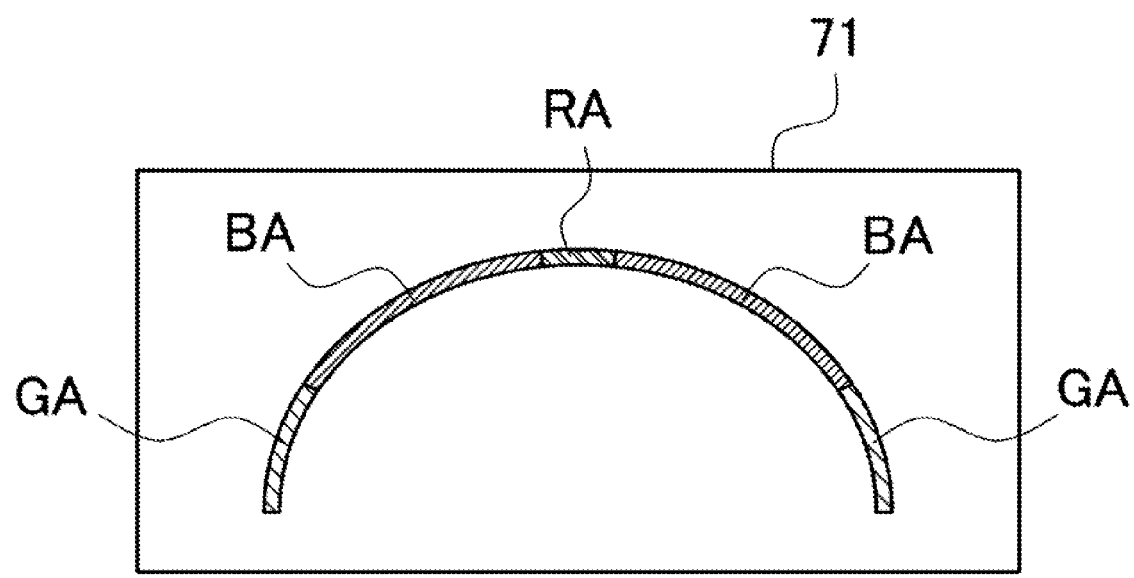
FIG. 18 is an enlarged schematic view of a profile display area.

FIG. 18 is an enlarged view of the profile display area 71. As shown in the diagram, a highlight process according to the light reception amount can be performed on the profile shape by the profile highlight means. In the example, different colors are given according to the levels of the light reception amounts in different positions in the profile shape. For example, a portion in which the light amount is in a proper range is colored in blue (a narrow-hatched area BA in FIG. 18), a portion in which the light amount is larger than a threshold and is excessive is colored in red (a double-hatched area RA in FIG. 18), and a portion in which the light amount is insufficient is colored in gray (a wide-hatched area GA in FIG. 18). With the arrangement, the user can visually grasp the light reception amount in each of positions in the profile shape and easily select a profile shape having the smaller number of parts of insufficient light amounts in a portion necessary for measurement. In the separation in colors performed by the profile highlight means, the levels of the light reception amount are pre-set and colors are assigned in advance. The profile highlight means can properly use methods capable of distinguishing parts from each other such as a method of changing drawing colors in a profile in accordance with the levels of the light reception amount, a method using fluorescent colors, a method using grayout, a method of displaying frame borders, a method of changing line kinds such as a thick line, thin line, and broken line, and a method of changing patterns of hatching.

Light Amount Graph

Figure 19:
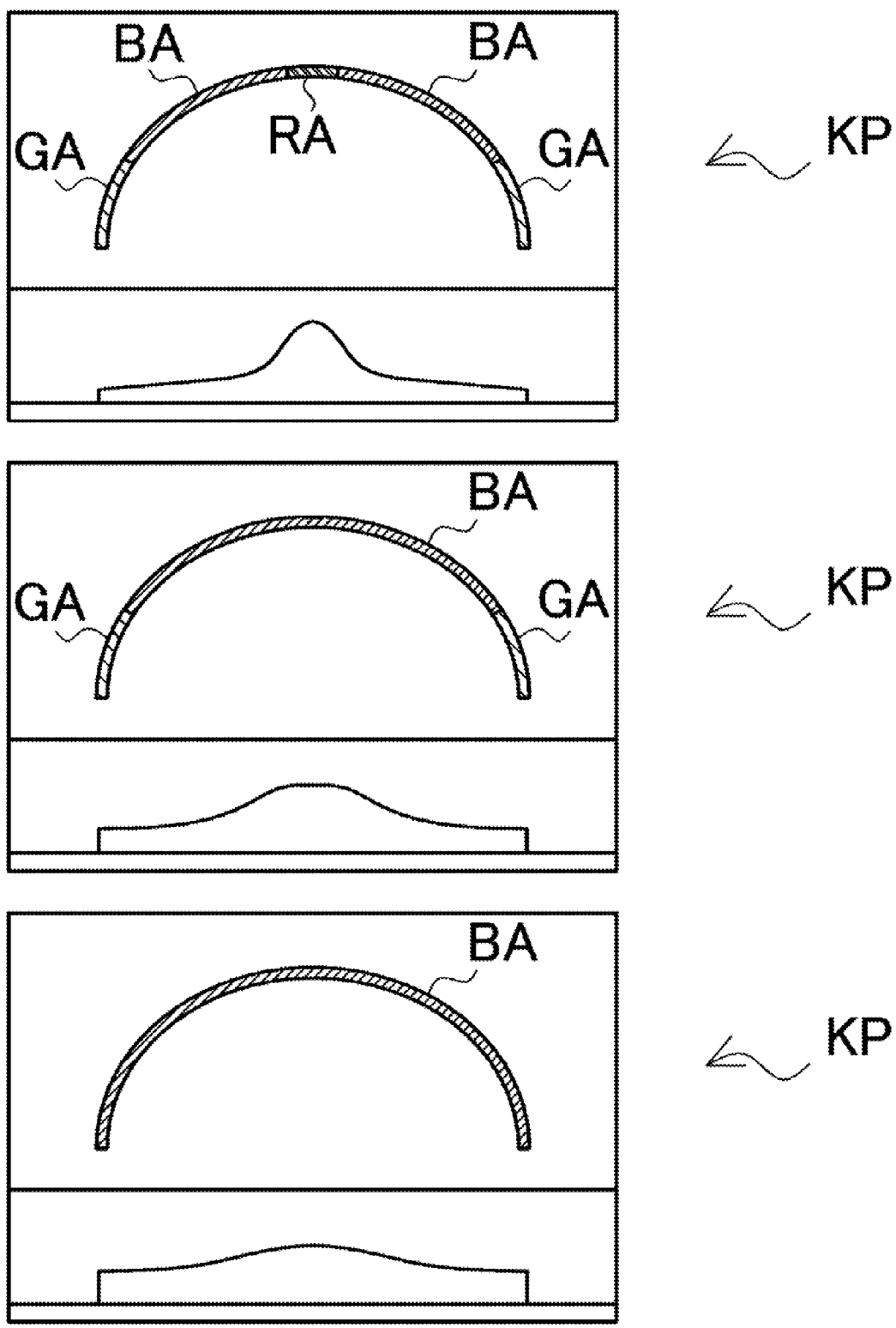
FIG. 19 is a schematic diagram showing a state where the profile shape as a candidate pattern and the light amount graph are displayed.
Figure 20:
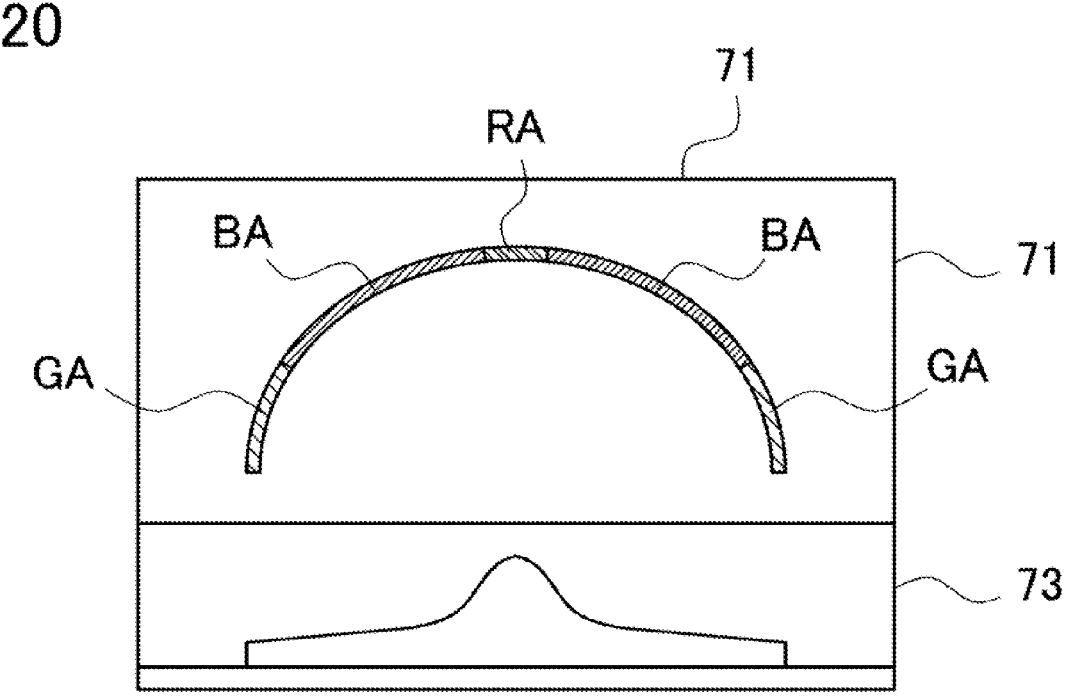
FIG. 20 is an enlarged schematic diagram of the profile display area and the light amount graph display area.

Further, as shown in FIG. 19, as the candidate pattern KP, a light amount graph indicative of the light amount in each of the different positions in a profile shape can be displayed in addition to the profile shape. As shown in an enlarged diagram of FIG. 20, the light amount graph is displayed in the light amount graph display area 73 provided below the profile display area 71. The profile shape and the light amount level are simultaneously displayed. Particularly, by arranging the profile shape and the light amount level in the vertical direction, the light amount in a corresponding position in the profile shape can be visually recognized. Thus, the diagram can be used as a more objective index at the time of selection.

It is also possible to display only the light amount graph or a light reception image as the candidate pattern. Not a whole image but a part of an image may be displayed. In particular, in a case where an area necessary for measurement is limited, by displaying only the area or enlargedly displaying the area, comparison and recognition can be facilitated, and visibility can be further increased.

Feedback Control in Plural Lines

Figure 21A:
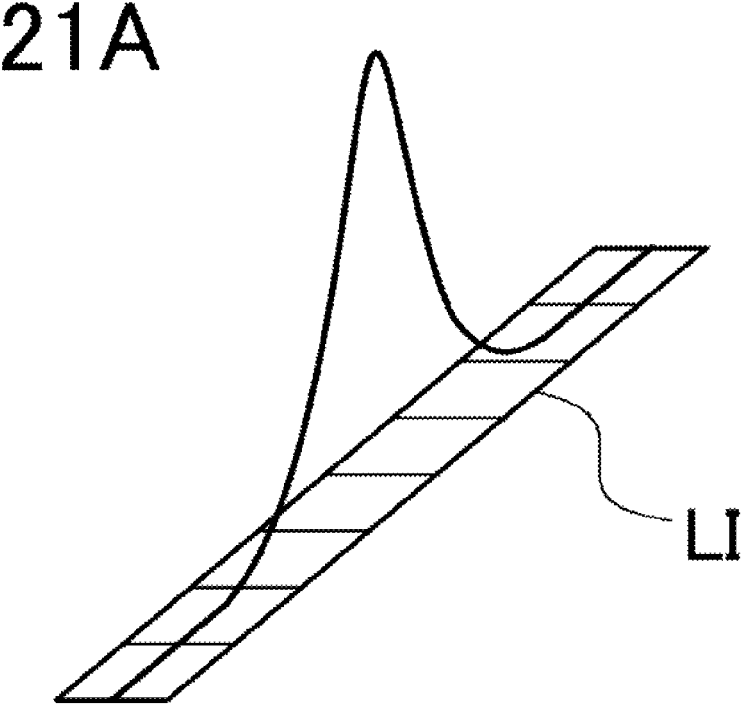
FIGS. 21A and 21B are schematic diagrams showing waveforms of a reception light signal.
Figure 21B:
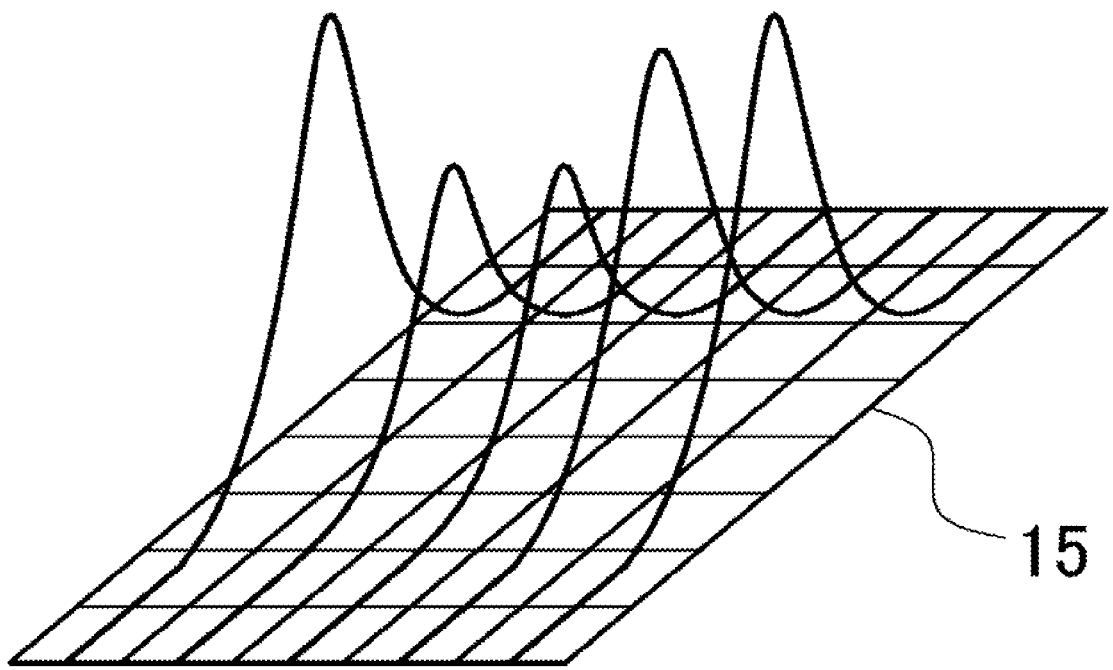

In the optical displacement meter using the two-dimensional light receiving device, linear image sensors are arranged two-dimensionally. Consequently, in addition to feedback control of a light reception amount in the linear image sensor, a feedback control considering distributions of light reception amounts in a plurality of linear image sensors, that is, lines is also necessary. To be concrete, in the case of the two-dimensional light receiving device 15, a structure in which linear image sensors L1 are arranged in parallel only by the number of lines of pixels as shown in FIG. 21A is employed. Therefore, a plurality of peaks of a single light reception signal and the like exist only by the number of pixel lines as shown in FIG. 21B. In the case of a linear image sensor such as a one-dimensional CCD or CMOS, it is sufficient to only determine the power of a laser beam on the basis of peaks of light reception signals. In the case of the two-dimensional light receiving device 15, peak levels exist by the number corresponding to a plurality of lines. It is therefore necessary to perform a control in consideration of the peak levels among lines. In particular, in the case of a work in which parts whose surface states largely differ from each other mixedly exist, the peak level largely differs from each other line by line, and the adverse influence is exerted on stable control and a high-precision displacement calculation. Consequently, in the embodiment, as methods of feedback-controlling the light reception amount by the light reception level control means 61, the following methods are employed.

(1) A method of extracting a measured peak level at the position of the "a"% from the top and setting it as an object to be controlled.

(2) A method of calculating an average of measured peak levels in a range from the "b"% to the "c"% from the top and setting it as an object to be controlled.

(3) A method of controlling the method (1) or (2) after reducing the difference of peak levels among lines by using a two-dimensional light receiving device whose light reception characteristic (light reception amount-output voltage relation) is nonlinear.

In the method (1), by paying attention to a portion having a high peak level, a control for suppressing saturation of a light reception signal can be performed. The "a"% can be set to an arbitrary value, preferably, to 50%. As an example, by setting the "a"% to a value in a range from 5% to 15%, specifically, 10% from the top, a line whose reflection light amount is accidentally or locally large is eliminated. Thus, more stable control can be performed.

In the method (2), by paying attention to not only a portion of a high peak level but also a portion of a low peak level, a control can be realized which prevents a work part having a large reflection amount from having an excessive light amount while detecting a work of a small reflection light amount can be realized. The "b"% to the "c"% is 5% to 95%, preferably, 10% to 90%. In particular, by setting the range to the top 10% to 90%, abnormal points such as peak levels which are accidentally or locally high or low can be eliminated.

In the method (3), a two-dimensional light receiving device having a nonlinear light receiving characteristic such that saturation is suppressed in high output areas is used. The light reception characteristic of a normal CCD, CMOS, or the like is linear. When the light reception amount is too large, an output signal saturates. However, by making the area of the high output non-linear, a wide dynamic range can be assured. Particularly, an increase in an output signal in an area of a large light reception amount is suppressed. As a result, the difference between the signal and a signal in an area of a small light reception amount is reduced, the difference between peaks in the lines is reduced, and the processes in the methods (1) and (2) can be performed more effectively. Preferably, a two-dimensional light receiving device whose light reception characteristic (sensitivity curve) called the logarithm characteristic has a curve like a logarithm graph or broken line close to the curve is used. The stronger the logarithm characteristic is, the more an output signal in the area of a high light reception signal can be suppressed.

Logarithm Characteristic

Figure 16:
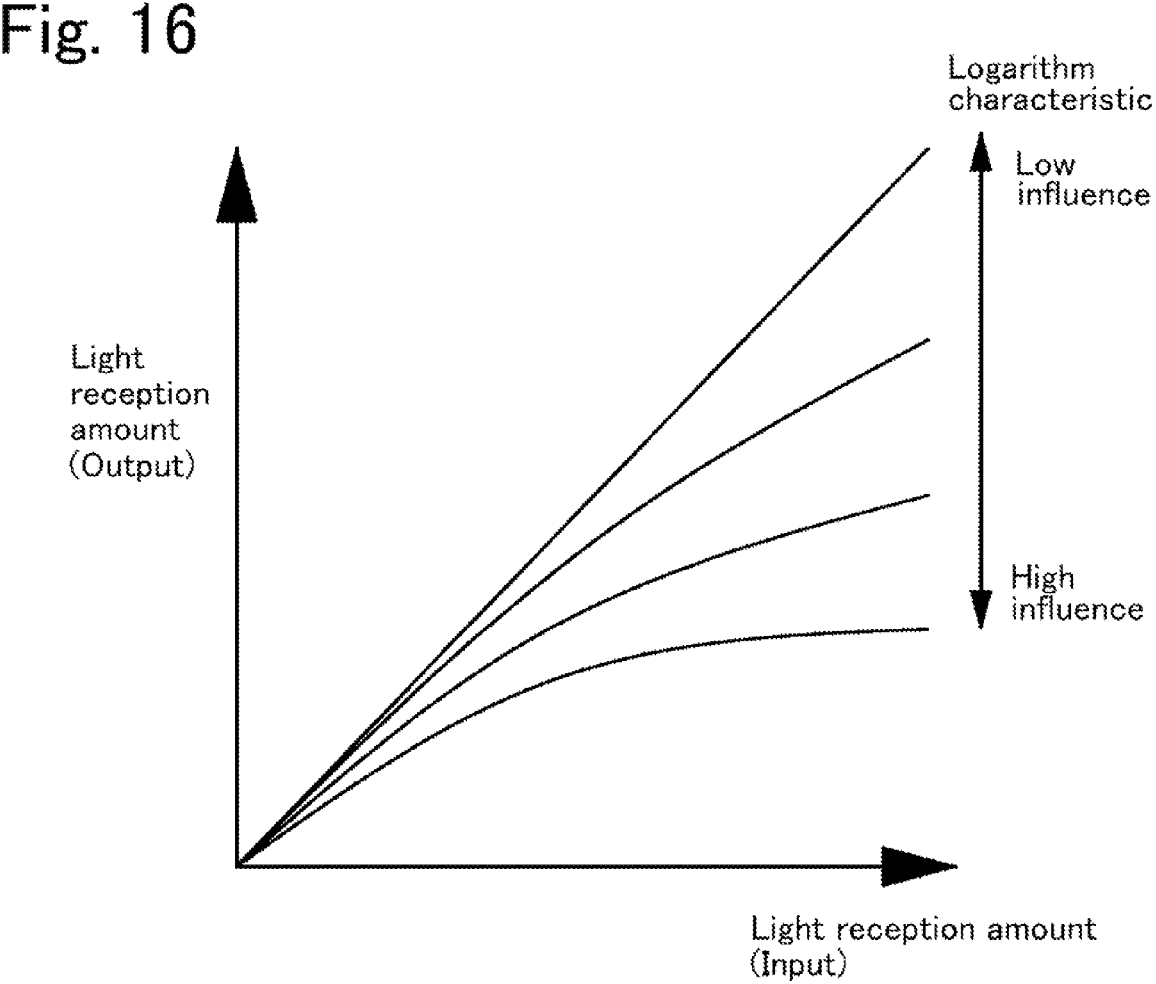
FIG. 16 is a graph showing an example of the light receiving characteristic of the two-dimensional light receiving device.

The logarithm characteristic is an input/output characteristic showing a nonlinear curve as shown in FIG. 16. It is assumed here that a curve of sensitivity drops in an area of a large light reception amount. Consequently, the possibility that the light reception amount saturates is reduced, and the light reception amount can be reproduced in a wide range. It enables a work having various light reception levels to be properly imaged in a single light reception image. The number of uncomposed images at the time of performing multiple exposures can be reduced. Therefore, the process time required for imaging is shortened, the process amount is reduced, and high-speed and low-load process is realized.

The stronger the logarithm characteristic is, the more the output signal in an area of a large light reception amount can be suppressed. For example, in a case where the relative value of the lower end of the distribution of the light amount peak is below 500, the logarithm characteristic is strengthened.

As the light reception characteristic, a characteristic of increasing the peak in the area of the low light reception amount may be also added. Further, a two-dimensional light receiving device having a multi-slope characteristic capable of generating an arbitrary light reception characteristic curve, and a two-dimensional light receiving device whose light reception characteristic curve can be arbitrarily adjusted can be also used. Switching of a plurality of characteristic curves and adjustment of light reception characteristic curves are performed by the light receiving device control unit 52. Obviously, the light reception characteristic is not limited to the curve shape but may be linear or a broken line. Consequently, the light reception characteristic of the two-dimensional light receiving device can be selected or adjusted in accordance with sensitivity according to an object to be measured, so that a proper measurement can be realized. The invention is not limited to the example of performing the feedback control in the measurement mode. It is effective to use a two-dimensional light receiving device having a nonlinear light receiving characteristic such as the logarithm characteristic also in the setting mode.

The light reception characteristic can be also adjusted in relation with the feedback control. For example, at the time of generating the light amount graph showing the distribution of the waveform peak in the measured profile shape, 10% from the lightest side and 10% from the darkest side in the light amount graph are eliminated from an object to be measured. The light reception characteristic is adjusted so that the remaining 80% lies in a predetermined light amount range. When the adjustment is performed so as to cover center values and not all of the light reception levels, a more-accurate reliable control result can be expected. In the example, the light amount is expressed in a relative value. For example, the light reception characteristic is determined so as to be in the range level from 500 to 900.

Work Determining Means 63

One of the issues in the feedback control of the light reception amount of the two-dimensional light receiving device 15 is a process of a line whose reception-light peak is not recognized. There are two causes for the issue that the reception-light peak is not recognized; (a) the light emission amount of a laser is insufficient, and (b) no work exists in a position corresponding to a line in practice. However, it is impossible to distinguish the causes by a feedback control system in the conventional technique.

When the cause is (a), it is sufficient to increase the light amount of the laser. However, when the actual cause is (b), even if the laser light amount is increased much, no reception-light peak can be recognized. Instead, as a result of an increase in the laser light amount, a light reception signal in another line, whose reception-light peak was recognized also saturates. It may cause deterioration in precision.

Figure 22:
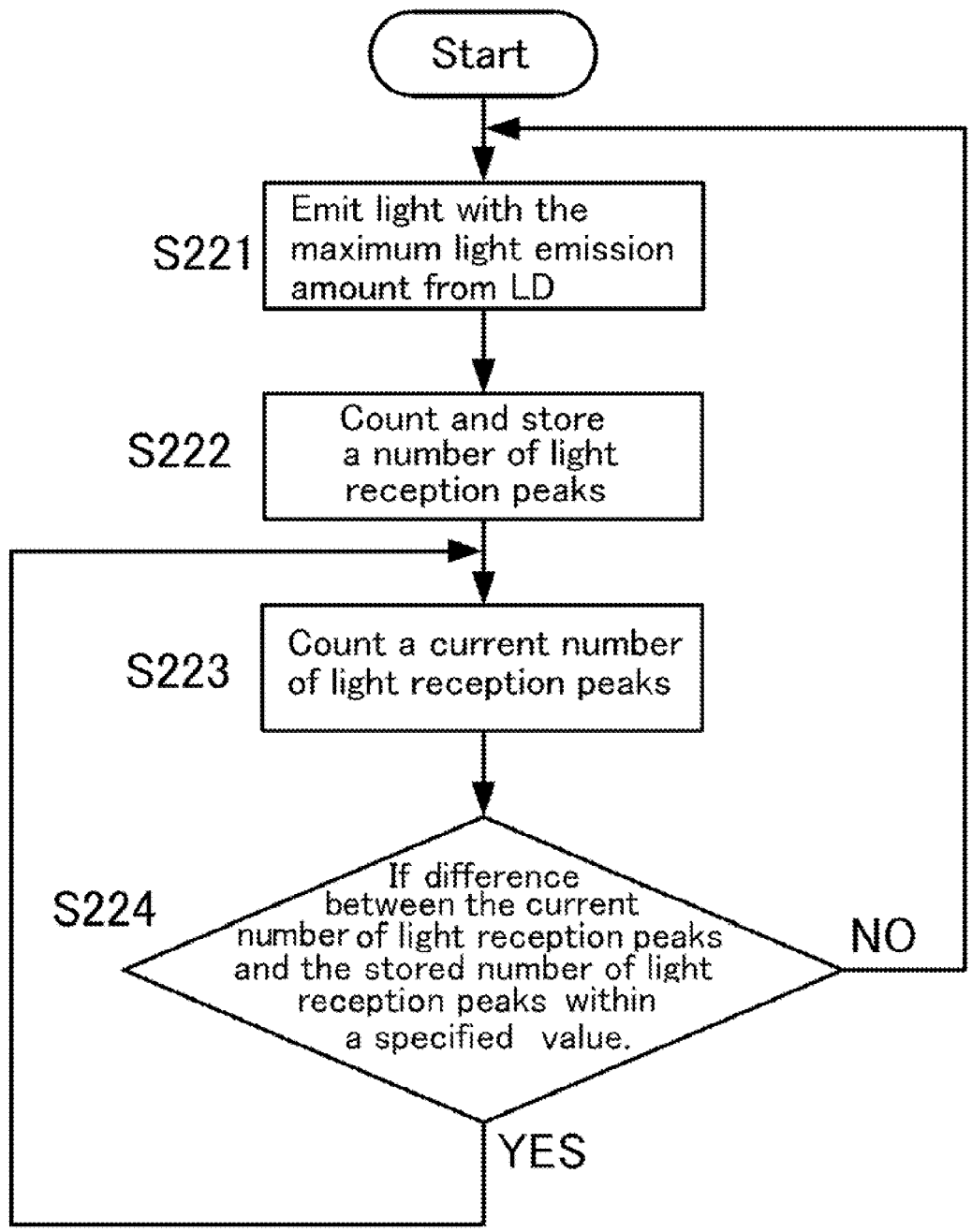
FIG. 22 is a flowchart showing the procedure of storing the number of peaks and controlling the reception light amount.

To address such a problem, the work determining means 63 determines the state of the work on the basis of the number of reception-light peaks so that a proper feedback control can be performed. Concretely, as shown in the flowchart of FIG. 22, first, as a preparation, the light emitting device is allowed to emit light with the maximum light emission amount in step S221. The number of reception-light peaks measured is counted and stored in the reception-light peak storing means 91 in the memory 90 (step S222). At the time of detecting the reception-light peaks in this state, the number of reception-light peaks is counted (step S223). The detected number of reception-light peaks is compared with the number of reception-light peaks stored in the reception-light peak storing means 91 (step S224). When the difference between the detected number of reception-light peaks and the stored number of reception-light peaks is equal to a specified value or less, it is determined that there is no change in the work, and the light reception amount feedback control, that is, any one of the controls (1) to (3) is performed. The work determining means 63 returns to step S223 and repeats the control. On the other hand, when the difference between the detected number of reception-light peaks and the stored number of reception-light peaks is larger than the specified value, it is determined that a large change occurs in the state of the work. The work determining means 63 returns again to step S221. The number of reception-light peaks in the maximum light amount is re-counted, and comparison is performed. By performing the control of determining a state change of a work on the basis of the number of reception-light peaks in the work determining means 63, it can be determined that a change in the light reception amount is caused by a state change in the work or simply a shortage of the reflection light amount. Thus, the accurate feedback control can be realized by the light reception level control means 61.

Control Area Designating Means 85

As another method, it is suitable for stabilizing the control by making a control area to be designated as a range of performing the light reception amount control. For example, there is an optical displacement meter having a function of designating an area to be measured by the measuring area designating means 82 such as a mask function. However, the main aim of this optical displacement meter is setting of the measurement area. Consequently, a control area is selected from a viewpoint different from the viewpoint of stabilizing an operation amount to be controlled. As a result, a part in which a work does not exist is included in a measurement area, a part in which the reflection light amount is extremely small or large, or the like is mixed. Since the reception-light amount peak level in such a part is largely different from that in another part, if the feedback control is performed in a state where such data is included, there is the possibility that an operation amount cannot be adjusted to an accurate one.

Figure 23A:
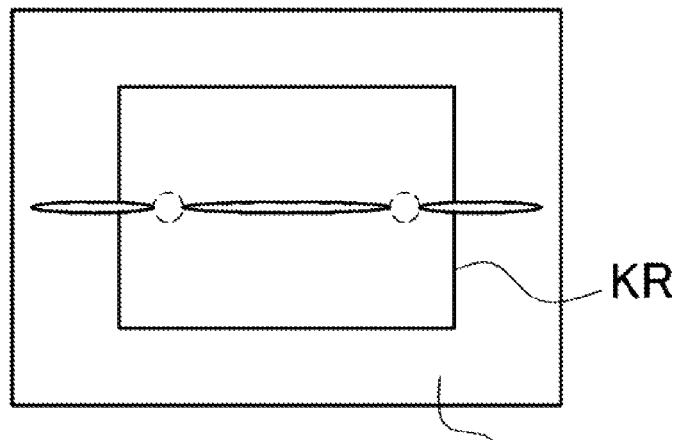
FIGS. 23A to 23C are top views and a perspective view showing a state of designating a control area.
Figure 23B:
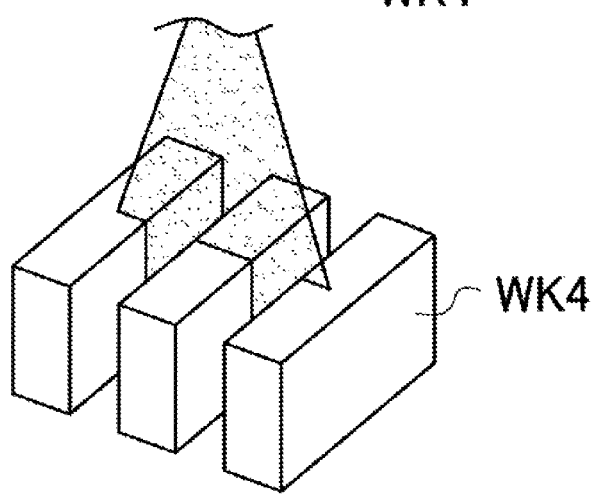
Figure 23C:
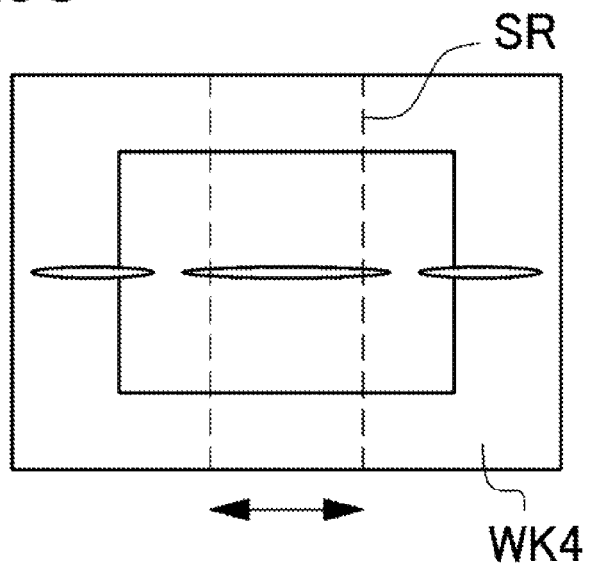

In the embodiment, therefore, the control area designating means 85 can set the control area as a range to be controlled separately from the above-described measurement area. As a result, the range suitable for control can be set uniquely. The state will be described with reference to FIG. 23. In the example, switching of a plurality of characteristic curves of a laser beam and adjustment of the light reception characteristic curve on a work WK4 as shown in FIG. 23B are performed by the light receiving device control unit 52. FIG. 23A is a top view of a light reception image of the work WK4 shown in FIG. 23B displayed on the display unit 70. On the screen, a measurement area KR in a rectangular shape is designated by the measurement area designating means 82. A work does not exist in circular areas in the measurement area KR. Therefore, the reflection light amount in the areas is so smaller than that in the other portion, that it causes fluctuation. Consequently, a control area SR is designated separately from the measurement area. FIG. 23C shows an example where the control area SR is designated by the control area designating means 85 so as to overlap the measurement area KR shown in FIG. 23A. As shown in the diagram, the control area SR is designated in a band shape while excluding a portion where no work exists. As a result, a portion of a low reception-light peak level or a portion in which the peak level varies is eliminated, the general level can be made constant, and the stable reception light amount feedback control can be realized with higher precision. Although the control area SR is designated in a band shape in the example of FIG. 23C, the control area SR is not limited to the band shape. Obviously, the control area SR can be set in an arbitrary shape such as a rectangular, polygonal, circular, or ellipse shape.

For the control area designating means 85 for designating the control area SR, the same member as that of the measurement area designating means 82 for designating a measurement area can be used. That is, a member can be commonly used so as to designate each of the control area and the measurement area by single designating means.

Stability Output Means 58

Figure 24:
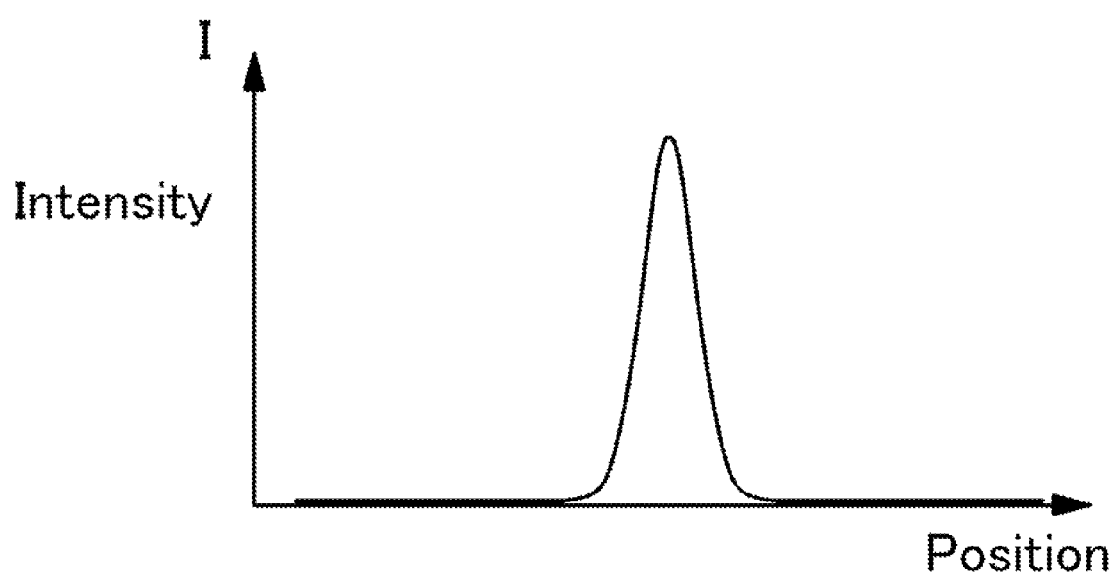
FIG. 24 is a schematic view showing an example of a normal reception light signal waveform.
Figure 25A:
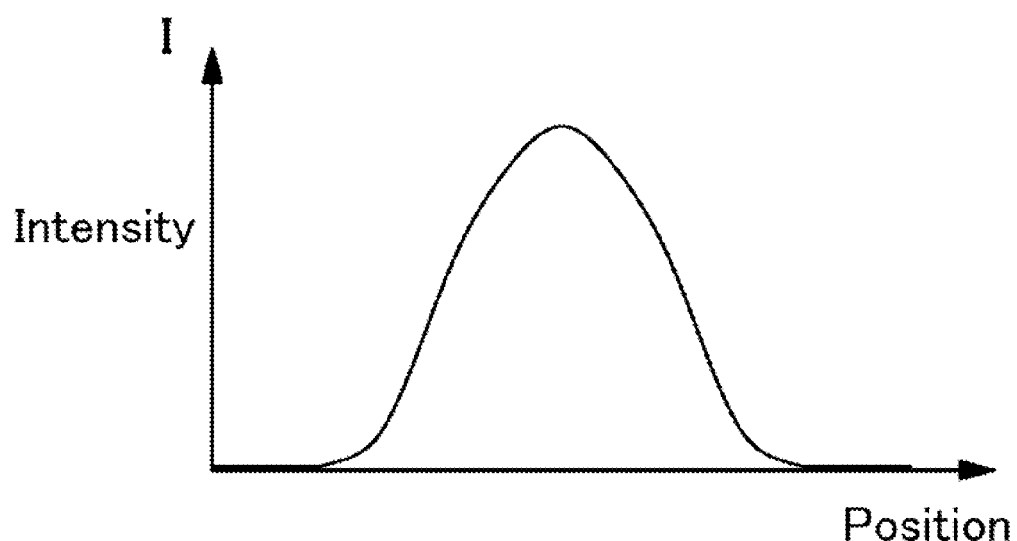
FIGS. 25A to 25C are schematic views showing examples of abnormal reception light signal waveforms.
Figure 25B:
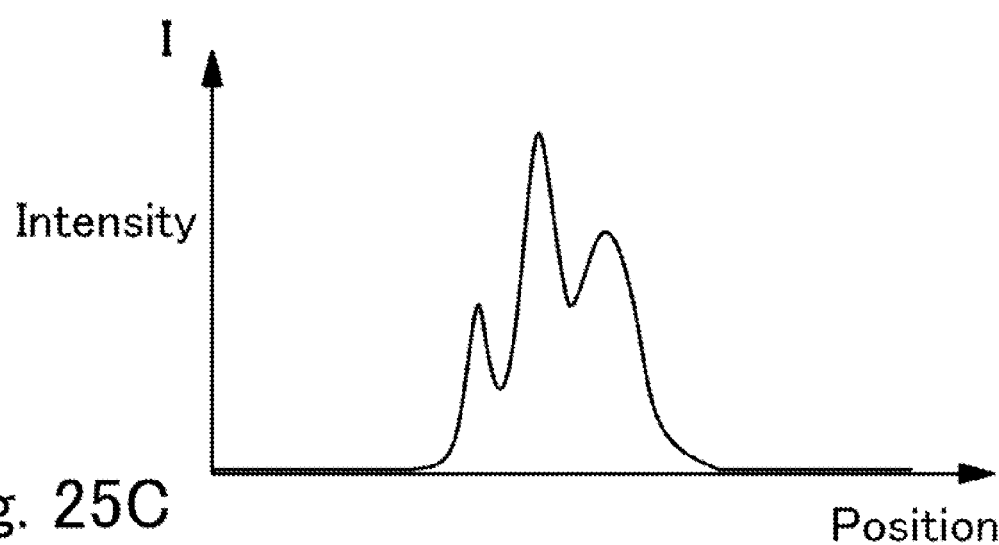
Figure 25C:
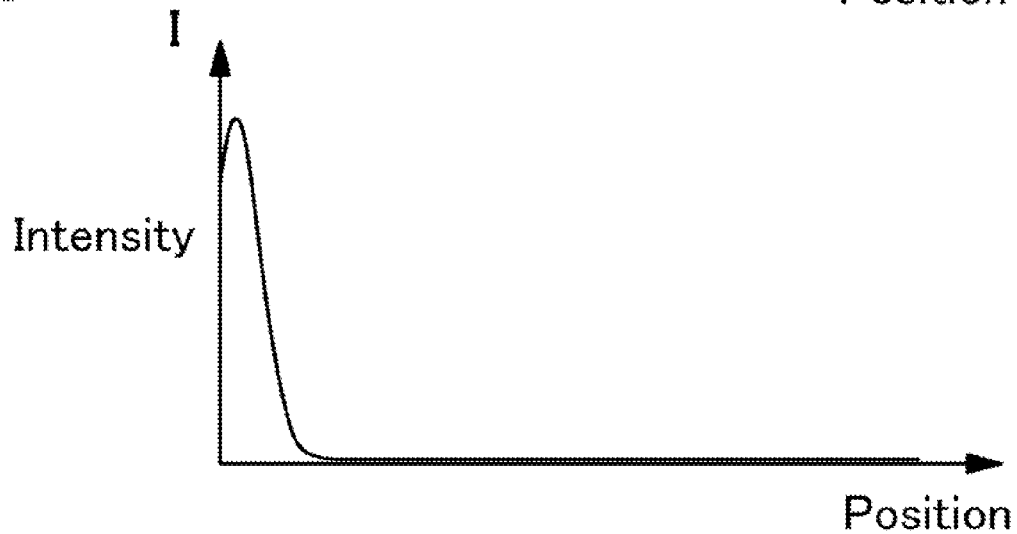

Further, the stability output means 58 for outputting stability as an index of the stability of the reception light peak waveform can be also provided. At the time of performing the feedback control on the basis of a reception light signal, in the case of conveying the work in the work shape at high speed or in a case where reflectance varies, imaging may be performed in a state where the light reception signal saturates or is insufficient in a transient period until the reception light amount becomes stable. In such a case, problems occur such that the precision of a measurement value such as displacement becomes lower than in a case where the light reception amount control is stable, and an abnormal value largely different from the true value is expressed. FIG. 24 shows the waveform of a normal light reception signal. In contrast, FIGS. 25A to 25C show waveforms of an abnormal light reception signal. Concretely, FIG. 25A shows a broad waveform, FIG. 25B shows a jaggy waveform in which an external disturbance such as noise is added. FIG. 25C shows a waveform which is cut at the end of a CCD. When such a signal waveform is processed and measurement computation is performed in a state where the signal waveform shows abnormal, an error occurs.

On the other hand, in the embodiment, as an index of stability of the feedback control, the stability can be outputted from the stability output means 58 and used as an index of the reliability of the calculated measurement value or whether a measurement value is calculated in this state or not. In the embodiment, whether the control is stable or unstable is determined on the basis of (1) the number of peaks of saturated light reception amounts and/or the number of lines of peaks of reception light amounts, and (2) the number of lines of peaks of light reception signals having abnormal shapes. When a preset alarm condition such as the number of lines of abnormal light reception peaks is satisfied, an alarm is outputted. Information such as the number of lines of abnormal peaks and the kind can be directly outputted as stability information.

Further, alarm means 59 for generating a stepwise alarm on the basis of stability output from the stability output means 58 may be also provided. In the example of the block diagram of FIG. 4, the stability output means 58 includes the alarm means 59 capable of setting the alarm level step by step. For example, a step "of outputting an alarm when saturation or insufficient light amount occurs even in one line", a step of "calculating a measurement value even when saturation or insufficient light amount occurs in many lines", and the like can be arbitrarily set according to the application, purpose, or the like. By the light reception amount control stability detecting function using the stability output means 58, the displacement measurement with the precision and measurement stability required by the user can be realized.

Measurement Light Selecting Means 836

Figure 101:
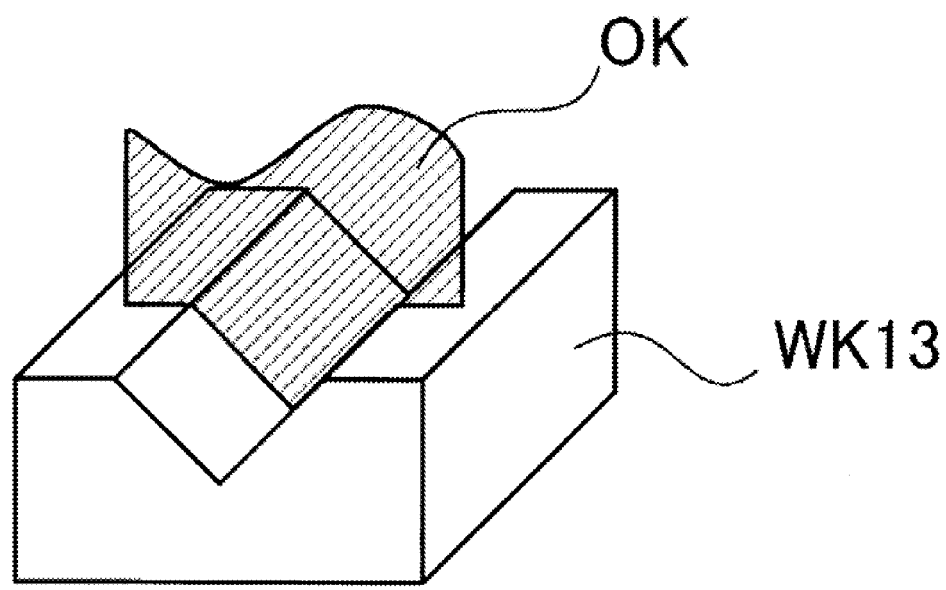
FIG. 101 is a schematic view showing a state of projecting light to a work having a V-shaped groove.
Figure 102:
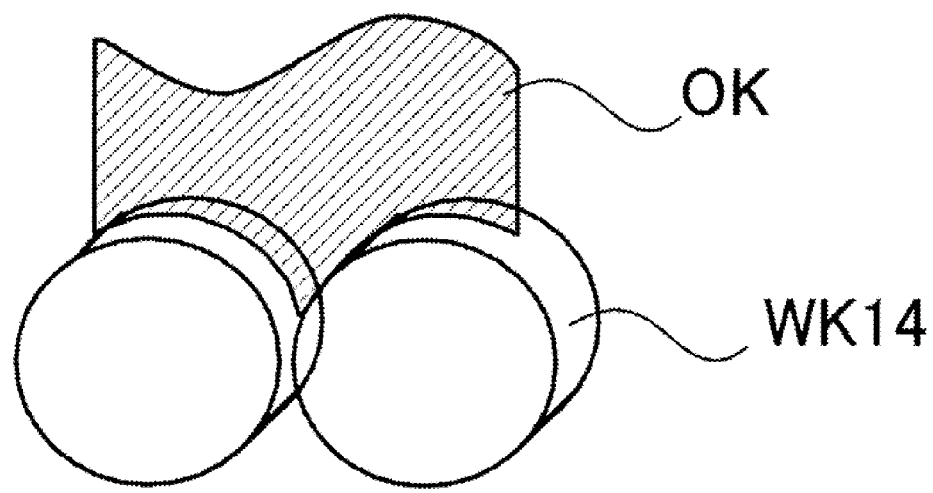
FIG. 102 is a schematic view showing a state of projecting light to a roller-shaped work.

At the time of measuring profiles of works WK13 and WK14 as shown in FIGS. 101 and 102, there is a case such that a plurality of reception light signal waveforms are on a measurement line. The optical displacement meter can be provided with the measurement light selecting means 836 for selecting any of the reception light signal waveforms as an object to be measured in such a case. Concretely, in a case where a plurality of waveforms exist on a measurement line, an object to be measured can be selected by a method of recognizing the order of the waveform and measuring the nearest waveform, the n-th waveform from the nearest waveform, the m-th waveform from the furthest waveform, or the like. As described above, by selecting proper measurement light by the measurement light selecting means 836, even in a case where a number of pieces of reflection light occur, proper measurement light can be set as an object to be measured while eliminating unnecessary reflection light.

Reception Light Mask Function

Figure 26:
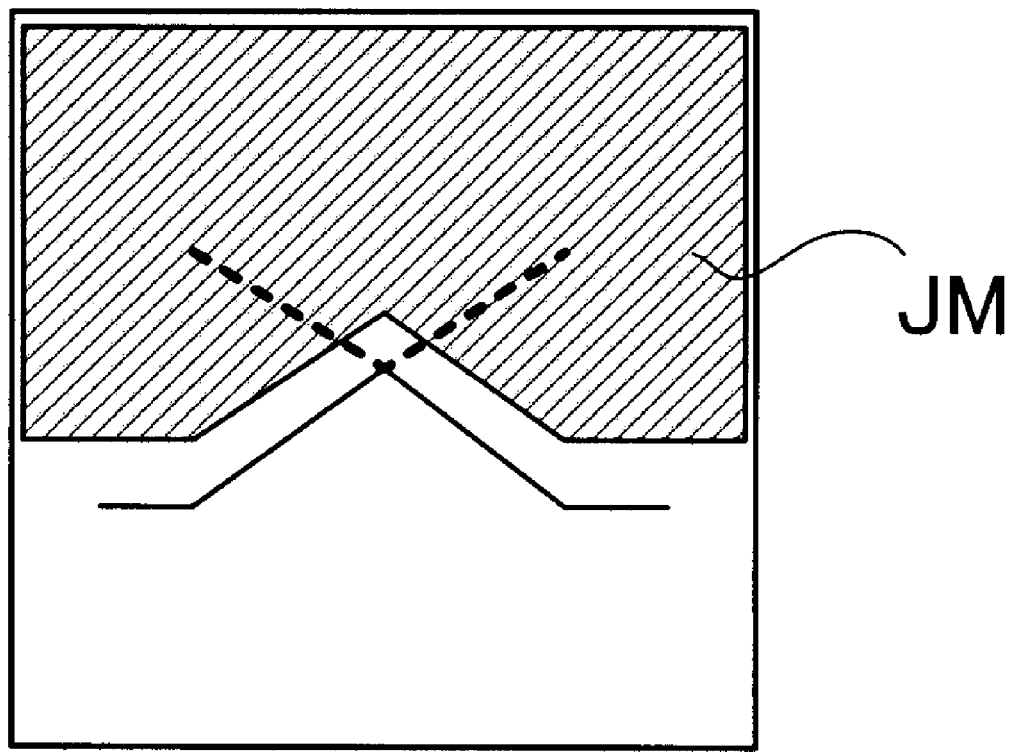
FIG. 26 is a schematic view showing a state where a reception light mask area is set in a reception light image.
Figure 27:
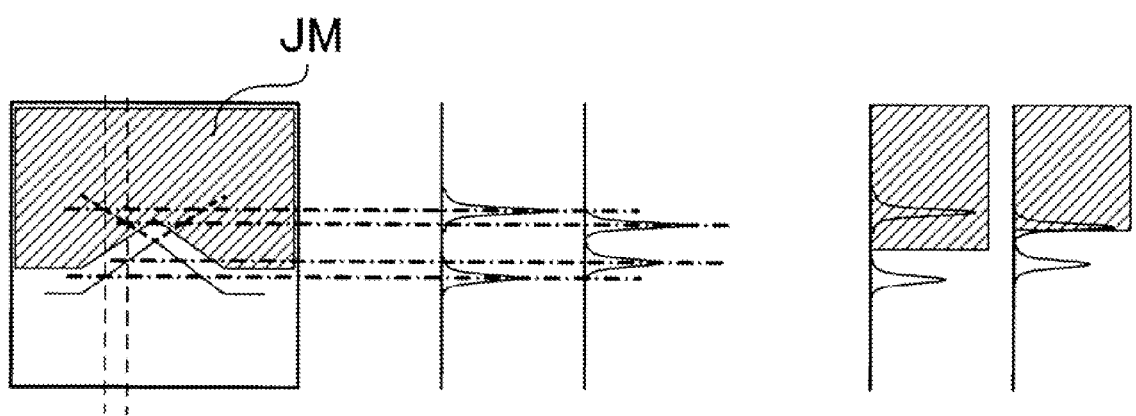
FIG. 27 is a schematic view showing a state where reflection light is separated from FIG. 26.

The above-described method can be used excellently in a case where reflection is stable and the number of waveforms is stable in any positions. However, there is a case that the number of waveforms is unstable. In this case, the above-described method is not enough to determine measurement light or eliminate unnecessary waveforms, but this case can be handled by designating a reception light mask area JM by the mask area designating means 86. Concretely, as shown in FIG. 26, the reception light mask area JM which is not an object to be measured is set on the screen of the display unit displaying a reception light image. In the example of FIG. 26, two pieces of reflection light are recognized, so that the reception light mask area JM is set so as to include a reflection light component unnecessary for measurement. The shape of the reception light mask area JM can be designated like rectangular, trapezoidal, triangular, linear, or circular shape. In the example of FIG. 26, the shape of the reception light mask area JM is designated as an M shape by combining a rectangle and two trapezoids. As a result, as shown in FIG. 27, reflection light components shown by wave lines are properly eliminated, so that only reflection light components shown by solid lines are left. On the basis of the information, the measurement processor 54 performs measurement.

Mask Shifting Means 617

Figure 28:
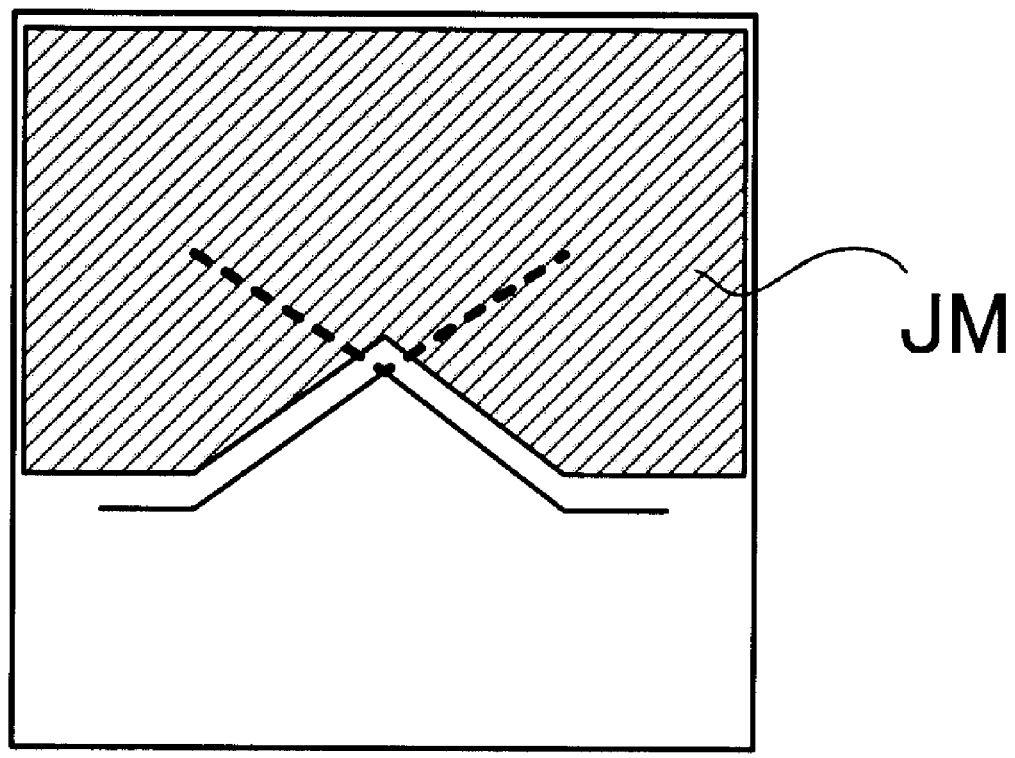
FIG. 28 is a schematic view showing an example of finely setting the light reception mask area in accordance with measurement light.
Figure 29:
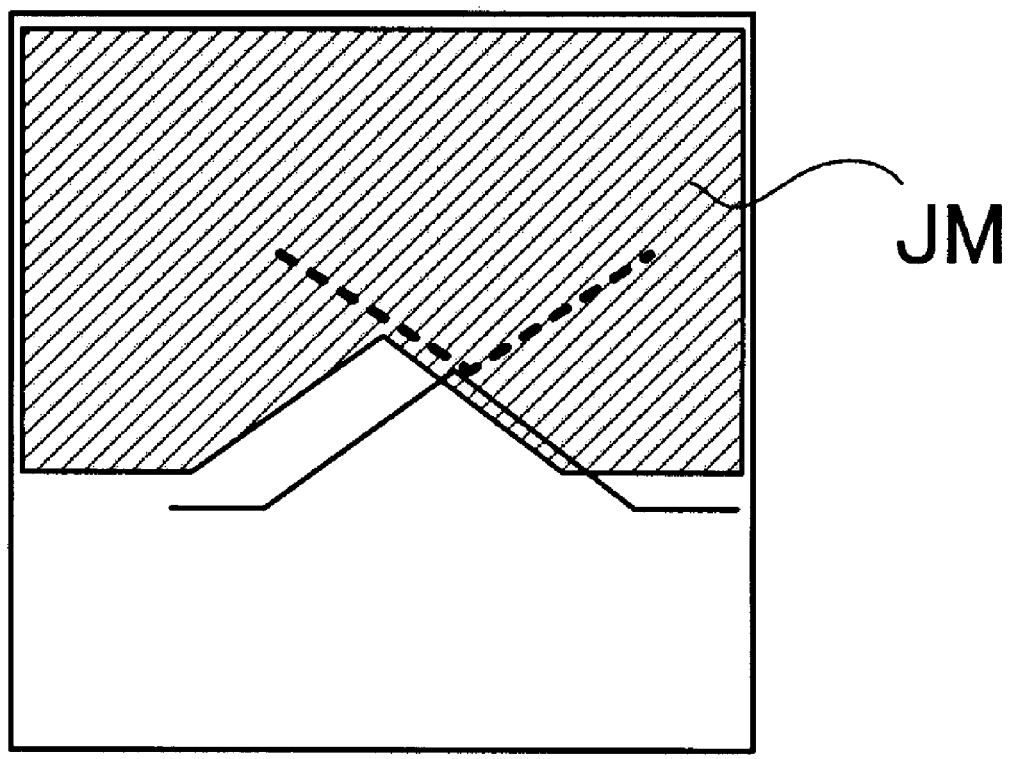
FIG. 29 is a schematic view showing a state where a part of the measurement light is masked by the light reception mask area due to a displacement.
Figure 30:
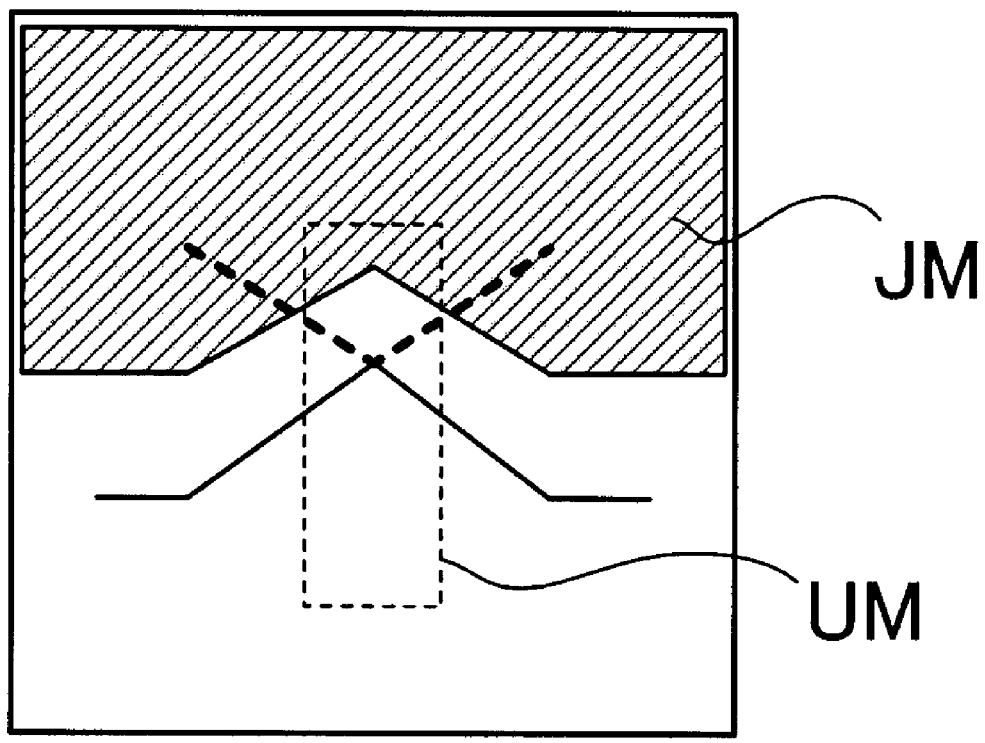
FIG. 30 is a schematic view showing an example of setting the reception light mask area in consideration of displacement.
Figure 31:
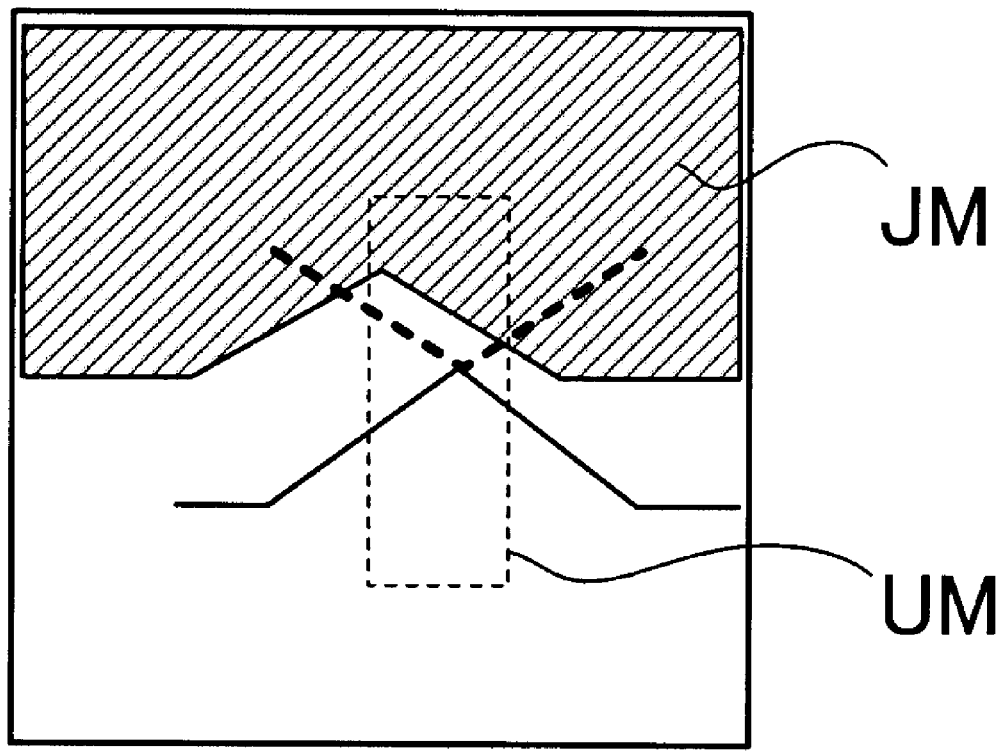
FIG. 31 is a schematic view showing an example where displacement occurs in the reception light mask area in FIG. 30.

When the reception light mask area JM is set finely in accordance with the measurement light as shown in FIG. 28, an accurate measurement is expected. However, depending on a work, even when the mask function is used, there is the possibility that the work position is unstable. For example, in an application of capturing an image of a work conveyed on a line by a CCD camera, the position of the work changes every imaging operation, and the waveform appearance point is also undetermined. When the reception light mask area JM is finely set in accordance with the measurement light in such a case as shown in FIG. 28, if the work shifts in position as shown in FIG. 29, a part of the measurement light to be measured is masked and cannot be measured. In contrast, when the reception light mask area JM is set with a margin in consideration of a positional shift of a work as shown in FIG. 30, the situation that the measurement light is masked can be avoided as shown in FIG. 31. However, as shown by a broken-line frame UM in FIGS. 30 and 31, a part of the reflection light cannot be excluded. As described above, in the application where a positional shift occurs in a work, an inconvenience occurs such that the reception light mask area JM cannot be properly set.

Figure 32:
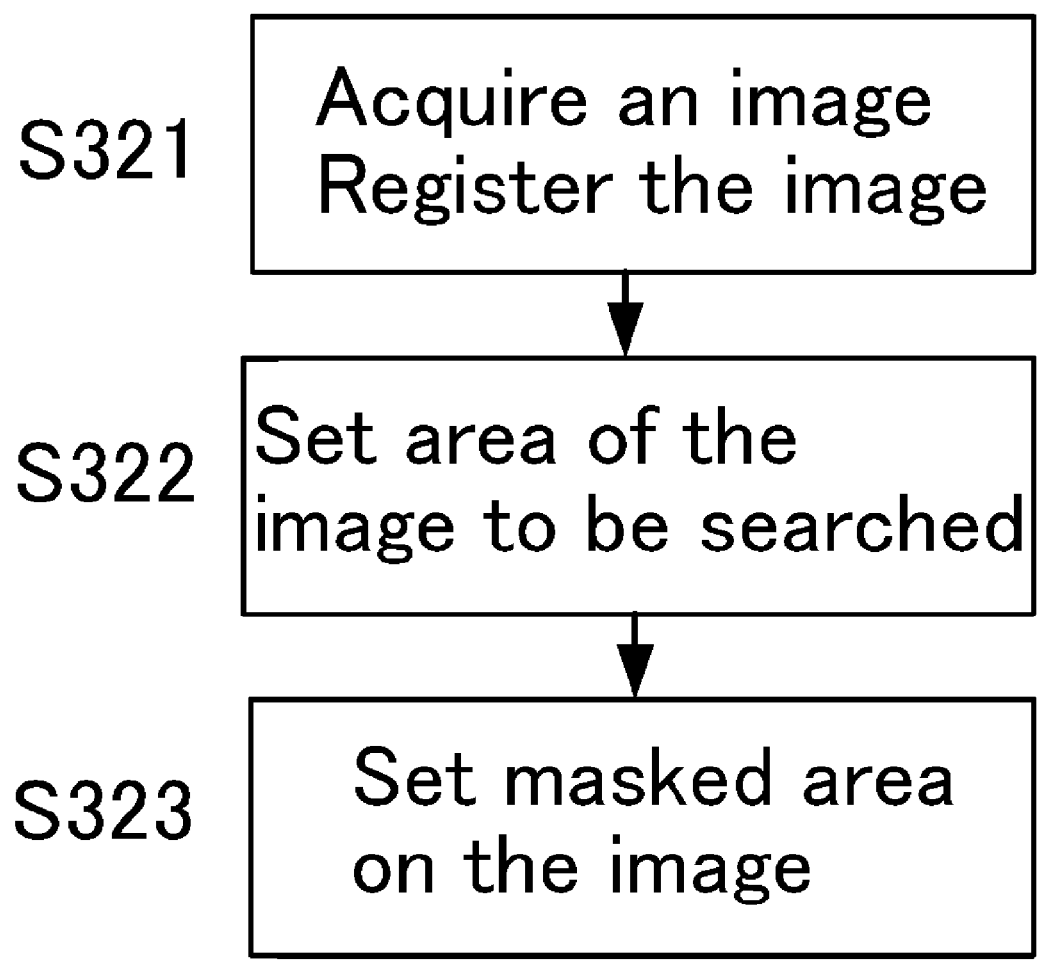
FIG. 32 is a flowchart showing the procedure at the time of setting movement of a mask.
Figure 33:
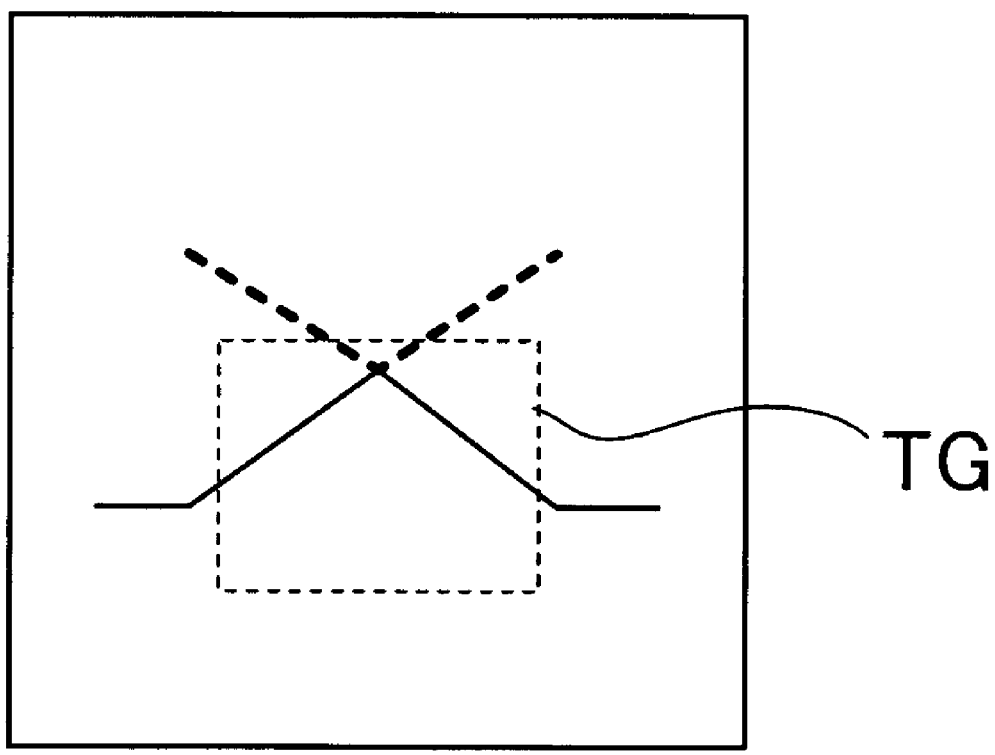
FIG. 33 is a schematic diagram showing a state of setting a registration image in a reception light image.
Figure 34:
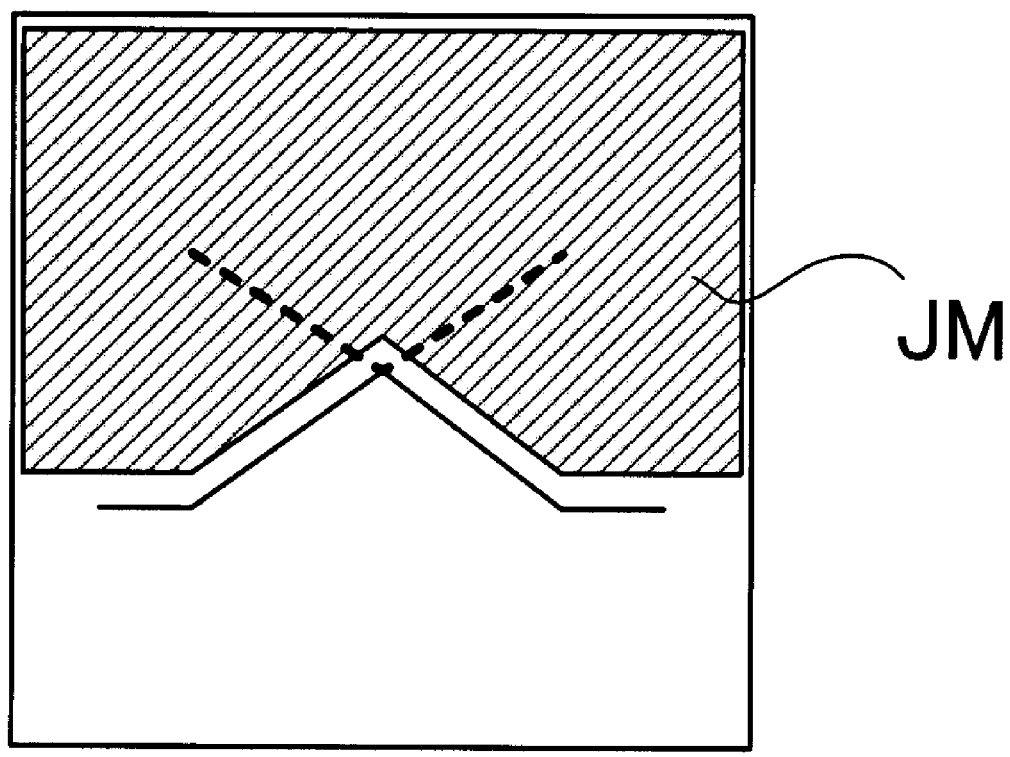
FIG. 34 is a schematic diagram showing a state of finely setting the light reception mask area.

To address the inconvenience, the mask moving means 617 is prepared, which makes an image search on a reception light image and moves the reception light mask area JM to a proper position in accordance with the search result. In the following, the setting procedure of the mask moving means 617 in the setting mode and a procedure of actually moving the reception light mask area JM by the mask moving means 617 in the measuring mode will be described with reference to the flowcharts of FIGS. 32 and 35 and the image diagrams of FIGS. 33, 34, 36, and 37. First, the procedure at the time of setting will be described on the basis of the flowchart of FIG. 32. A reception light image as a reference is obtained in step S321, and a registration image TG as a reference of a search is registered. As shown in FIG. 33, the registration image TG is set by a frame line in a stable area in a reception light image. In step S322, a range on which an image search is made is set. For example, an image search is made on the whole area of an image. In addition, a work movement range which is preliminarily known is designated as an image search range. In step S323, the reception light mask area JM in a reception light image is designated by the mask area designating means 86. Preferably, as shown in FIG. 34, the range is finely designated so as to cover most of reflection light unnecessary for measurement.

Figure 35:
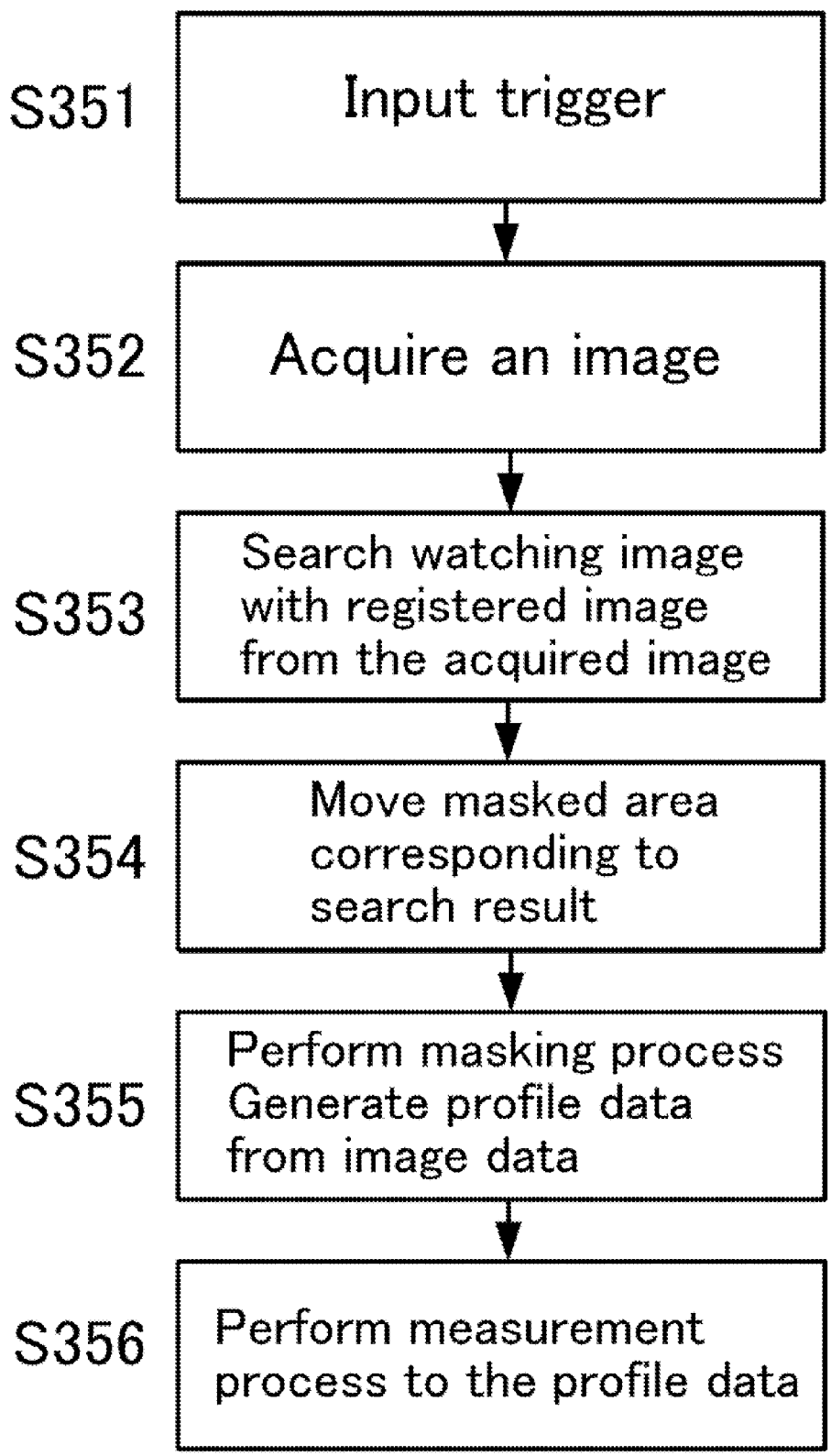
FIG. 35 is a flowchart showing the procedure of executing the movement of the mask.
Figure 36:
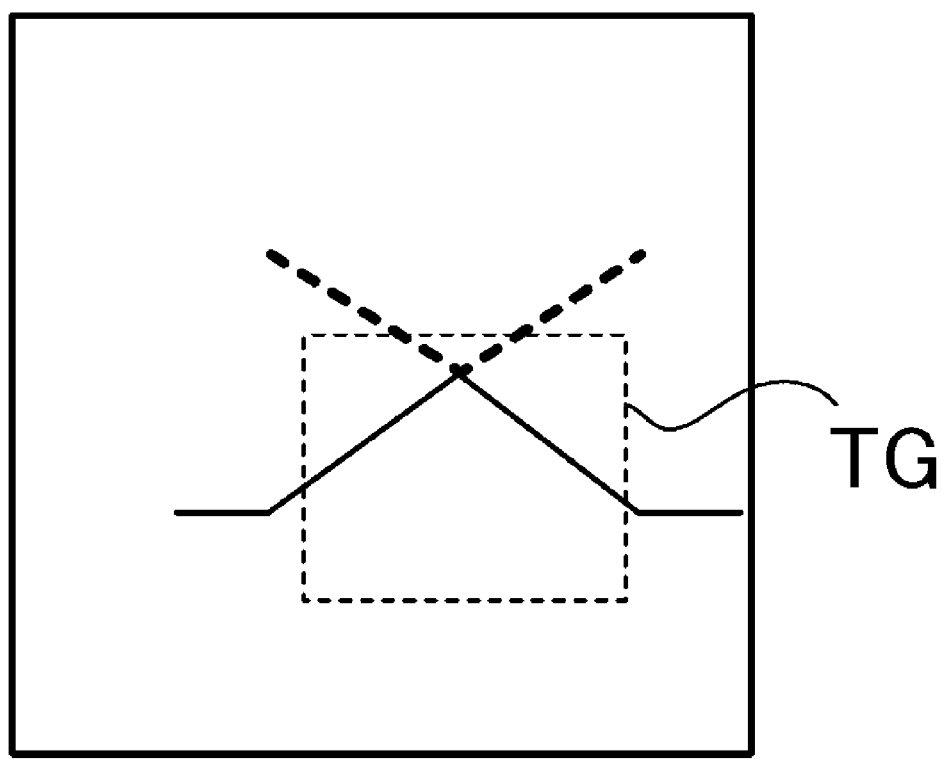
FIG. 36 is a schematic diagram showing a state where the position of a registration image in a reception light image is specified by an image search.
Figure 37:
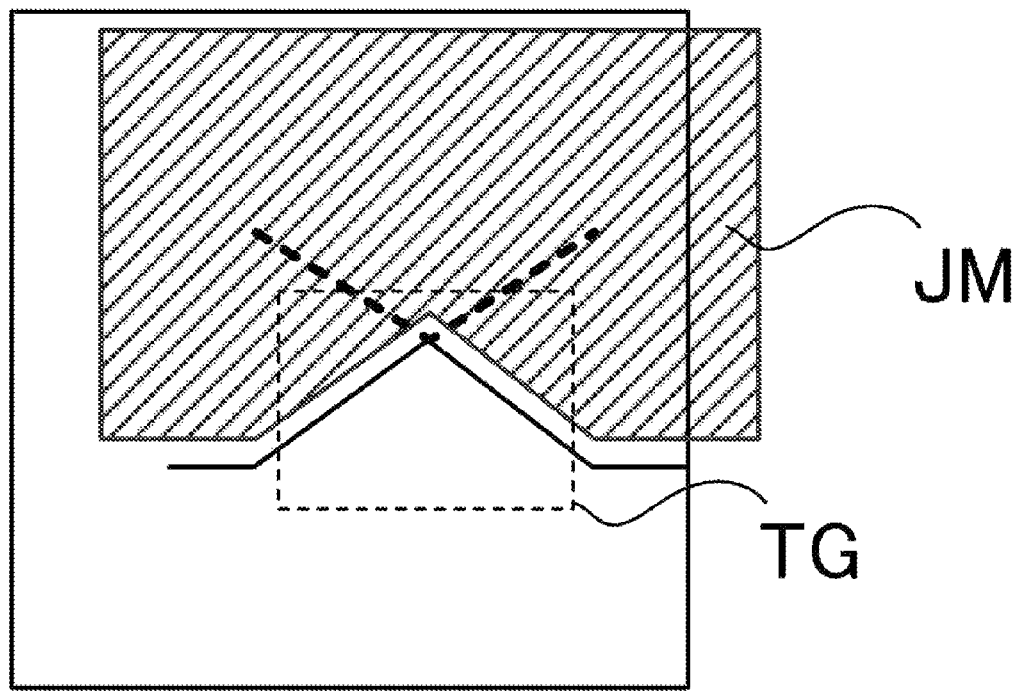
FIG. 37 is a schematic diagram showing a state where the reception light mask area follows in accordance with a reception light image.

The procedure of moving the mask in the measuring mode after the mask image and mask movement is set in the setting mode as described above will be described with reference to the flowchart of FIG. 35. First, when a trigger input for capturing of a reception light image is received in step S351, capturing of the reception light image is executed in step S352. In step S353, to recognize the position of the registration image TG in the input reception light image, the image searching means 616 makes an image search. As the image search executed by the image searching means 616, an existing image processing method such as pattern matching can be properly used. As a result of the image search, as shown in FIG. 36, the position of the registration image TG in the reception light image is specified. In step S354, the reception light mask area JM is moved on the basis of the search result. Concretely, according to the coordinate positions of the registration image TG searched as shown in FIG. 36, the reception light mask area JM is attached so as to follow the registration image TG as shown in FIG. 37. In step S355, the masking process is performed, and the profile computing means generates a profile shape from the reception light image data. In step S356, the measurement processor 54 executes measuring process on the profile shape. The procedure is repeated for each of the input reception light images.

As described above, the image search is made on each of the supplied reception light images. According to a search result, the reception light mask area JM is moved. Consequently, even when the reception light mask area JM is set finely with the measurement light or reflection light, the reception light mask area JM can follow fluctuations in the work position, an external disturbance such as unnecessary reflection light can be eliminated with reliability, and high-precision computation can be performed.

Sensor Head Calibrating Function

Figure 98:
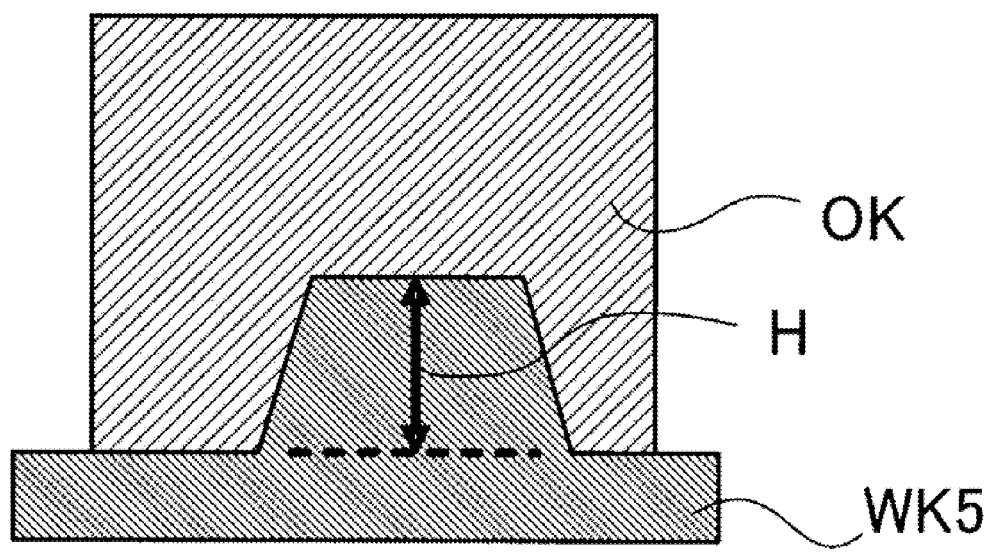
FIG. 98 is a schematic view showing a state of measuring the height of a projection of a work by projecting strip-line-shaped light to the work.
Figure 99:
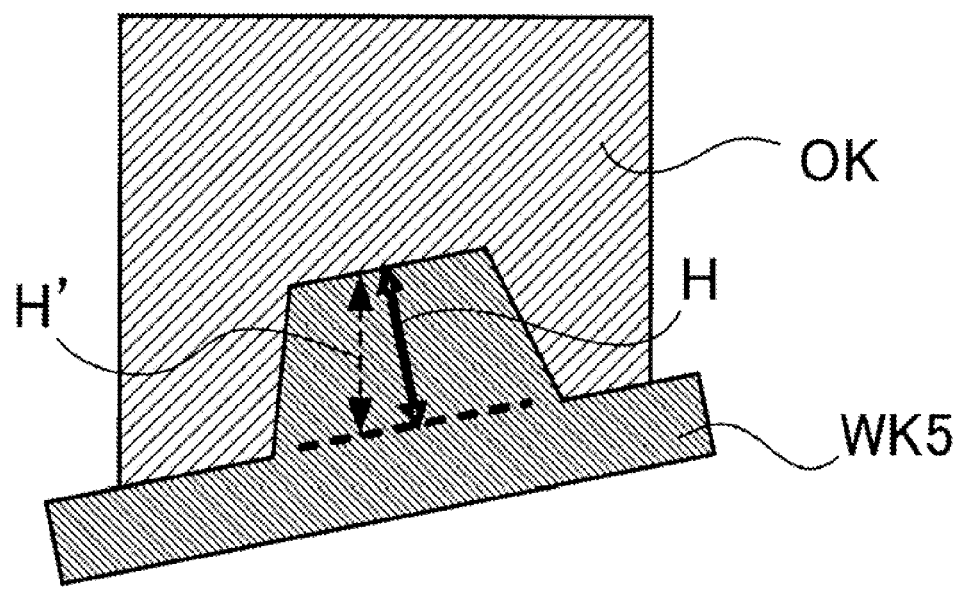
FIG. 99 is a schematic view showing a state of measuring the height of the projection in a case where the work of FIG. 98 is mounted a tilt in the width direction.
Figure 100:
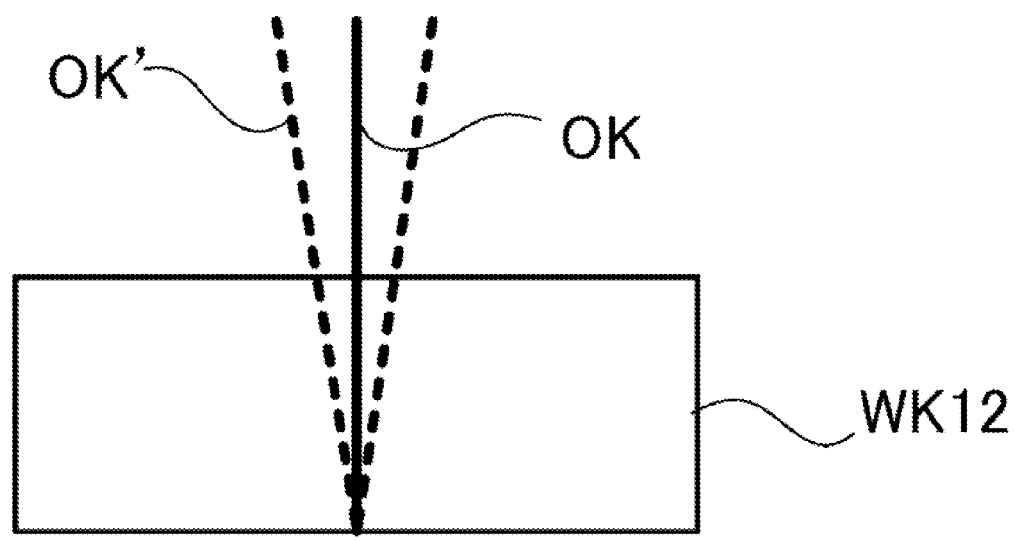
FIG. 100 is a schematic view showing a state where an error occurs in a case where the work is mounted a tilt in a direction orthogonal to the width direction of strip-line-shaped light.

The optical displacement meter has a sensor head calibrating function for calibrating the positional relation between light emitted from the projector in the sensor head and the work at the time of setting the sensor head. When the angle between strip-line-shaped light as the emission light and a work is not accurately adjusted, an accurate displacement measurement result cannot be obtained. With reference to FIG. 98, an example of measuring height H, shown by the solid-line arrow, of a projection of a work WK5 placed horizontally in a state where band light OK enters perpendicularly will be considered. When the work WK5 tilts with respect to the surface of incidence of the strip-line-shaped light OK as shown in FIG. 99, height H' shown by the broken-line arrow is measured, and a measurement error occurs. Similarly, when the work tilts in a direction orthogonal to the width direction of the strip-line-shaped light OK, a measurement error occurs. For example, when the strip-line-shaped light OK tilts with respect to the incidence face of a work WK12 as shown in FIG. 100, strip-line-shaped light OK' shown by broken lines enters and a measurement error occurs. To solve the problem, there are methods of physically setting relative positions of the sensor head and the work and a method of pre-storing, as a calibration value, a positional deviation between the relative positions of the sensor head and the work in an optical displacement meter and displaying, as a computation result, a result of correction of a measurement result with the calibration value. In any of the methods, the sensor head calibrating function is effective. In the following, the sensor head calibrating function will be described.

Tilt Correcting Function

Figure 38:
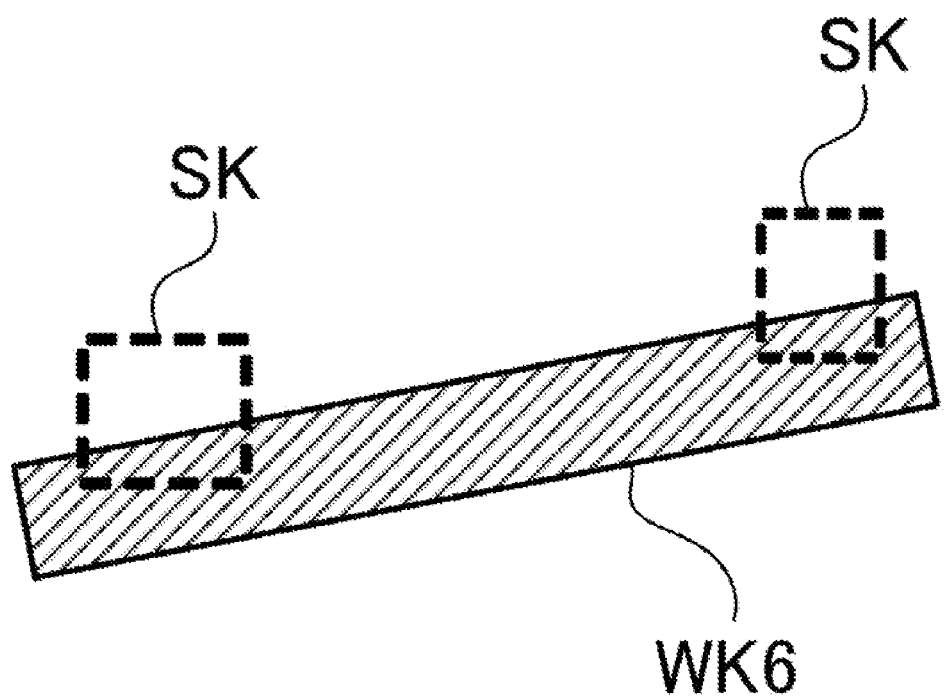
FIG. 38 is a schematic diagram showing a state of executing a tilt correcting function on a tilted work.

A state where a flat work WK6 tilts with respect to the horizontal plane as shown in FIG. 38 will be examined. When strip-line-shaped light enters perpendicularly in this state, a measurement error occurs. To avoid the measurement error, the tilt angle is detected. First, the strip-line-shaped light is emitted from the projector to the flat work WK6, and a profile shape is displayed in the display unit. In this state, the horizontal part designating means 812 designates two parts as horizontal reference parts positioned on the horizontal line. The horizontal reference parts are designated as horizontal reference position designation frames SK having rectangular regions as shown in FIG. 38. The tilt angle computing means 611 computes a tilt angle formed between an imaginary horizontal line connecting the horizontal reference positions and the actual horizontal line. The tilt angle computing means 611 also sets a calibration angle to calibrate the imaginary horizontal line. Concretely, a profile shape included in the designated area is extracted by the tilt angle computing means 611, and the center position of the profile included in the area and the average height are calculated. At the time of measurement, angle correction is performed on the basis of the calibration angle so that the average level of the two areas becomes the same in the horizontal direction. In such a manner, without performing the physical positional adjustment between the sensor head and the work, the tilt angle is held as a calibration amount, and a computation result is corrected by an internal process of the optical displacement meter. Thus, troublesome position adjustment can be performed by using software, and the adjusting work at the time of installation can be largely reduced.

Since the horizontal reference position can be designated as an area, not a point, designation work is easy. The tilt angle of a profile can be automatically computed by the tilt angle computing means 611 from the designated area. Therefore, an advantage that a horizontal position can be calibrated with higher precision and reliability can be also obtained.

Another configuration may be provided in which a horizontal reference position is designated as a point with a pointing device such as a mouse. In this case, by providing a snap function of automatically selecting lines of a profile shape by using an edge detecting process or the like, selection is facilitated.

In addition to correction based on the calibration angle, only computation of a tilt angle may be computed by the tilt angle computing means 611. On the basis of the computation result, the angle between the sensor head and the work can be adjusted physically. For example, by displaying a computed tilt angle on the display unit or outputting it to the outside, the tilt angle of the work to be set in the horizontal plane is known. The positions of the work and the sensor head are adjusted to set the angle to 0. By repeating a similar work on the adjustment result, re-adjustment can be performed. Finally, the imaginary horizontal line and the actual horizontal line can be matched to each other.

The tilt angle computing means 611 may have the function of automatically correcting a tilt of the optical displacement meter on the basis of the computed tilt angle. For example, an angle adjustment mechanism of the sensor head having the projector is provided. The angle adjustment mechanism is controlled according to a computation result of the tilt angle computing means 611, and automatic adjustment is performed so that the sensor head is in the position horizontal with respect to the work. In such a manner, troublesome horizontal position calibration at the time of installation can be automated.

The horizontal line is an example for explanation. Obviously, adjustment can be performed by using, as a reference, a vertical line, a line with an arbitrary angle, or a plane in place of the horizontal line in accordance with an actual application. Three or more horizontal reference positions may be designated.

Title Angle Adjusting Means 816

Further, the tilt angle adjusting means 816 for adjusting a computed tilt angle may be provided. With the means, the user can manually perform fine adjustment of a tilt angle. Thus, a flexible adjustment adapted to an actual installation state and a measurement purpose can be performed.

Elevation Difference Correcting Function

Figure 39:
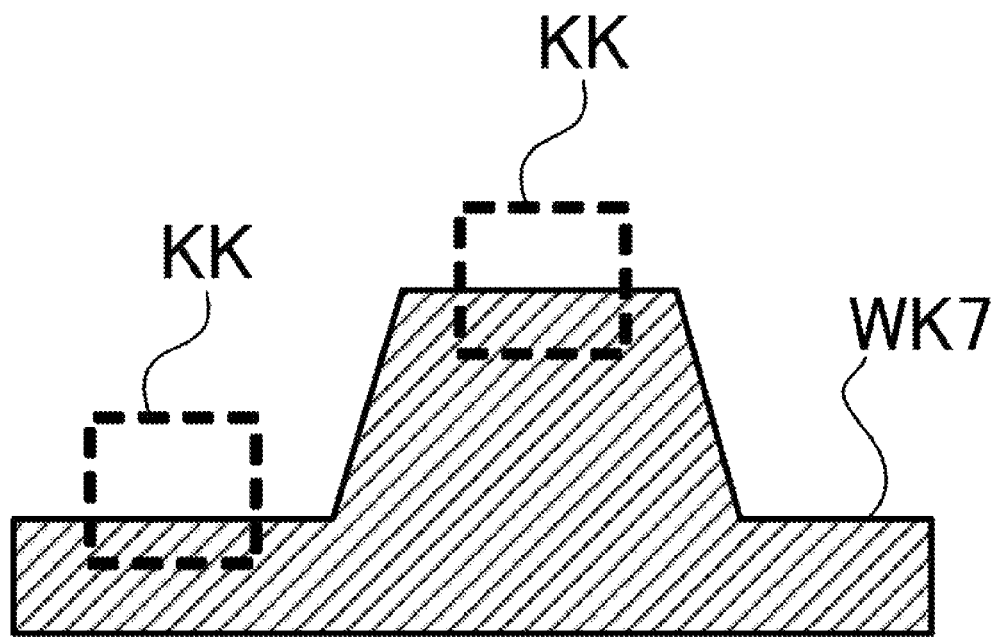
FIG. 39 is a schematic diagram showing a state of executing an elevation difference correcting function on a work having a projected part whose elevation difference is known.

The tilt correction function of adjusting the tilt angle in the sensor head calibration function has been described above. In addition, an elevation difference correcting function of calibrating the elevation difference is provided. By the function, as shown in FIG. 100, a tilt in the direction orthogonal to the width direction of strip-line-shaped projection light can be also calibrated. The elevation difference correcting function, will be described below with reference to FIG. 39. A work WK7 having a projection whose elevation difference is known is disposed and measured. As shown in FIG. 39, in a state where a profile shape is obtained and displayed on the display unit, the elevation difference designating means 814 designates, as an elevation difference reference position, each of the top face as a first face and an under face as a second face. The difference between the first and second faces is the elevation difference. The elevation difference reference positions are designated by the elevation difference designating means 814 in a manner similar to the horizontal part designating means 812, by setting elevation difference reference position designation frames KK each having a rectangular shape. The elevation difference computing means 612 calculates average height of each of the frames and calculates the difference between the average heights of the two areas. By inputting the elevation difference (actual dimension) of a known projection, a tilt in the direction orthogonal to the width direction of strip-line-shaped light can be computed from the difference between the calculated elevation difference and the actual dimension. Therefore, by setting a calibration amount so that the elevation difference coincides with the actual dimension, a result of computation in which the elevation difference is calibrated can be obtained. It can be also used as an index at the time of performing physical adjustment so that the elevation difference of a profile coincides with an actual dimension value.

The shapes of reference positions such as a horizontal reference position and an elevation difference reference position designated by the horizontal part designating means 812 and the elevation difference designating means 814 are not limited to rectangular but may be a circular shape, an ellipse shape, or an arbitrary shape. Although an edge face is detected from a designated area, a reference position may be directly designated by a point or line.

Third Embodiment

Figure 41A:
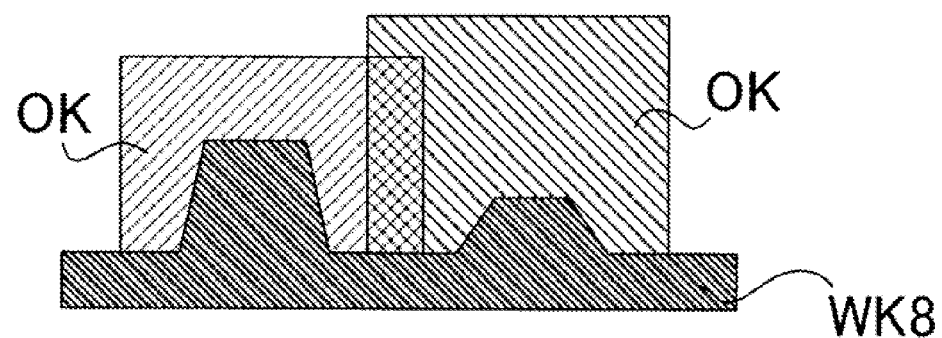
FIGS. 41A to 41C are schematic diagrams showing an example of disposing two sensor heads side by side to substantially enlarge the area of irradiation light.
Figure 41B:
Figure 41C:
Figure 42A:
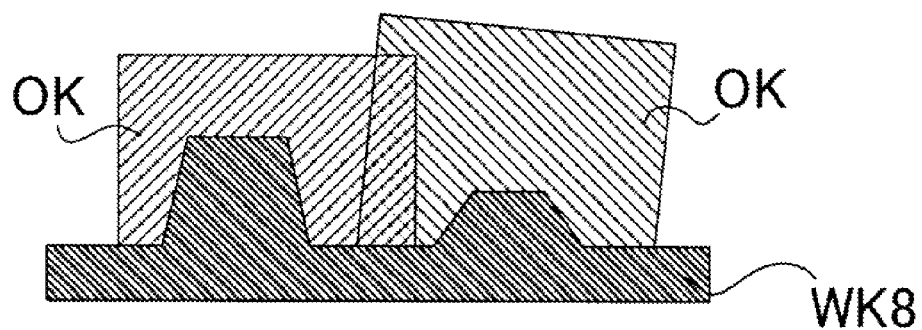
FIGS. 42A to 42E are schematic diagrams showing a state where one of the sensor heads of FIGS. 41A to 41C is disposed a tilt.
Figure 42B:
Figure 42C:
Figure 42D:
Figure 42E:

The optical displacement meter in which one sensor head is connected to one controller has been described. Head connectors for connecting two or more sensor heads to a single controller may be also provided. FIG. 40 shows a third embodiment in which a controller has head connectors 4 capable of connecting two sensor heads. In the optical displacement meter, a process using the two sensor heads can be performed. To be specific, different parts in the same work are measured by the two sensor heads, the same work is measured at different timings, or different works can be measured. By combining results of the computations, high-degree measurement is realized. FIG. 41A shows an example of arranging two sensor heads side by side to substantially enlarge a measurable area. Ideally, by disposing the sensor heads in the same posture with respect to the work WK8, profile shapes obtained from the sensor heads as shown in FIG. 41B can be combined as shown in FIG. 41C. In reality, however, it is difficult to mount the two sensor heads without any error with respect to the work WK8. As a result, due to a tilt of a sensor head or the like as shown in FIG. 42A, an error occurs in an obtained profile as shown in FIG. 42B or the like, and the profiles cannot be connected to each other. Therefore, the optical displacement meter has a sensor head coupling function for coupling a plurality of sensor heads.

Sensor Head Coupling Function

To make profile shapes obtained by the two sensor heads overlap each other, as shown in FIG. 41A, in some cases, a part of the strip-line-shaped light OK overlaps. However, it is not easy to determine the overlap amount at the time of coupling two profile shapes actually obtained. In particular, since a tilt and a positional deviation occurs at the time of installing the sensor heads, to solve the problems, the profiles have to be moved in the height and width directions and, then, the process for coupling has to be performed.

Correction Profile Generating Function

Figure 43A:
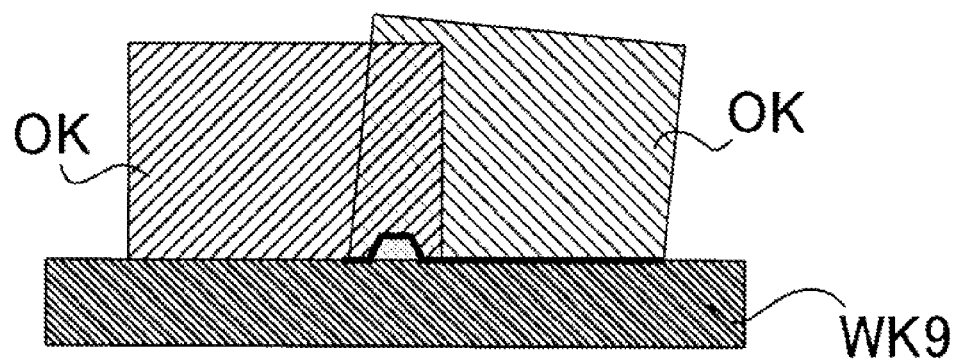
FIGS. 43A to 43D are schematic diagrams showing a sensor head coupling function.
Figure 43B:
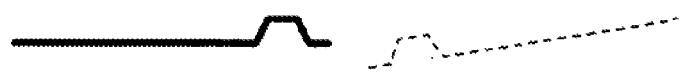
Figure 43C:
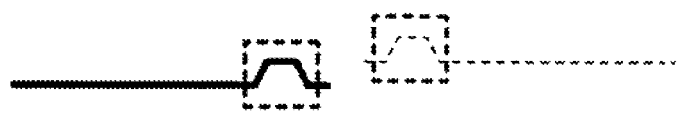
Figure 43D:

To address the issue, a correction profile generating function is provided, of correcting a tilt of each of sensor heads with respect to a work by using a step portion in each of the profile shapes by using the tilt correcting means 613. The tilt correcting function and the elevation difference correcting function are used. The procedure will be described with reference to the schematic views of FIGS. 43A to 43D. As shown in FIG. 43A, a work WK9 having a step such as a projection is prepared and disposed so that both radiation areas of the strip-line-shaped light OK of two sensor heads include the projection. The tilt correction and/or the elevation difference correction of each of the sensor heads are/is performed by the tilt correcting means 613 in FIG. 4 as shown in FIG. 43B, thereby generating correction profiles. Further, as shown in FIG. 43C, a common profile shape corresponding to the same portion, that is, the projected portion is designated by the common profile designating means 820, to the correction profiles of the sensor heads. In this case, the user manually designates the projection by the common profile designating means 820. Alternatively, the common profile designating means 820 may compare correction profiles and automatically extracts a common profile shape. The profile matching means 614 performs a profile search (which will be described later) so that the common profile shape designated by the common profile designating means 820 matches a profile shape. The heights of the two profile shapes, the interval between the profile shapes, and the like are automatically adjusted. After that, the profile shapes are combined. It is also possible to provide a function so that the user can manually finely adjust the result of the automatic computation on the height of the profile shapes, the interval, and the like performed by the profile matching means 614. In the example of FIG. 4, the profile moving means 824 capable of setting an offset amount of the profile shape and the tilt adjusting means 826 capable of adjusting a tilt angle are provided. The elevation difference adjusting means 814 for manually adjusting the elevation difference computed by the elevation difference computing means can be also used. In such a manner, as shown in FIG. 43D, profiles measured by a plurality of sensor heads can be combined so as to be coupled to each other.

Direct Matching Function

Figure 44A:
FIGS. 44A and 44B are schematic diagrams showing a direct matching function.
Figure 44B:
Figure 45:
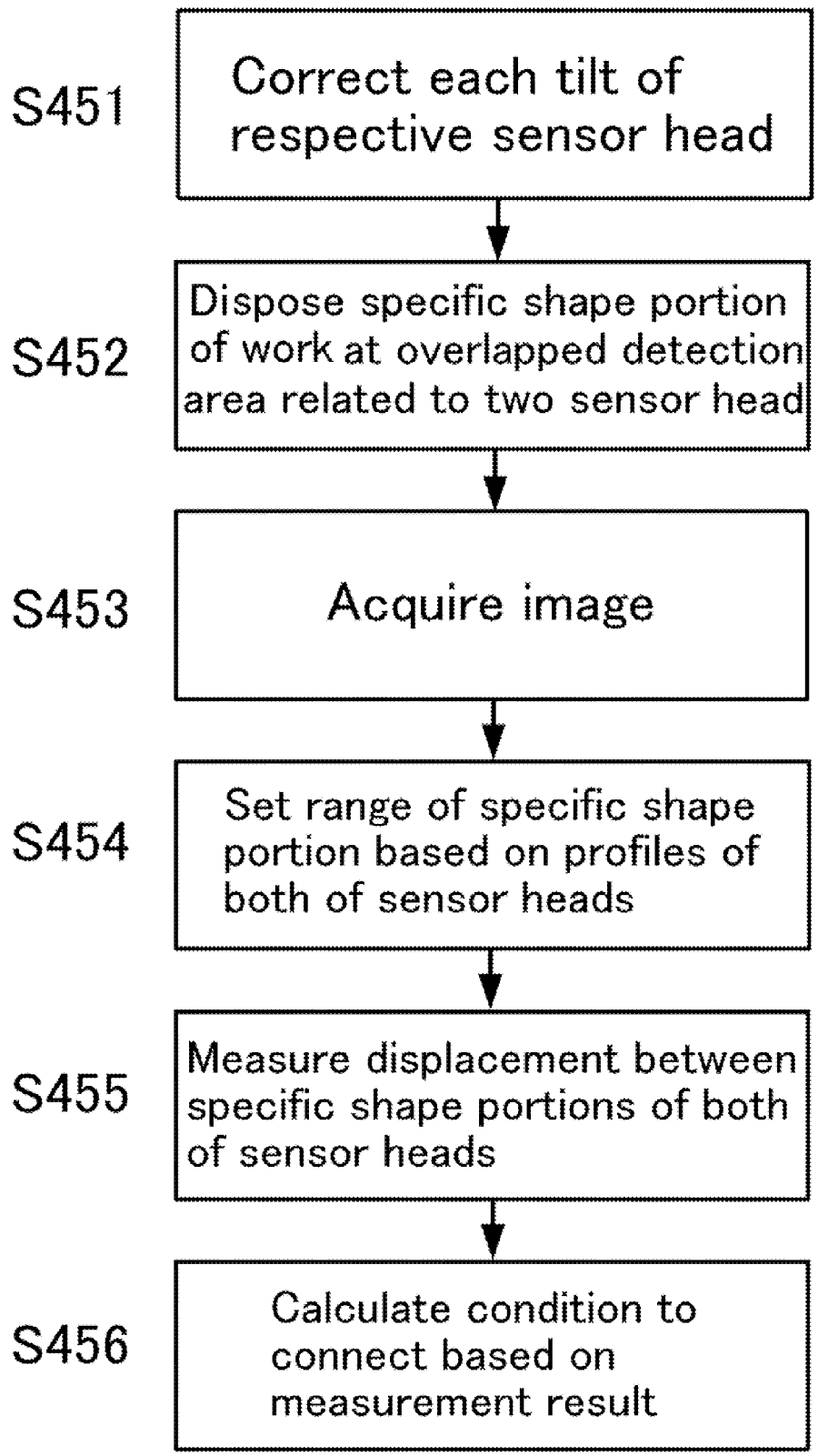
FIG. 45 is a flowchart showing the procedure of the direct matching function.

Further, a direct matching function can be also provided. As shown in FIGS. 44A and 44B, the function designates a common profile shape by the common profile designating means 820 on each of the profile shapes before correction and performs direct matching without performing the tilt correction or the elevation difference correction on each of the sensor heads. The procedure will be described with reference to the schematic view of FIG. 44 and the flowchart of FIG. 45. As necessary, each of the tilts of the sensor heads is corrected in step S451. When only coupling of profiles is executed, the correcting process can be omitted. In step S452, the work WK9 is disposed so that the projected part of the work WK9 is positioned in the overlap portion of beams emitted from the two sensor heads. In step S453, a profile shape is captured by each of the sensor heads. In step S454, the range of the common profile shape is designated by the common profile designating means 820 on the profile shape of each of the sensor heads. In a case where the common profile shapes obtained by the sensor heads are the same, it is sufficient to designate the common profile shape only by one of the sensor heads. In this case as well, the user can operate the common profile designating means 820 to manually designate a common profile shape and, in addition, can automatically extract the common profile shape by the common profile designating means 820. By the method, a plurality of profiles can be extremely easily matched while omitting the area designation of the user. In step S455, a profile search is performed by the profile matching means 614 so that the common profile shapes of the sensor heads match each other. Finally, in step S456, on the basis of the result of the profile search, the condition of coupling the profile shapes is computed by the profile matching means 614, and the profile shapes are combined.

Although the composition of two profile shapes using the two sensor heads has been described above, obviously, the composition can be similarly performed on three or more profile shapes. Specifically, for example, in an optical displacement meter in which three sensor heads A, B, and C are connected, the profile shapes of the sensor heads A and B are combined. After that, it is sufficient to combine the composite shape of the profile shapes A and B with the profile shape C.

Profile Inverting Function

Figure 46:
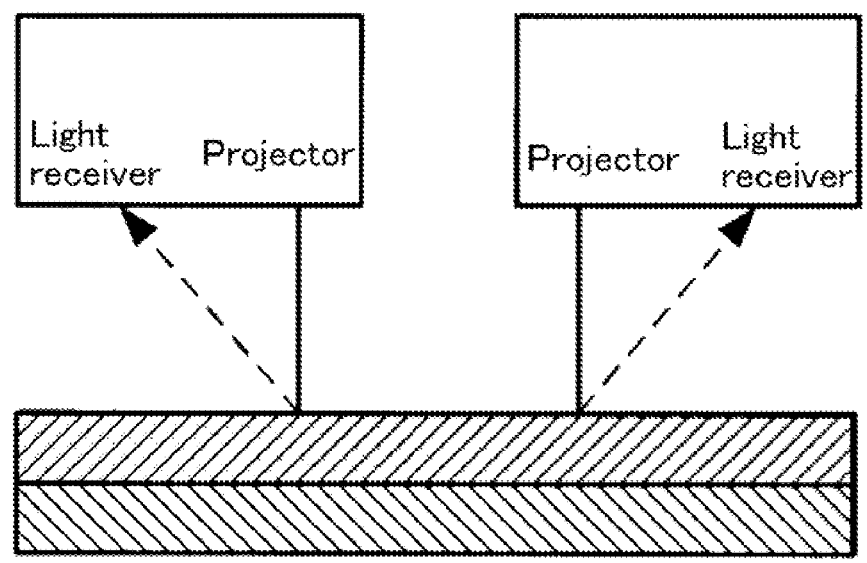
FIG. 46 is a schematic diagram showing a state where sensor heads are disposed like a mirror image.

The example of disposing the sensor heads side by side has been described above. As another layout of a plurality of sensor heads, the sensor heads may be disposed so as to face each other. At the time of disposing the plurality of sensor heads adjacent to each other, an issue is whether spaces to physically dispose the sensor heads so as not to interfere with each other can be assured or not. In other words, there may be a case that the sensor heads cannot be disposed in the same posture due to insufficient spaces and have to be disposed in postures inverted in the vertical or horizontal direction. For example, as shown in FIG. 46, when the sensor heads are disposed like a mirror image, obtained profiled shapes are mirror-reversed. It is inconvenient to compare the shapes with each other. Consequently, the function of inverting the profile shapes is provided. To be concrete, the inverting means 822 inverts the profile shape in the vertical or horizontal direction as necessary, and the resultant profile shapes can be displayed on the display unit. In such a manner, the profile shapes obtained by the sensor heads can be properly compared with each other without restriction of the layout of the sensor heads.

Horizontal Inversion

Figure 47A:
FIGS. 47A to 47D are image diagrams showing a state of obtaining the difference of profiles by inverting means.
Figure 47B:
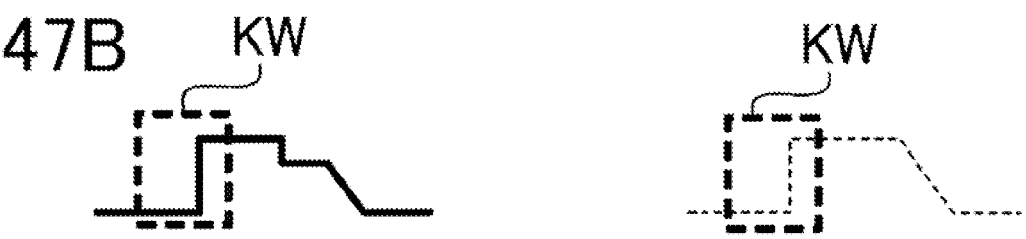
Figure 47C:
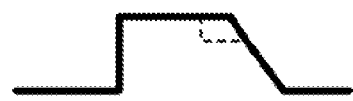
Figure 47D:
Figure 48:
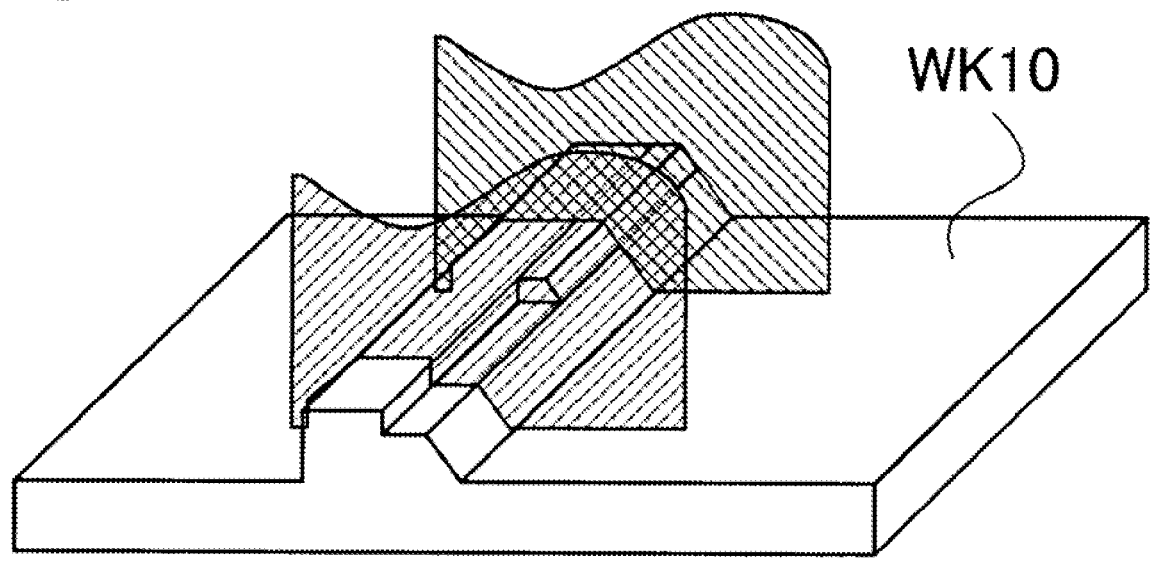
FIG. 48 is a perspective view showing a state of irradiating a work with a band light so as to obtain profile shapes of different parts.

An example of obtaining the difference between profiles by the inverting means 822 will be described with reference to FIGS. 47A to 47D. First, two sensor heads are disposed so as to obtain profile shapes of different parts in a single work WK10 as shown in FIG. 48. The tilt correction and/or the elevation difference correction are/is executed on the profile shapes obtained by the sensor heads, thereby generating a corrected profile as shown in FIG. 47A. Next, using the common profile designating means 820, a common part is designated in the corrected profiles of the sensor heads. Concretely, the common profile shape is included in the common profile designation frame KW indicated by broken lines in FIG. 47B. The profile matching means 614 automatically computes the heights and positions of two profiles so that the common profile shapes in the set frame match each other. As a result, as shown in FIG. 47C, two profile shapes are overlapped and displayed on the display unit. Since different parts are observed, partial pattern matching, not perfect pattern matching, is executed. As shown in FIG. 47D, the difference of the profiles can be also displayed as the differential profile. The invention is not limited to the method. A function of finely adjusting the height and position of the profile shape automatically computed as described above by the user may be provided. Without performing the tilt correction and the elevation difference correction in each of the sensors, it is also possible to designate a common profile shape to a profile shape which is not subjected to correction, and perform direct matching.

Vertical Inversion

Figure 49:
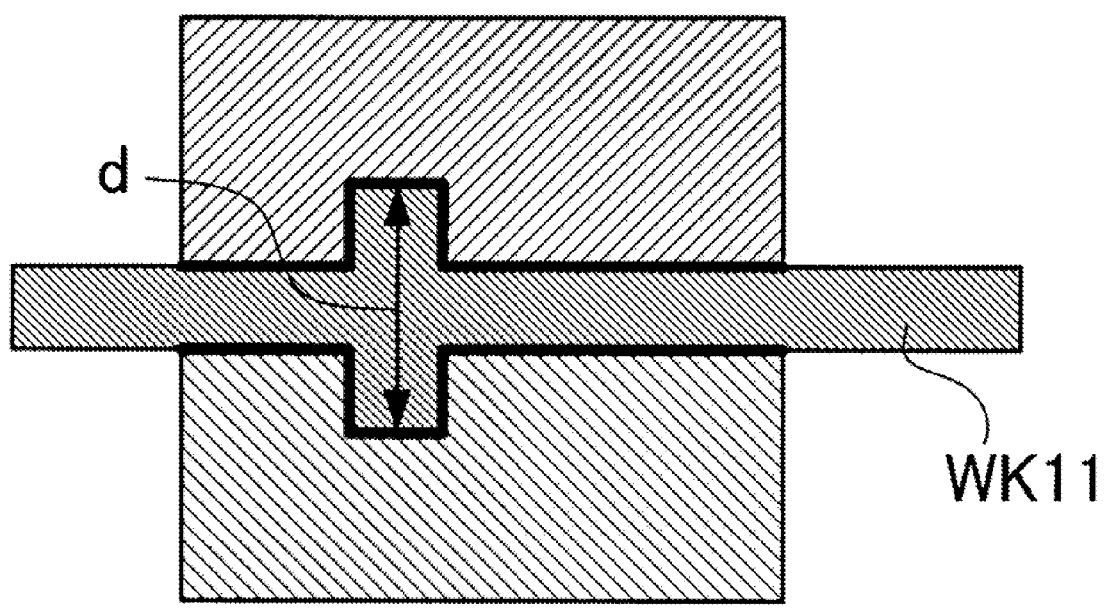
FIG. 49 is a side view showing a state of measuring a work while sandwiching the work between two sensor heads.
Figure 50:
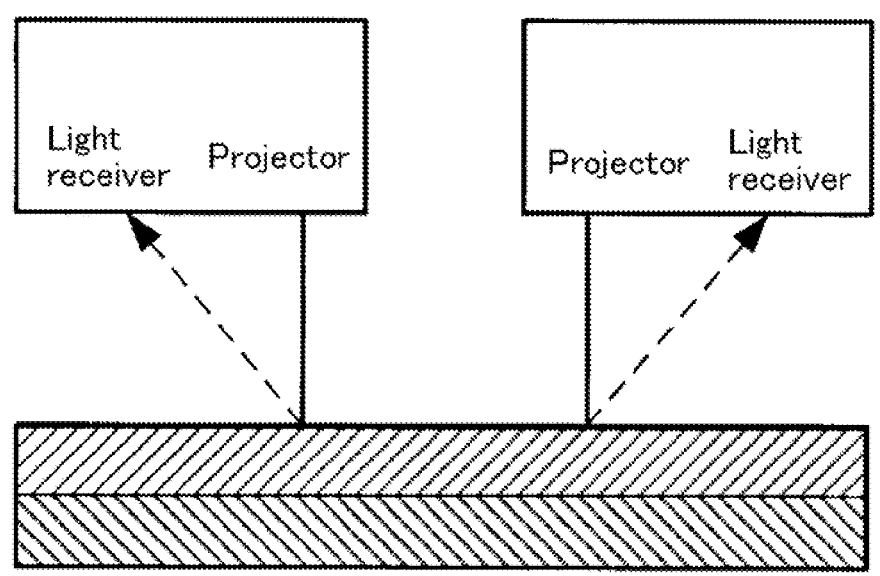
FIG. 50 is a side view showing a state of disposing sensor heads so that the light projecting sides of the sensor heads face each other.
Figure 51A:
FIGS. 51A to 51D show side views showing a state of measuring the thickness of a projected part of a work by inverting means.
Figure 51B:
Figure 51C:
Figure 51D:
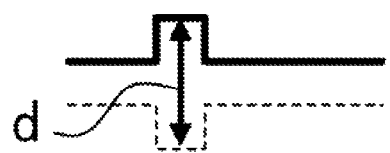

Further, a work WK11 can be sandwiched and measured by two sensor heads as shown in FIG. 49. In a case where measurement parts in the work WK11 exist apart from each other, the sensor heads can be disposed in the same direction. However, when measurement parts are close to each other, as shown in FIG. 50, the sensor heads have to be disposed so that the projector sides of the sensor heads face each other. In this case, the profiles of the two sensor heads are mirror-reversed, and it is inconvenient to compare the shapes. The mirror reversal can be adjusted by combining horizontal inversion or vertical inversion performed by the inverting means 822. An example of this case will be described with reference to FIGS. 51A to 51D. The work WK11 is sandwiched by the two upper and lower sensor heads as shown in FIG. 49, and the thickness "d" of the projection is measured. As shown in FIG. 51A, the tilt correction and/or the elevation difference correction are/is executed on the profile shapes measured by the sensor heads, thereby generating a corrected profile. Next, as shown in FIG. 51B, one of the corrected profiles (the right one in FIG. 51A) is inverted in the vertical direction by the inverting means 822 and, further, inverted in the horizontal direction as shown in FIG. 51C. In this state, parts to be matched in the corrected profiles are designated by the common profile designating means 820. In the example of FIG. 51C, the common profile designation frames KW indicated by broken lines surround the parts so as to include the rising parts of the projections. The profile matching means 614 automatically computes the heights and positions of two profile shapes and combines them. In this case, the profiles are not coupled to each other. As shown in FIG. 51D, the profiles are disposed in the vertical direction so that the thickness "d" of the projection in the work WK11 can be measured.

Figure 52:
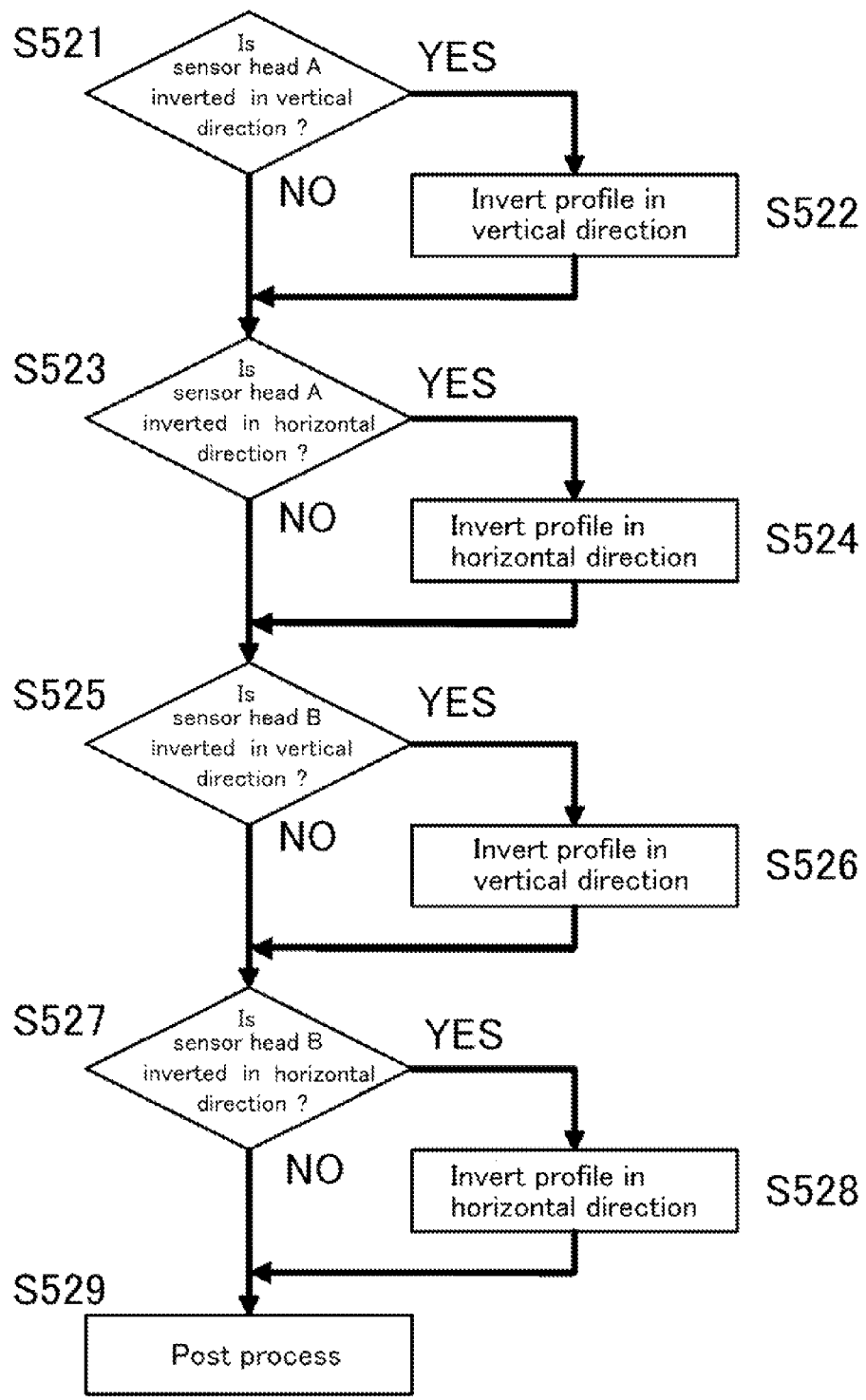
FIG. 52 is a flowchart showing the procedure of inverting a profile shape by the inverting means.

The profile shape is individually inverted in the vertical direction or horizontal direction by the inverting means 822. According to the measurement application, the inverting process may be automatically selected and executed. Concretely, the layout mode selecting means 828 is provided for selecting the layout of two or more sensor heads from a transverse layout, longitudinal layout, and sandwich layout as a measuring mode of measuring a displacement of a work. According to the layout mode selected by the layout mode selecting means 828, the inverting direction of the inverting means 822 is automatically selected. With the configuration, the profile shape is automatically inverted according to the layout of the two or more sensor heads. The setting work is made unnecessary and a setting error can be avoided. As an example, by using the inverting means 822, the procedure of inverting the profile shapes obtained by two sensor heads A and B will be described with reference to the flowchart of FIG. 52. First, in step S521, whether the sensor head A is inverted in the vertical direction or not is determined. In a case where the sensor head A is not inverted, the program advances to step S523. In the case of inverting the sensor head A in the vertical direction, the program advances to step S522 where the profile shape obtained by the sensor head A is inverted in the vertical direction by the inverting means 822, and then advances to step S523. In step S523, whether the profile shape of the sensor head A is inverted in the horizontal direction or not is determined. In a case where the profile shape is not inverted, the program advances to step S525. In a case where the profile shape is inverted, the program advances to step S524. The profile shape of the sensor head A is inverted in the horizontal direction, and the program advances to step S525. Similarly, also with respect to the sensor head B, first, whether vertical inversion is performed or not is determined in step S525. If YES, the profile shape is inverted in the vertical direction in step S526, and the program advances to step S527. Further, in step S527, whether horizontal inversion is performed or not is determined. If YES, the profile shape is inverted in the horizontal direction in step S528. After that, the program advances to step S529 where post-process is performed. By determining whether the vertical inversion is performed or not and whether the horizontal inversion is performed or not and performing necessary inversion in each of the sensor heads, the profile shape can be displayed on the display unit or computed by the measurement processor 54 in postures so as to be easily compared with each other.

Profile Search

In automatic following of the reception light mask area JM, the tilt correction/the elevation difference correction, composition of two or more profiles, and the like, a profile search effectively functions on the profile shapes. In the profile search described above, a registration profile is set once and matching is performed on the basis of the registration profile. The profile search is made to see whether coordinate position information of the registration profile is included in the coordinate position information of an input profile shape or not on the basis of the coordinate position information of the registration profile. The profile shape is the coordinate position information, different from image data. Consequently, the data amount and the processing amount of the profile search are smaller than those of image data search, so that the low-load high-speed search can be realized. The profile search is performed with actual dimensions. There is also a work whose registration profile is not easily determined. In such a case, the registration profile can be changed each time. In the following, the detailed procedure of the profile search on the profile shape will be described.

Rotation/Movement Profile Search

Figure 53:
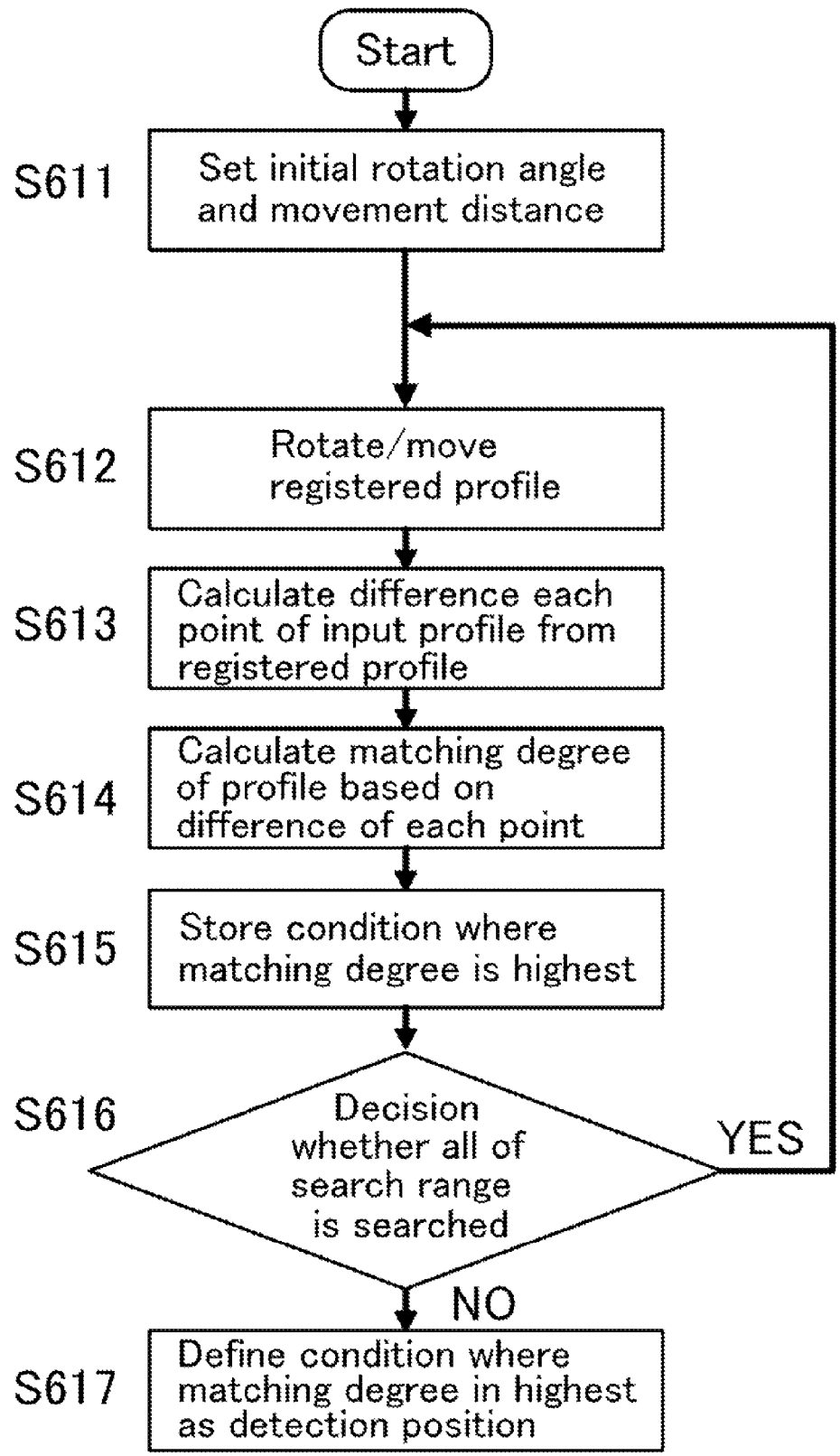
FIG. 53 is a flowchart showing the procedure of detecting a matching position from profile shapes.
Figure 54A:
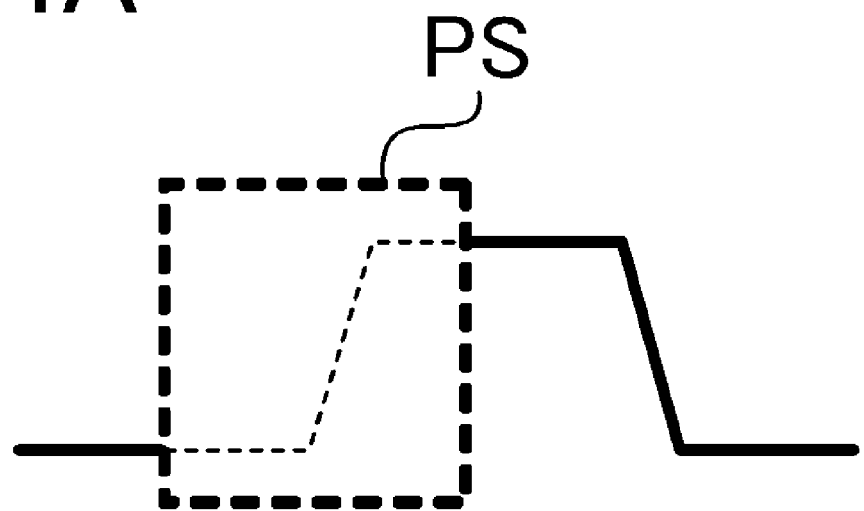
FIGS. 54A and 54B are image diagrams showing a registration profile and a result of a profile search performed on a profile shape on the basis of the registration profile.
Figure 54B:
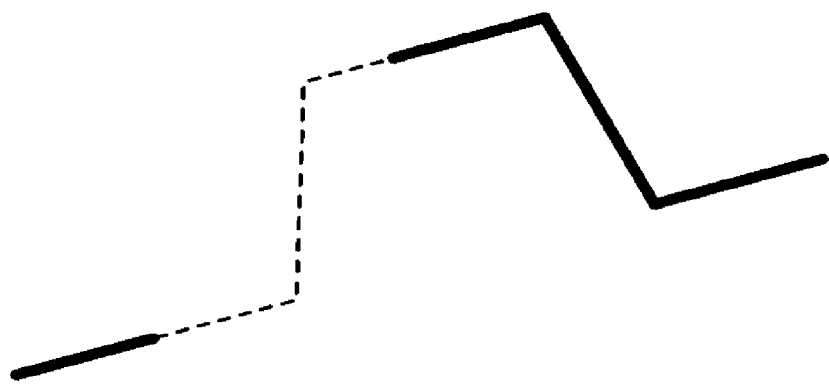

First, an example of making a profile search using a profile shape as a registration profile so that stable measurement can be executed even in a case where the work WK5 tilts as shown in FIGS. 98 and 99 will be described. A profile shape displayed on the profile display area 71 in the display unit 70 is designated as a registered profile in advance by using the registration profile designating means 830 shown in FIG. 4 (a registration profile designation area PS shown by a broken-line frame in FIG. 54A). The profile matching means 614 detects the most matched position from the input profile shape to be measured by a profile search. On the basis of the search result, the profile is rotated and moved, and shape measurement is carried out. The procedure will be described with reference to the flowchart of FIG. 53 and the image diagram of FIG. 54. First, as shown in step S611, the rotation angle and the movement distance at the start of the profile search are set. In step S612, the registered profile is rotated/moved. Further, in step S613, the profile matching means 614 computes the difference between points of the input profile with the registered profile. In step S614, on the basis of the difference of the points, the matching degree of the profiles is computed. Further, in step S615, the parameters at the time of the highest matching degree (in this case, the rotation angle and movement amount) are stored. The procedure is repeated in a predetermined search range (rotation angle/movement amount). Concretely, in step S616, whether all of the range of an input profile is scanned or not is determined. If NO, the program returns to step S612 where the process is continued. If YES, the program advances to step S617 where the parameters at the time of the highest matching degree are output as a detection position. In such a manner, a rotated profile is detected from the input profile in the profile search using the registration profile as shown in FIG. 54B, and the coordinate position can be outputted. According to the result, the profile matching means 614 can rotate and move the input profile as necessary, and the resultant profile can be displayed on the display unit 70.

Invalid Area Setting

Figure 55A:
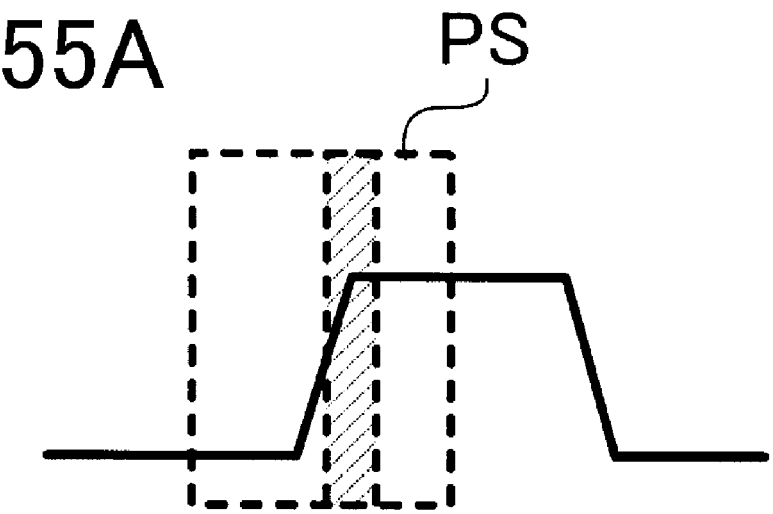
FIGS. 55A to 55C are image diagrams showing a state of setting an invalid area.
Figure 55B:
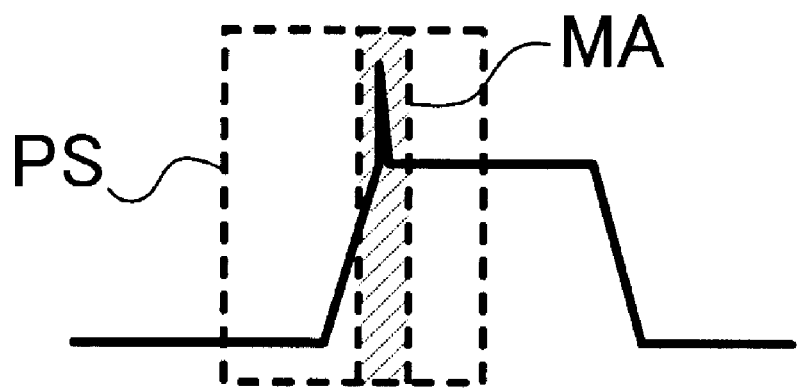
Figure 55C:
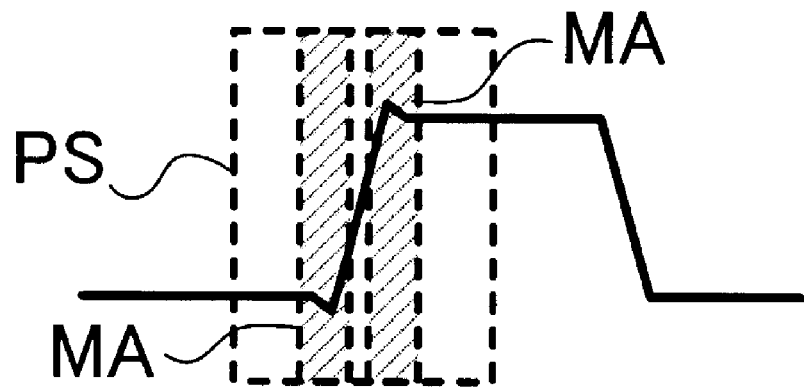

On the other hand, in an optical displacement meter using the principle of light sectioning, there is a case that the shape of an edge part is unstable. For example, in a work having a projection as shown in FIG. 55A, there is a case that a peak-shaped noise occurs at the projected edge portion as shown in FIG. 55B. Due to such a noise component, the measurement error decreases. By providing an invalid area which does not undergo the profile search in the registration profile, the influence of the shape fluctuation can be suppressed. The invalid area is designated on the profile display area 71 by the invalid area designating means 832 shown in FIG. 4. In the example of FIGS. 55A to 55C, as shown in FIG. 55B, an invalid area MA having a rectangular shape is set in the registration profile designation area PS so as to include the peak-shaped noise occurring at the projected edge portion.

Although only one invalid area is set in the example, obviously, two or more invalid areas can be set. For example, as shown in FIG. 55C, the invalid area MA can be set in each of two projected edge portions in the registration profile designating area PS. The invalid area may be completely excluded from the object of the profile search or may be lightly-weighted and set as an object of the profile search.

Tilt Invalidating Function

Figure 56:
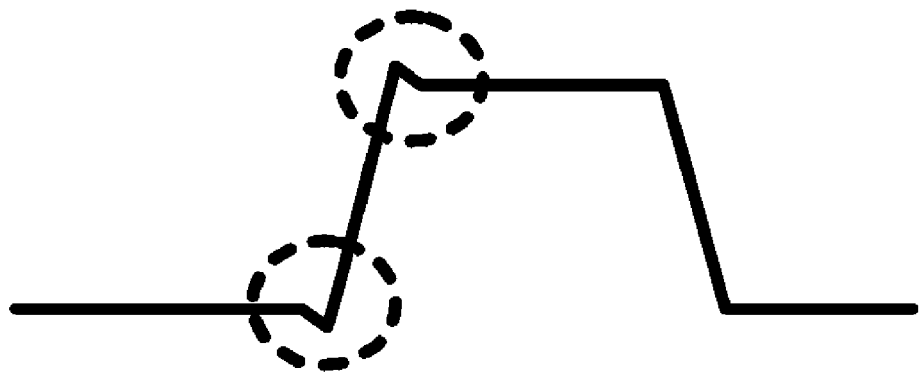
FIG. 56 is an image diagram showing a state of automatically extracting an area in which a change in a tilt in a work is large.
Figure 57:
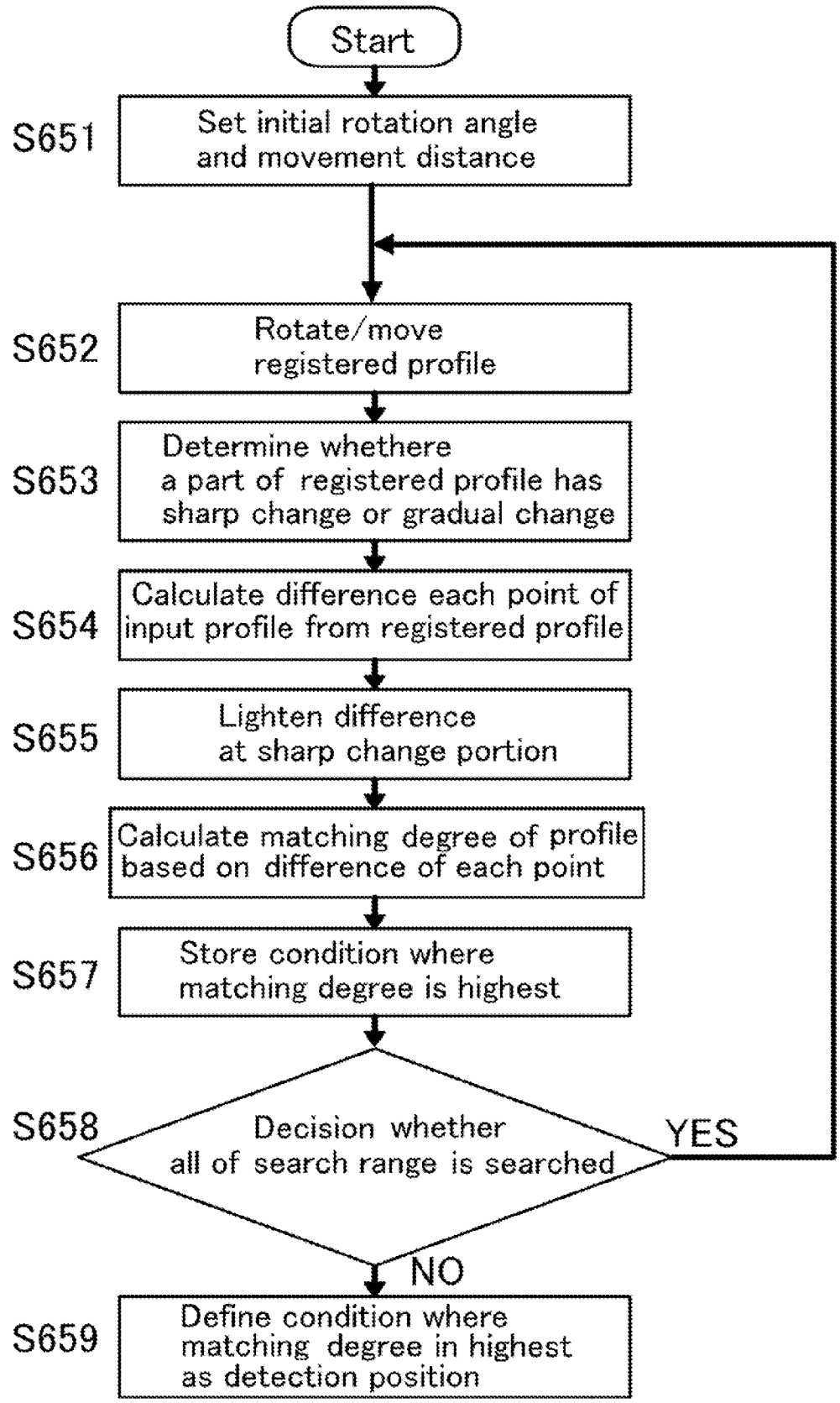
FIG. 57 is a flowchart showing the procedure of performing invalidation by a tilt invalidating function.

In addition to manual setting of an invalid area in a registration profile in a work whose shape is unstable such as a work having edges as shown in FIG. 56, a setting can be made in such a manner that an area having a large change in tilt is extracted automatically from a registration profile and is invalidated or lightly-weighted. The process is automatically performed by the invalidating means 834 shown in FIG. 4. The procedure will be described hereinbelow with reference to the flowchart of FIG. 57 and the image diagram of FIG. 56. In a manner similar to FIG. 53, in step S651, rotation angle and movement distance at the start of a profile search are set. In step S652, a registration profile is rotated/moved. Further, in step S653, the invalidating means 834 analyzes the data of the registration profile and extracts an area having a sharp shape change and an area having a gentle shape change. In step S654, the profile matching means 614 computes the difference between points of the input profile with the registration profile. In step S655, on the area having a sharp shape change, a process is performed to reduce the influence. Specifically, the area is not processed or is lightly weighted. In step S656, the profile matching means 614 computes the degree of matching between the profile shapes on the basis of the differences between the points. In step S657, the position of the highest matching degree is set as a detection position. In step S658, whether all of the range of the input profile has been scanned or not is determined. If NO, the program returns to step S652 where the process is continued. If YES, the program advances to step S659 where the position of the highest matching degree is outputted as a detection position. In such a manner, also in a work having an edge, high-precision matching can be realized by placing little weight according to a change in the tilt in the registration profile, and detection precision can be improved.

Dead Angle Processing Function

Figure 58A:
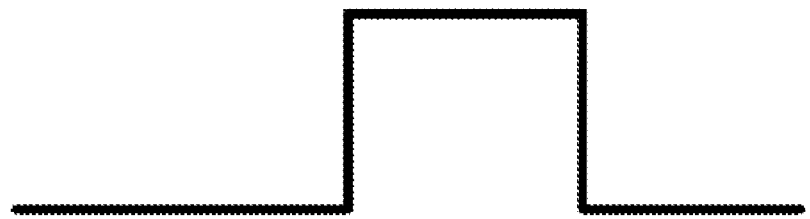
FIGS. 58A to 58C are image diagrams showing a profile shape to be measured due to occurrence of the dead angle.
Figure 58B:
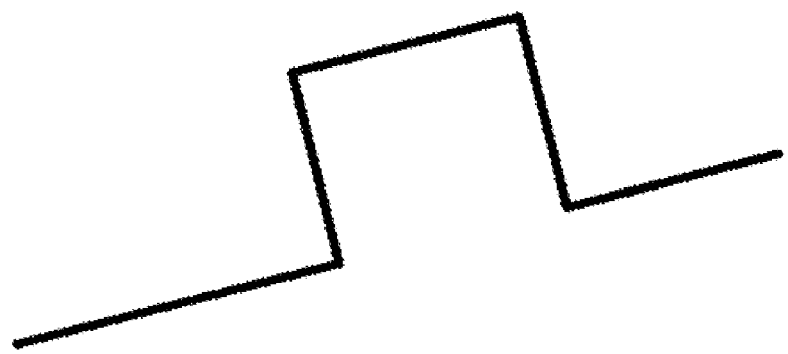
Figure 58C:
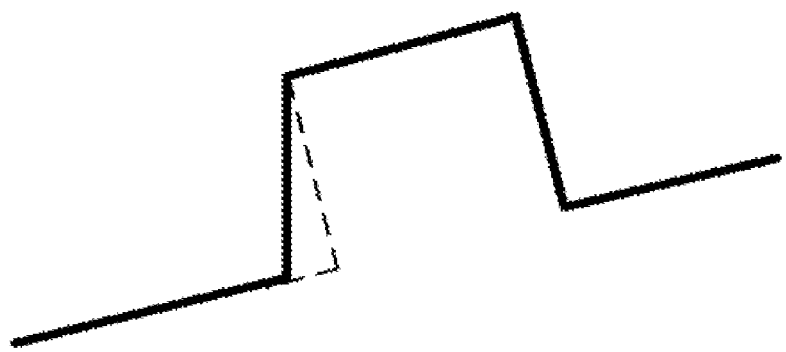
Figure 59:
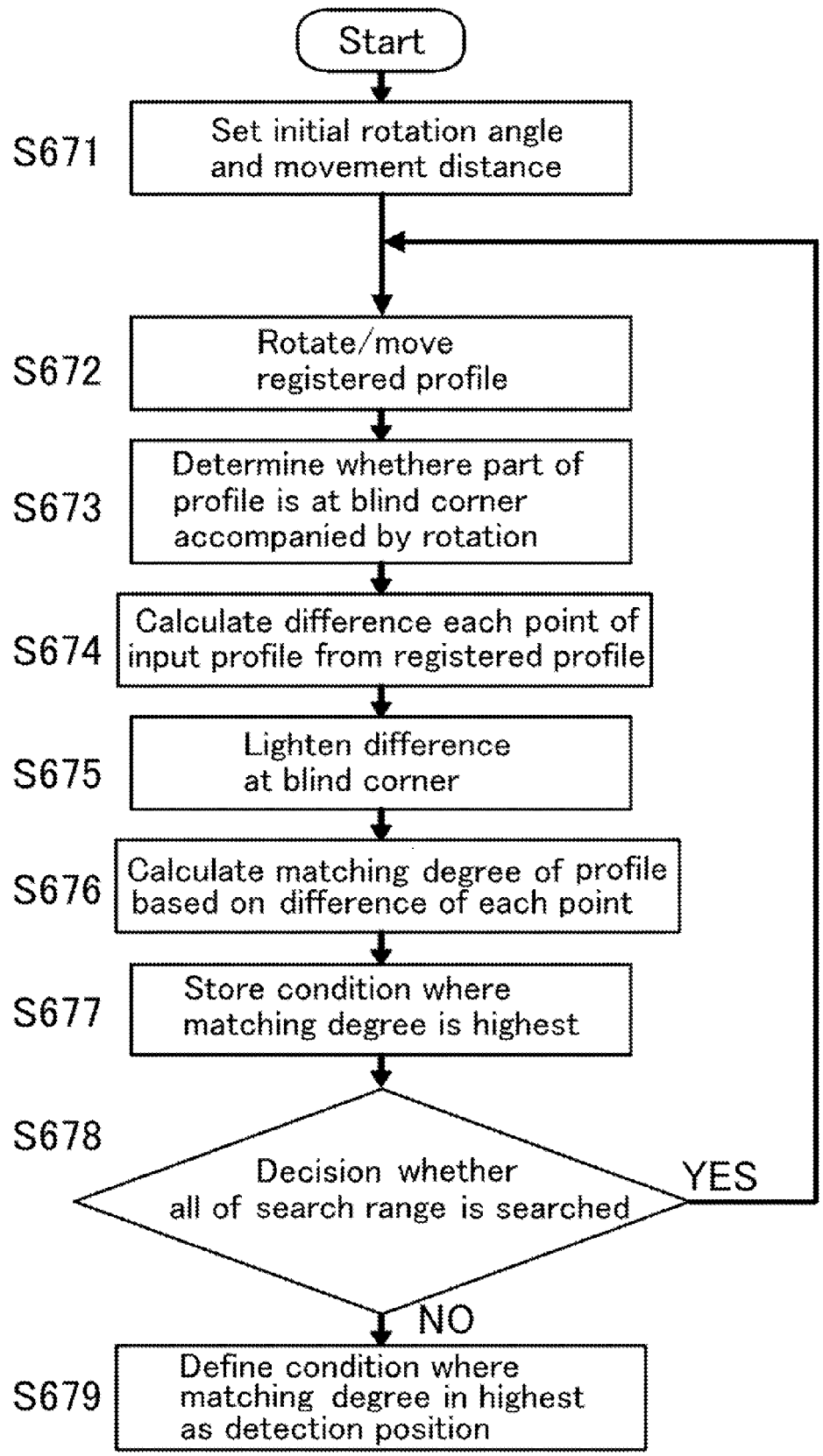
FIG. 59 is a flowchart showing the procedure of automatically extracting the dead angle by a dead angle processing function.

On the other hand, in the case of measuring a work having a projection by the optical displacement meter using the principle of light sectioning as shown in FIGS. 58A to 58C, it is difficult to measure a shape having the possibility that a dead angle is included such as a step part in a profile shape. For example, when a work shown in FIG. 58A turns and becomes as shown in FIG. 58B, light emitted from the above does not reach the root part of the projection, and a profile as shown in FIG. 58C is observed. When a dead angle occurs as described above, shape matching precision deteriorates, and a result of the matching becomes unstable. To address such a problem, the invalidating means 834 automatically extracts a part whose tilt is close to perpendicular from a registration profile and performs a process of eliminating or lightly-weighting the extracted part. This state will be described with reference to the image diagram of FIG. 58 and the flowchart of FIG. 59. First, in step S671, in a manner similar to FIG. 53, rotation angle and movement distance at the start of a profile search are set. In step S672, a registration profile is rotated/moved. At the time point the registration profile is registered, whether a part in which a dead angle may occur due to rotation of the registration profile is included or not can be determined. In step S673, whether such a part is included or not is determined by the invalidating means 834. When such a part is included, the position of the part is recognized. In step S674, the profile matching means 614 computes the difference between points of the input profile with the registration profile. With respect to the part which may have a dead angle depending on rotation of the image, a process of reducing the influence is performed (step S675). Specifically, the area is not processed or is lightly weighted. In the following, like illustrated in FIG. 57 and the like, in step S676, the profile matching means 614 computes the degree of matching between the profile shapes on the basis of the differences between the points. In step S677, the position of the highest matching degree is set as a detection position. In step S678, whether all of the range of the input profile has been scanned or not is determined. If NO, the program returns to step S672 where the process is continued. If YES, the program advances to step S679 where the position of the highest matching degree is outputted as a detection position. In such a manner, also in a work having an edge, high-precision matching can be realized by placing a light weight according to a change in the tilt in the registration profile, and detection precision can be improved.

Improvement in Precision in Lateral Direction

Figure 60:
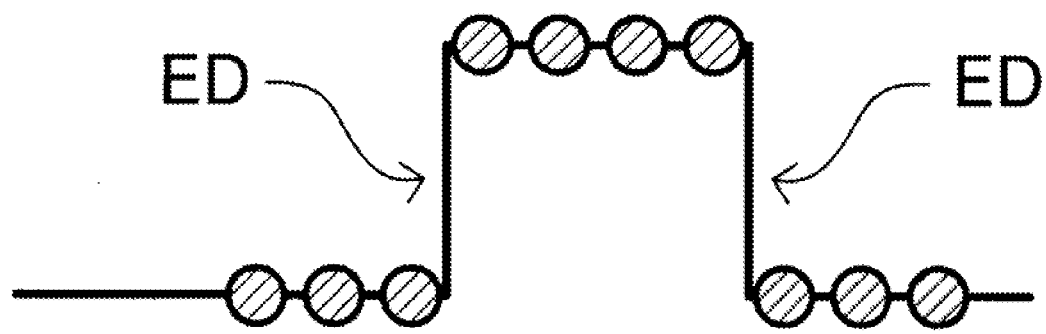
FIG. 60 is an image diagram showing a state where a profile becomes discrete, in a work changed in a projected shape.
Figure 61:
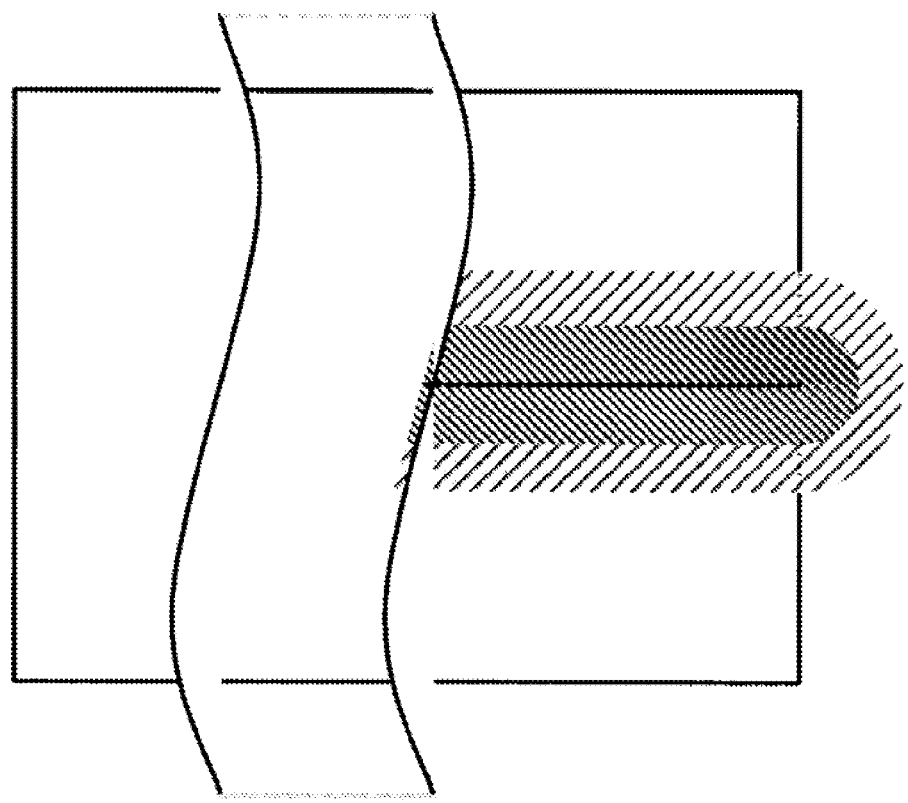
FIG. 61 is a plan view of a reception light image of the work of FIG. 60.
Figure 62:
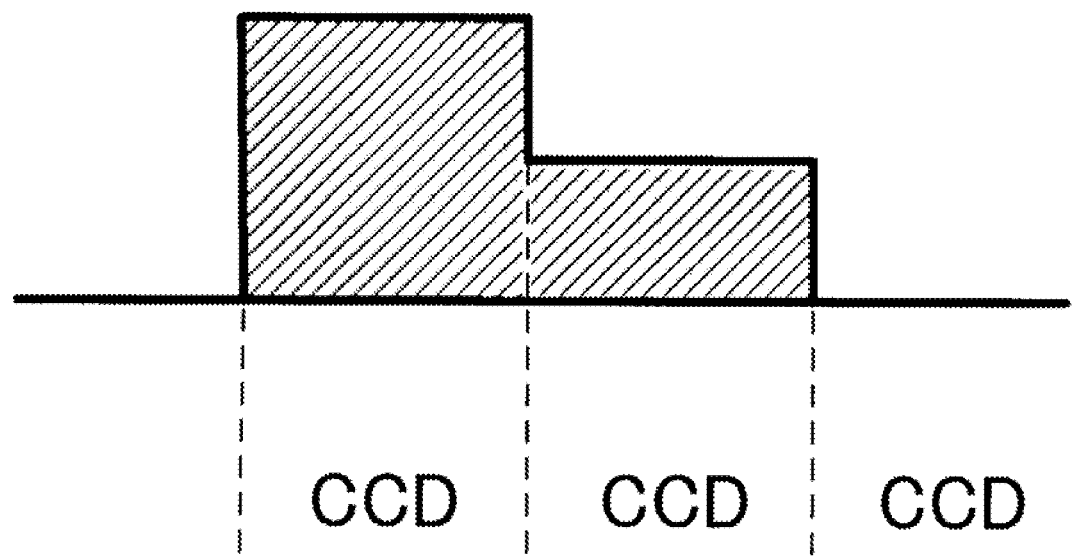
FIG. 62 is a graph showing a change in the reception light amount of a two-dimensional light receiving device in an edge portion.
Figure 63:
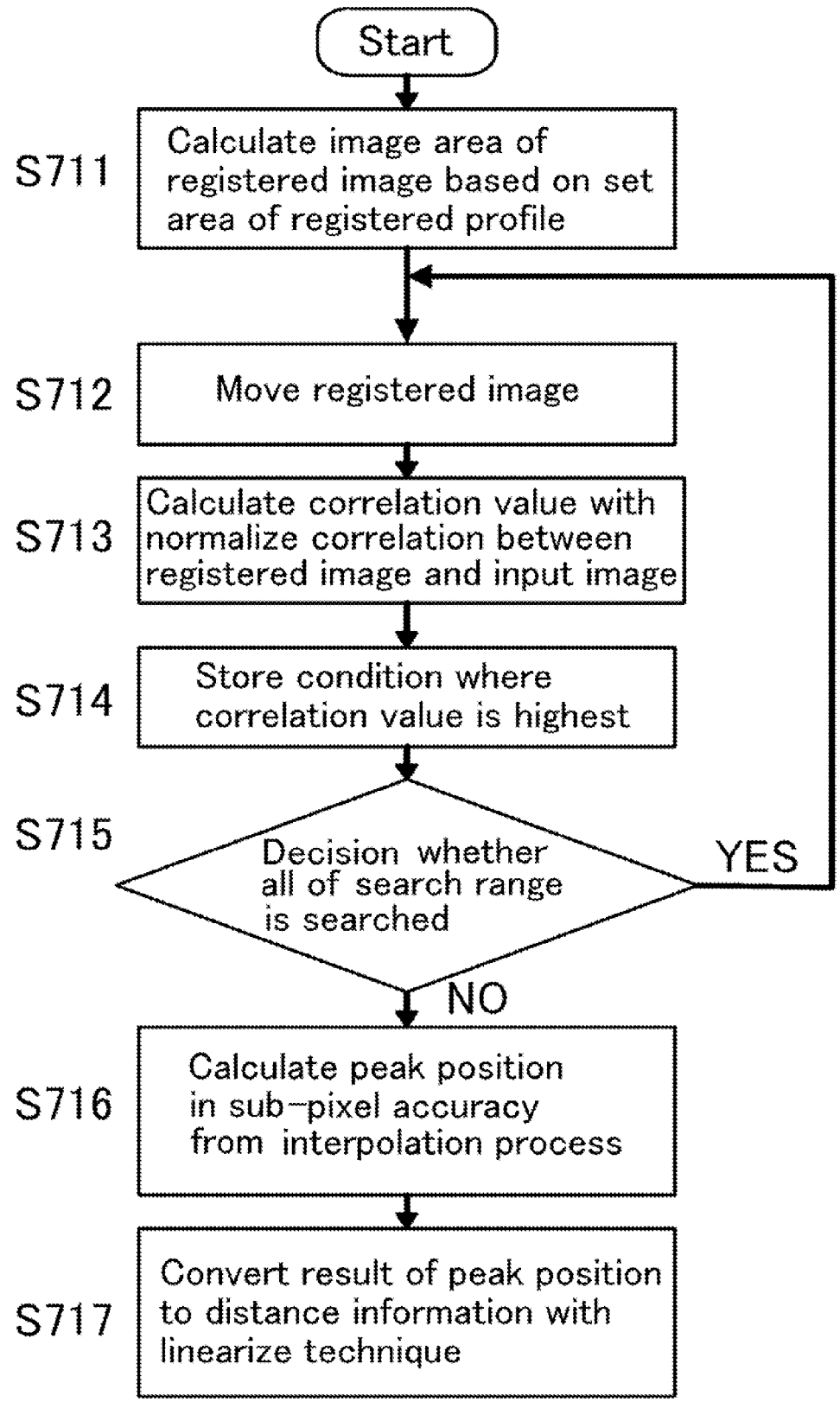
FIG. 63 is a flowchart showing the procedure of detecting the edge position using a reception light image.

In the case of measuring a section close to perpendicular by using the principle of light section, a problem occurs such that the precision in the lateral direction for resolution of the light receiving device is limited. In a part whose profile sharply changes such as edge faces ED of a work changing to a projection as shown in FIG. 60, that is, rising and trailing parts of the projection, the level changes between neighboring pixels. Data becomes discrete data where intermediate levels do not exist, and the precision deteriorates. On the other hand, according to changes in the edge positions, a reception light image itself has changes in the reception light amount as shown in FIG. 61. In particular, in a two-dimensional light receiving device such as a CCD, the reception light amount of neighboring pixels changes step by step near the edge face as shown in FIG. 62. In the case of measuring an edge close to perpendicular, by performing position detection using reception light image data before conversion to a profile shape rather than position correction in a state where the data is converted to a profile shape, precision of the edge position can be improved. The detection is performed by the edge face calculating means 618 shown in FIG. 4. With the configuration, without being limited by the resolution of a CCD, the rising edge and the trailing edge can be detected with high precision in the sub-pixel order. The procedure will be described with reference to the flowchart of FIG. 63. First, in step S711, an applicable area is computed on a corresponding reception light image on the basis of the range of the registered profile set on the profile shape. In step S712, the registration profile in the area is moved. In step S713, the registration profile and an input profile undergo normalized correction, and a correlation value is computed. A parameter of the highest correction value (movement amount) is stored in step S714. Further, the program returns to the step S712 to repeat the process in a predetermined area until all of the parts are processed (step S715). In step S716, interpolating process is performed on the basis of the parameter of the highest correlation value and correlation values around it, and the peak position is calculated in the sub-pixel order. Finally, in step S717, the peak position is computed on the reception light image. The result is linearized so as to be converted to distance information. In such a manner, extremely high-precision matching process utilizing a reception light image can be realized.

Shape Measuring Function

Figure 64:
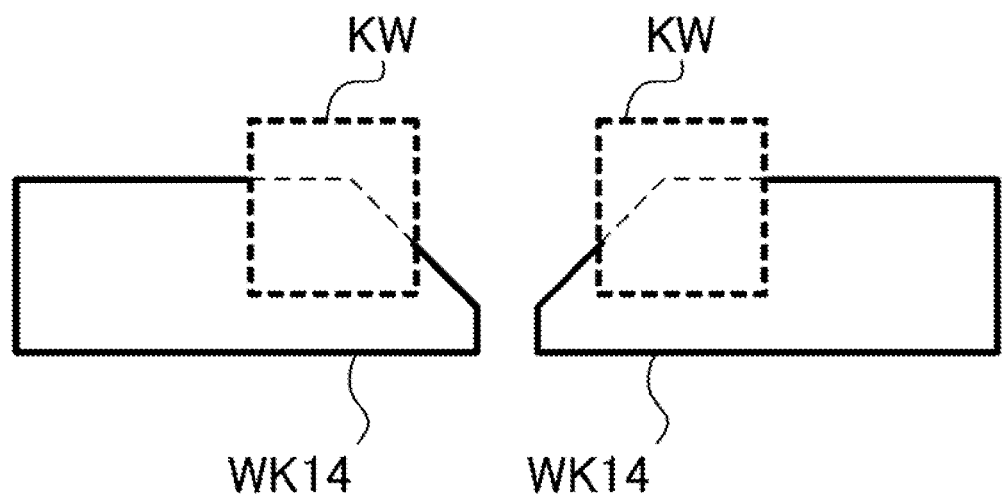
FIG. 64 is a schematic view showing a measurement example of a work using a profile search.

The profile search process can be used not only for position correction of the profile shape but also measurement of the profile shape and the like. For example, in the example of FIG. 64, common profile designation frames KW are designated for two shapes as facing parts of facing works WK14. The profile matching means 614 performs a profile search, thereby enabling a process of detecting a middle point between the two parts to be performed. In such a manner, the profile search can also effectively function for not only position correction but also measurement.

Profile Computing Function

Figure 65A:
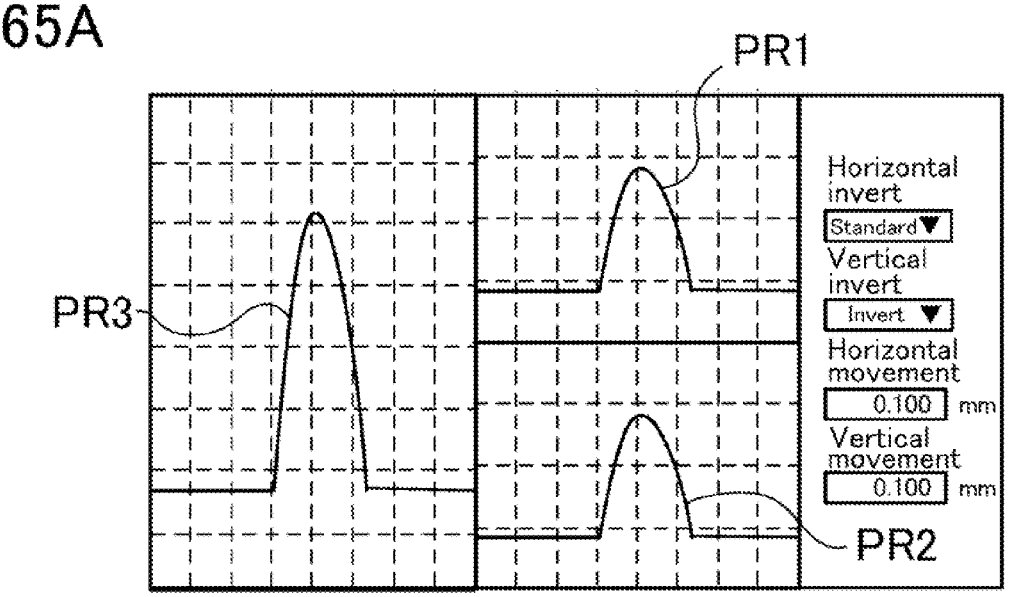
FIGS. 65A and 65B show image diagrams showing a screen example of manually operating the profile shape.
Figure 65B:
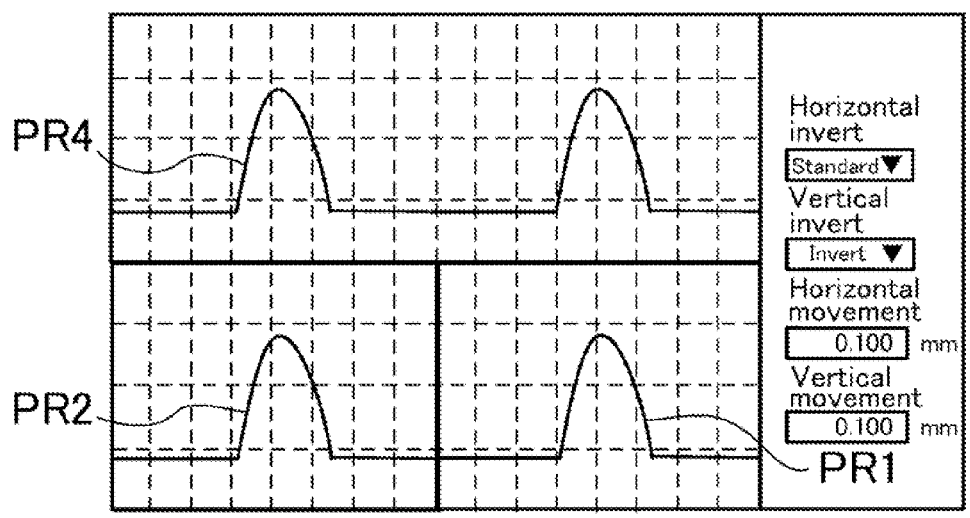

Further, the profile moving means 824 for manually moving a profile shape and an operation function of adding, inverting, or the like of a profile can be also provided. FIGS. 65A and 65B show examples of the screen on which the profile shape displayed on the display unit 70 is manually operated. In the display unit 70 shown in the diagram, a profile shape of a work is displayed in the profile display area 71. In the example of FIG. 65A, the right part of the profile display area 71 is divided into upper and lower parts in which profile shapes RP1 and RP2 obtained by two sensor heads 2 are displayed, respectively. On the left side of the profile display area 71, an addition profile shape PR3 obtained by adding the profile shapes PR1 and PR2 is displayed. In such a manner, computations such as addition, subtraction, difference extraction, and the like can be performed on a plurality of profile shapes. In particular, by extracting the differential information of common shape portions in the profile shapes combined by the profile search or the like by the difference extracting means 615, the difference of profiles can be computed and displayed. The different points of designated parts can be easily compared.

Profile Moving Means

In the example of FIG. 65B, the lower half of the profile display area 71 is divided into right and left parts for displaying profile shapes PR1 and PR2, respectively. In the upper part of the profile display area 71, a composite profile shape PR4 obtained by combining the profile shapes A and B is displayed. The composition of the profiles is performed by a profile search of the profile matching means 614. Further, each of the profile shapes in the screens of FIGS. 65A and 65B can be moved or inverted in the vertical or horizontal direction. A rotation/enlargement/reduction function may be also provided. With the function, the composite profile shape obtained by the profile search can be manually finely adjusted by further setting an offset amount or the like.

Function of Coloring and Displaying Profile Shape

By displaying a profile shape on the display unit as shown in FIG. 8, the profile shape of the work can be recognized. However, from the profile shape, the reception light amount (excessive or not), a change, and the like cannot be known. Consequently, whether the accurate shape of the work is measured or not cannot be determined only from the image. The display mode of the display unit is therefore switched to a reception light image as shown in FIG. 9, and a reception light state of each of parts of the profile shape is recognized. The reception light image is a monotone gray image, and there is a problem such that it is difficult to determine the reception light distribution state. When the profile shape and the reception light image are displayed, it is not easy to recognize the corresponding position, and an operation of switching the display screen and the like is troublesome. Therefore, in the embodiment, the profile shape is colored by the profile coloring means, so that a reception light amount, a change in the reception light amount, and the like can be grasped only from the profile shape.

Profile Coloring Function

The profile coloring means divides the light amount range into parts in advance in accordance with the light amount in each of positions constructing the profile shape, performs coloring process of coloring the parts in different colors, and can display the profile shape colored in the different colors on the display unit. The profile coloring means can also divide the light amount change range into parts in advance in accordance with change amounts in the light amount in the positions of the profile shape, perform coloring process of coloring the parts in different colors assigned to the parts, and display the colored profile shape on the display unit. A state of coloring the profile shape by the profile coloring means will be described with reference to the image diagrams of the profile shape display on the display unit shown in FIGS. 66 to 68.

Figure 66:
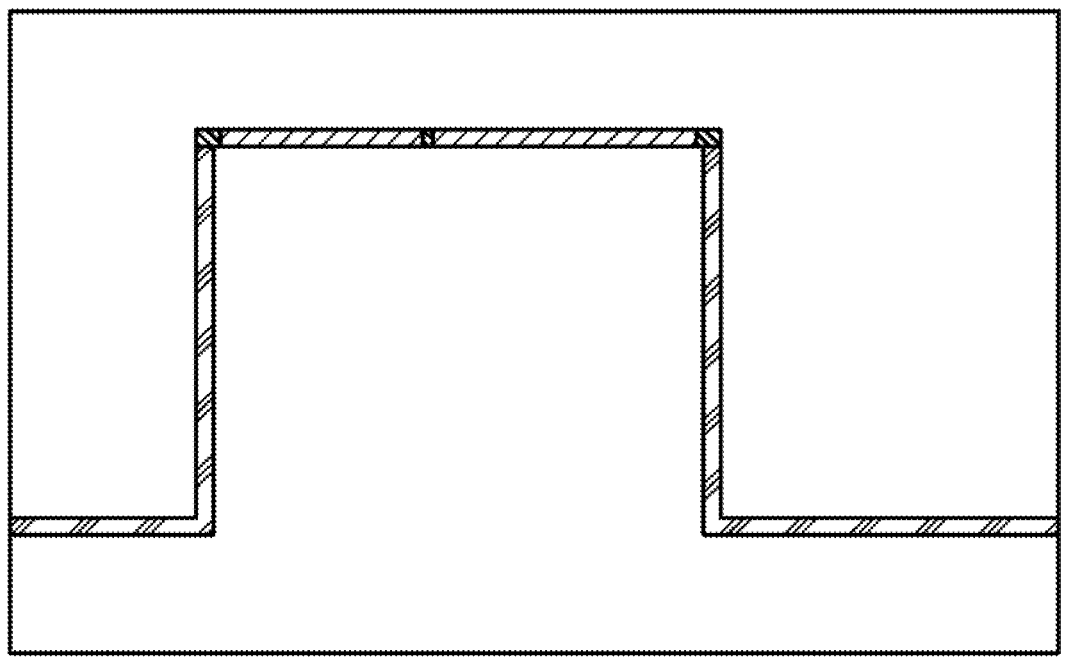
FIG. 66 is an image diagram showing an example of coloring and displaying a profile shape in accordance with the light amount state of the profile.

In FIG. 66, colors displayed by the profile coloring means are varied in accordance with the light amount state of the profile, concretely, whether the light amount is large or not at the time of displaying a profile shape. In the example, a part of a proper light amount is colored in blue (shown by solid-line hatching in FIG. 66). A part of a light amount exceeding a predetermined upper limit threshold value is colored in white (shown by bold-line high-pitched hatching in FIG. 66). A part of a light amount smaller than a predetermined lower limit threshold is colored in red (shown by three-line hatching in FIG. 66). By coloring parts of the profile shape in different colors and displaying the resultant profile shape on the display unit, the user can determine whether stable measuring is performed or not only by looking the profile shape. As examples of the threshold, for example, in the case of detecting the reception light amount in 256 shades of gray (8 bits) from 0 to 255, the upper limit threshold is set to 191 or larger, and the lower limit threshold is set to 64 or less. Such thresholds may be preset on the optical displacement meter or arbitrarily designated and adjusted by the user. In particular, by setting proper thresholds in accordance with measurement parameters or the like, the stability of the profile shape can be recognized in a color display more adapted to an application.

Figure 67:
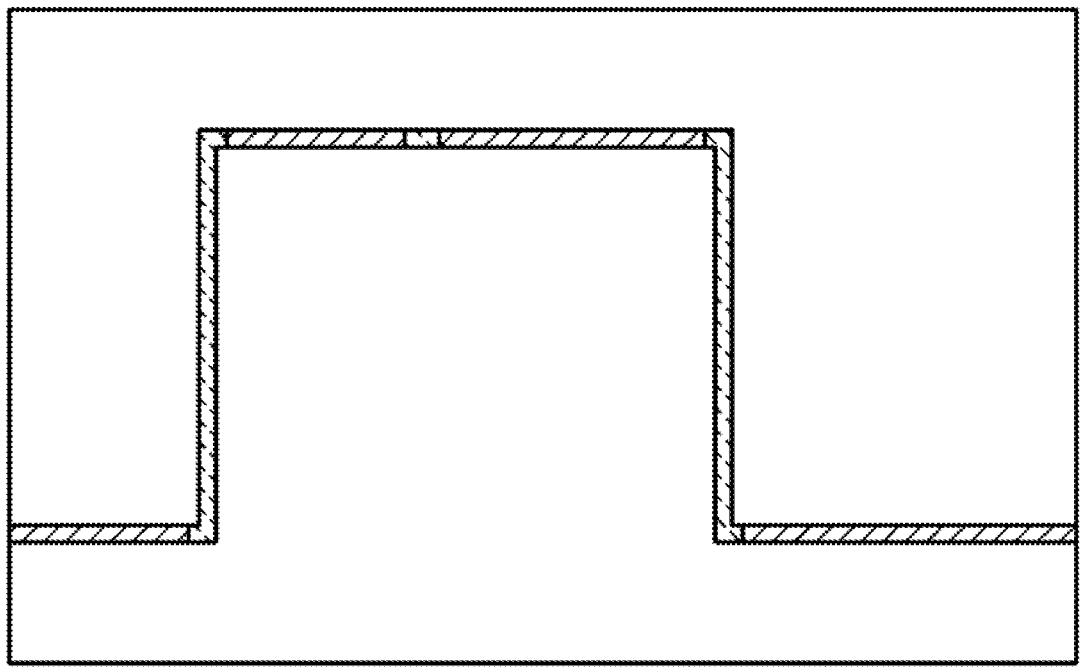
FIG. 67 is an image diagram showing an example of coloring and displaying a profile shape in accordance with a change in the light amount of the profile.

FIG. 67 shows an example where the profile coloring means performs the coloring process in accordance with the light amount change in the profile. When the profile shape is unstable, the case where the light amount changes largely can be also considered. In this case, the profile coloring means color parts so that a part in which the light amount change is large can be specified. When a change in the reception light amount between neighboring parts lies in a predetermined range, it is determined that a change in the reception light amount is proper and the part is colored in blue (solid-line hatching in the example of FIG. 67). When a change in the reception light amount exceeds the predetermined range, it is determined that the change in the reception light amount is large, and the part is colored in green (broken-line hatching in the example of FIG. 67). As examples of the reception light amount range, in the case of detecting the reception light amount in 8 bits from 0 to 255 in a manner similar to the above, when the difference of reception light amounts in neighboring pixels constructing the profile shape is 64 or less, it is determined that a change in the reception light amount is proper. The range may be preset on the optical displacement meter or arbitrarily set by the user. Further, the reception light amount can be also determined on the basis of the ratio between the maximum/minimum change amount and the average value with reference to reception light levels of neighboring target pixels.

Figure 68:
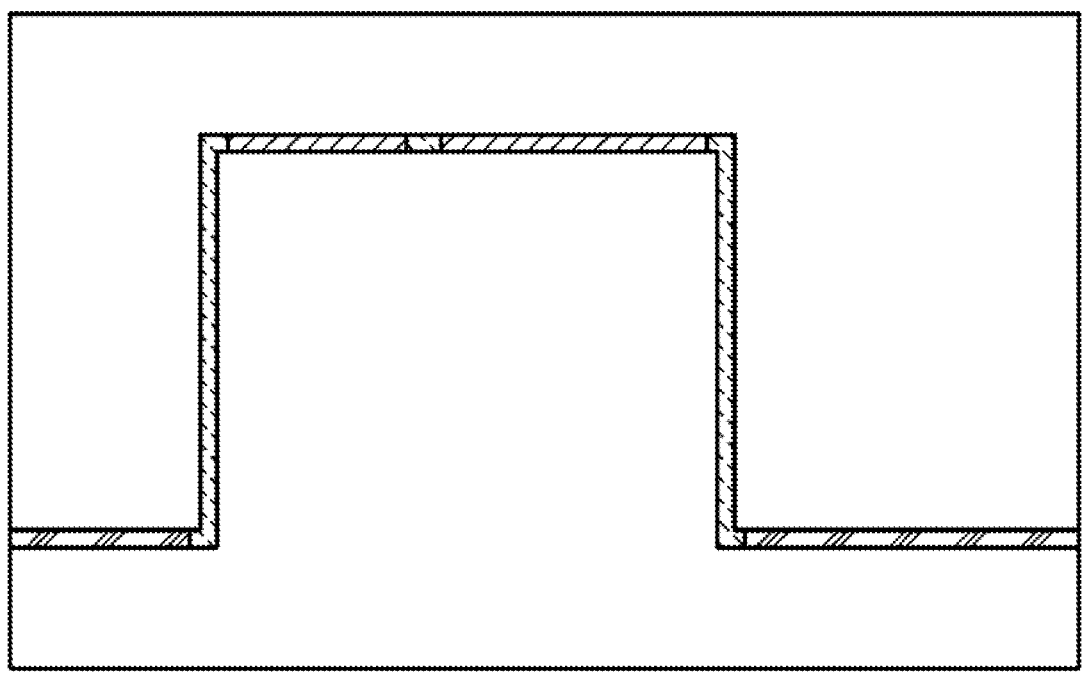
FIG. 68 is an image diagram showing an example of coloring and displaying a profile shape in accordance with the light amount state and a change in the light amount of the profile.
Figure 69:
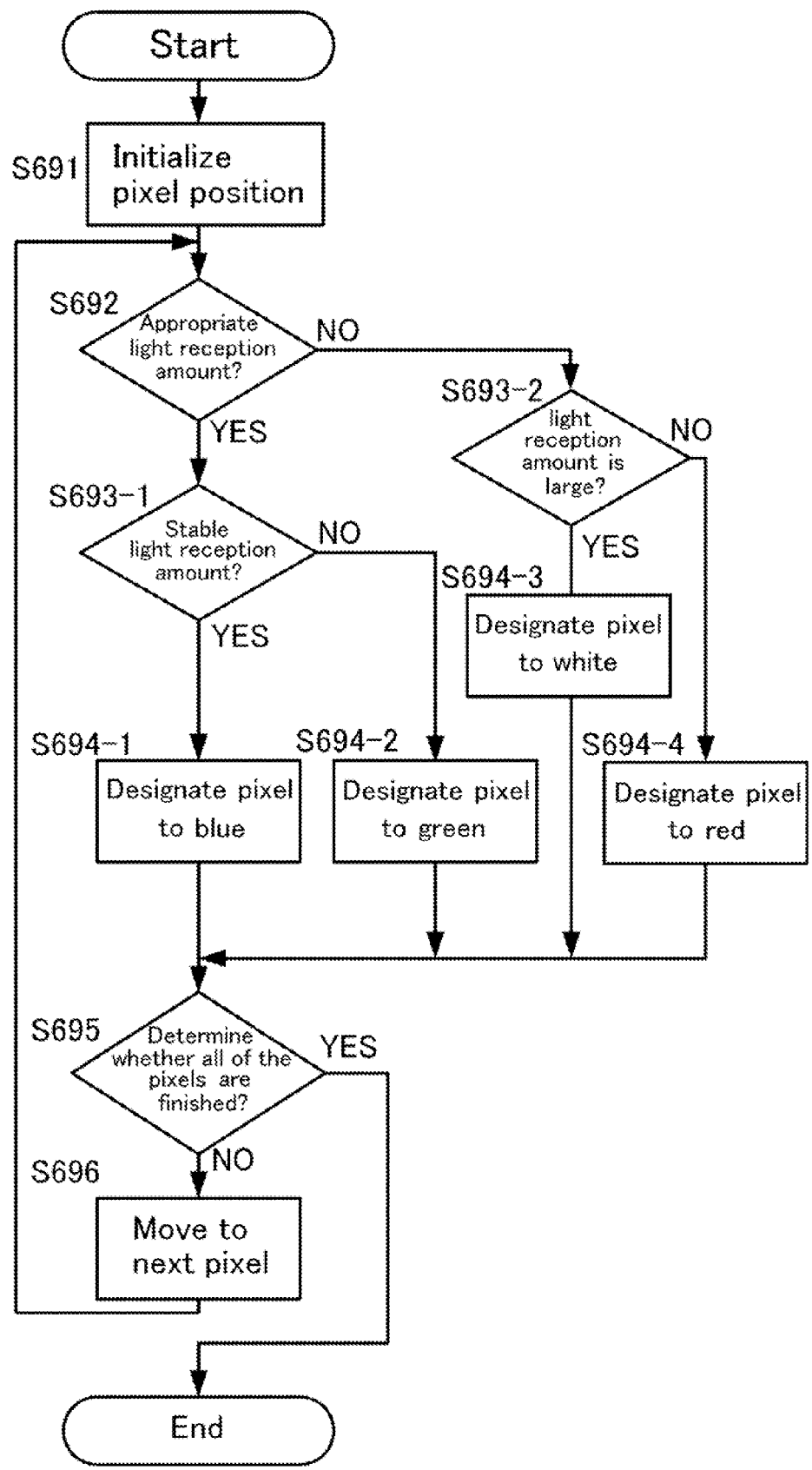
FIG. 69 is a flowchart showing a coloring determination procedure.

Further, as shown in FIG. 68, the coloring process can be also performed by the profile coloring means by a method obtained by combining the above-described methods. In the example of FIG. 68, the coloring process is performed according to the reception light amount (whether it is large or not) and a change amount in the positions of the profile. An example of the coloring determining procedure will be described with reference to the flowchart of FIG. 69. First, in step S691, pixels to undergo the profile shape coloring process are moved to initial positions. Since the profile shape is formed by lines, it is unnecessary to scan all of the pixels of an image displaying the profile shape. By sequentially scanning only pixels of a reception light image corresponding to the position of the profile shape, the coloring process is performed efficiently. The range of the coloring process in the profile shape can be further narrowed. In step S692, whether the reception light amount of the pixel is proper or not is determined by comparison with the predetermined threshold. When the reception light amount is proper, the program advances to step S693-1 and whether the reception light amount is stable or not is determined. Concretely, the reception light amount of the pixel is compared with that of the immediately preceding neighboring pixel. When the difference is smaller than the predetermined threshold, it is determined that the reception light amount is stable. When the difference is larger than the predetermined threshold, it is determined that the reception light amount is unstable. In a case where the reception light amount is stable, the program advances to step S694-1 where the coloring process (for example, in blue) of the case of determining that the reception light amount is proper and stable is performed, and the program advances to step S695. On the other hand, when it is determined in step S693-1 that the reception light amount is unstable, the program advances to step S694-2, the coloring process (for example, in green) performed in a case where it is determined that the reception light amount is proper but unstable is carried out, and the program advances to step S695. Further, when it is determined in step S692 that the reception light amount is not proper, the program advances to step S693-2 and whether the reception light amount is large or not is determined. Concretely, it is determined by comparing the reception light amount with a predetermined threshold. In a case where it is large, the program advances to step S694-3, and the coloring process (for example, in white) is performed in the case of a large reception light amount, and the program advances to step S695. In a case where the reception light amount is small, the program advances to step S694-4 where the coloring process (for example, in red) in a case where the reception light amount is small is performed, and the program advances to step S695. When the coloring process on the pixels is finished, whether the pixel position reaches the final position or not is determined in step S695. If NO, the program advances to step S696 where the target pixel of the coloring process is moved and the program returns to step S692 and the above-described steps are repeated. When it is determined in step S695 that the pixel position has reached the final pixel position, the process is finished. By the procedure, the target pixels are sequentially scanned and the coloring process can be performed on the profile shape.

Figure 70:
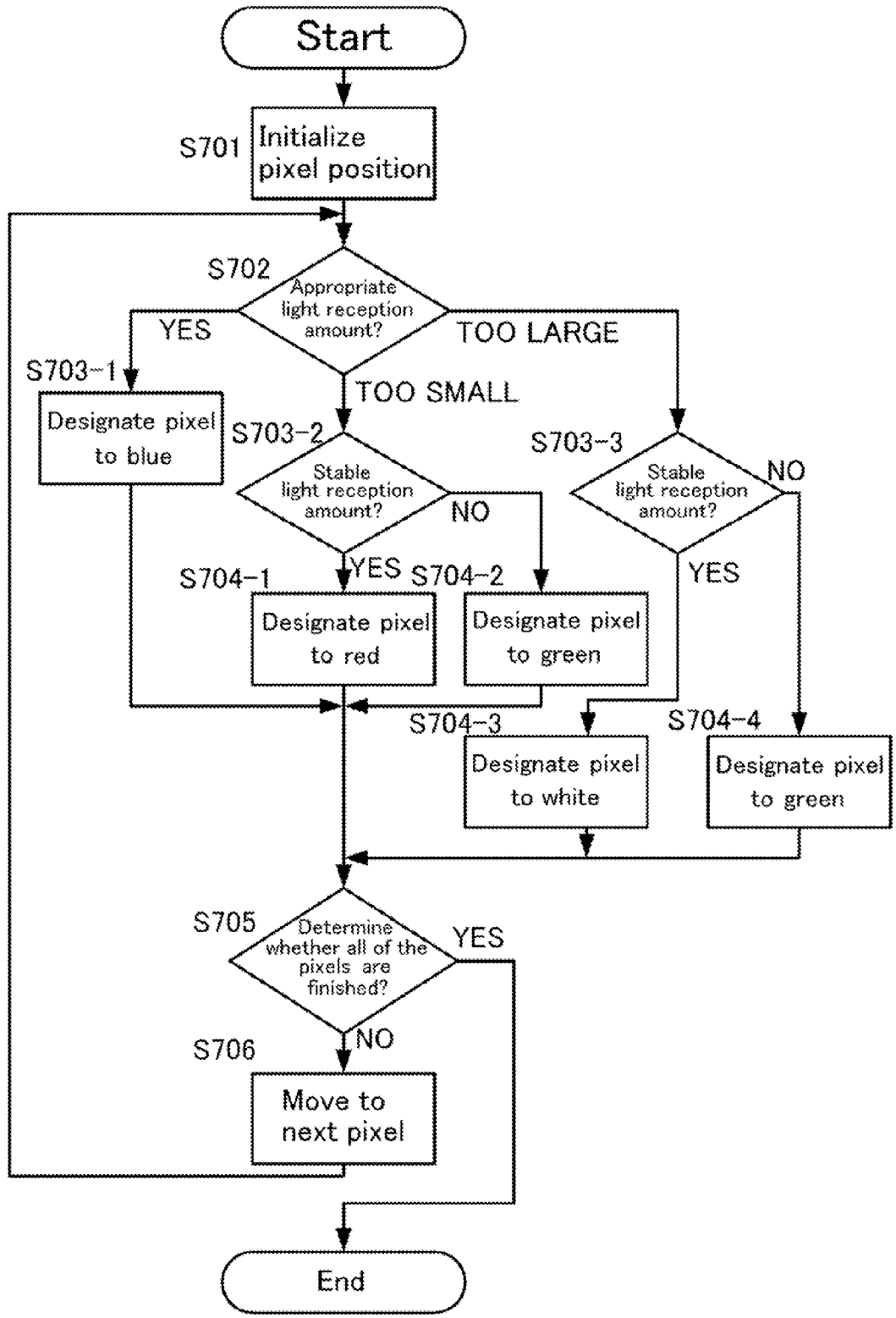
FIG. 70 is a flowchart showing another coloring determination procedure.

The procedure of coloring a profile is not limited to the above. Other methods, for example, the procedure shown by the flowchart of FIG. 70 can be also used. The procedure will be described. The procedure of moving the pixel position to the initial pixel position in step S701 and determining whether the reception light amount of the pixel is proper or not in step S702 is similar to that of FIG. 69. When the reception light amount is proper, the program advances to step S703-1, and the coloring process (for example, in blue) of the case where it is determined that the reception light amount is proper is executed. On the other hand, when the reception light amount is smaller than a predetermined lower threshold value, the program advances to step S703-2 where it is determined whether the reception light amount is stable or not. Concretely, the reception light amount of the pixel is compared with that of the immediately preceding neighboring pixel. When the difference is smaller than the predetermined threshold, it is determined that the reception light amount is stable. When the difference is larger than the predetermined threshold, it is determined that the reception light amount is unstable. In a case where the reception light amount is stable, the program advances to step S704-1 where the coloring process (for example, in red) of the case where the reception light amount is smaller is performed, and the program advances to step S705. On the other hand, when it is determined in step S703-2 that the reception light amount is unstable, the program advances to step S704-2, the coloring process (for example, in green) performed in a case where it is determined that the reception light amount change is large is carried out, and the program advances to step S705. Further, when it is determined in step S702 that the reception light amount is larger than the upper threshold value, the program advances to step S703-3 and whether the reception light amount is stable or not is determined in a manner similar to the above. In a case where the reception light amount is stable, the program advances to step S704-3, and the coloring process (for example, in white) performed in the case of a large reception light amount is performed, and the program advances to step S705. In a case where the reception light amount is not stable, the program advances to step S704-4 where the coloring process (for example, in green) in a case where the reception light amount change is large is performed, and the program advances to step S705. Processes after completion of the pixel coloring process are similar to those of FIG. 69. Whether the pixel position has reached the final position or not is determined in step S705. If NO, the program advances to step S706 where the target pixel of the coloring process is moved and the program returns to step S702 and repeats the above steps. When it is determined in step S705 that the pixel position has reached the final pixel position, the process is finished. Also by the procedure, the target pixels are sequentially scanned and the coloring process can be performed on the profile shape.

The procedures are examples. For example, whether the light reception amount is stable or not is determined first. After that, the reception light amount is large or not is determined. Even when the order is changed in this way, similar results can be obtained. The above-described coloring is an example. Any combination of colors which can be easily distinguished from each other and are visible on the display unit can be selected.

Moment-To-Moment Display Function of Profile

By the above method, the profile shape in a temporary time point can be recognized on the display unit. In the case such that works sequentially conveyed on the line are measured, a work that changes with time may be measured. In such a case, the profile of the work measured also changes with time. The optical displacement meter can hold data of the measured profile shape in a memory. As necessary, a profile shape at a past time point can be displayed. However, in the conventional optical displacement meter, profile shapes at different time points are displayed while being switched. It is not easy to see continuous changes in profiles with time and determine whether the profile could be measured stably or not at that time point.

Figure 71:
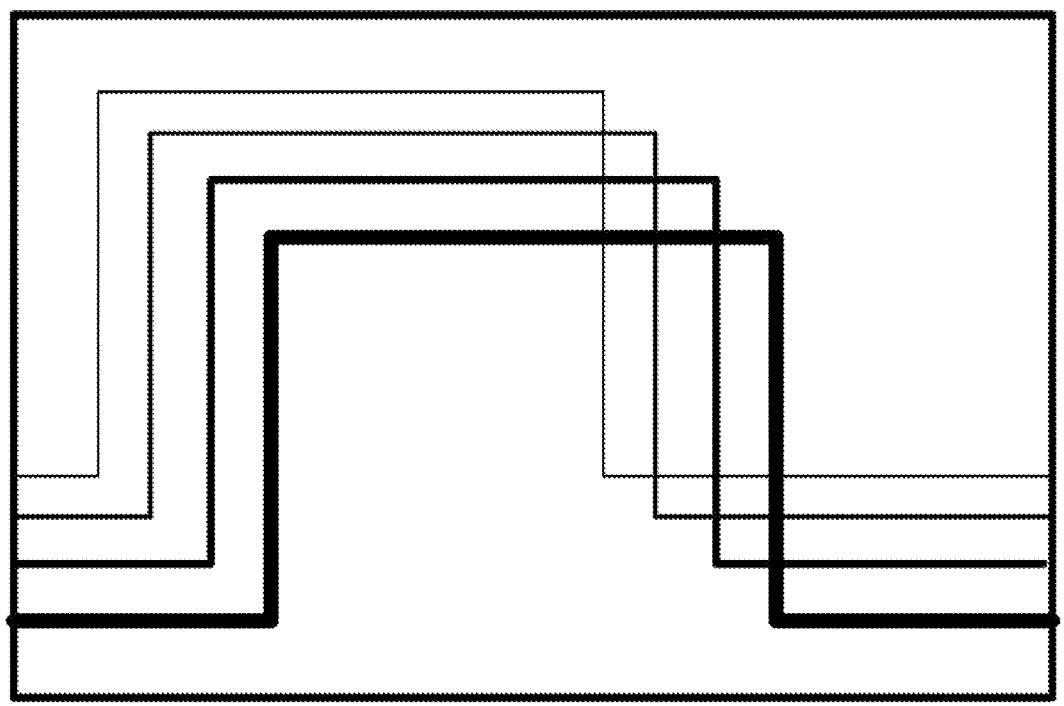
FIG. 71 is an image diagram showing a state where a plurality of profile shapes are displayed overlapped in such a manner that the newer the profile shape is, the thicker the line is.

In contrast, in the embodiment, profile shapes at different time points can be displayed so as to overlap each other on the display unit. Moreover, by adding different highlight processes to each of the profile shapes by the profile highlight means, the profile shapes at different time points can be distinguished from each other, and changes with time of the profile shape can be visually easily recognized. The state will be described with reference to FIGS. 71 to 73.

Profile Highlight Function

Figure 72:
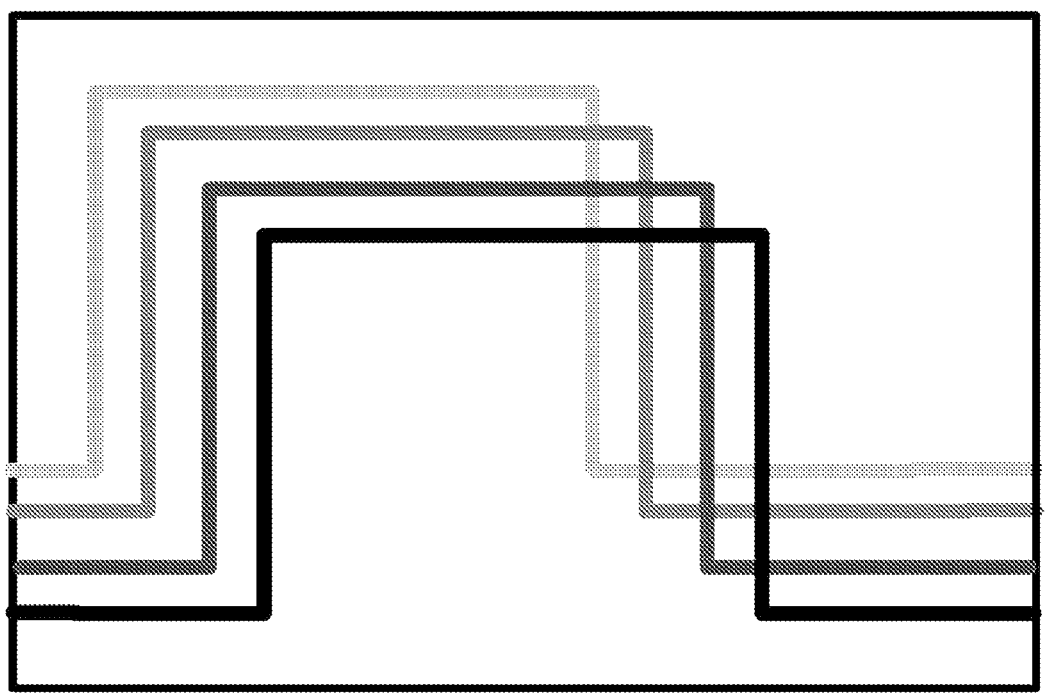
FIG. 72 is an image diagram showing a state where a plurality of profile shapes are displayed overlapped in such a manner that the newer the profile shape is, the darker the color is.
Figure 73:
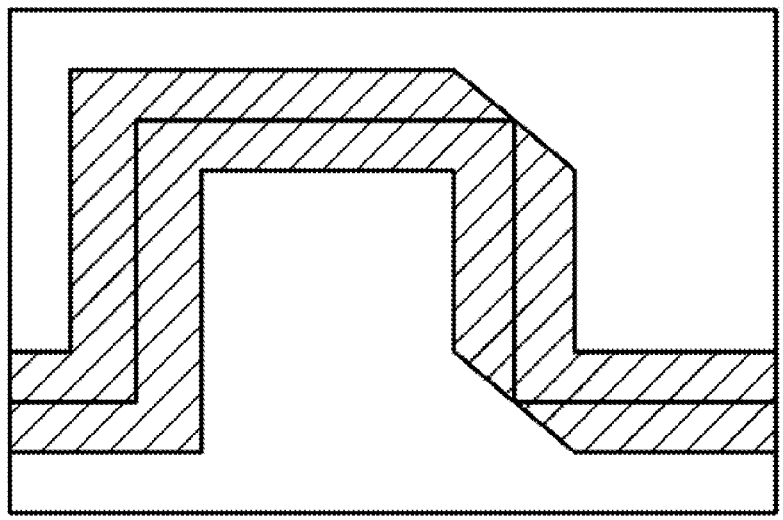
FIG. 73 is an image diagram showing a state of displaying an average profile.

The profile highlight means displays a plurality of profile shapes measured at different timings so as to be overlapped on the display unit, and displays the profile shapes subjected to different highlight processes in time series on the display unit. In an example of FIG. 71, a plurality of profile shapes obtained at predetermined time intervals are displayed so as to overlap each other on the display unit. The highlight process is performed by the profile highlight means so that the newer the profile shape is, the thicker the line is, and the older the profile shape is, the thinner the line is. As shown in FIG. 72, the highlight process may be also performed so that the newer the profile shape is, the darker the color is, and the older the profile shape is, the lighter the color is. Further, the degree of coloring may be gradually increased or decreased (for example, the newer the profile shape is, the darker the blue color is and the older the profile shape is, the darker the red color is). The patterns of lines may be changed like a solid line, a broken line, an alternate long and short dash line, an alternate long and two short dashes line, and the like. Any of the techniques may be combined. As described above, proper patterns can be used for the highlight process. Thus, on the basis of a plurality of profile shapes measured at different timings, stability with time of the profile can be displayed.

Profile Width Display Function

The profile highlight means can also display a plurality of profile shapes measured at different timings so as to overlap each other on the display unit, and color the width defined by the maximum and minimum values in each position. By such a profile width display function, the user can visually grasp the possible range of the profile. As necessary, functions of displaying a distribution of a profile, coloring an area surrounded by an envelope line, and the like can be also added.

Average Profile Display Function

Further, an average profile display function of displaying an average value of a profile in each position by coloring the value in a color different from the display color of the width may be also provided. In an example of FIG. 73, the locus of the profile shape is colored in yellow (hatched in FIG. 73) and displayed in a band shape, and average values in different positions are colored in blue (shown by thick line in FIG. 73) and displayed as an average profile shape on the display unit. With the arrangement, the possible range of the profile and the average value can be known from the history information of the profile obtained in the past, and can be used for analysis.

Further, the profile width display function and the average profile display function can be executed on all of data obtained in the past and stored in the memory or a predetermined number of data pieces in a specified period. For example, the functions can be executed on all of the profile shapes obtained from the start of the measurement until reset, or the profile width and the average profile can be displayed while limiting the period to the latest N profiles, a sampling trigger generation period, past "t" seconds, or the like. By displaying a plurality of profile shapes so as to overlap with each other as described above and, as necessary, enabling displacement, the elevation difference, area, and the like to be computed and measured, the measurement range can be easily set.

Reception Light Image Coloring Function

The means for displaying profile shapes on the display unit has been described above. In addition to the display of such profile shapes, a reception light image captured by the two-dimensional light receiving device can be displayed independently or displayed so as to overlap the profile shape on the display unit. For example, when the profile shape of a work cannot be measured properly, there is a case that the profile shape shown in FIG. 8 is switched to the reception light image shown in FIG. 9 and determination is made. However, since a reception light image is a monotone gray image, the reception light distribution state is not easily understood.

Figure 74:
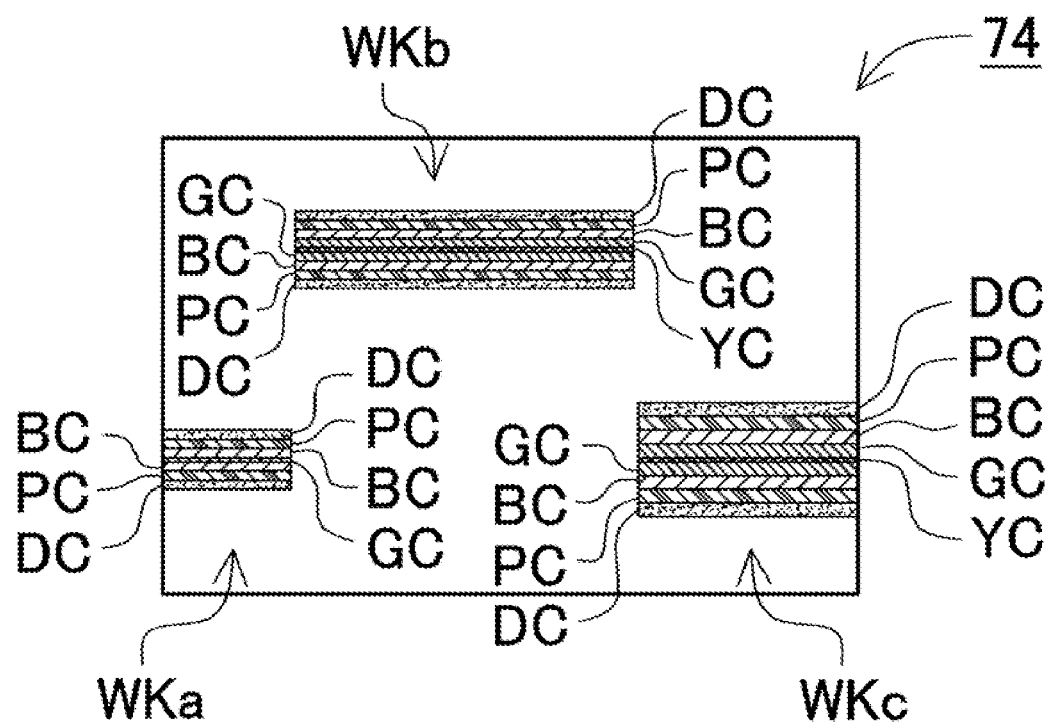
FIG. 74 is an image diagram showing a state of performing a coloring process on a reception light image and displaying the resultant image.

In the embodiment, therefore, the reception light image coloring means performs the coloring process on the reception light image, and the colored image can be displayed on the display unit as shown in FIG. 74. The reception light image coloring means performs the coloring process in accordance with the tone of the reception light signal on the pixel unit basis on the reception light image. The tone is preliminarily divided into a plurality of levels, different colors are assigned to the levels, and the color assigned to the level is given to each of the pixels of the reception light image. As a result, the reception light image is displayed like a contour image, so that the luminance distribution of the reception light signal can be visually grasped. Whether the gradient of the reception light distribution is sharp or gentle can be easily recognized by the pitch of contour intervals. Thus, the degree of tilt of the profile and the like can be visually grasped. Further, the peak level of the profile shape can be also more easily recognized by colors. For example, when the two-dimensional light receiving device receives a light signal of 256 shades of gray (8 bits) from 0 to 255, the range is divided every 16 shades into 16 levels. By assigning different colors (for example, yellow, green, blue, purple, orange, pink, red, . . . in the decreasing order) to the levels, the levels of the reception light amount can be expressed in 16 colors. In the example of FIG. 74, a portion WKa on the reception light image display area 74 has seven areas colored in, from top, orange color DC, purple color PC, blue color BC, green color GC, blue color BC, purple color PC, and orange color DC. A portion WKb has nine areas colored in, from top, the orange color DC, purple color PC, blue color BC, green color GC, yellow color YC, green color GC, blue color BC, purple color PC, and orange color DC. Further, a portion WKc has nine areas colored in, from top, orange color DC, purple color PC, blue color BC, green color GC, yellow color YC, green color GC, blue color BC, purple color PC, and orange color DC. By such a contour line display function, a plane reception light image can be expressed like a contour model in which the luminance values are arranged in the height direction. The reception light image is displayed in colors, not a simple monotone gray image, so that visibility improves, and the user can visually grasp the levels, distribution, and gradient of luminance. The contour line display function can be turned on or off and can be executed as necessary. The coloring of the contour lines is an example. Obviously, an arbitrary color combination can be used.

The invention is not limited to the configuration of separating all of the luminance distribution of the reception light signal by colors, but only a designated range may be separated by colors. In place of or in addition to the coloring, patterns of different hatchings, dots, and the like can be added. By the patterns, the luminance distribution of the reception light image can be visually grasped more easily.

Figure 75:
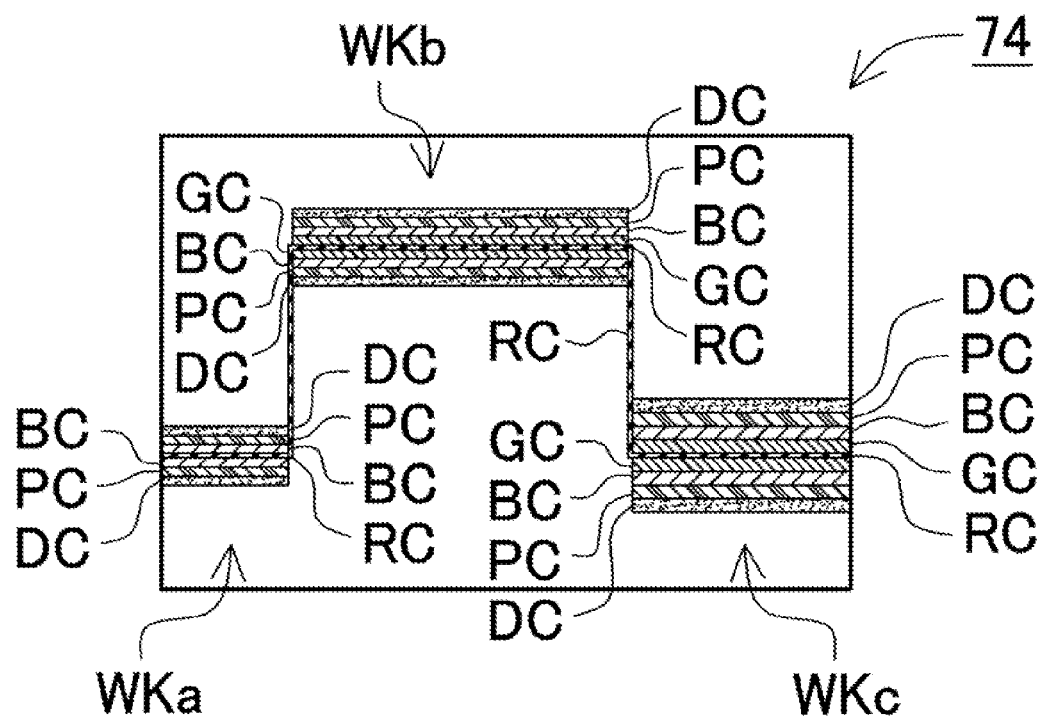
FIG. 75 is an image diagram showing a display state where a profile shape is overlapped on the reception light image subjected to the coloring process.

Further, in a case where a plurality of beams are received in the light sectioning method, although a reception light image is displayed on the display unit, a part which is being measured is not easily found. Consequently, as shown in FIG. 75, by superimposing the profile shape on the reception light image subjected to the coloring process of the reception light image coloring means, the position in the reception light distribution which is being detected can be visually recognized more easily. In the example of FIG. 75, a profile shape is displayed in red color RC on the reception light image display area 74 shown in FIG. 74. Specifically, the portion WKa on the reception light image display area 74 has seven areas colored in, from top, the orange color DC, purple color PC, blue color BC, red color RC, blue color BC, purple color PC, and orange color DC. The portion WKb has nine areas colored in, from top, the orange color DC, purple color PC, blue color BC, green color GC, red color RC, green color GC, blue color BC, purple color PC, and orange color DC. Further, the portion WKc has nine areas colored in, from top, orange color DC, purple color PC, blue color BC, green color GC, red color RC, green color GC, blue color BC, purple color PC, and orange color DC.

Trend Graph

Figure 76:
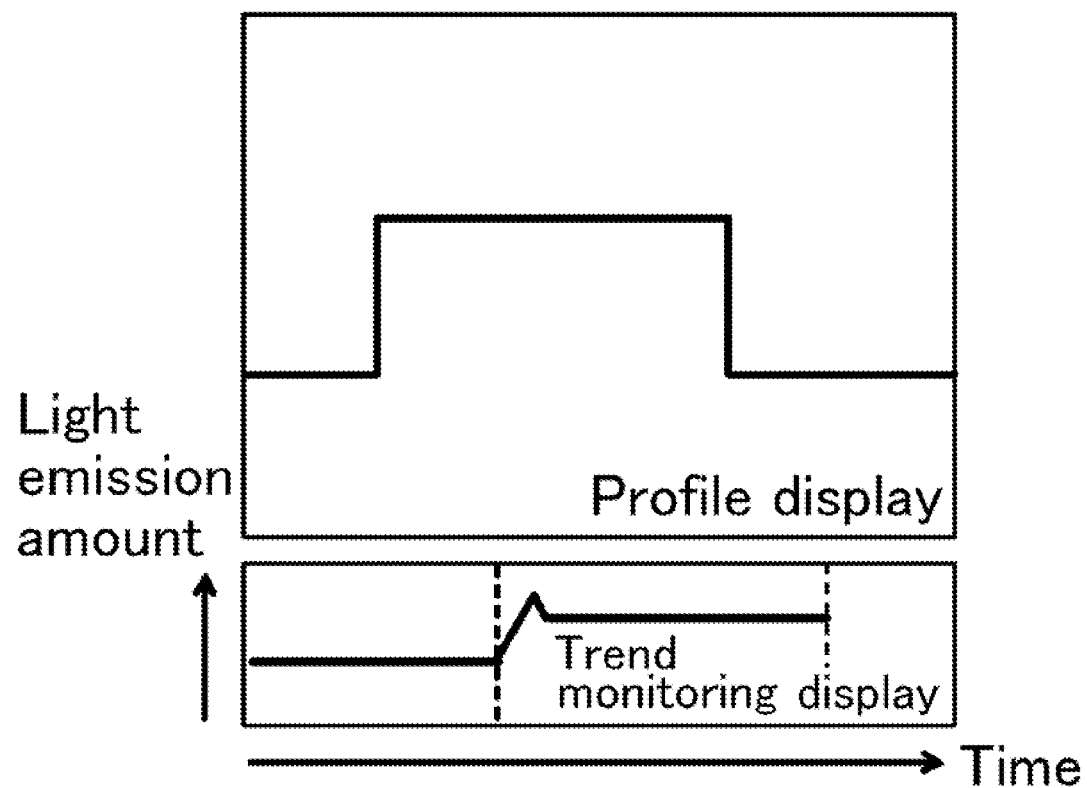
FIG. 76 is an image diagram showing a display unit provided with a trend graph display area.

The display unit may have, in addition to the profile display area for displaying a profile shape, a trend graph display area for displaying a trend graph indicative of a change with time of a light emission amount of the projector or a reception light amount of the two-dimensional light receiving unit. FIG. 76 shows a display example of the display unit. In an upper part, the profile display area is provided to display a profile shape generated at the latest time. In a lower part, the trend graph display area is provided to display a trend graph. In the example, the trend graph display area is provided by dividing one screen of the display unit, so that the profile shape and the trend graph can be simultaneously recognized in the one screen. It is also possible to provide a trend monitor screen for displaying a trend graph separately from the display unit for displaying the profile shape.

The trend graph realizes the trend recording function of recording a time-series change by using the horizontal axis as a time base. The vertical axis of the trend graph is not limited to the light emission amount or the light reception amount but may indicate an operation amount which is feedback-controlled such as a change in the amplification factor of the amplifier, or a measurement value to be controlled. The threshold for determining the presence or absence of occurrence of an error may be also displayed so as to be superimposed on the trend graph.

Time Designating Means

Further, by time designating means for designating time on the trend graph display area, the profile shape at a designated time can be displayed in the profile display area. When a different time is designated by operating the time designating means, the profile display area is switched to display a profile shape at the newly designated time. By making the trend graph display area and the profile display area associated with each other, a more convenient operation environment is realized. In the example of FIG. 76, predetermined time is directly designated on the trend graph with a pointing device such as a mouse as the time designating means. The designated time is displayed by a broken line perpendicular to the horizontal axis. The user can recognize the time of imaging the profile shape currently displayed in the profile display area on the trend graph. The time may be easily changed by adjusting the position of the broken line by operating the mouse.

The trend graph and the profile shape are stored together with acquisition time information into the memory. The profile shape measured at the time designated by the time designating means (or time around the designated time) is read from the memory and developed into the profile display area.

Alarm Generation Period Display Function

Figure 77:
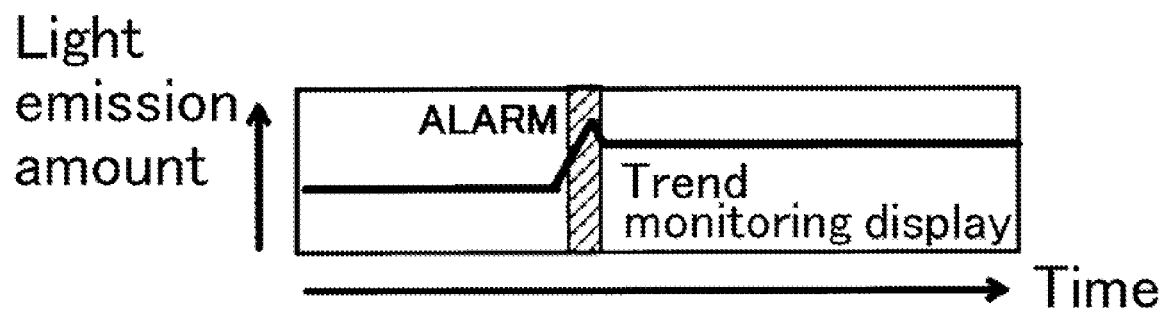
FIG. 77 is an image diagram showing a state where an alarm occurrence period is displayed on the trend graph.

Such a trend graph is suitable for a monitoring work for monitoring the state of feedback control on the light emission amount and the reception light amount and can be suitably used for, particularly, finding out the cause of occurrence of an error, observation of an effect of improvement in the procedure, and the like. With reference to the trend graph visualized, the alarm generation timing is specified, the cause is analyzed and, also after a measure is taken, whether the measure is effective or not can be recognized. For example, referring to FIG. 76, a measure will be considered against the case where the reflectance sharply changes due to the presence or absence of a work, the feedback control cannot instantaneously address the change, the light emission amount suddenly increases, and an error occurs. First, the user recognizes the occurrence position of the error with reference to the trend graph. As shown in FIG. 77, by displaying the alarm generation period on the trend graph, the user can promptly grasp the occurrence position of the error.

Alarm Detecting Function

An alarm signal is generated by the alarm detecting means. For example, when the feedback control is performed by the reception light level control means, if the operation amount or the reception light amount exceeds a predetermined threshold, the alarm detecting means outputs an alarm signal. When the alarm detecting means outputs an alarm signal, the alarm signal generation period is stored in the memory. At the time of displaying the trend graph, the alarm generation period is read from the memory, and the trend graph generating means automatically highlight-displays the alarm generation period on the time base of the trend graph, and displays it in the trend graph display area. The highlight display is performed by coloring the alarm generation period in a band shape as shown in FIG. 77. Various methods for discriminating the alarm generation period from the other periods can be also employed by hatching, inversion display, or blinking, or by making thickness, color, or line kind of the line of the trend graph in the alarm generation period different from that of the other periods. By any of the methods, the user can promptly discriminate the alarm generation period from the other periods on the trend graph, so that the timing of an occurrence of a problem can be promptly grasped. The user analyzes the trend graph and performs a work of adjusting an operation amount of feedback control to shorten the alarm generation period.

Figure 78:
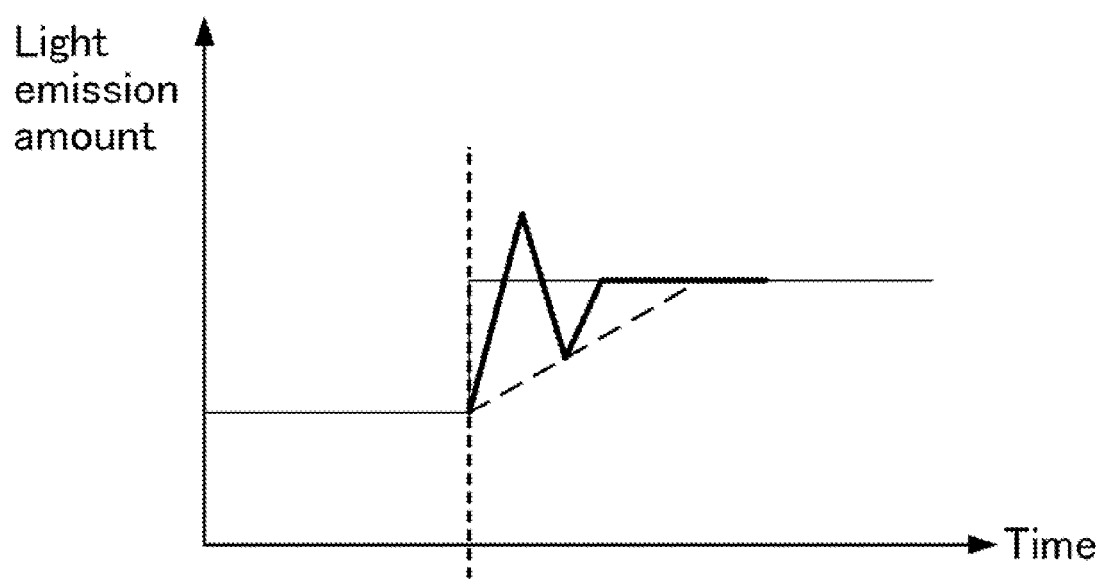
FIG. 78 is an image diagram showing a state where the gain is adjusted so as to avoid occurrence of overshooting on the trend graph.

After taking a necessary measure, the effect can be observed on the trend graph. In the example of FIG. 78, by gradually increasing the light emission amount of the projector as shown by the broken line so as to prevent occurrence of overshooting of the light emission amount in a part where the moving work enters an area to be measured, the light emission amount can be set so as not to exceed the threshold. After making such a setting, the work is actually loaded and the user can confirm by referring to the trend graph that the system can accurately operate without occurrence of an error. As necessary, resetting of the fine adjustment of the light emission amount and the like can be also made. By referring to the trend graph, the user can also easily confirm whether the result of the resetting is correctly reflected or not. As described above, by observing a response to the feedback control using the trend graph, the operation amount of the feedback control is adjusted, and adjustment according to the use environment such as reflectance and approaching speed of a work can be made. In the work, by enabling the alarm generation period to be superimposed on the trend graph, the workability of the measure against the occurrence of the error is improved and, further, it becomes convenient for the user to check the presence or absence of the occurrence of the error after setting. Thus, it improves usability.

Figure 79:
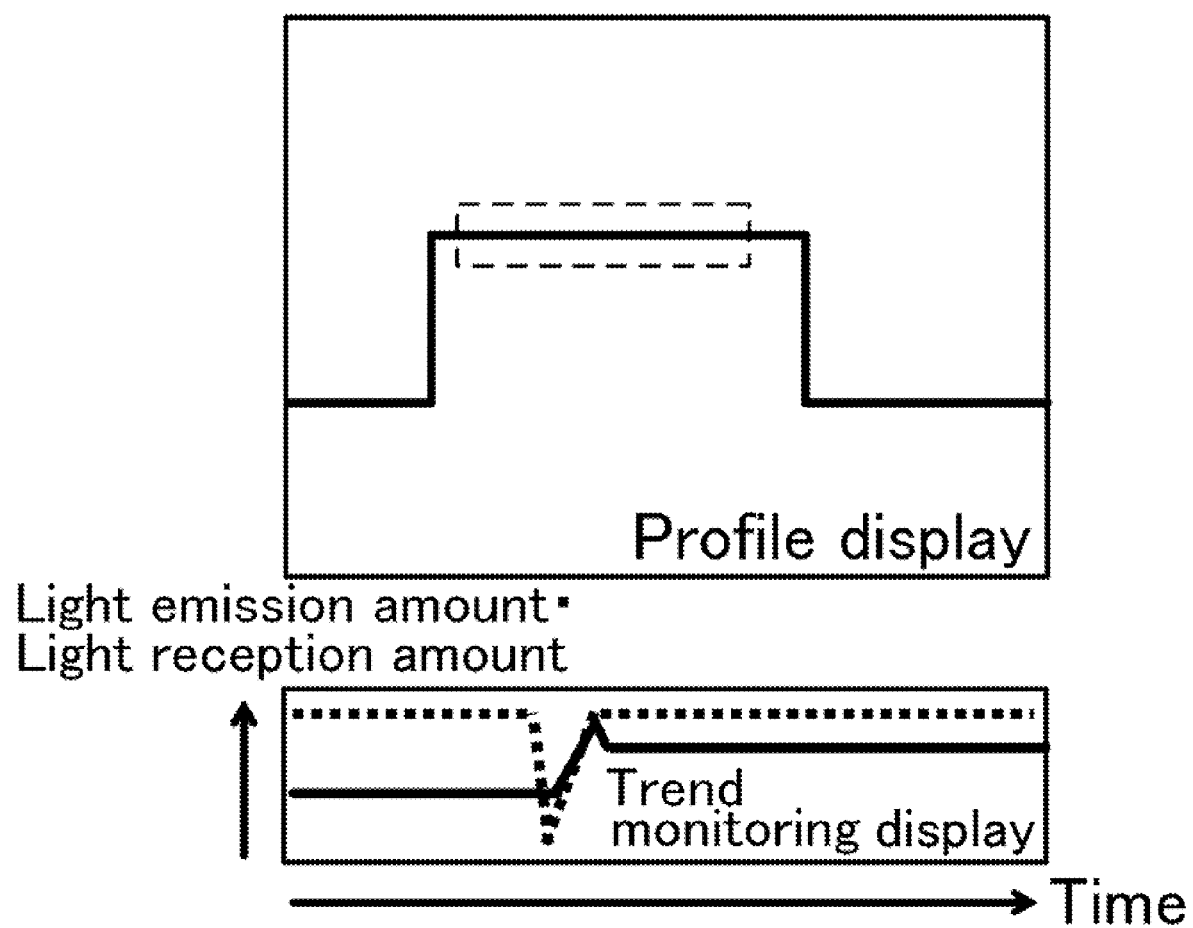
FIG. 79 is an image diagram showing a trend graph simultaneously displaying the light emission amount and the light reception amount.

Function of Concurrently Displaying Reception Light Amount and Light Emission Amount As described above, the vertical axis of the trend graph is not limited to the light emission amount but can indicate the reception light amount, both of the light generation amount and the reception light amount, or the like. FIG. 79 shows an example of the trend graph showing both the light emission amount and the reception light amount simultaneously. In the example of the trend graph of FIG. 79, the light emission amount is expressed by the solid line, and the reception light amount is indicated by the broken line. In the feedback control, the light emission amount changes in correspondence with a change in the reception light amount. Consequently, not only the light emission amount but also the reception light amount can be displayed. It contributes to the entire analysis.

Measurement Area Designating Function

Further, a measurement area is designated by the measurement area designating means in the profile shape displayed in the profile display area, and the average, peak value, and the like of the reception light amount in the designated measurement area can be computed by the measurement processor and displayed. In the example of FIG. 79, a desired area is surrounded by a rectangular frame to designate a measurement area on the profile shape with a pointing device such as a mouse as the measurement area designating means. A peak light amount and an average light amount in the designated measurement area can be displayed in the trend graph display area. The profile display area and the trend graph display area are associated with each other as described above. A profile shape at a time designated by the time designating means on the trend graph display area is displayed in the profile display area. On the contrary, a light emission amount and a reception light amount of the measurement area designated by the measurement area designating means on the profile display area can be displayed as a trend graph in the trend graph display area.

Measurement Value Display Function

Figure 80:
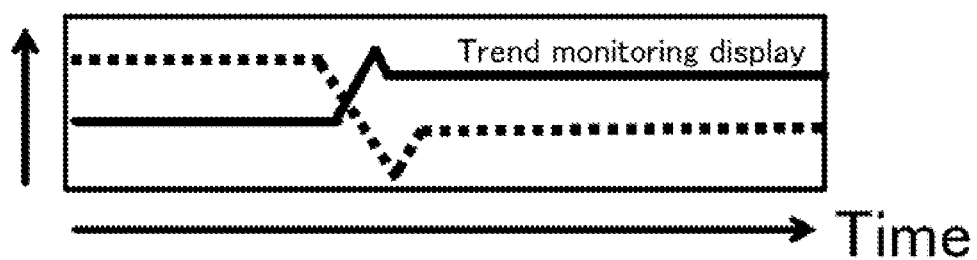
FIG. 80 is an image diagram showing a state where an average value of measurement values is displayed in the trend graph.

The object displayed in the trend graph is not limited to the light emission amount and the reception light amount, but a measurement value can be also displayed. The measurement value to be subjected to the feedback control is directly displayed in time series, so that the user can directly recognize that the control result is accurately obtained. FIG. 80 shows an example of displaying an average value of the measurement values in the trend graph. The user can adjust the operation amount of the feedback to shorten the period in which an alarm is generated or the period in which the measurement value is unstable while directly recognizing the measurement value. The user can also recognize a measurement value after the adjustment in the trend graph again and perform fine adjustment. By displaying a measurement value on the trend graph as described above, a result of adjustment of the operation amount of the feedback control can be easily recognized. A trend graph before adjustment and a trend graph after adjustment may be superimposed on the trend graph display area. In this case, the adjustment of the operation amount and the result in which the adjustment is actually reflected can be compared with each other more easily. As the operation amount, the amplification factor of the amplifier, the light emission amount, the reception light amount, and the like may be also superimposed on the measurement value.

Association Between Profile Data Storage Function and Trend Graph

Figure 81A:
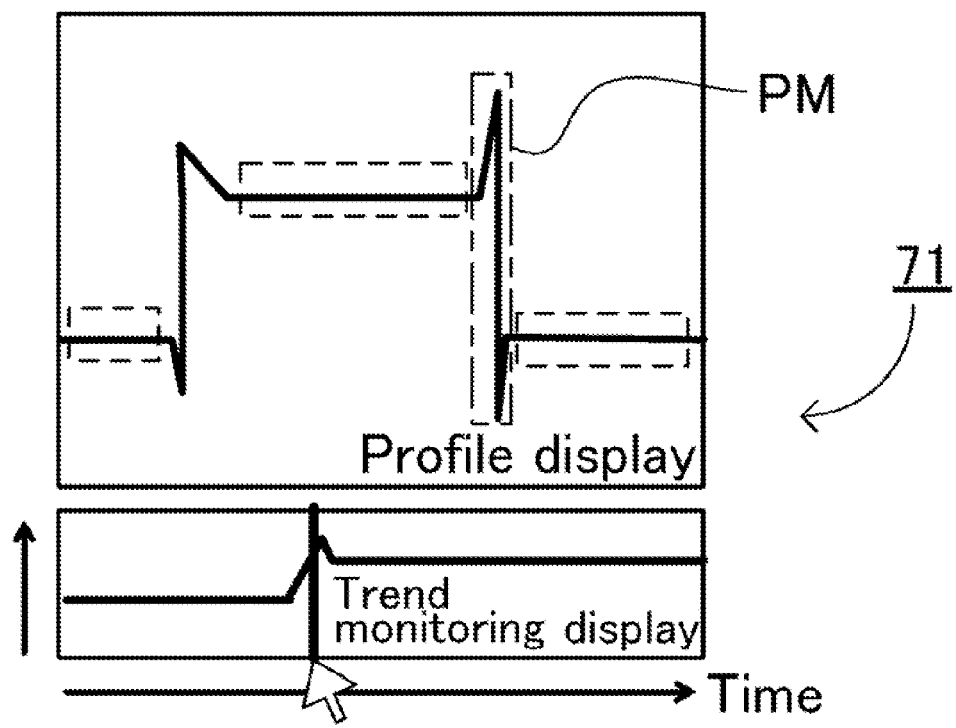
FIGS. 81A and 81B are image diagrams showing a state where a profile data storage function and a trend graph are associated with each other.
Figure 81B:
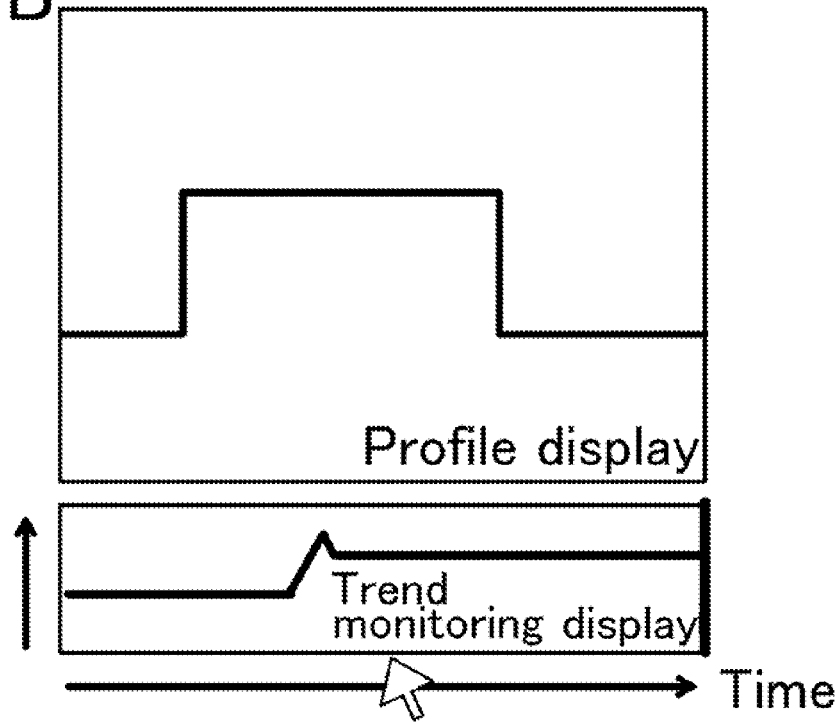

Further, the trend graph function can be linked to a profile data storage function of storing the profile data described above into a profile data storage area in the memory. With the configuration, by the time designating means for designating time on the trend graph display area, a profile shape at the designated time can be displayed in the profile display area. When a different time is designated by operating the operation designating means, the profile display area is switched to display a profile shape at the newly designated time. In such a manner, by associating the trend graph display area and the profile display area with each other, a more convenient operation environment is realized. In the example of FIGS. 81A and 81B, as the time designating means, a thin line (red) perpendicular to the horizontal axis of the trend graph is displayed. With the pointing device such as a mouse, the time designating means is operated to directly designate a predetermined time. A profile shape at the time indicated by the thin line of the time designating means is called from the memory and displayed in the profile display area. The user can recognize the time of imaging the profile shape on the trend graph. By operating the mouse to adjust the position of the thin line, the time can be easily changed.

To realize the profile data storage function, the trend graph and the profile shape are stored together with information of the acquisition time in the memory. A profile shape measured at a time designated by the time designating means (or time close to the designated time) is read from the memory and developed in the profile display area. In the example of FIGS. 81A and 81B, the time designating means is positioned at the right end (present time) in FIG. 81B. In the upper profile display area, the profile shape at the present time is displayed. As shown in FIG. 81A, by moving the time designating means to the right side with the mouse, the profile shape is also changed to an image at the designated time (the profile shape at the time point of occurrence of the alarm).

By combining the profile data storage function of storing the profile shape and the trend monitor display function as described above, when past time is designated, a profile shape obtained at the time can be referred to. At the time of measuring the work by the measurement processor, a proper measure can be taken in consideration of stability of the profile waveform and the like. For example, in a case where the reception light amount shows abnormality on the trend graph as shown in FIG. 81A, when a profile shape is displayed in the area (or in the alarm occurrence period), partial unstability can be recognized. Such an unstable area causes a measurement error of a work. It is consequently preferable to perform a measurement in a range including no unstable area in order to stably measure the height or the like of the work.

Control Area Designating Function

With the control area designating means, a control area to be subjected to feedback control is designated in the profile display area. Preferably, the control area is set as long as wide in the range including no unstable area. In the example of FIG. 81A, a frame-shaped control area is designated in each of a total of three portions; the apex portion as a flat area in a projected profile waveform and right and left fringe portions. As a result, the feedback control of the reception light data control unit is performed in an area in which a stable profile is obtained. Consequently, unstable areas are eliminated, more accurate feedback control result is obtained, and the work is measured accurately by the measurement processor.

Mask Area Designating Function

On the contrary, a profile mask area which is not subject to the feedback control can be also designated. In this case, the mask area designating means 86 designates a profile mask area PM which is not subject to the feedback control in the profile display area 71. In the example of FIG. 81A, an unstable area in the profile shape is designated as a frame-shaped profile mask area PM indicated by an alternate long and short dash line. At the time of feedback control, the measurement value of the profile mask area PM is ignored. Consequently, an accurate feedback control result obtained by eliminating the unstable area can be obtained, and stable and reliable control and measurement is realized. Either the control area designating function or the mask area designating function may be set or both of the functions may be simultaneously used as shown in FIG. 81A.

Sample Trigger

Sampling designating means capable of designating timings of recording a profile shape in the memory and/or the number of pieces of profile shapes can be also provided. Consequently, a predetermined number of images captured at the sampling intervals designated by the sampling designating means can be stored, or a predetermined period or a predetermined number of images can be stored on the basis of a sampling trigger. By limiting the number of profile shapes recorded in the memory, it becomes unnecessary to unlimitedly record a large amount of image data, and the memory amount can be reduced. It is also possible to set to overwrite old image data.

Figure 82:
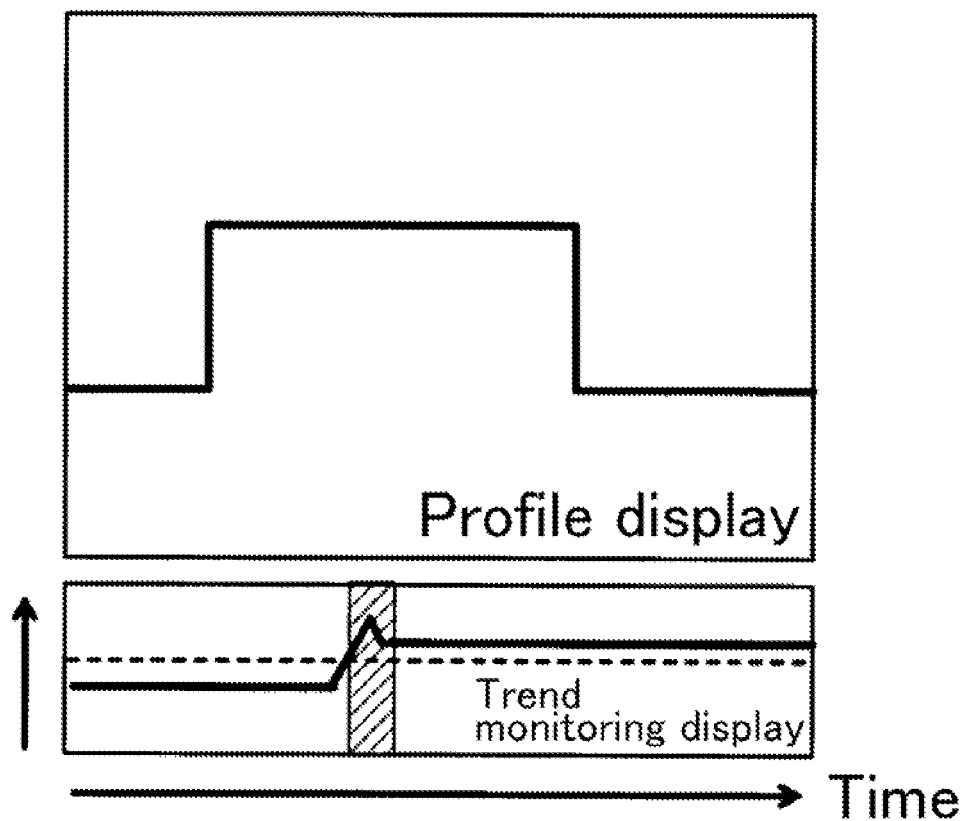
FIG. 82 is an image diagram showing a state where a trigger level is displayed in the trend graph display area.

The sampling trigger is designated by the user with sampling designating means. For example, the user sets such that a sampling trigger is generated when a measurement value, a projected light amount, a reception light amount, or the like becomes larger or smaller than a predetermined threshold (trigger level). In the example of FIG. 82, the trend graph (solid line) of the reception light amount and the trigger level (broken line) are displayed and overlap in the trend graph display area. When the reception light amount exceeds the trigger level, the sampling trigger is generated, and profile shapes for a predetermined period (trigger generation period which is hatched) after the generation of the trigger are obtained and stored in the memory. By limiting the profile shape storing period to time of occurrence of abnormal state that the measurement value, projected light amount, reception light amount, or the like exceeds the predetermined threshold, only data to be referred to is efficiently collected and used. Thus, the memory amount can be effectively utilized.

Multiple Composition

The example of capturing reception light images under different multiple composition conditions or timings has been described. To obtain a clearer reception light image, multiple composition for capturing a plurality of uncomposed images as reception light images and composing them can be also employed. In the multiple composition, however, the imaging operation has to be performed a plurality of times, and there is a problem in that it takes time to generate a composite image. Conventionally, the time or range of the multiple composition cannot be set. In the first place, an interface by which the multiple composition condition of performing the multiple composition can be flexibly set was not provided. It seems that the user can set a more appropriate multiple composition condition by making a setting item adjustable while confirming a finish state of a reception light image obtained by the multiple composition. In the embodiment, by limiting the range and area of multiple composition, useless imaging is prevented and efficiency improves. While shortening the imaging time, a higher-precision reception light image can be obtained. This state will be described with reference to FIGS. 83 to 85.

Figure 83:
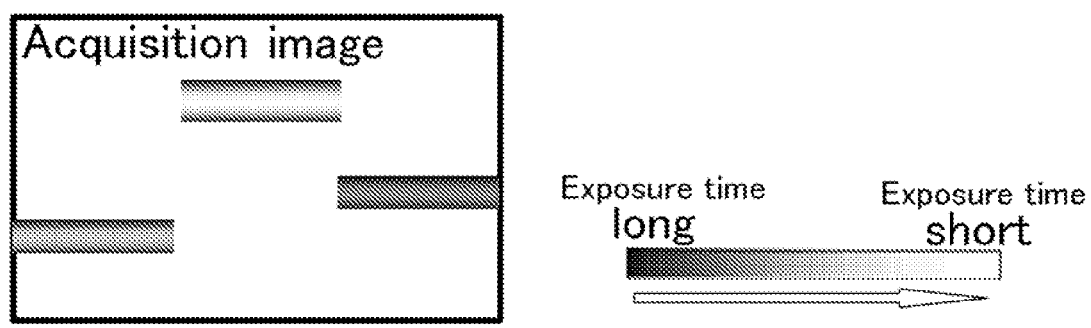
FIG. 83 is an image diagram showing a composite image obtained by performing multiple composition on the basis of a plurality of uncomposed images.

FIG. 83 shows an example of performing the multiple composition in the whole range. As a multiple composition parameter which is changed, the exposure time of the two-dimensional light receiving device is changed step by step. As shown in the example of FIG. 83, in a case where a screen includes a part in which reflectance is very high (called "light part" in upper center in FIG. 83), a part in which reflectance is very low (called "dark part" in left lower part in FIG. 83), and a part in which the reflectance is intermediate (right center in FIG. 83), it is necessary to capture uncomposed images while changing from the light part to the dark part and perform multiple composition. As shown in FIG. 83, a plurality of uncomposed images have to be captured in a wide range while changing the exposure time step by step in the whole range. By the operation, even when a screen includes parts in a wide range of tone such as a work having variations of reflectance, it can be recognized as a single reception light image.

Figure 84:
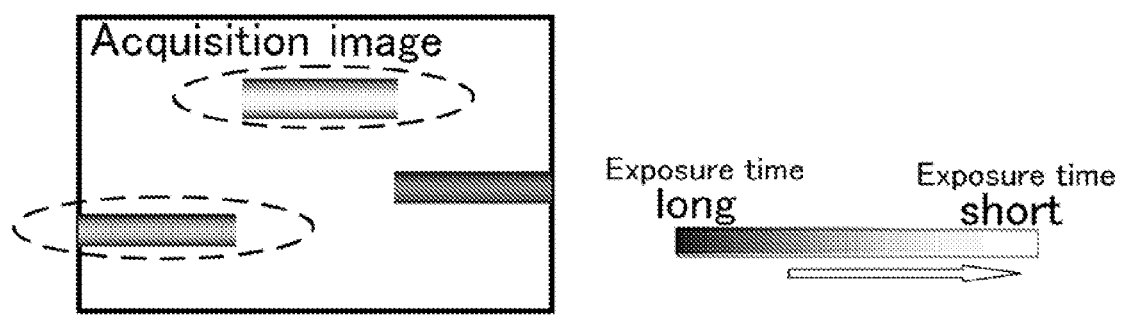
FIG. 84 is an image diagram showing a composite image obtained by eliminating dark parts.

On the other hand, the number of imaging capturing times can be decreased depending on works to be imaged. For example, even for works of different degrees of reflectance, in a case where the degree is low or a few distributions of reflectance clearly different from each other exist (as an example, in a case where there are two kinds of works, light works and dark works, and no intermediate work exists), only by performing limited imaging on uncomposed images (for example, imaging performed once for the light part and once for dark part), a necessary, sufficient multiple-composite image can be obtained. As a result, the measuring time is shortened, and the efficiency of the multiple composition process is improved. FIG. 84 shows such an example. In FIG. 84, in the case such that it is unnecessary to measure a very dark part or a very dark part is not included in an image, capturing of uncomposed images in such a range can be omitted. As a result, the number of steps to change the exposure time can be reduced, so that a measurement can be performed at higher speed.

Multiple Composition Range Limiting Means 88

In the example of FIG. 84, the range of changing the exposure time is displayed in a gauge. By operating the gauge, a range in which exposure time is unchanged, that is, uncomposed image are not captured can be designated. The gauge serves as the multiple composition range limiting means 88. By the gauge, the multiple composition range of actually changing exposure time can be designated.

The gauge designates the start position and the end position of the multiple composition range. For example, an arrow indicative of the start position and an arrow indicative of the end position are adjusted slidably. The length of the gauge can be directly changed or adjusted with a slider. In the example of FIG. 83, the multiple composition range is designated by the expandable arrow.

In the example, the gauge shows the range of changing the exposure time. The longer the exposure time is, the more it is preferable to detect a dark part. The shorter the exposure time, the more it is preferable to detect a light part. To show the phenomenon, the luminance of a pixel actually obtained is also displayed together with the exposure time. The user can therefore visually grasp the luminance of a pixel to be recorded so that the user can sensuously perform the adjusting work. In the example, as a parameter changed under the multiple composition condition, the exposure time of the two-dimensional light receiving device (time width from exposure start time to exposure end time of the CCD as the two-dimensional light receiving device) is adjusted. The exposure time can be also adjusted by shutter speed, aperture, or the like. The other parameters such as the light emission amount and the light emission time (radiation light amount or light emission output) of the light emitting device, the amplification factor (gain) and the light emission time of the amplifier, the light receiving characteristic such as the logarithm characteristic, the input amount of the projector, and luminance of an obtained reception light image may be adjusted singularly or in combination.

Further, the multiple composition condition can be also designated by luminance of a reception light image obtained as a result. Concretely, when the user designates the termination values (initial and end values) of the desired range of luminance, adjustment is performed by using a single parameter or combination of parameters to obtain the designated luminance. In the method, the user can designate the range on the basis of desired luminance without understanding the meaning of the parameter(s), and the optical displacement meter automatically sets the parameter(s) to obtain the designated luminance. Thus, the setting is easy for the user, and particularly suitable for a beginner.

At the time of composition of multiple composition images, first, uncomposed images are captured while changing the parameter by predetermined width within the designated range. The change width may be designated by the optical displacement meter or the user. For example, when the exposure time is designated, the initial value and the change width of the exposure time are designated by the multiple composition range limiting means 88. With the designated multiple composition parameters, uncomposed images are captured. The number of imaging times or the desired number of uncomposed images can be designated by the multiple composition range limiting means 88. In this case, the time interval is automatically computed from the termination values of the range so that the necessary number of uncomposed images are captured in the designated range. Uncomposed images can be also captured by setting the time width uniformly in the whole target range without limiting the range. The method can also reduce the uncomposed image capturing process.

Figure 85:
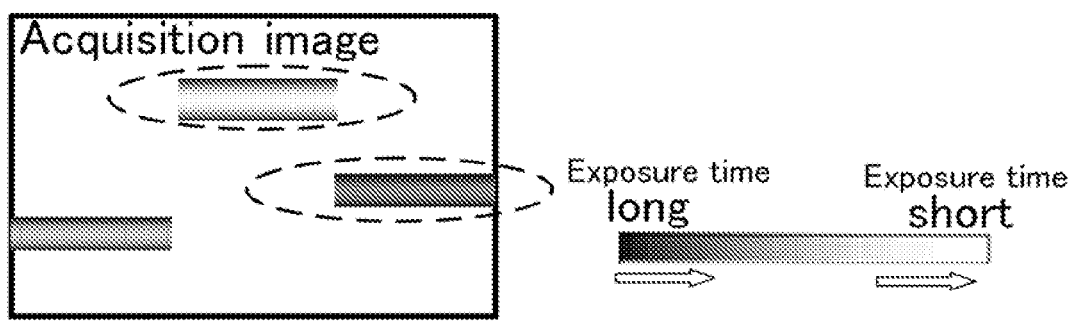
FIG. 85 is an image diagram showing a composite image in which a plurality of multiple composition ranges are designated.

The multiple composition range limiting means 88 can also designate a plurality of multiple composition ranges for performing multiple composition within a target range. FIG. 85 shows an example of the application in which it is sufficient to measure only two points of a very dark part and a very light part included in a reception light image. In this case, as shown in FIG. 85, two multiple composite ranges are designated by using two expandable arrows. Consequently, acquisition of composite images of an intermediate part can be omitted, and the measurement time can be shortened as a whole.

Trackback Function

Figure 86:
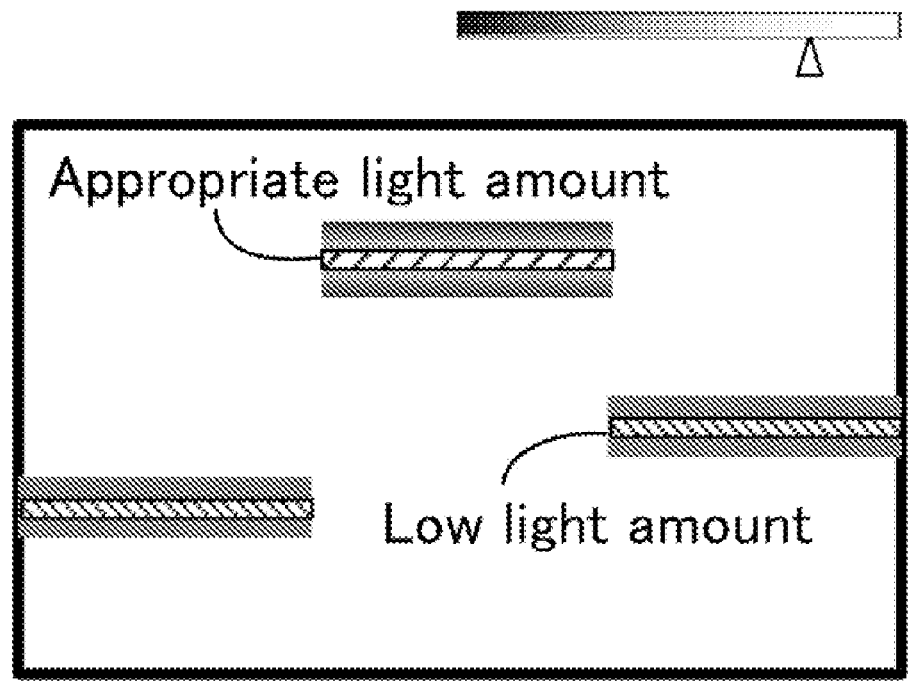
FIG. 86 is an image diagram showing a state where an uncomposed image already captured is read by a trackback function.

Further, by using the profile storage function, an arbitrary uncomposed image already captured can be displayed. First, as shown in FIG. 86, uncomposed images are captured in the whole target range or a multiple composition range designated by the multiple range limiting means 88, and multiple composition is performed. All of uncomposed image data captured is stored in an uncomposed image memory so as to be associated with the imaging parameters. The multiple composition parameter is designated by the uncomposed image selecting means 89, and uncomposed images can be read and displayed on the display unit. The uncomposed image selecting means 89 takes the form of, for example, a slide bar. With an arrow, the multiple composition parameter is designated. The user can therefore intuitively instruct and adjust the multiple composition parameter. Particularly, with the slide bar, the parameter can be changed continuously. The slide bar has therefore high operability. Obviously, the multiple composition parameter may be directly designated by a numerical value. The multiple composition parameter to be designated is not limited to the exposure time of the two-dimensional light receiving device employed in the foregoing embodiment but may be another parameter such as the light emission amount of the light emitting device, time at which the uncomposed image is captured, or the like. In such a manner, a desired uncomposed image is called by the uncomposed image selecting means 89 from uncomposed images captured in the past and displayed on the display unit. Further, when the image capturing parameter including the capturing time is changed by the uncomposed image selecting means 89, in response to the change, the uncomposed image on the display unit is sequentially updated. The user can easily grasp changes on the display unit.

Further, by using the function of displaying the contours of a reception light image, the function of displaying coloring of profile shapes, a line bright waveform display function, or the like, whether the light amount is properly obtained or not can be visually recognized.

Partial Storage

Although the example of storing all of the uncomposed images captured in the whole target range has been described above, only part of the uncomposed images may be stored. For example, uncomposed images are captured, and a multiple composite image is generated from the captured images. After that, only representative uncomposed images are extracted from the used uncomposed images and stored in the uncomposed image storing means 92. Examples of the extraction include a method of extracting uncomposed images at certain intervals such as every five or ten images, a method of extracting only images corresponding to representative values of exposure time, and a method of extracting images at predetermined timings based on triggers. By limiting the uncomposed images to be stored, the necessary data capacity is suppressed, and hardware resources can be utilized efficiently. Another method can be also employed. Data in important areas such as a range of a large change amount is selectively stored. With respect to the other ranges, a small amount of data or no data is stored. In such a manner, storage with weighting or selective storage can be performed. Such weighting can be realized by the user who manually designates a region whose data is selectively stored or a method of automatically detecting a change amount by the optical displacement meter and automatically extracting an area of a large change. In this example as well, various highlight display methods such as display by color in accordance with the light amount can be applied. Further, the range of changing the exposure time can be also limited. Obviously, it is unnecessary to obtain a composite image by using all of the uncomposed images stored or to display uncomposed images on the display unit, but only part of the images may be used or displayed.

Thumbnail Display

Figure 87:
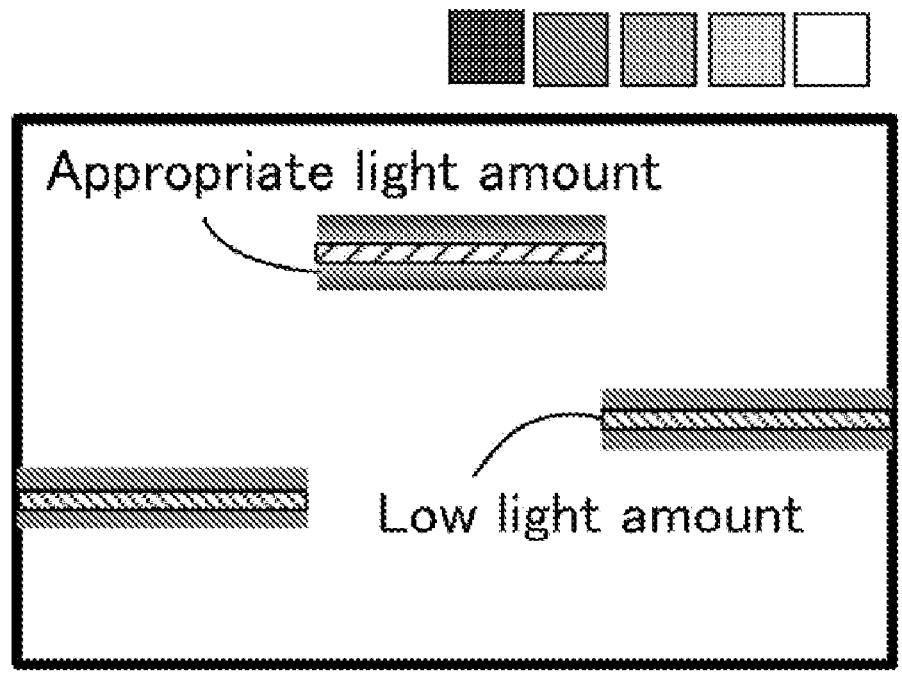
FIG. 87 is an image diagram showing a state where a list of uncomposed images is displayed and the already captured image is read.

The stored uncomposed images may be called not only by selection with the slide bar but also by a configuration of displaying a list of uncomposed images to be selected so that the user can select it as shown in FIG. 87. In the example, reduced images of the uncomposed images are displayed above the screen. The user selects a desired uncomposed image from the displayed images, thereby enabling the selected uncomposed image to be displayed on the display unit. When the number of pieces of image data to be selected is small, the images are displayed like buttons, and the user is allowed to select any of the buttons. The reduced image is expressed with the imaging parameter of luminance or exposure time. Consequently, the user can visually grasp the imaging parameter even from the small image. In particular, by displaying a plurality of reduced images, the images can be easily compared with each other, and high visibility and operability is realized.

Figure 88:
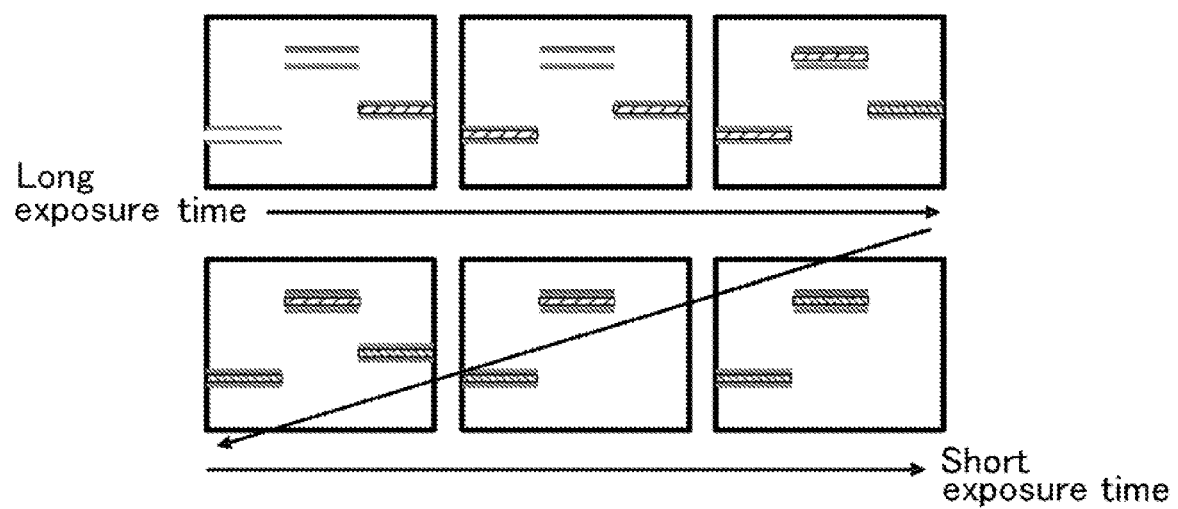
FIG. 88 is an image diagram showing a state where a plurality of uncomposed images are arranged and displayed.

As the reduced images, thumbnail images obtained by reducing the uncomposed images may be used. When thumbnail images are displayed in the state of FIG. 87, the images may be too small to be easily seen. Preferably, a plurality of uncomposed images are arranged and displayed in the whole display unit as shown in FIG. 88. In the example of FIG. 88, the left upper image is obtained with the longest exposure time, and the exposure time becomes shorter to the right. The left lower image follows the right upper image. The right lower image is obtained with the shortest exposure time. In such a manner, a list of uncomposed images can be displayed. The user can select a desired image while comparing the imaging parameters. In this example as well, various highlight display methods such as display by color in accordance with the light amount can be applied.

Real-Time Display of Multiple Composite Image

Figure 89A:
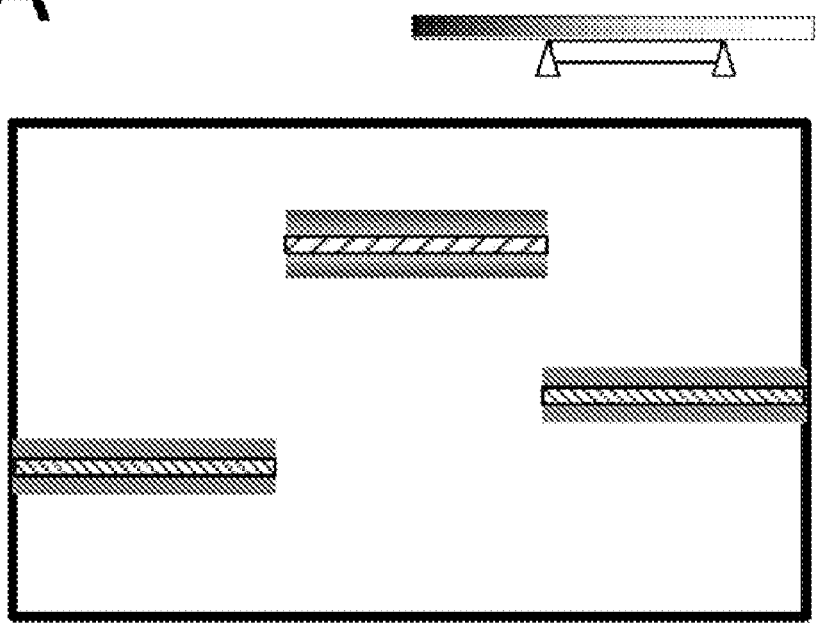
FIGS. 89A and 89B are image diagrams showing a state where a multiple-composition image is real-time displayed.
Figure 89B:
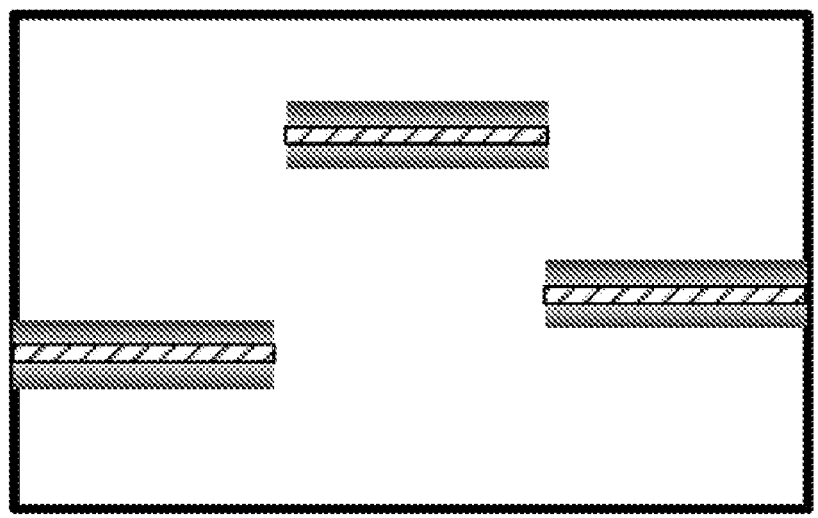

As described above, the user selects a parameter and a range of an uncomposed image adapted to generation of a multiple composite image while seeing uncomposed images, resets the multiple composite parameter, and performs multiple composition. To facilitate the work, the multiple composite image can be displayed in a real-time manner on the display unit in accordance with resetting of the multiple composite parameter. FIGS. 89A and 89B show an example of the real-time display of the multiple composite image. FIG. 89A shows a state where a composite image is generated in the multiple composite range of exposure time designated with a slide bar above the right part of the display area, and displayed on the display unit. When the user examines the light amount with reference to the state and adjusts again the exposure range with the slide bar, the multiple composite image displayed on the display unit is updated as shown in FIG. 89B. Since the multiple composite image can be displayed according to the multiple composition parameter which is set at present, the user can easily adjust the setting of the range and parameter of the multiple composition. In this case as well, various highlight display methods such as display by color in accordance with the light amount can be applied. To smoothly perform the real-time updating of the multiple composite image, image data stored in the uncomposed image storing means 92 is used as the uncomposed image. It enables real-time updating, so that a smooth setting work can be made.

Designation of Multiple Composition Area

Figure 90:
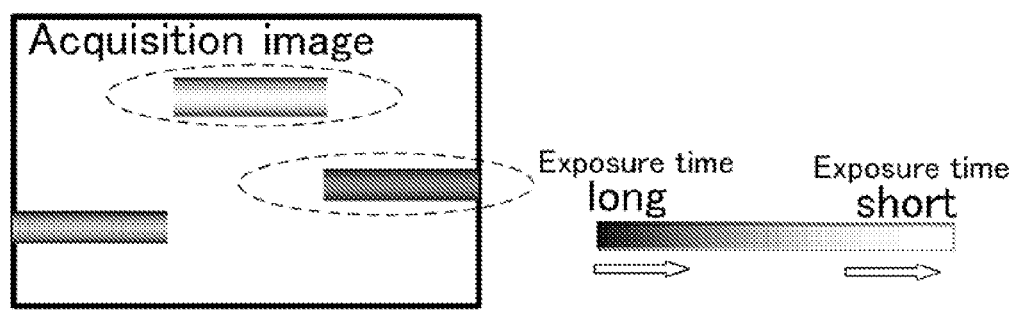
FIG. 90 is an image diagram showing a state of regulating a multiple-composition area for performing multiple composition.

The example of performing the multiple composition using all of areas displayed on the display area has been described. On the other hand, multiple composition can be performed only in a limited area in an image. By reducing a multiple composition area in which the multiple composition is performed, the data size of an image is reduced and, further, the speed of the multiple composition process can be increased. The example will be described with reference to FIGS. 90 and 91. In the example of FIG. 90, in a manner similar to FIG. 85 and the like, a reception light image includes a very light part (an upper center part in FIG. 90), a very dark part (a lower right part), and an intermediate part (a lower left part). An application in which it is sufficient to perform measurement only in the very light part and the dark part will be considered. In this case, by using the multiple composition range limiting means 88, two multiple composition ranges for performing multiple composition are set from target ranges. Specifically, a range in which exposure time is relative long (multiple composition range 1) corresponding to the very dark part and a range in which exposure time is relatively short (multiple composition range 2) corresponding to the very light part are set.

Figure 91:
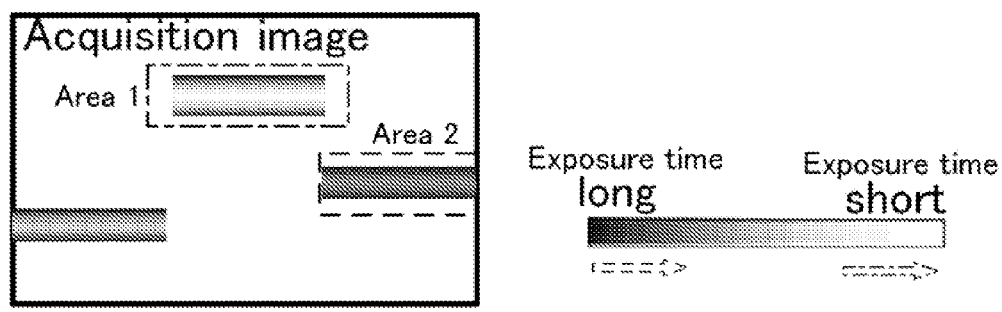
FIG. 91 is an image diagram showing a state of regulating the multiple-composition area for performing multiple composition.

Simultaneously, in each of the multiple composition ranges, a reception light image is not captured in the whole area, but an imaging range is limited and assigned. In this example, as shown in FIG. 91, an area to be subject to imaging in the multiple composition range 1, that is, the very dark area in the reception light image is designated by the multiple composite area limiting means. With the pointing device, the applicable multiple composite area 1 is designated in the reception light image and associated with the multiple composite range 1. Similarly, as the multiple composite area 2 corresponding to the multiple composite range 2, a very light area in the reception light image is designated by the multiple composite area limiting means and assigned as the multiple composite range 2. In such a manner, the multiple composite area is assigned on the multiple composite range unit basis. A reception light image is captured, and a multiple composite image is generated by the multiple composing means 69. By limiting not only the range of the exposure time but also the area in which imaging is actually performed, the data amount of an image to be captured can be reduced, and the amount of data to be processed is reduced. Thus, the load on the process can be reduced, and the processing speed can be increased.

In the above example, the procedure is employed in which a plurality of multiple composite ranges are designated by the multiple composition range limiting means 88, after that, a multiple composite area is designated by using the multiple composite area limiting means, and the multiple composite area is assigned for each of the multiple composition ranges. The invention is not limited to the procedure. For example, a plurality of multiple composite areas are designated by using the multiple composition area limiting means and, after that, the multiple composition ranges are designated and assigned to each of the multiple composition areas by using the multiple composition range limiting means 88. The multiple composition areas and the multiple composition ranges may be designated in a lump and, after that, assigned. A work of designating one multiple composition range and, after that, designating and assigning the applicable multiple composition area may be repeated.

By increasing the speed of the multiple composition in any of the methods, the method can be also sufficiently applied to real-time process and also to applications requiring immediacy such as an inline process.

Light Receiving Characteristic Adjusting Function

Figure 110:
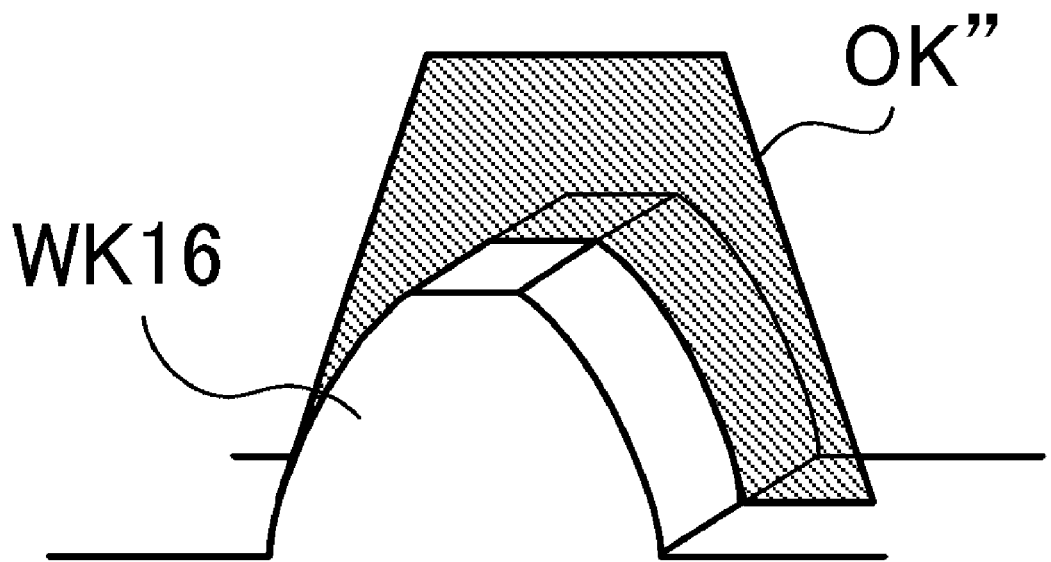
FIG. 110 is a perspective view showing an example of a work in which a reflection light amount varies according to its parts.
Figure 111A:
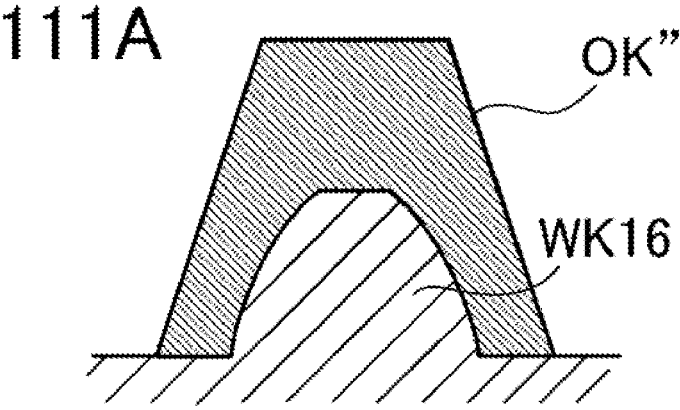
FIGS. 111A to 111C are schematic views showing a state where the reception sensitivity of a two-dimensional light receiving device is set to be high and a profile shape of the work of FIG. 110 is measured.
Figure 111B:
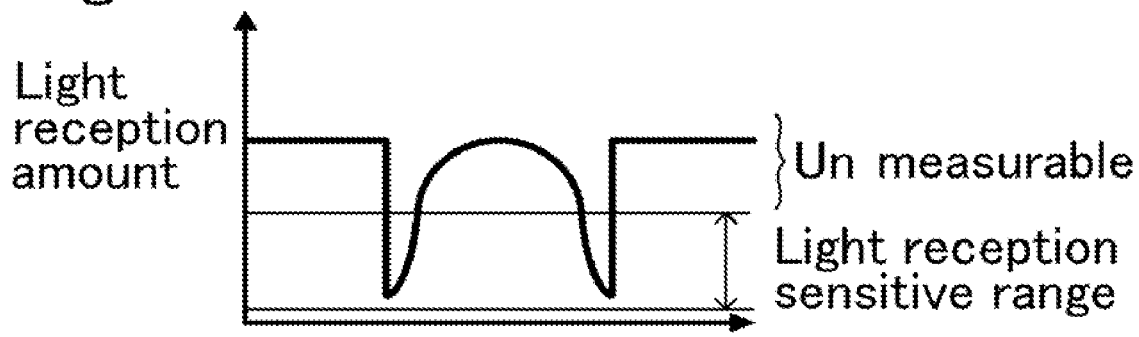
Figure 111C:
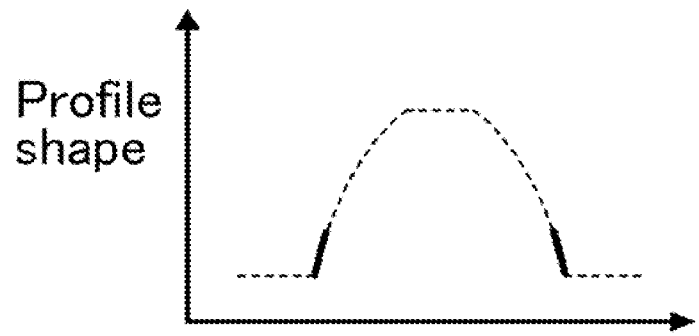
Figure 112A:
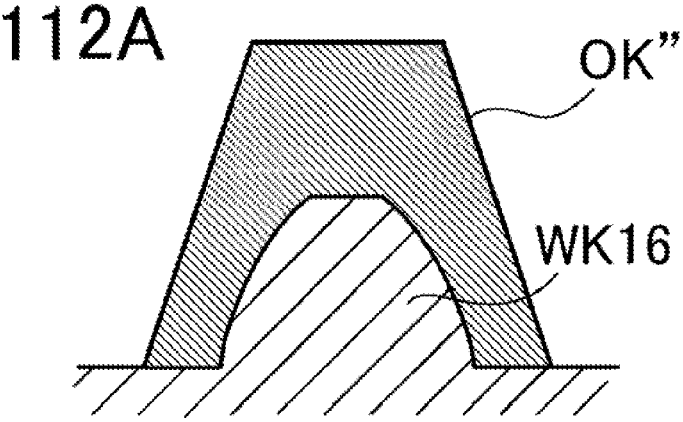
FIGS. 112A to 112C are schematic views showing a state where the reception sensitivity of the two-dimensional light receiving device is set to be low and a profile shape of the work of FIG. 110 is measured.
Figure 112B:
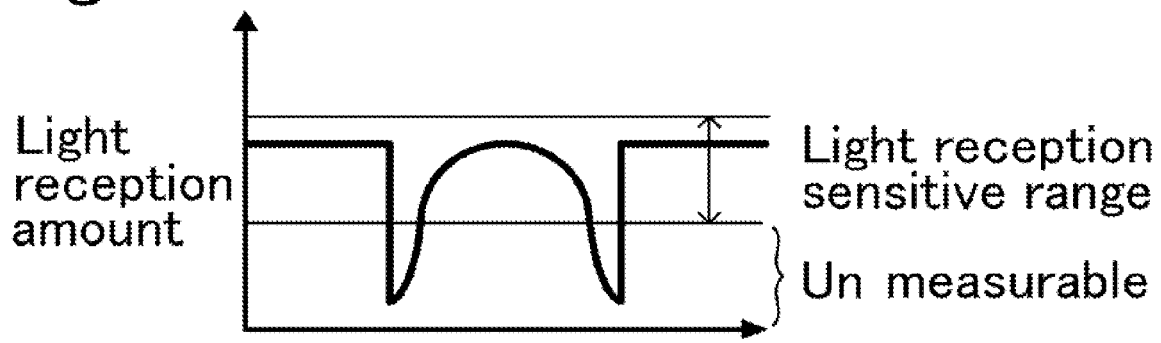
Figure 112C:
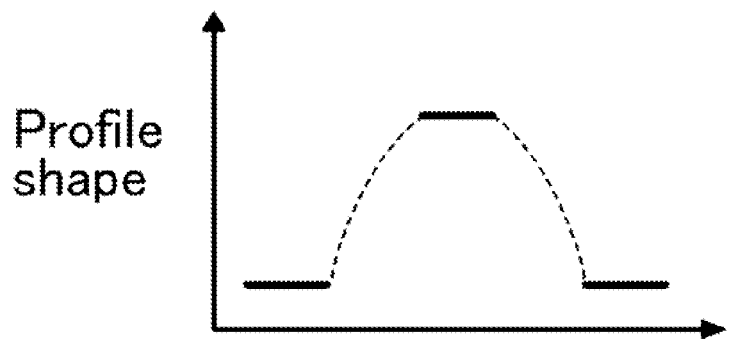

Further, as a multiple composition method, the light receiving characteristic of the two-dimensional light receiving device is changed to partially capture a profile shape. By combining partial profile shapes, a single profile shape can be obtained. The method will be described with reference to FIGS. 110 to 115. FIG. 110 is a perspective view of a work WK16 curved in a convex shape as an example of a work in which the reflection light amount varies according to parts. When strip-line-shaped light OK' is emitted from above to the work WK16 to obtain a profile shape as shown in FIG. 110, the reception light amount largely varies according to the tilt angles of the surface of the work WK16. Consequently, it is difficult to unconditionally set the light receiving characteristic of the two-dimensional light receiving device. Concretely, the reception light amount is large in the plane part. In the curved part, as the tilt becomes close to the perpendicular plane, the reception light amount decreases. Therefore, at the time of emitting the strip-line-shaped light OK" to the work WK16 in FIG. 110 as shown in FIG. 111A, when the light reception sensitivity of the two-dimensional light receiving device is set to high so that a sufficient reception light amount can be obtained in a curved part, the reception light amount in the plane part saturates as shown in FIG. 111B, so that the profile shape of the plane part cannot be detected as shown in FIG. 111C. On the contrary, in a setting of suppressing the light reception sensitivity so that the reception light amount in the plane part can be properly detected in a similar work WK16 shown in FIG. 112A, the reception light amount in the curved part becomes short as shown in FIG. 112B, and the profile shape of the area cannot be detected as shown in FIG. 112C. As described above, in a case where the reception light amount largely changes in the surface shape of the work, or in the case of a work having large variations in the reflection light amount according to its parts such as a work made of materials having different reflectance such as a metal and a black rubber, it is difficult to set a proper light receiving characteristic.

Figure 113:
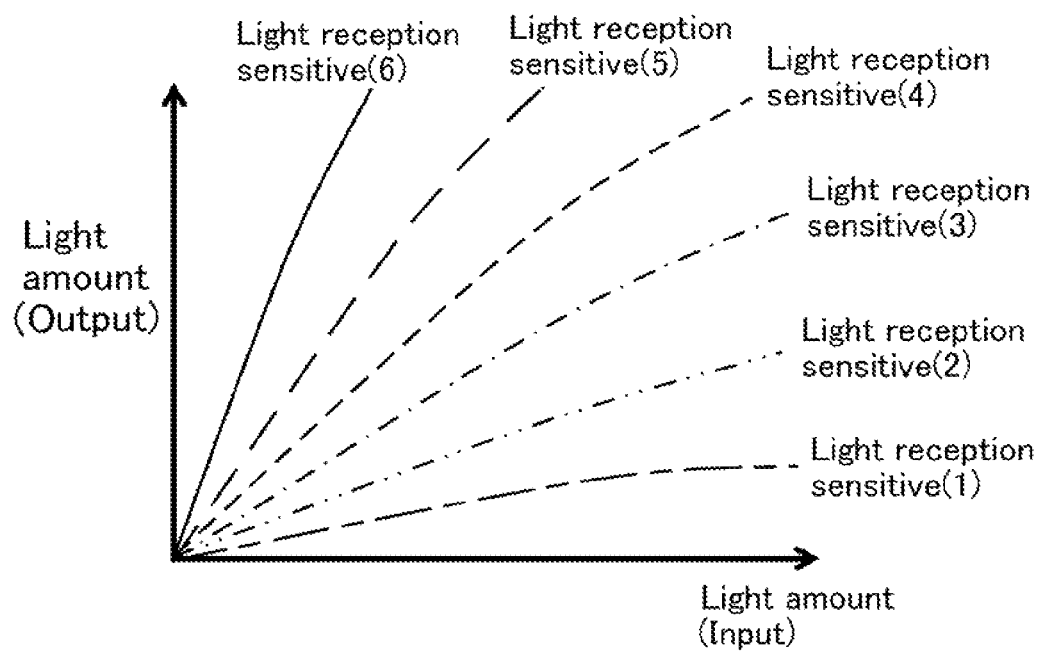
FIG. 113 is a graph showing a reception light sensitivity curve of a two-dimensional light receiving device whose light receiving characteristic is adjustable.

In the embodiment, the two-dimensional light receiving device whose light receiving characteristic is variable is used, and a light receiving characteristic adjusting function (multi-trigger function) is provided, which computes partial profile shapes on the basis of reception light amounts obtained from light projected a plurality of times, and combines the partial profile shapes, thereby forming a single profile shape. A CCD having the above-described logarithm characteristic as a light receiving sensitivity curve is used and, further, a CCD capable of switching the light receiving characteristic in six levels from 1 to 6 as shown in FIG. 113. Each of the light receiving characteristic curves shows light receiving sensitivity or an exposure parameter which can be switched by the light receiving device control unit 52. Also, the light receiving sensitivity parameter can be switched by the light reception level control means 61.

Figure 114:
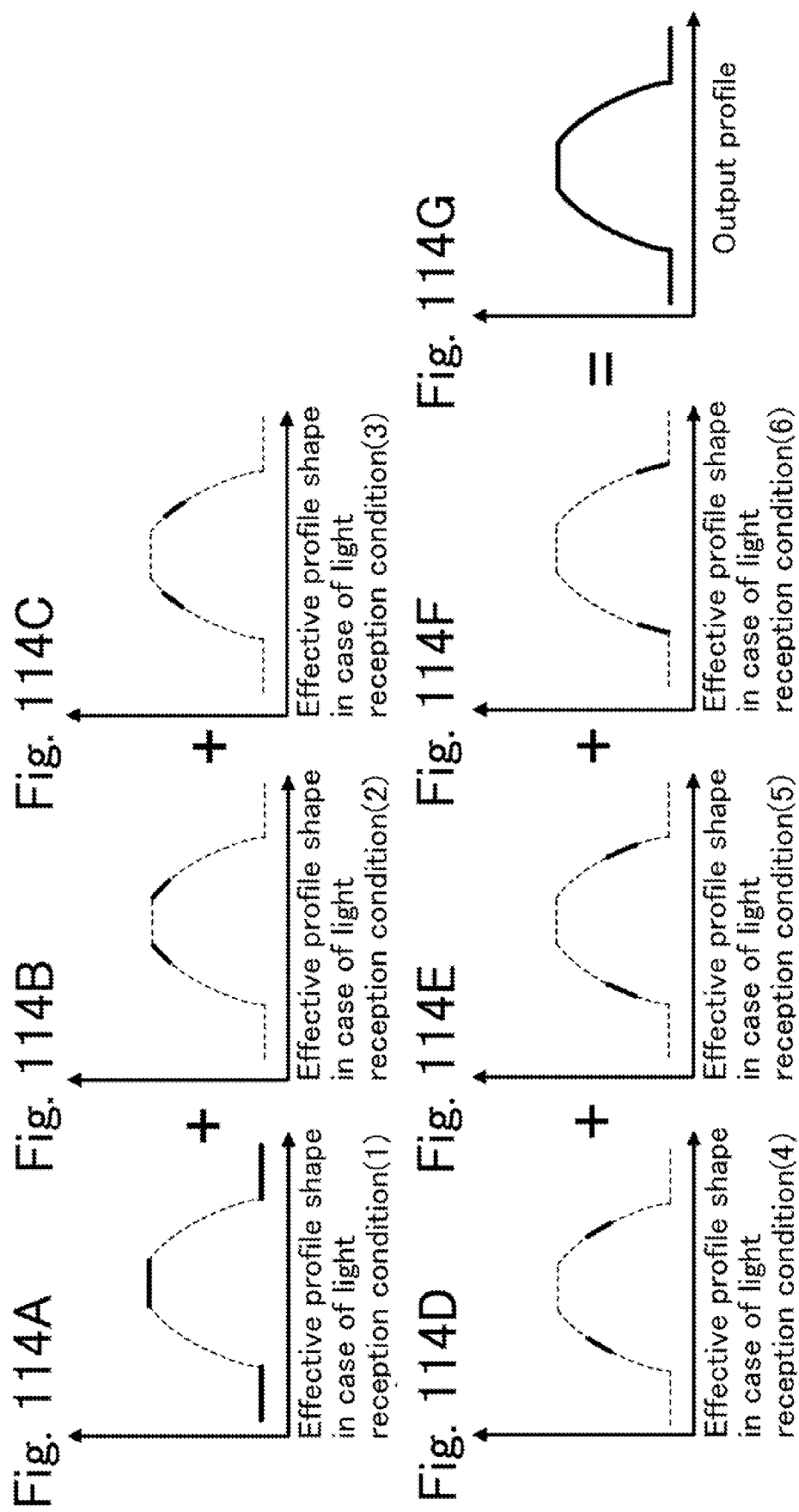
FIGS. 114A to 114G are schematic views showing a state of combining profile shapes by a multi trigger function.

A light receiving device such as a CCD or CMOS having a light receiving characteristic in five levels or less or seven or higher level, or which can be continuously changed can be also used. With the CCD, a profile shape of the work WK16 shown in FIG. 110 is measured a plurality of times. Specifically, the light reception sensitivity measured by the CCD is sequentially switched from (1) to (6) as shown in FIG. 114. Profile shapes are computed on the basis of reception light amounts detected according to the light reception sensitivity by the profile computing means 64 as a profile calculator, and the profile shapes are combined. In the example, the light reception sensitivity (1) is low as shown in FIG. 113, so that the plane part having a large reflection light amount is detected as shown in FIG. 114A and a partial profile is generated as a valid profile shape. Since the light reception sensitivity (2) is higher than the light reception sensitivity (1) as shown in FIG. 113, only slightly tilted parts are detected as shown in FIG. 114B. Similarly, the light reception sensitivity (3), (4), (5), and (6) sequentially increases, and profile shapes in areas of small reflection amounts are detected. Consequently, valid profile shapes are partially generated as shown in FIGS. 114C to 114F. By combining the profile shapes, the profile shape of the whole work is generated as shown in FIG. 114G and is outputted. By the method, only waveforms of optimum light amounts are processed and combined. Consequently, without an area which cannot be detected due to deterioration in detection precision due to saturated waveform and insufficient light amount, a profile can be detected accurately. In particular, a dark part and a light part in a work having variations in the light amount can be processed with optimum reception light amounts, so that the profile detection precision improves. An advantage is obtained such that a work having variations in light amounts such as a printed board having a large light amount difference between a substrate part and a land part and a cylindrical work in which the light amount largely varies according to the angle can be effectively measured.

Procedure of Executing Multi-Trigger Function

Figure 115:
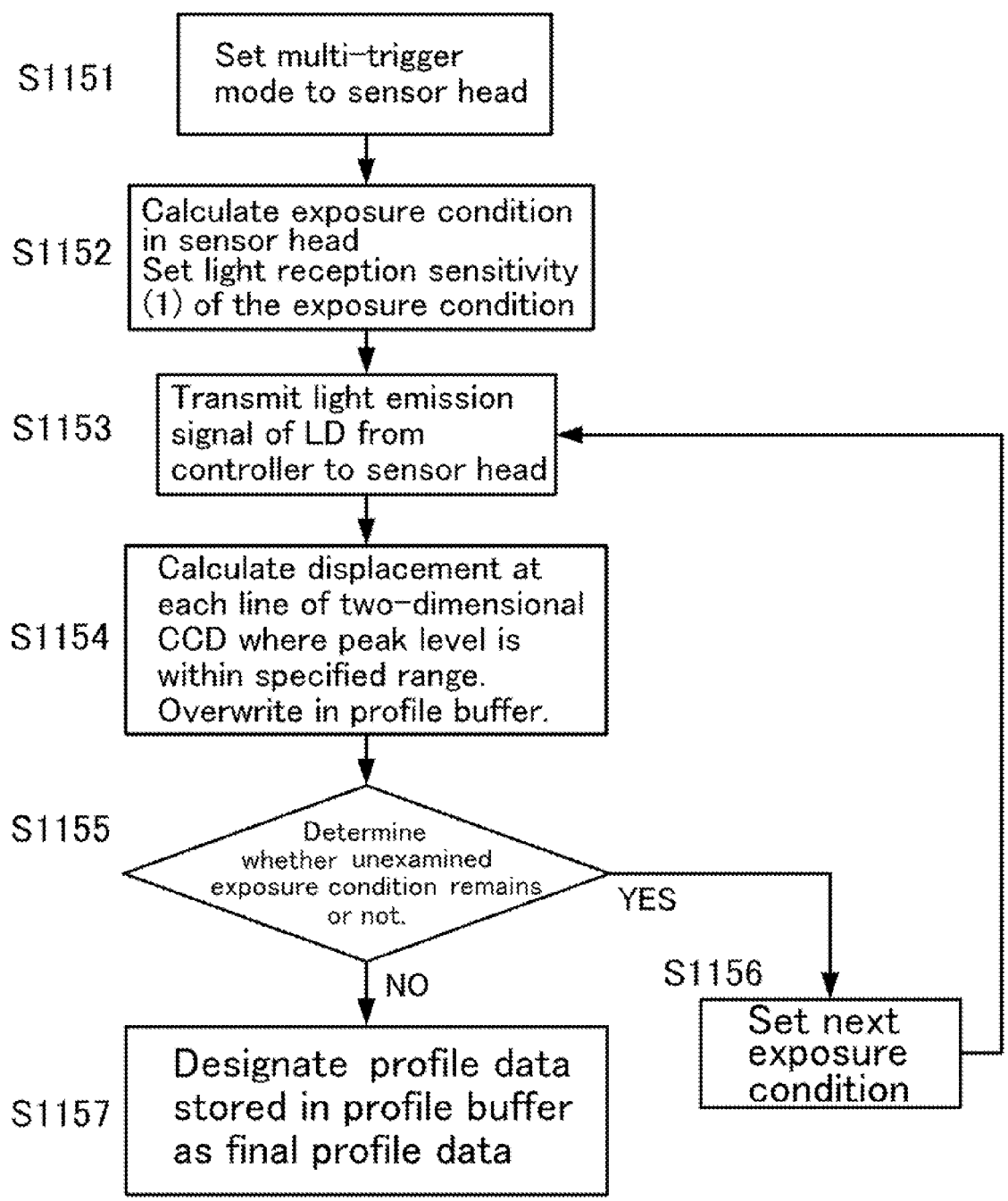
FIG. 115 is a flowchart showing the procedure of process of combining profile shapes by the multi trigger function.

The procedure of performing a process of combining profile shapes by the multi-trigger function will be described with reference to the flowchart of FIG. 115. First, the multi-trigger function is set. Concretely, in step S1151, the controller 22 turns on a multi-trigger function and sets a multi-trigger mode to be executed, that is, the number of light reception sensitivity parameters in the sensor head 21. In this example, as the trigger mode, a standard mode or a high-speed mode is selected. When the standard mode is selected, exposure is performed with the six light reception sensitivity (1) to (6) in FIG. 113. When the high-speed mode is selected, exposure is performed with only three parameters (for example, only light reception sensitivity (1), (3), and (6)) in FIG. 113. In such a manner, when importance is placed on precision of a profile shape, the number of light reception sensitivity parameters is increased. When importance is placed on processing speed, the number is decreased. The number of light reception sensitivity parameters may be designated by the user, and three or more trigger modes (standard, high-speed, fine, . . . ) may be provided. A multi-trigger with fixed parameters may be also used. In this case, the trigger mode is not selected.

Next, according to the trigger mode which is set in step S1152, the number of light reception sensitivity parameters to be set on the sensor head 21 and the details of the parameters are set. In the example, the sensor head 21 computes the reception light sensitivity characteristic of the two-dimensional light receiving device (specifically, the exposure parameter of the two-dimensional CCD) and sets, as the first parameter, the light reception sensitivity (1) in FIG. 113. The light reception sensitivity (1) is a parameter of decreasing the output value of the CCD even when a reception light amount which is input is large. After the setting is made as described above, an actual measurement is performed. As necessary, the mode can be switched from the setting mode to the measurement mode.

In the measurement procedure, concretely, a light emission signal of the laser diode 12 is transmitted from the controller 22 to the sensor head 21 in step S1153. In step S1154, a displacement value of only a line having reception light sensitivity in a proper range out of reception light signals obtained in an imaging operation of the two-dimensional CCD with the set light reception sensitivity is obtained and stored in a profile buffer as the uncomposed-image storing means 92. The light reception sensitivity at which a displacement value can be obtained is specified by the light reception sensitivity parameter. For example, the light reception sensitivity (1) is set to the peak height of 200 to 800 LSB. In step S1155, whether a light reception sensitivity parameter which is not yet measured remains or not is determined. If YES, the program advances to step S1156. If NO, the program advances to step S1157. In step S1156, the next light reception sensitivity parameter (the light reception sensitivity (2) in the example) is set. Returning to step S1153, the light emission signal of the laser diode 12 is transmitted again to the sensor head 21. In step S1154, the sensor head 21 performs imaging operation with the two-dimensional CCD with the parameter of the light reception sensitivity (2), obtains a displacement value of only a line having reception light sensitivity in a proper range, and combines it to the profile buffer obtained. Similarly, the work is repeated while sequentially changing the light reception sensitivity from (1) to (6). After profile shapes are measured at all of the sensitivity (1) to (6), the program advances to step S1157 where an initializing process of resetting the sensitivity to the light reception sensitivity (1) or the like is performed as necessary. After that, profile data stored in the profile buffer is outputted as final profile data.

In the above example, profile shapes of work with different reception light amounts are obtained while changing the exposure parameter, that is, the characteristic on the light receiving side. On the other hand, similar effects can be obtained by changing the light emission amount on the light emission side, not the light receiving side. To be concrete, a plurality of profile images are obtained and combined while changing the light emission amount of the laser diode 12 on the projection side. In this case, the range of the reception light amount obtained per laser diode emission, that is, the dynamic range is narrow. Therefore, the imaging operation has to be performed a number of times, and a problem arises that requires a long process time. When the emission light amount is decreased, a problem occurs that the influence of noise is easily exerted. On the other hand, in the method of adjusting the sensitivity on the light receiving side while setting an irradiation light amount as a constant value, a predetermined reception light amount can be assured, so that stable measurement is achieved. In particular, when a light receiving device having the logarithm characteristic is used, the dynamic range of the amount of light which can be received is wide. Thus, reception light signals in a wide range can be detected by a single image capturing operation. As a result, advantages are obtained such that the number of images is small, and process time required to obtain a profile shape can be shortened. It can be therefore said that it is more advantageous to fix the light emission amount and change the light receiving characteristic of the light reception side. Obviously, a more-appropriate profile shape can be obtained by adjusting both of the light emission amount and the light reception sensitivity.

Laser-Scan-Type Two-Dimensional Displacement Sensor

Figure 92:
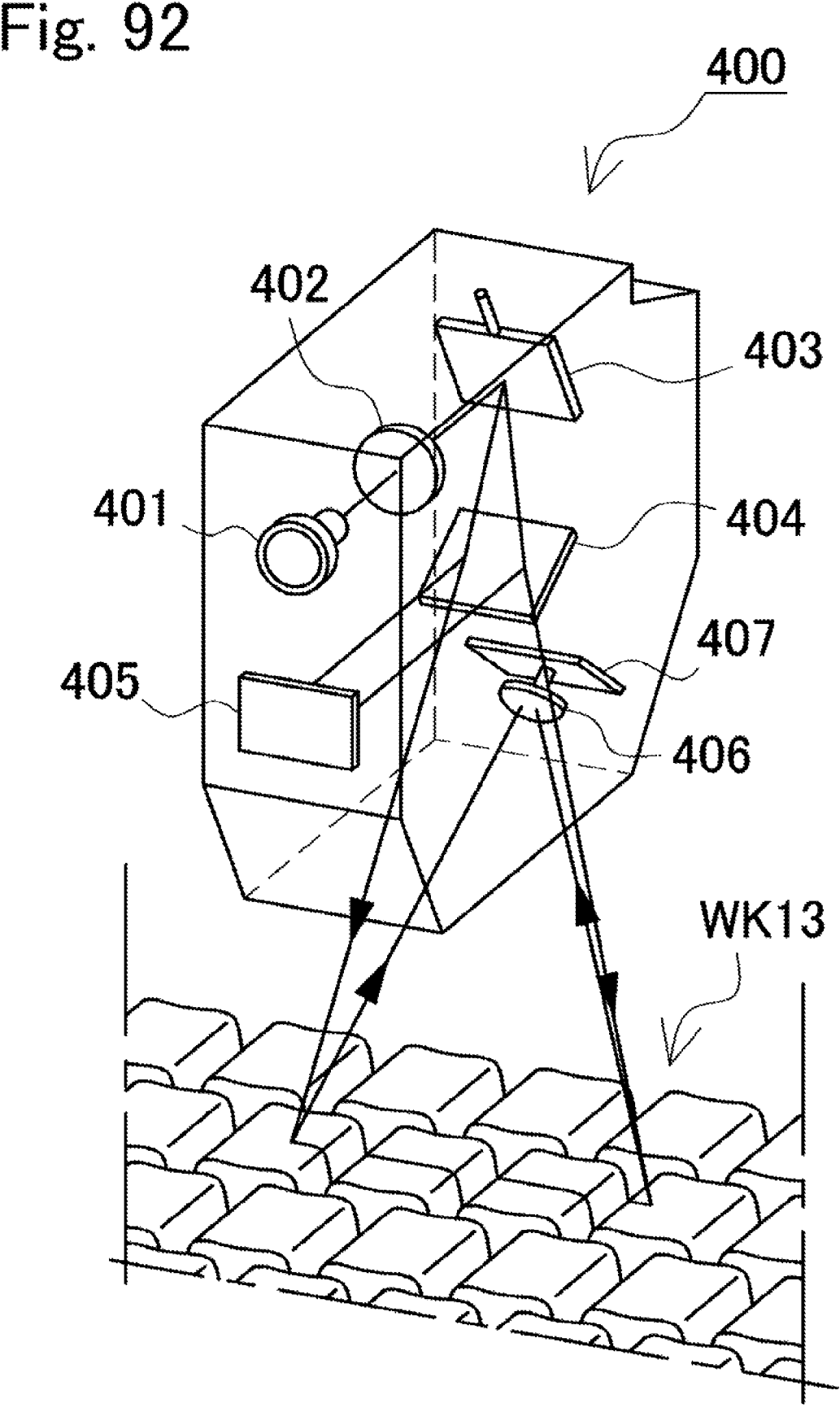
FIG. 92 is a schematic diagram showing a laser scan type two-dimensional displacement sensor.
Figure 93:
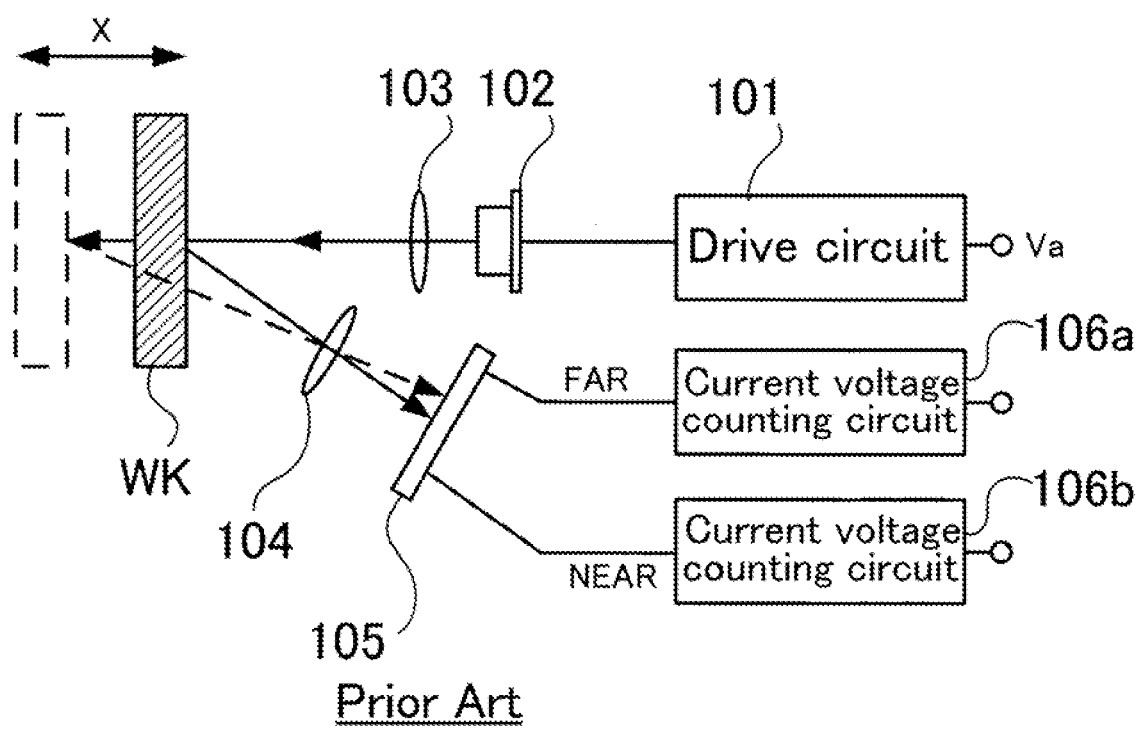
FIG. 93 is a block diagram showing the configuration of main components of a conventional optical displacement meter.
Figure 94:
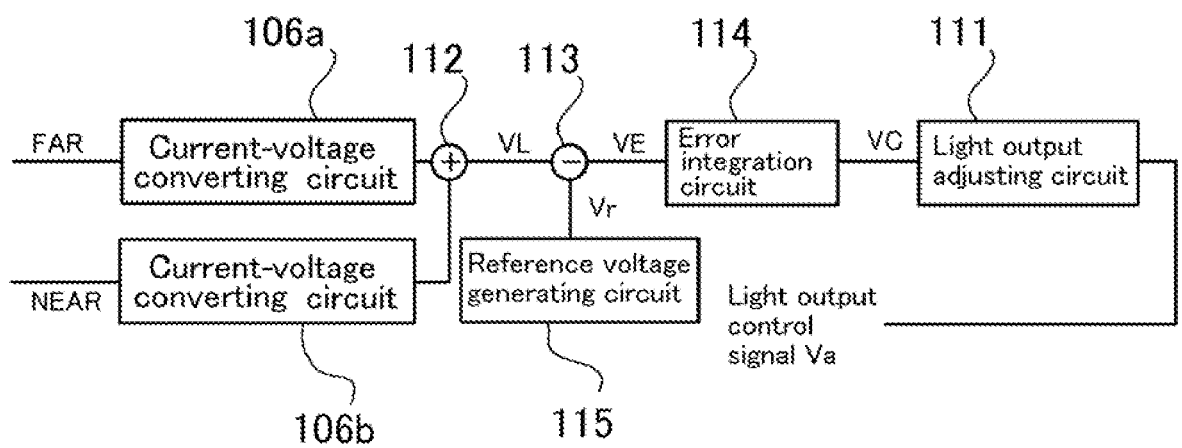
FIG. 94 is a block diagram showing an example of a conventional control circuit for controlling a reception light amount in a light position detecting device.
Figure 95:
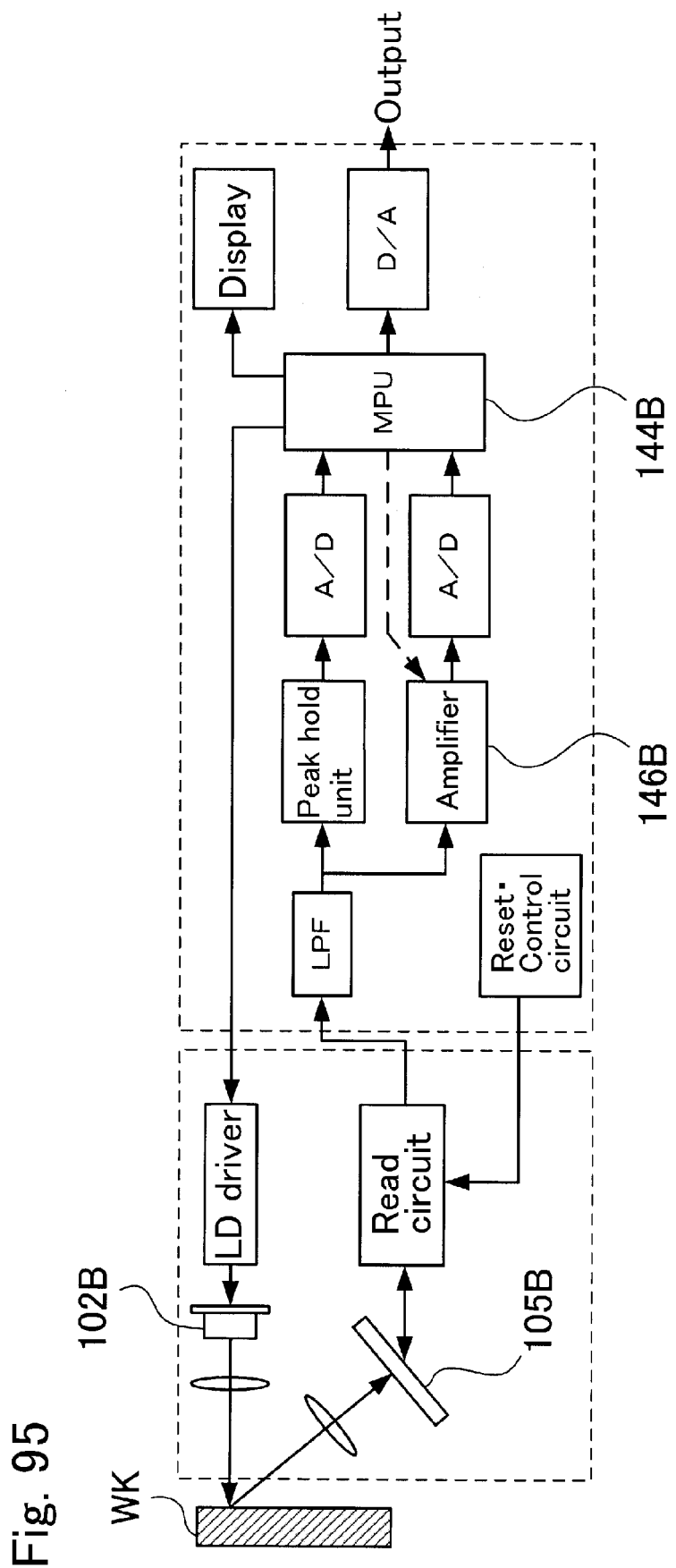
FIG. 95 is a block diagram showing a main circuit configuration of another conventional optical displacement meter.
Figure 96:
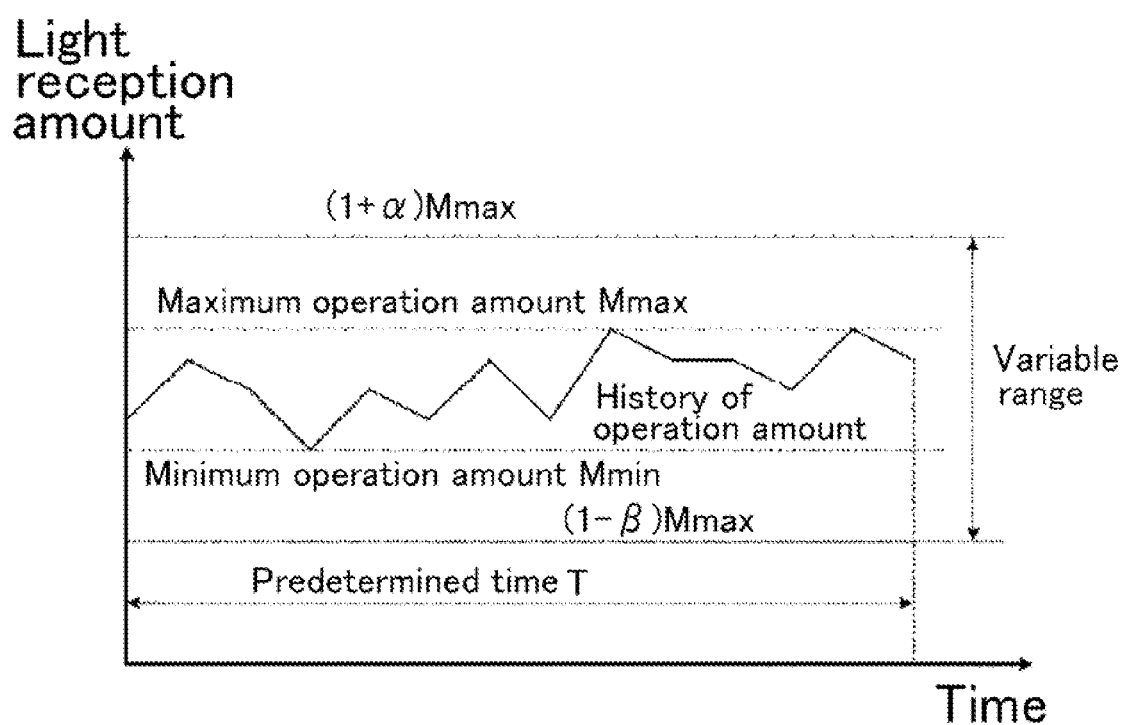
FIG. 96 is a schematic diagram showing an example of a variable range setting method.
Figure 97A:
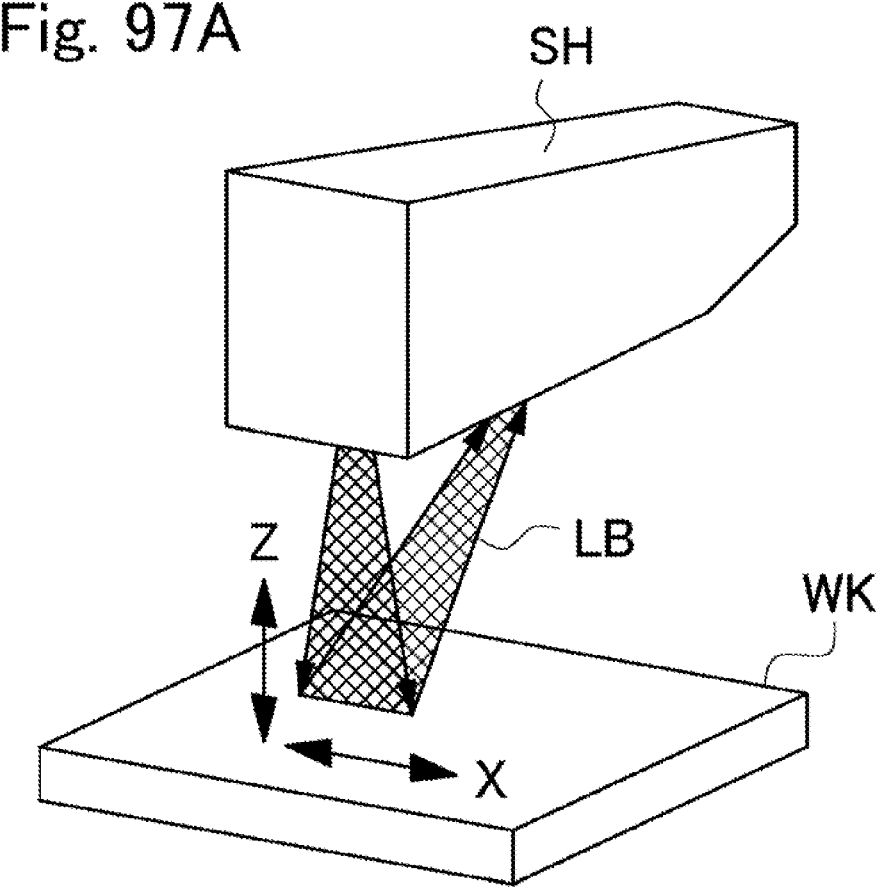
FIGS. 97A and 97B are schematic views showing the light sectioning principle.
Figure 97B:
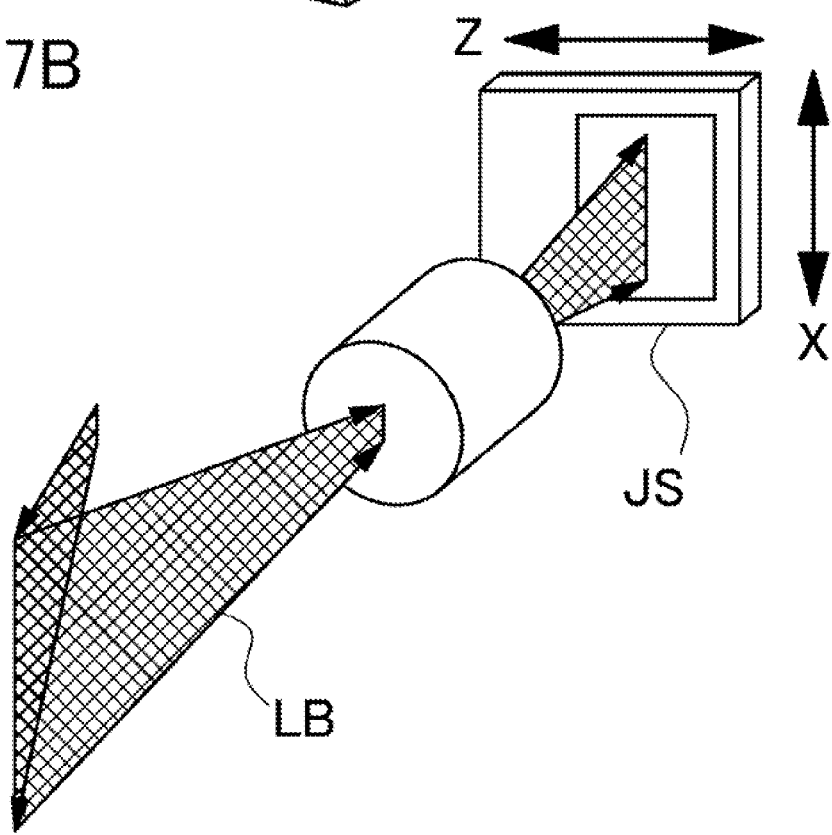

The present invention can be also applied to a laser-scan-type two-dimensional displacement sensor. FIG. 92 shows an outline of a laser-scan-type two-dimensional displacement sensor 400. As shown in the diagram, the laser-scan-type two-dimensional displacement sensor 400 has a light emitting device 401, a projection lens 402 as an aspherical surface glass, a scanner 403, a half mirror 404, an X-direction light receiving device 405, a light reception lens 406, and a Z-direction light receiving device 407. As the light receiving devices 405 and 407, image sensors such as a two-dimensional CCD and CMOS can be used. It is also possible to use a one-dimensional image sensor and obtain reception light signals line by line. In this method, feedback control can be performed line by line. Without generating a composite image, a reception light image adjusted to a proper light amount line by line can be obtained. In the laser-scan-type two-dimensional displacement sensor 400, in place of the strip-line-shaped light, a spot-shaped laser beam emitted by the light emitting device 401 is polarized in the X-axis direction to the linear shape by the scanner 403. The linear laser beam is split by the half mirror 404 to surface reflection light and transmission light. The surface reflection light of the half mirror 404 forms a spot on the X-direction light receiving device 405, thereby determining a measurement point in the X direction. On the other hand, the transmission light transmitted through the half mirror 404 is passed to the work WK13. The diffusion reflection light of the work WK13 is condensed by the light reception lens 406, and forms a spot on the Z-direction light receiving device 407. On the basis of the change in the position of the spot, movement in the Z direction of the work WK13 is measured. By collating a measurement point detected by the X-direction light receiving device 405 and a measurement point detected by the Z-direction light receiving device 407, the shape of the work WK13 can be detected.

The optical displacement meter, the optical displacement measuring method, the optical displacement measuring program, the computer-readable recording medium, and the device that records the program can be suitably applied as a CCD laser displacement sensor or the like capable of measuring a displacement of a work such as a transparent member, resin, black rubber, or the like, and can be used for applications such as measurement of a warp of a substrate, measurement of the surface shape of a tire, control of the height of the nozzle of a dispenser, and control of the position of a stage.

What is claimed is:

1. An optical displacement meter for measuring a displacement of an object to be measured, comprising:
    a projector being configured to emit a strip-line-shaped light to an object to be measured;
    a two-dimensional light receiving device having a plurality of linear sensors arranged in parallel, being capable of receiving reflection light image of the strip-line-shaped light from the object to be measured, wherein each of the linear sensors has a plurality of pixel construction parts arranged in line and each of the pixel construction parts generates a reception light signal corresponding to the reflection light image;
    an amplifier for amplifying the reception light signals read from the two-dimensional light receiving device;
    a profile computing unit being configured to calculate a peak position of the amplified light reflection light signals at each of the linear sensors of the two-dimensional light receiving device, and being configured to compute a displacement (Z) of the object to be measured on the basis of each of the peak positions and to compute a profile shape of the object to be measured on the basis of a position (X) of each of the linear sensors in the two-dimensional light receiving device and the displacement (Z) at each of the linear sensors; and
    a reception light level controller being configured to extract a peak level which is an amount of the amplified light reflection light signal at each of the peak positions, and controlling at least one of the peak levels except for the highest side and the lowest side of amount of the amplified light reflection light signal to keep within a predetermined range by adjusting at least one parameter of an emitting amount of the projector, an emitting duration of the projector, an exposure duration of the two-dimensional light receiving device and an amplification ratio of the amplifier.

2. The optical displacement meter according to claim 1, wherein the two-dimensional light receiving device has an input/output characteristic of light receiving sensitivity which can be arbitrarily adjusted.

3. The optical displacement meter according to claim 2, wherein the reception light level controller controls the at least one of the peak levels except for the highest side and the lowest side of amount of the amplified light reflection light signal to keep within the predetermined range by adjusting the input/output characteristic of light receiving sensitivity.

4. The optical displacement meter according to claim 1, further comprising:
    a display unit being configured to display the plurality of profile shapes computed with the different parameters respectively, and
    a selection unit being configured to select one of the plurality of profile shapes displayed on the display unit.

5. The optical displacement meter according to claim 4, wherein the display unit comprises:
    a profile display area being capable of displaying the profile shape of an object to be measured computed by the profile computing unit; and
    a light amount graph display area being capable of displaying a light amount graph indicative of a light amount.

6. The optical displacement meter according to claim 5, further comprising profile highlight means for performing highlight process on a profile shape in accordance with levels of the light amount at the time of displaying the profile shape on the display unit.

7. The optical displacement meter according to claim 1, further comprising:
    a display unit being configured to display the profile shape computed by the profile computing unit;
    measurement area designating means for designating a desired measurement area in a profile shape displayed on the display unit; and
    a measurement processor being capable of performing desired computation on the measurement area designated by the measurement area designating means.

8. The optical displacement meter according to claim 1, wherein the reception light level controller adjusts the parameter so that a peak level which is lied in a predetermined ratio of the distribution from the maximum peak level, lies in a predetermined range.

9. The optical displacement meter according to claim 1, wherein the reception light level controller adjusts the parameter so that an average of at least part of the distribution of each of the peak levels of the amplified reception light signals, lies in a predetermined range.

10. The optical displacement meter according to claim 2, further comprising:
    a profile shape combining unit being configure to store the displacement (Z) only at a linear sensor which has the peak level in a proper range with one of a plurality of set input/output characteristics of light receiving sensitivity, and to combine the stored displacement (Z) with the displacement (Z) only at a linear sensor which has the peak level in a proper range with another of the plurality of set input/output characteristics of light receiving sensitivity as a final profile shape.

* * * * *